United States Patent
Buibas et al.

(10) Patent No.: US 10,909,694 B2
(45) Date of Patent: Feb. 2, 2021

(54) SENSOR BAR SHELF MONITOR

(71) Applicant: ACCEL ROBOTICS CORPORATION, San Diego, CA (US)

(72) Inventors: Marius Buibas, San Diego, CA (US); John Quinn, San Diego, CA (US); Aleksander Bapst, San Diego, CA (US); Christopher Lai, San Diego, CA (US); Jose Miguel Rodriguez, San Diego, CA (US); Mark Alan Graham, San Diego, CA (US); Michael Brandon Maseda, San Diego, CA (US); Martin Alan Cseh, San Diego, CA (US)

(73) Assignee: ACCEL ROBOTICS CORPORATION, San Diego, CA (US)

( * ) Notice: Subject to any disclaimer, the term of this patent is extended or adjusted under 35 U.S.C. 154(b) by 0 days.

(21) Appl. No.: 16/917,813

(22) Filed: Jun. 30, 2020

(65) Prior Publication Data
US 2020/0334835 A1    Oct. 22, 2020

Related U.S. Application Data

(63) Continuation-in-part of application No. 16/563,159, filed on Sep. 6, 2019, which is a continuation of
(Continued)

(51) Int. Cl.
*G06K 9/00*     (2006.01)
*G06T 7/246*    (2017.01)
*G06T 7/292*    (2017.01)

(52) U.S. Cl.
CPC .......... *G06T 7/248* (2017.01); *G06K 9/00201* (2013.01); *G06K 9/00369* (2013.01); *G06K 9/00771* (2013.01); *G06T 7/292* (2017.01)

(58) Field of Classification Search
CPC ..... G06T 7/248; G06T 7/292; G06K 9/00771; G06K 9/00369; G06K 9/00201
See application file for complete search history.

(56) References Cited

U.S. PATENT DOCUMENTS 6,193,154 B1    2/2001  Phillips et al.
6,364,206 B1    4/2002  Keohane
(Continued)

OTHER PUBLICATIONS

Swift Local Solutions, "What is frictionless shopping and how will it impact your retail business", Apr. 25, 2017 (6 pages).
(Continued)

*Primary Examiner* — David F Dunphy
(74) *Attorney, Agent, or Firm* — ARC IP Law, PC; Joseph J. Mayo

(57) ABSTRACT

A sensor bar shelf monitor, for example that may be added to an existing shelving system to convert a store to autonomous operation. The sensor bar may contain distance sensor to detect shoppers reaching towards items on a shelf, and cameras to determine which items shoppers have taken. It may be installed into shelf supports such as gondola shelving uprights. The sensor bar may be located at the front edge of a shelf, and may monitor the shelf below. Placing the sensor bar along the front edge prevents damage to electronics from spills or shelf cleaning, and prevents heat from the sensor bar electronics from damaging items on the shelf. The sensor bar may have a local sensor bar processor that collects sensor data; images may be analyzed locally or transferred to more powerful store processors. A sensor bar may also have controllable lights and controllable electronic labels.

23 Claims, 71 Drawing Sheets
(35 of 71 Drawing Sheet(s) Filed in Color)

Related U.S. Application Data application No. 16/404,667, filed on May 6, 2019, now Pat. No. 10,535,146, which is a continuation-in-part of application No. 16/254,776, filed on Jan. 23, 2019, now Pat. No. 10,282,852, which is a continuation-in-part of application No. 16/138,278, filed on Sep. 21, 2018, now Pat. No. 10,282,720, which is a continuation-in-part of application No. 16/036,754, filed on Jul. 16, 2018, now Pat. No. 10,373,322.

(56) References Cited

U.S. PATENT DOCUMENTS

| | | |
|---|---|---|
| 6,507,279 B2 | 1/2003 | Loof |
| 6,882,900 B1 | 4/2005 | Terranova |
| 7,436,887 B2 | 10/2008 | Yeredor et al. |
| 8,300,890 B1 | 10/2012 | Gaikwad et al. |
| 9,064,161 B1 | 6/2015 | Boman et al. |
| 9,558,398 B2 | 1/2017 | Iwai |
| 9,805,266 B2 | 10/2017 | Zhang et al. |
| 9,911,290 B1 | 3/2018 | Zalewski et al. |
| 9,996,818 B1 | 6/2018 | Ren et al. |
| 10,044,922 B1 | 8/2018 | Bradski et al. |
| 10,055,853 B1 | 8/2018 | Fisher et al. |
| 10,127,438 B1 | 11/2018 | Fisher et al. |
| 10,133,933 B1 | 11/2018 | Fisher et al. |
| 10,148,918 B1 * | 12/2018 | Seiger ............... G06Q 10/087 |
| 10,282,852 B1 * | 5/2019 | Buibas ............... G06T 7/277 |
| 2005/0093690 A1 | 5/2005 | Miglionico |
| 2006/0187305 A1 | 8/2006 | Trivedi et al. |
| 2006/0279630 A1 | 12/2006 | Aggarwal et al. |
| 2007/0282665 A1 | 12/2007 | Buehler et al. |
| 2008/0181507 A1 | 7/2008 | Gope et al. |
| 2009/0057068 A1 | 3/2009 | Lin et al. |
| 2009/0324010 A1 | 12/2009 | Hou |
| 2011/0317016 A1 | 12/2011 | Saeki et al. |
| 2012/0113294 A1 | 5/2012 | Oyabu et al. |
| 2014/0132728 A1 | 5/2014 | Verano et al. |
| 2015/0039458 A1 | 2/2015 | Reid |
| 2015/0124088 A1 * | 5/2015 | Vera ............... H04N 5/2253 348/143 |
| 2015/0199890 A1 | 7/2015 | Hewett |
| 2015/0294483 A1 | 10/2015 | Wells et al. |
| 2015/0294496 A1 | 10/2015 | Medasani et al. |
| 2015/0347846 A1 | 12/2015 | Guzman-Rivera et al. |
| 2016/0034988 A1 * | 2/2016 | Howard ............... G06F 3/147 348/143 |
| 2016/0092739 A1 | 3/2016 | Oami et al. |
| 2016/0138857 A1 * | 5/2016 | Klingshirn ............... F25D 29/00 62/130 |
| 2016/0259341 A1 | 9/2016 | High et al. |
| 2016/0358145 A1 | 12/2016 | Montgomery |
| 2017/0309136 A1 | 10/2017 | Schoner |
| 2017/0323376 A1 | 11/2017 | Glaser et al. |
| 2018/0046975 A1 | 2/2018 | Jones et al. |
| 2018/0052228 A1 | 2/2018 | Markison et al. |
| 2018/0150685 A1 | 5/2018 | Ebrom et al. |
| 2018/0165728 A1 | 6/2018 | McDonald et al. |
| 2018/0225625 A1 | 8/2018 | DiFatta et al. |
| 2019/0117812 A1 | 4/2019 | Olsen et al. |
| 2019/0130180 A1 | 5/2019 | Shiraishi |
| 2019/0172039 A1 | 6/2019 | Kambara et al. |
| 2019/0213212 A1 * | 7/2019 | Adato ............... G06K 9/00624 |
| 2020/0036906 A1 * | 1/2020 | Yamade ............... H04N 7/181 |
| 2020/0061839 A1 | 2/2020 | Deyle et al. |
| 2020/0176125 A1 | 6/2020 | Chatterjea et al. |
| 2020/0225673 A1 | 7/2020 | Afrouzi et al. |
| 2020/0300538 A1 * | 9/2020 | Avakian ............... G06Q 10/087 |
| 2020/0302775 A1 | 9/2020 | Liu et al. |

OTHER PUBLICATIONS

Stores NRF's Magazine, "Standard Cognition makes frictionless checkout a reality", Jan. 23, 2018 (3 pages).

Porikli, Fatih, "Inter-Camera Color Calibration by Correlation Model Function", Mitsubishi Electric Research Lab, Cambridge, MA, 2003, 4 pages.

International Search Report Issued in PCT/US2019/042071, dated Aug. 26, 2019 (6 pages).

* cited by examiner

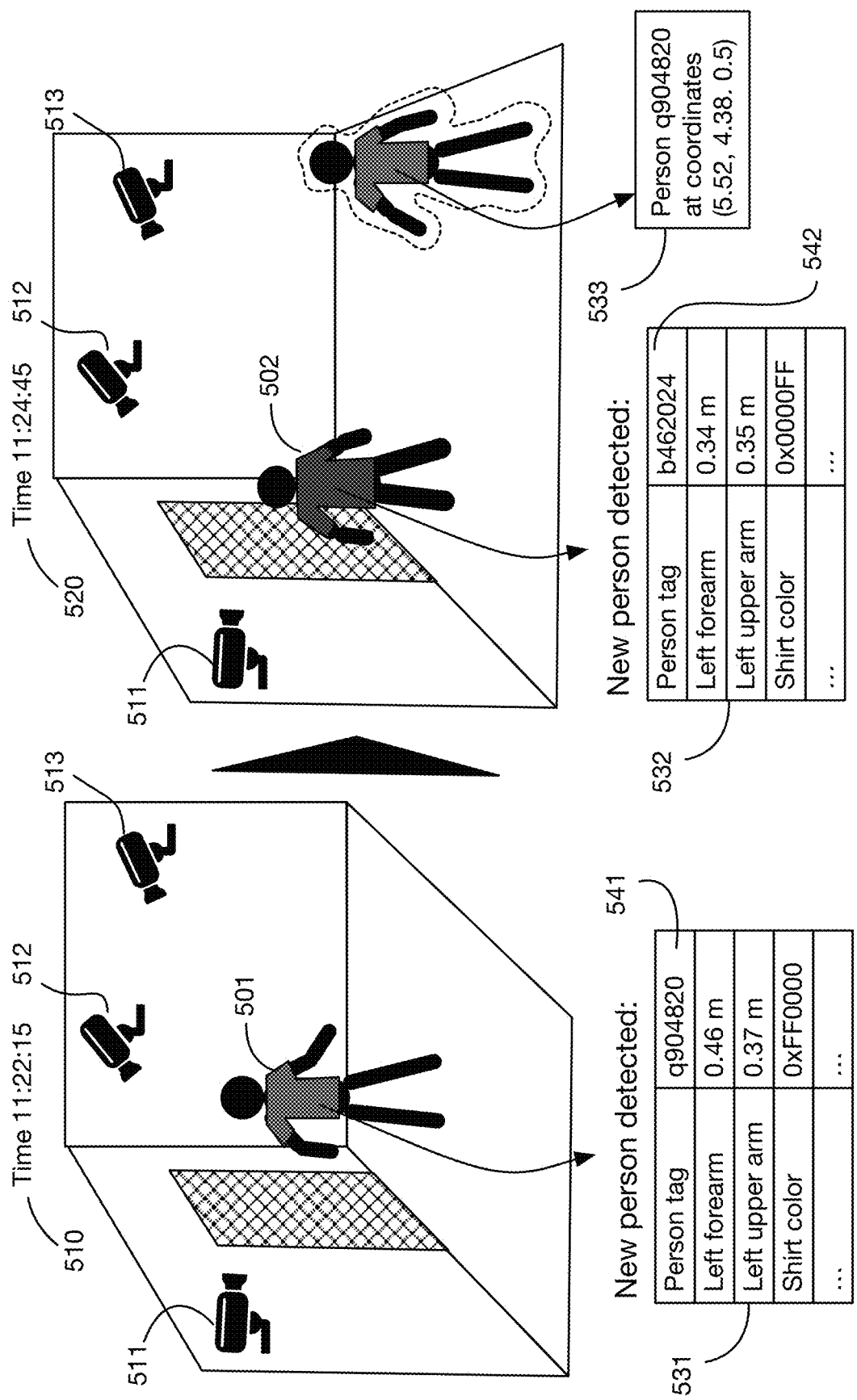

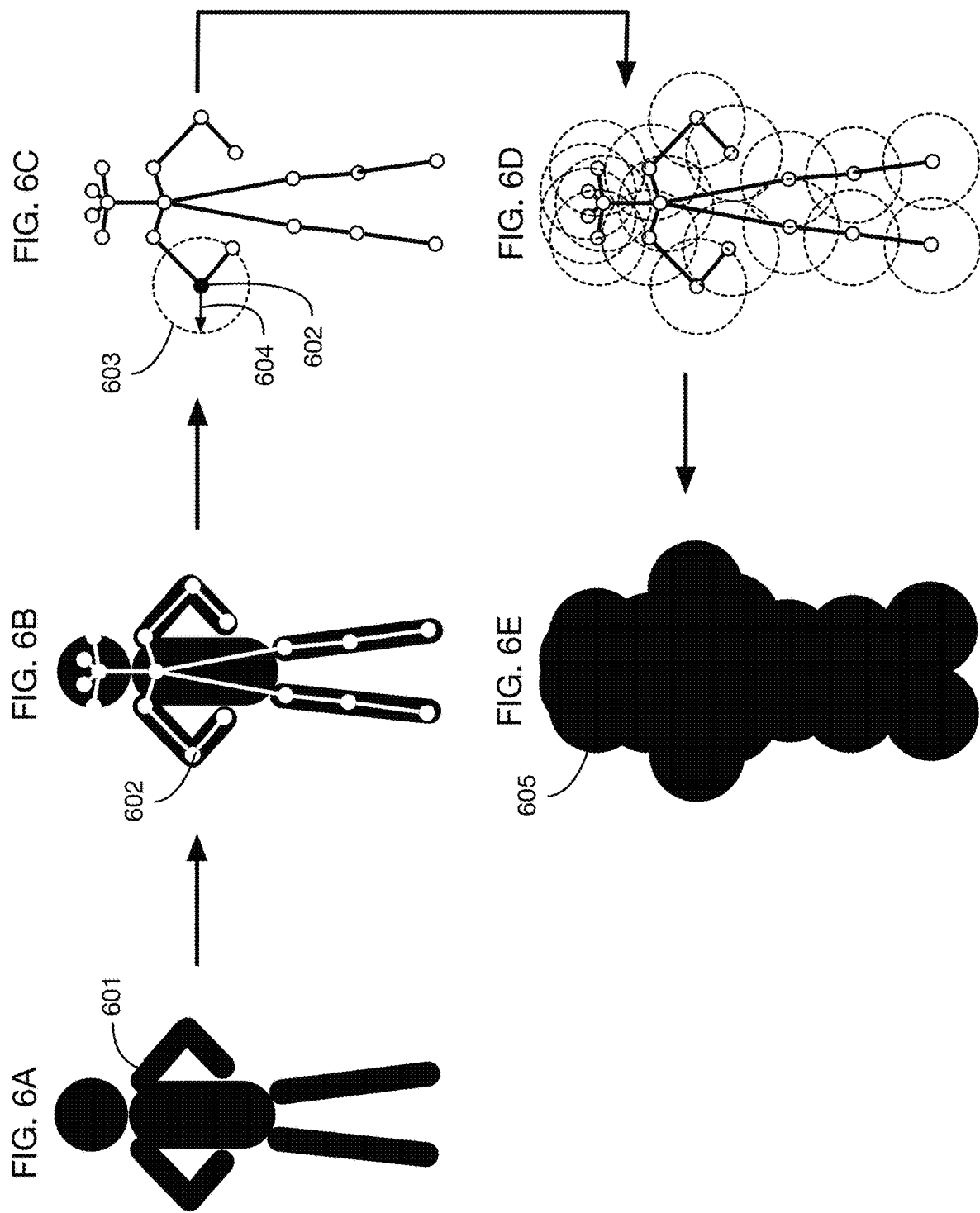

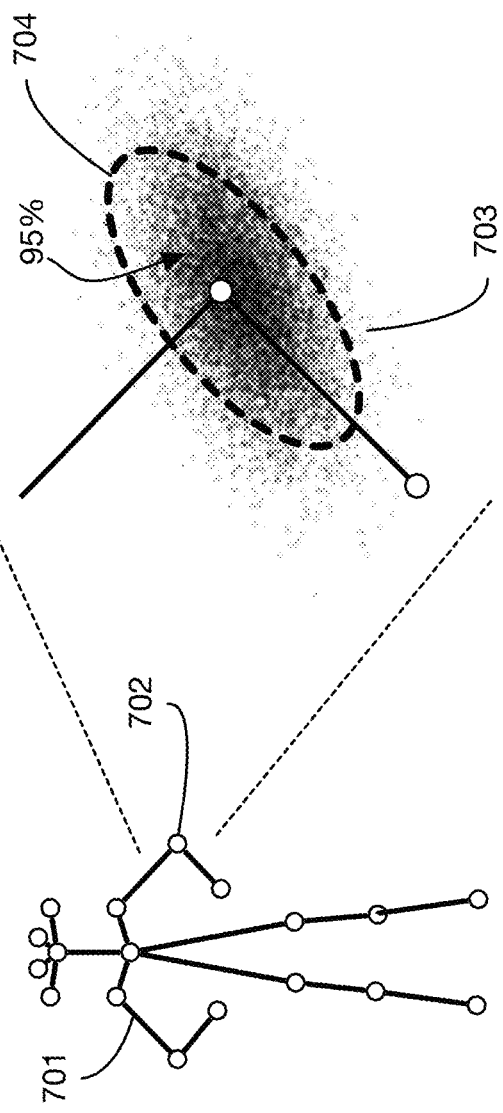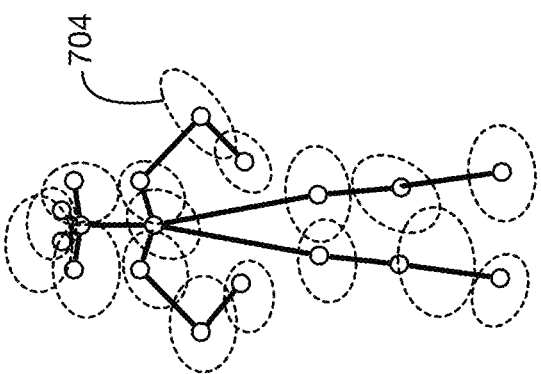

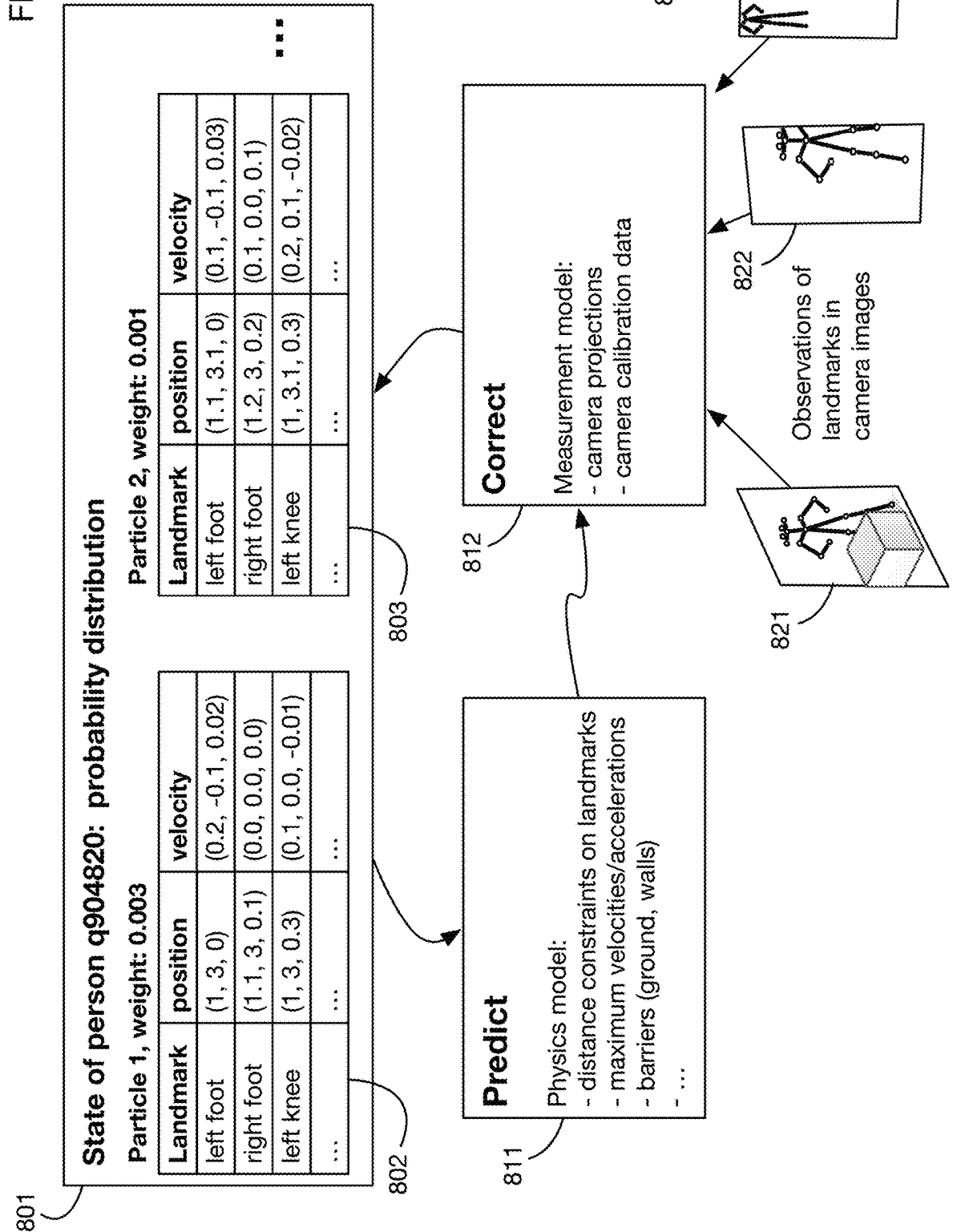

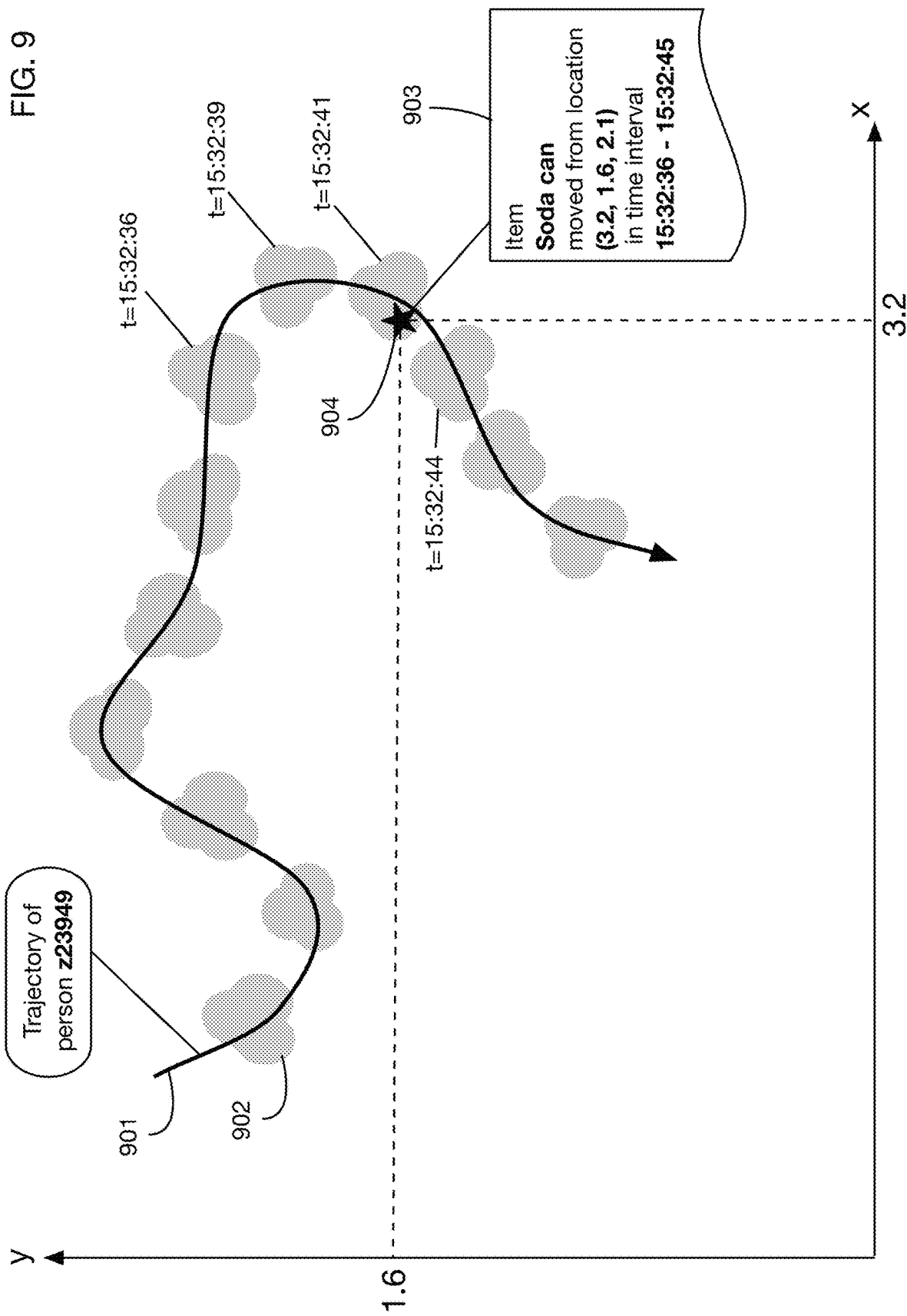

FIG. 14
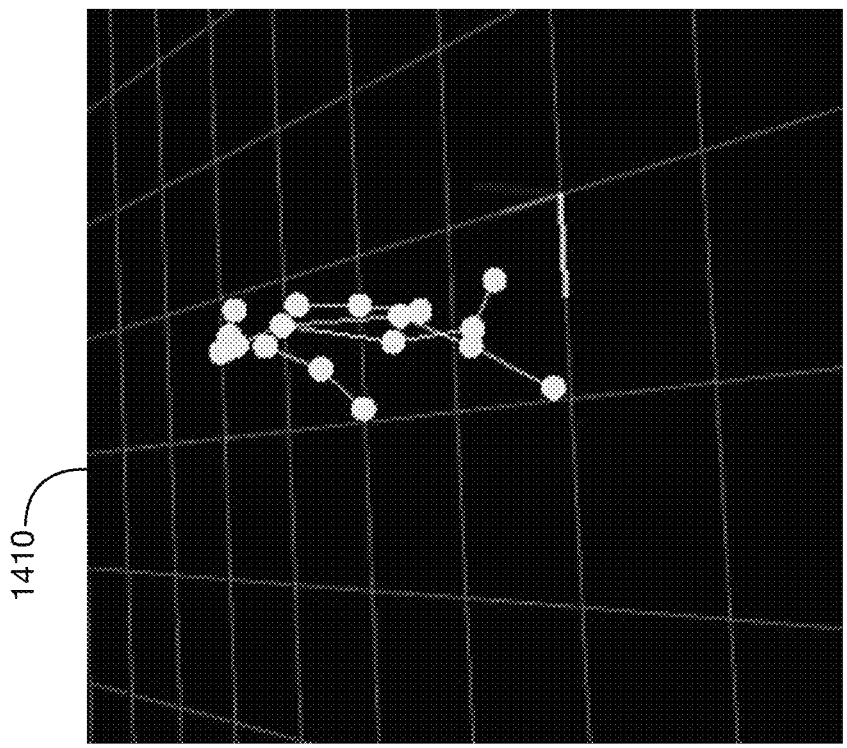

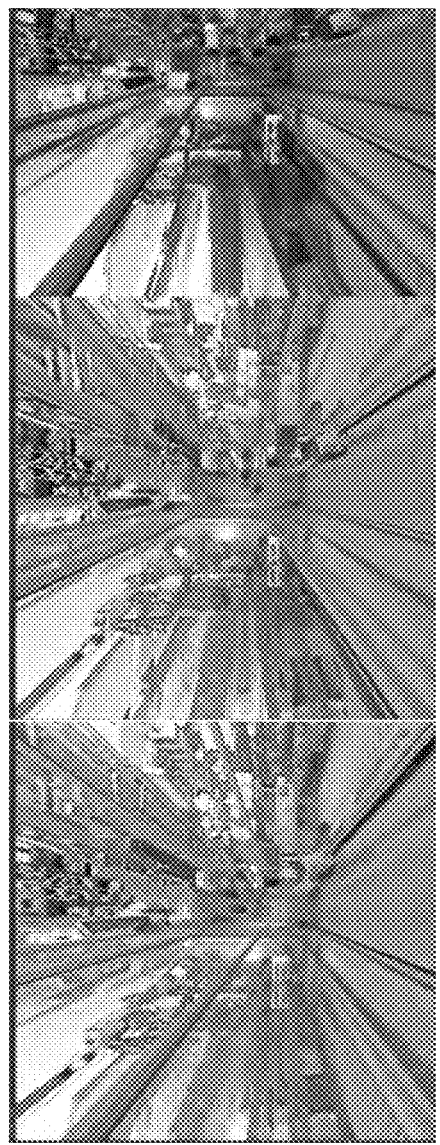
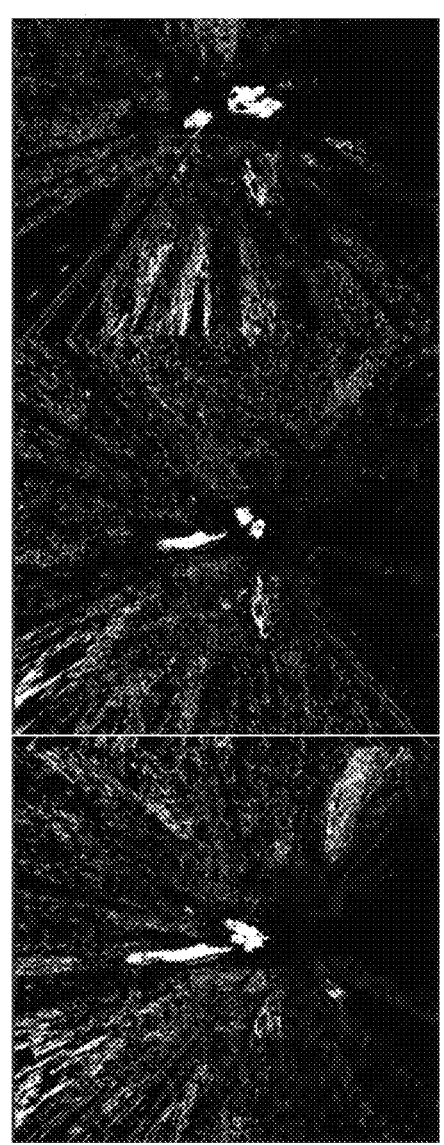
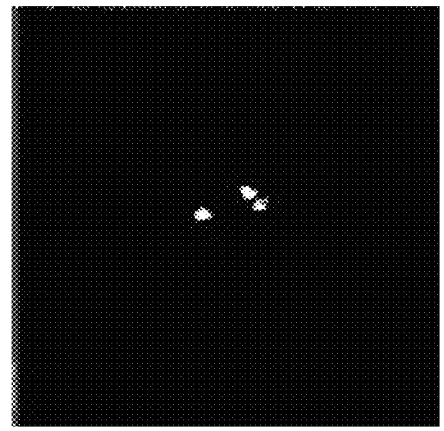
FIG. 27A FIG. 27B FIG. 27C
FIG. 28A FIG. 28B FIG. 28C
FIG. 28D

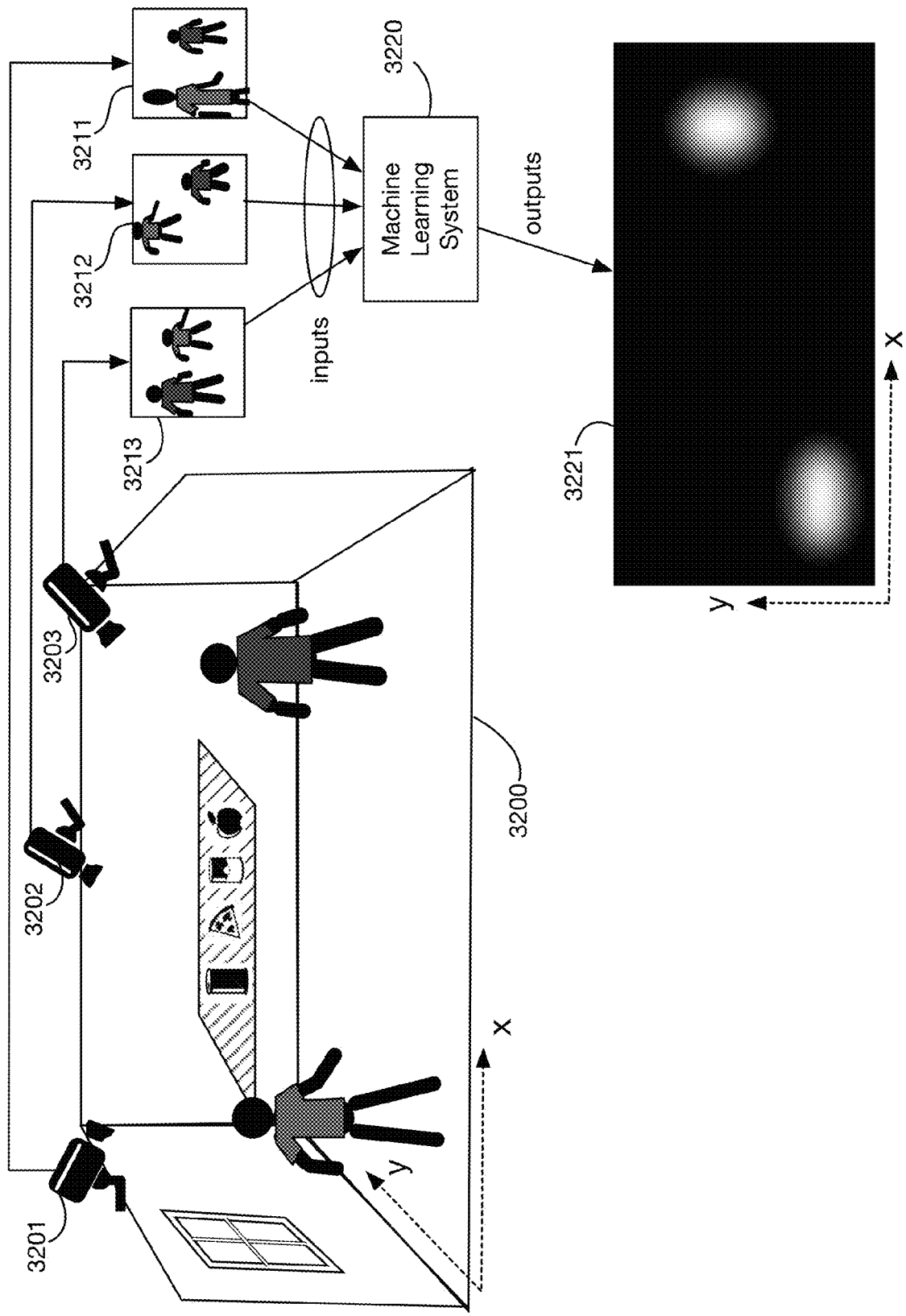

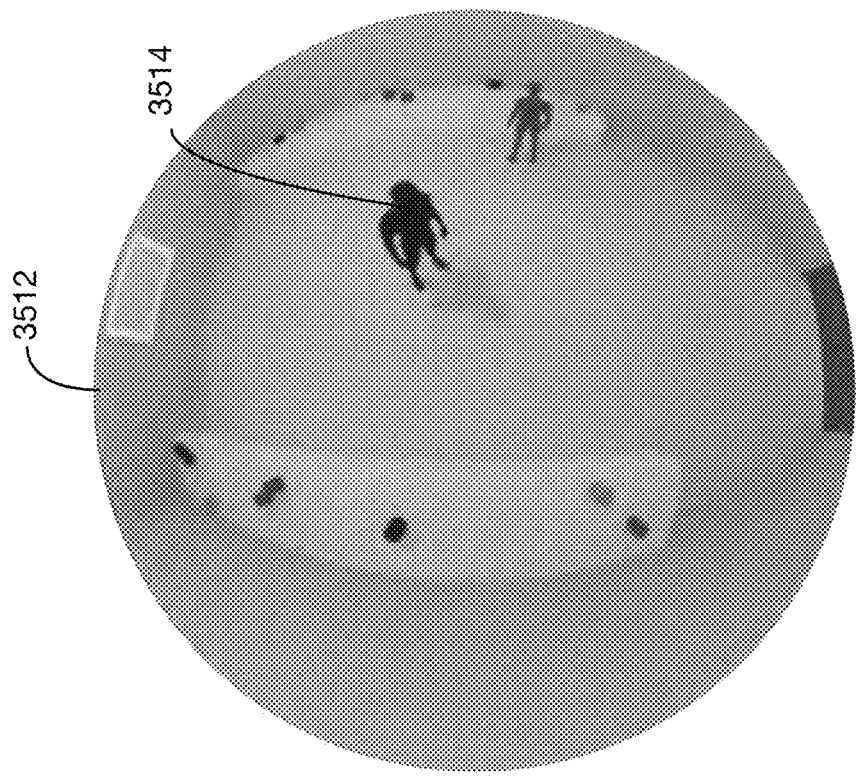
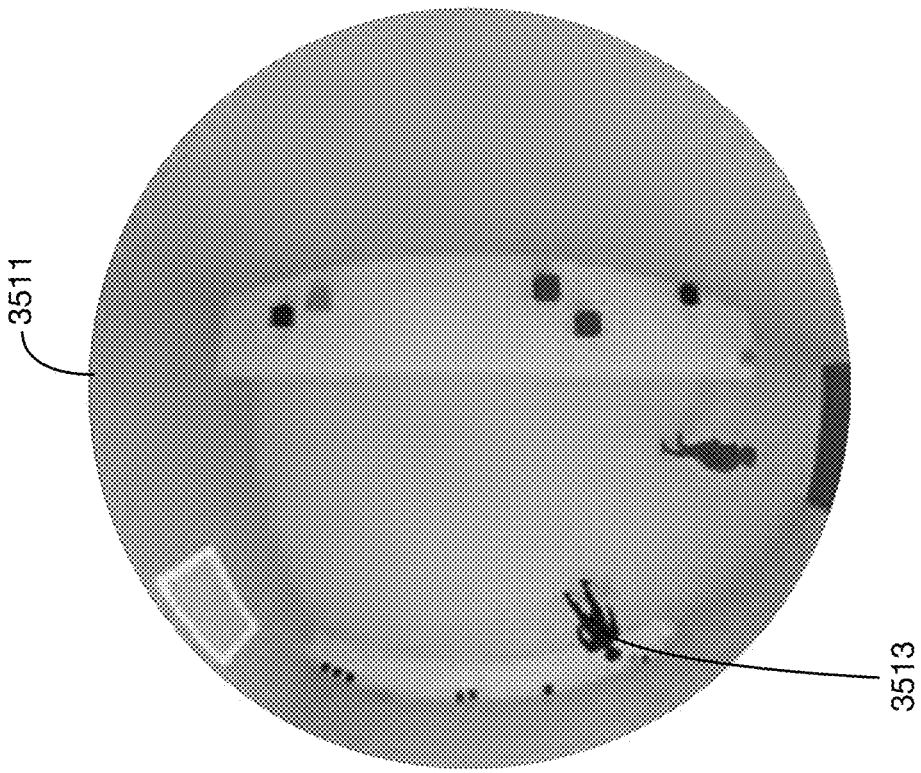
FIG. 35

FIG. 36
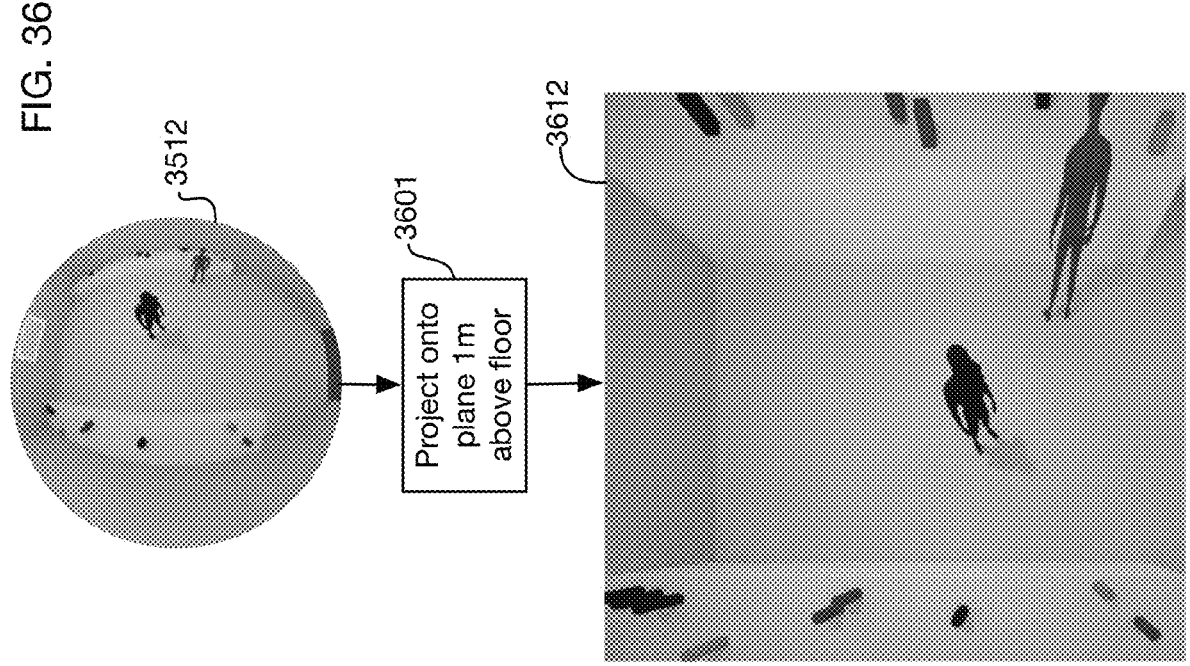
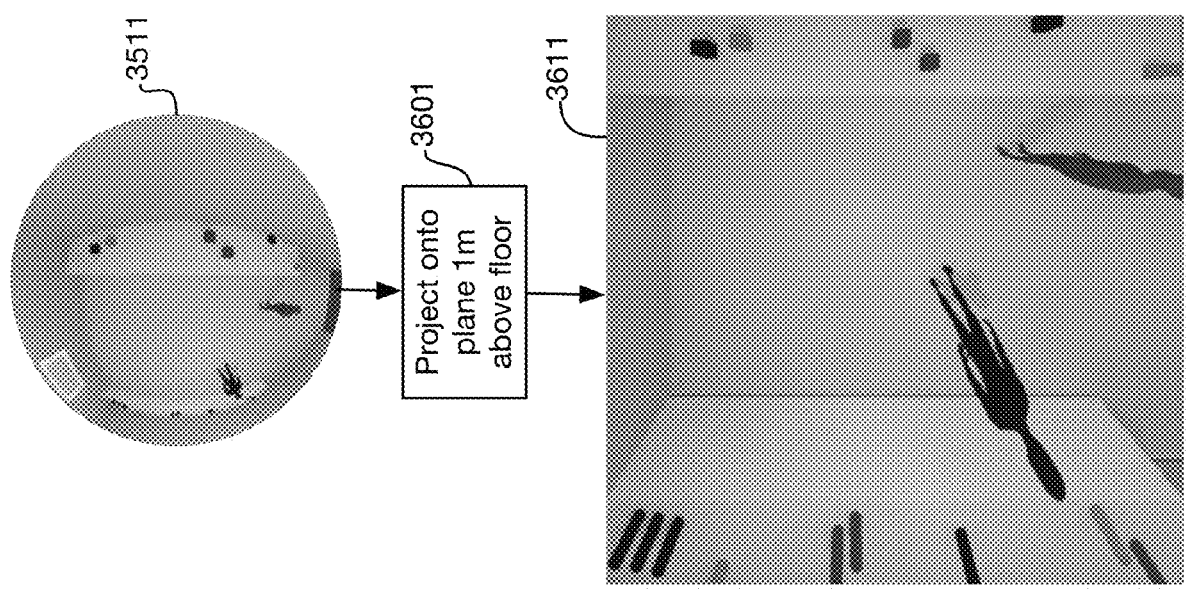

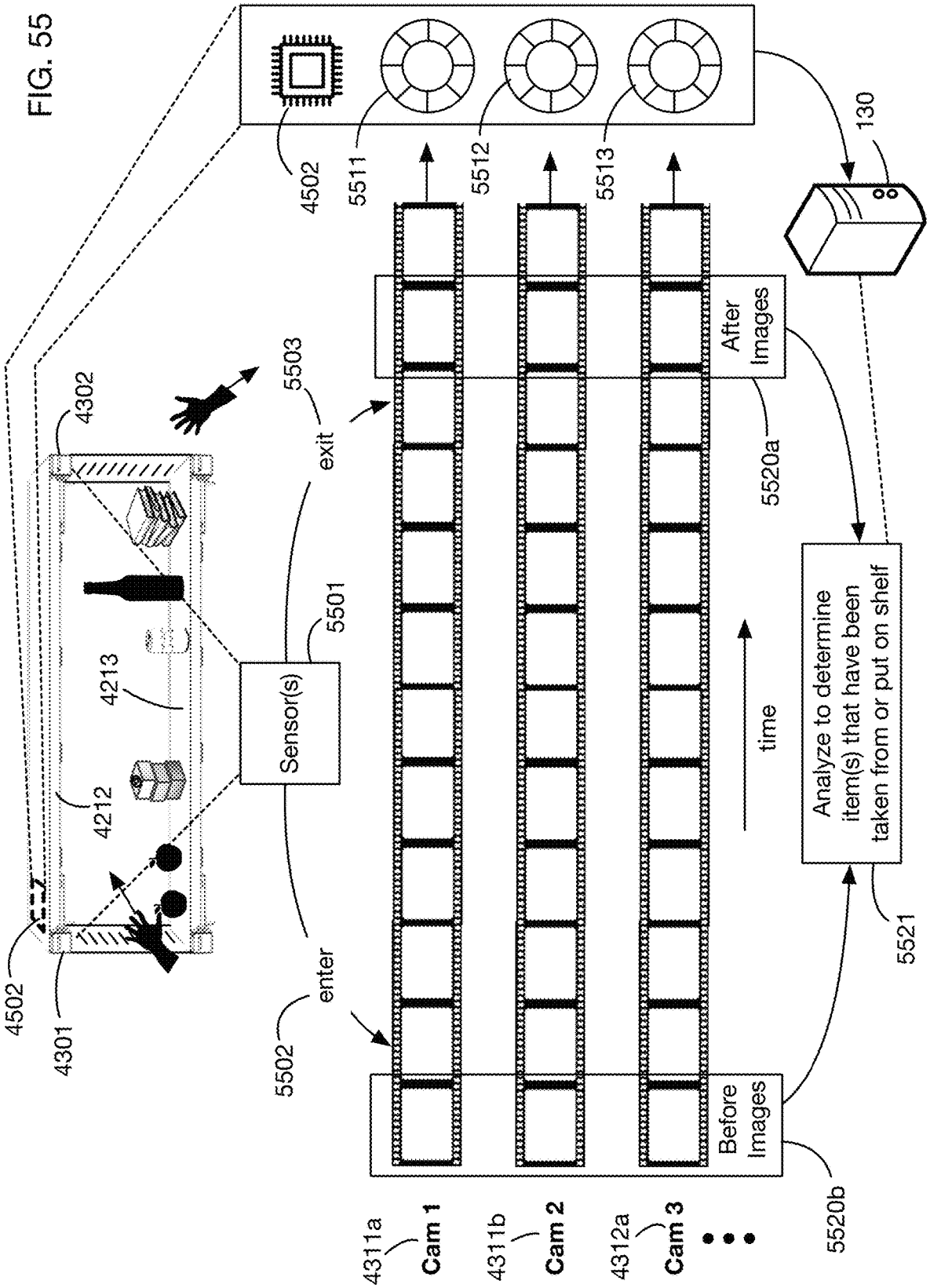

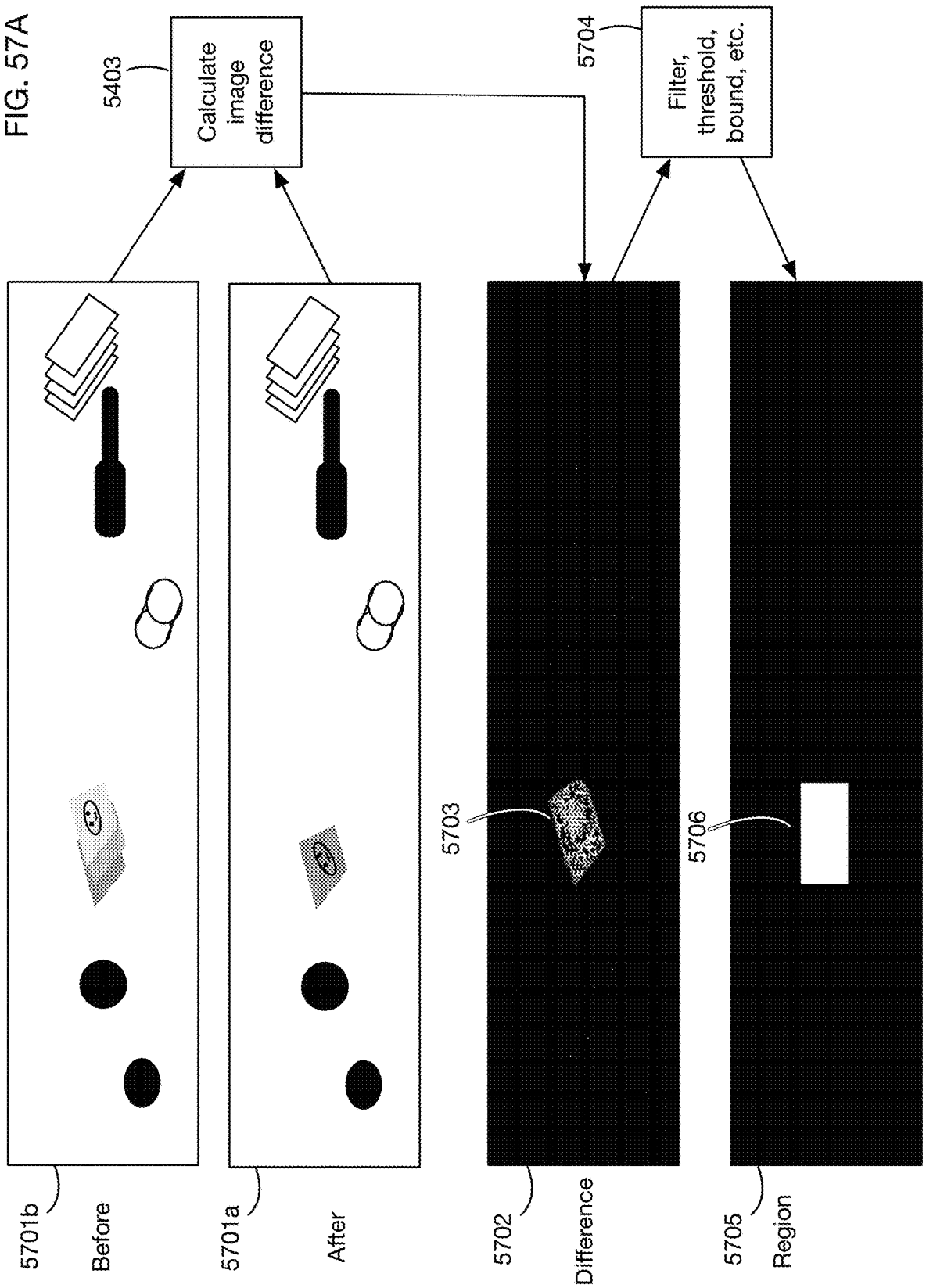

FIG. 61
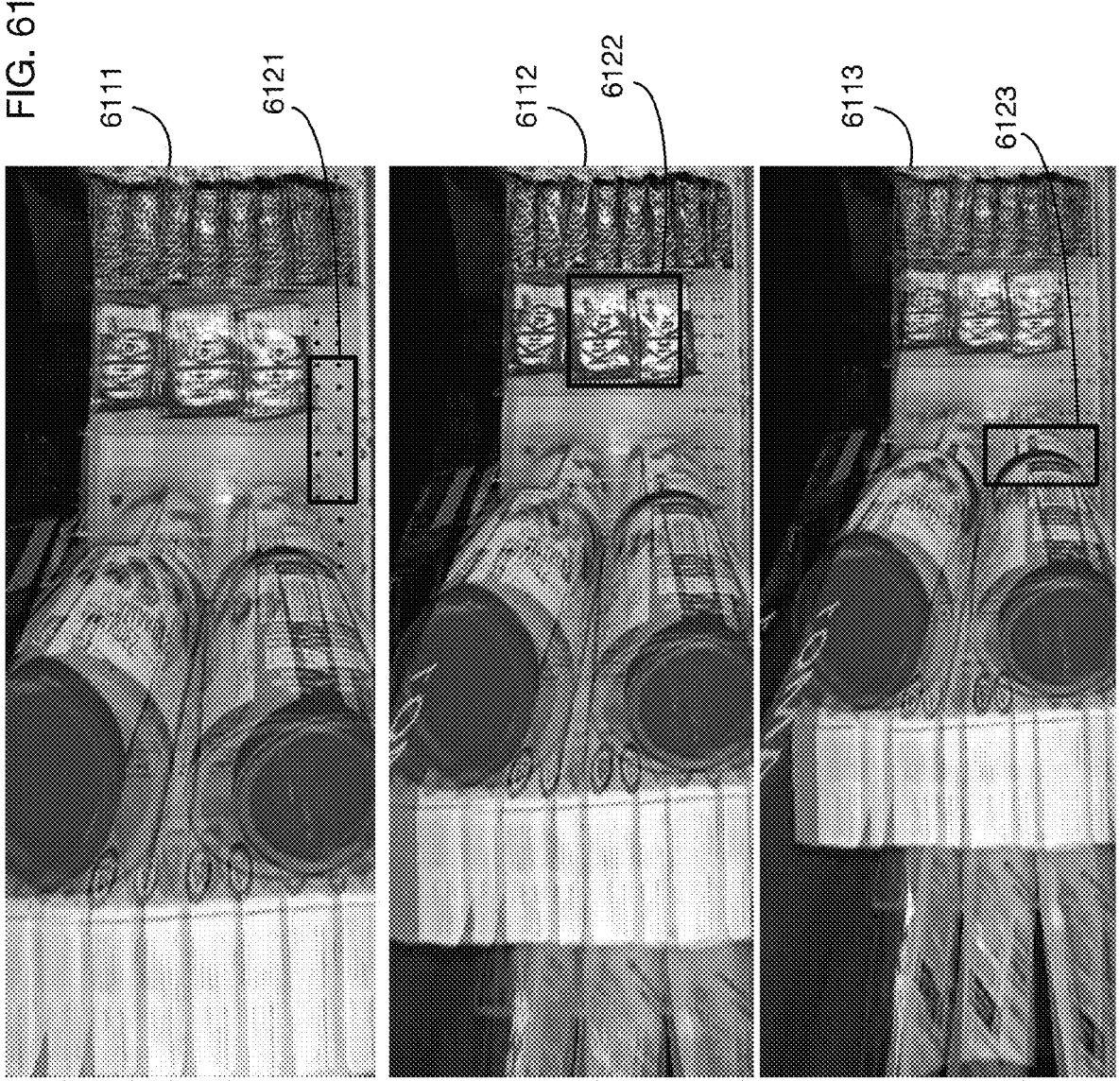
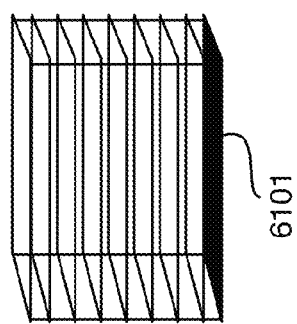
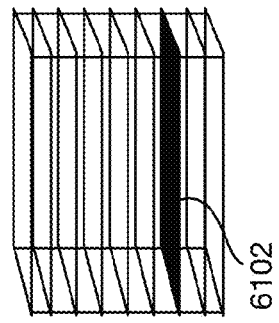
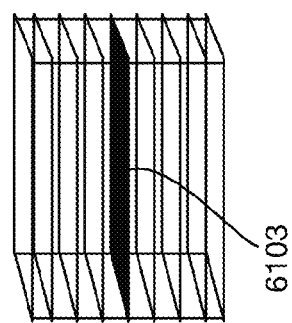

SENSOR BAR SHELF MONITOR

This application is a continuation-in-part of U.S. Utility patent application Ser. No. 16/563,159, filed 6 Sep. 2019, which is a continuation of U.S. Utility patent application Ser. No. 16/404,667, filed 6 May 2019, which is a continuation-in-part of U.S. Utility patent application Ser. No. 16/254,776, filed 23 Jan. 2019, which is a continuation-in-part of U.S. Utility patent application Ser. No. 16/138,278, filed 21 Sep. 2018, which is a continuation-in-part of U.S. Utility patent application Ser. No. 16/036,754, filed 16 Jul. 2018, the specifications of which are hereby incorporated herein by reference.

BACKGROUND OF THE INVENTION

Field of the Invention

One or more embodiments of the invention are related to the fields of image analysis, artificial intelligence, automation, camera calibration, camera placement optimization and computer interaction with a point of sale system. More particularly, but not by way of limitation, one or more embodiments of the invention enable a sensor bar that may be installed into shelving units to monitor items and actions on the shelf below the bar, for example as part of an autonomous store.

Description of the Related Art

Previous systems involving security cameras have had relatively limited people tracking, counting, loiter detection and object tampering analytics. These systems employ relatively simple algorithms that have been utilized in cameras and NVRs (network video recorders).

Other systems such as retail analytics solutions utilize additional cameras and sensors in retail spaces to track people in relatively simple ways, typically involving counting and loiter detection.

Currently there are initial "grab-n-go" systems that are in the initial prototyping phase. These systems are directed at tracking people that walk into a store, take what they want, put back what they don't want and get charged for what they leave with. These solutions generally use additional sensors and/or radio waves for perception, while other solutions appear to be using potentially uncalibrated cameras or non-optimized camera placement. For example, some solutions may use weight sensors on shelves to determine what products are taken from a shelf; however, these weight sensors alone are not sufficient to attribute the taking of a product with a particular shopper. To date all known camera-based grab-n-go companies utilize algorithms that employ the same basic software and hardware building blocks, drawing from academic papers that address parts of the overall problem of people tracking, action detection, object recognition.

Academic building blocks utilized by entities in the automated retail sector include a vast body of work around computer vision algorithms and open source software in this space. The basic available toolkits utilize deep learning, convolutional neural networks, object detection, camera calibration, action detection, video annotation, particle filtering and model-based estimation.

To date, none of the known solutions or systems enable a truly automated store and require additional sensors, use more cameras than are necessary, do not integrate with existing cameras within a store, for example security cameras, thus requiring more initial capital outlay. In addition, known solutions may not calibrate the cameras, allow for heterogenous camera types to be utilized or determine optimal placement for cameras, thus limiting their accuracy.

For an automated store or similar applications, it may be valuable to allow a customer to obtain an authorization at an entry point or at another convenient location, and then extend this authorization automatically to other locations in the store or site. For example, a customer of an automated gas station may provide a credit card at a gas pump to purchase gas, and then enter an automated convenience store at the gas station to purchase products; ideally the credit card authorization obtained at the gas pump would be extended to the convenience store, so that the customer could enter the store (possibly through a locked door that is automatically unlocked for this customer), and take products and have them charged to the same card.

Authorization systems integrated into entry control systems are known in the art. Examples include building entry control systems that require a person to present a key card or to enter an access code. However, these systems do not extend the authorization obtained at one point (the entry location) to another location. Known solutions to extend authorization from one location to additional locations generally require that the user present a credential at each additional location where authorization is needed. For example, guests at events or on cruise ships may be given smart wristbands that are linked to a credit card or account; these wristbands may be used to purchase additional products or to enter locked areas. Another example is the system disclosed in U.S. Pat. No. 6,193,154, "Method and apparatus for vending goods in conjunction with a credit card accepting fuel dispensing pump," which allows a user to be authorized at a gas pump (using a credit card), and to obtain a code printed on a receipt that can then be used at a different location to obtain goods from a vending machine. A potential limitation of all of these known systems is that additional devices or actions by the user are required to extend authorization from one point to another. There are no known systems that automatically extend authorization from one point (such as a gas pump) to another point (such as a store or vending machine) using only tracking of a user from the first point to the second via cameras. Since cameras are widely available and often are already installed in sites or stores, tracking users with cameras to extend authorization from one location to another would add significant convenience and automation without burdening the user with codes or wristbands and without requiring additional sensors or input devices.

Another limitation of existing systems for automated stores is the complexity of the person tracking approaches. These systems typically use complex algorithms that attempt to track joints or landmarks of a person based on multiple camera views from arbitrary camera locations. This approach may be error-prone, and it requires significant processing capacity to support real-time tracking. A simpler person tracking approach may improve robustness and efficiency of the tracking process.

An automated store needs to track both shoppers moving through the store and items in the store that shoppers may take for purchase. Existing methods for tracking items such as products on store shelves either require dedicated sensors associated with each item, or they use image analysis to observe the items in a shopper's hands. The dedicated sensor approach requires potentially expensive hardware on every store shelf. The image analysis methods used to date are error-prone. Image analysis is attractive because cameras are ubiquitous and inexpensive, requiring no moving parts, but to date image analysis of item movement from (or to) store shelves has been ineffective. In particular, simple image analysis methods such as image differencing from single camera views are not able to handle occlusions well, nor are they able to determine the quantity of items taken for example from a vertical stack of similar products.

Although converting a store to autonomous operation generally requires adding sensors and processors, many stores prefer to retain their existing shelving systems. There are no known solutions that install easily into existing shelving systems to provide autonomous store support. In addition, there are no known solutions that add sensors to a shelving system in a location that is not susceptible to spills or contamination, and that does not adversely affect the items on a shelf.

For at least the limitations described above there is a need for a sensor bar shelf monitor for example that may be mounted at the front of a shelf that monitors the shelf below.

BRIEF SUMMARY OF THE INVENTION

One or more embodiments described in the specification are related to a sensor bar shelf monitor for example that may be mounted at the front of a shelf that monitors the shelf below. One or more embodiments include a processor that is configured to obtain a 3D model of a store that contains items and item storage areas. The processor receives a respective time sequence of images from cameras in the store, wherein the time sequence of images is captured over a time period and analyzes the time sequence of images from each camera and the 3D model of the store to detect a person in the store based on the time sequence of images, calculate a trajectory of the person across the time period, identify an item storage area of the item storage areas that is proximal to the trajectory of the person during an interaction time period within the time period, analyze two or more images of the time sequence of images to identify an item of the items within the item storage area that moves during the interaction time period, wherein the two or more images are captured within or proximal in time to the interaction time period and the two or more images contain views of the item storage area and attribute motion of the item to the person. One or more embodiments of the system rely on images for tracking and do not utilize item tags, for example RFID tags or other identifiers on the items that are manipulated and thus do not require identifier scanners. In addition, one or more embodiments of the invention enable a "virtual door" where entry and exit of users triggers a start or stop of the tracker, i.e., via images and computer vision. Other embodiments may utilize physical gates or electronic check-in and check-out, e.g., using QR codes or Bluetooth, but these solutions add complexity that other embodiments of the invention do not require.

At least one embodiment of the processor is further configured to interface with a point of sale computer and charge an amount associated with the item to the person without a cashier. Optionally, a description of the item is sent to a mobile device associated with the person and wherein the processor or point of sale computer is configured to accept a confirmation from the mobile device that the item is correct or in dispute. In one or more embodiments, a list of the items associated with a particular user, for example a shopping cart list associated with the shopper, may be sent to a display near the shopper or that is closest to the shopper.

In one or more embodiments, each image of the time sequence of images is a 2D image and the processor calculates a trajectory of the person consisting of a 3D location and orientation of the person and at least one body landmark from two or more 2D projections of the person in the time sequence of images.

In one or more embodiments, the processor is further configured to calculate a 3D field of influence volume around the person at points of time during the time period.

In one or more embodiments, the processor identifies an item storage area that is proximal to the trajectory of the person during an interaction time period utilizes a 3D location of the storage area that intersects the 3D field of influence volume around the person during the interaction time period. In one or more embodiments, the processor calculates the 3D field of influence volume around the person utilizing a spatial probability distribution for multiple landmarks on the person at the points of time during the time period, wherein each landmark of the multiple landmarks corresponds to a location on a body part of the person. In one or more embodiments, the 3D field of influence volume around the person comprises points having a distance to a closest landmark of the multiple landmarks that is less than or equal to a threshold distance. In one or more embodiments, the 3D field of influence volume around the person comprises a union of probable zones for each landmark of the multiple landmarks, wherein each probable zone of the probable zones contains a threshold probability of the spatial probability distribution for a corresponding landmark. In one or more embodiments, the processor calculates the spatial probability distribution for multiple landmarks on the person at the points of time during the time period through calculation of a predicated spatial probability distribution for the multiple landmarks at one or more points of time during the time period based on a physics model and calculation of a corrected spatial probability distribution at one or more points of time during the time period based on observations of one or more of the multiple landmarks in the time sequence of images. In one or more embodiments, the physics model includes the locations and velocities of the landmarks and thus the calculated field of influence. This information can be used to predict a state of landmarks associated with a field at a time and a space not directly observed and thus may be utilized to interpolate or augment the observed landmarks.

In one or more embodiments, the processor is further configured to analyze the two or more images of the time sequence of images to classify the motion of the item as a type of motion comprising taking, putting or moving.

In one or more embodiments, the processor analyzes two or more images of the time sequence of images to identify an item within the item storage area that moves during the interaction time period. Specifically, the processor uses or obtains a neural network trained to recognize items from changes across images, sets an input layer of the neural network to the two or more images and calculates a probability associated with the item based on an output layer of the neural network. In one or more embodiments, the neural network is further trained to classify an action performed on an item into classes comprising taking, putting, or moving. In one or more embodiments, the system includes a verification system configured to accept input confirming or denying that the person is associated with motion of the item. In one or more embodiments, the system includes a machine learning system configured to receive the input confirming or denying that the person is associated with the motion of the item and updates the neural network based on the input. Embodiments of the invention may utilize a neural network or more generally, any type of generic function approximator. By definition the function to map inputs of before-after image pairs, or before-during-after image pairs to output actions, then the neural network can be trained to be any such function map, not just traditional convolutional neural networks, but also simpler histogram or feature based classifiers. Embodiments of the invention also enable training of the neural network, which typically involves feeding labeled data to an optimizer that modifies the network's weights and/or structure to correctly predict the labels (outputs) of the data (inputs). Embodiments of the invention may be configured to collect this data from customer's acceptance or correction of the presented shopping cart. Alternatively, or in combination, embodiments of the system may also collect human cashier corrections from traditional stores. After a user accepts a shopping cart or makes a correction, a ground truth labeled data point may be generated and that point may be added to the training set and used for future improvements.

In one or more embodiments, the processor is further configured to identify one or more distinguishing characteristics of the person by analyzing a first subset of the time sequence of images and recognizes the person in a second subset of the time sequence of images using the distinguishing characteristics. In one or more embodiments, the processor recognizes the person in the second subset without determination of an identity of the person. In one or more embodiments, the second subset of the time sequence of images contains images of the person and images of a second person. In one or more embodiments, the one or distinguishing characteristics comprise one or more of shape or size of one or more body segments of the person, shape, size, color, or texture of one or more articles of clothing worn by the person and gait pattern of the person.

In one or more embodiments of the system, the processor is further configured to obtain camera calibration data for each camera of the cameras in the store and analyze the time sequence of images from each camera of the cameras using the camera calibration data. In one or more embodiments, the processor configured to obtain calibration images from each camera of the cameras and calculate the camera calibration data from the calibration images. In one or more embodiments, the calibration images comprise images captured of one or more synchronization events and the camera calibration data comprises temporal offsets among the cameras. In one or more embodiments, the calibration images comprise images captured of one or markers placed in the store at locations defined relative to the 3D model and the camera calibration data comprises position and orientation of the cameras with respect to the 3D model. In one or more embodiments, the calibration images comprise images captured of one or more color calibration targets located in the store, the camera calibration data comprises color mapping data between each camera of the cameras and a standard color space. In one or more embodiments, the camera calibration processor is further configured to recalculate the color mapping data when lighting conditions change in the store. For example, in one or more embodiments, different camera calibration data may be utilized by the system based on the time of day, day of year, current light levels or light colors (hue, saturation or luminance) in an area or entire image, such as occur at dusk or dawn color shift periods. By utilizing different camera calibration data, for example for a given camera or cameras or portions of images from a camera or camera, more accurate determinations of items and their manipulations may be achieved.

In one or more embodiments, any processor in the system, such as a camera placement optimization processor is configured to obtain the 3D model of the store and calculate a recommended number of the cameras in the store and a recommended location and orientation of each camera of the cameras in the store. In one or more embodiments, the processor calculates a recommended number of the cameras in the store and a recommended location and orientation of each camera of the cameras in the store. Specifically, the processor obtains a set of potential camera locations and orientations in the store, obtains a set of item locations in the item storage areas and iteratively updates a proposed number of cameras and a proposed set of camera locations and orientations to obtain a minimum number of cameras and a location and orientation for each camera of the minimum number of cameras such that each item location of the set of item locations is visible to at least two of the minimum number of cameras.

In one or more embodiments, the system comprises the cameras, wherein the cameras are coupled with the processor. In other embodiments, the system includes any subcomponent described herein.

In one or more embodiments, processor is further configured to detect shoplifting when the person leaves the store without paying for the item. Specifically, the person's list of items on hand (e.g., in the shopping cart list) may be displayed or otherwise observed by a human cashier at the traditional cash register screen. The human cashier may utilize this information to verify that the shopper has either not taken anything or is paying/showing for all items taken from the store. For example, if the customer has taken two items from the store, the customer should pay for two items from the store. Thus, embodiments of the invention enable detection of customers that for example take two items but only show and pay for one when reaching the register.

In one or more embodiments, the computer is further configured to detect that the person is looking at an item.

In one or more embodiments, the landmarks utilized by the system comprise eyes of the person or other landmarks on the person's head, and wherein the computer is further configured to calculate a field of view of the person based on a location of the eyes or other head landmarks of the person, and to detect that the person is looking at an item when the item is in the field of view.

One or more embodiments of the system may extend an authorization obtained at one place and time to a different place or a different time. The authorization may be extended by tracking a person from the point of authorization to a second point where the authorization is used. The authorization may be used for entry to a secured environment, and to purchase items within this secured environment.

To extend an authorization, a processor in the system may analyze images from cameras installed in or around an area in order to track a person in the area. Tracking may also use a 3D model of the area, which may for example describe the location and orientation of the cameras. The processor may calculate the trajectory of the person in the area from the camera images. Tracking and calculation of the trajectory may use any of the methods described above or described in detail below.

The person may present a credential, such as a credit card, to a credential receiver, such as a card reader, at a first location and at a first time, and may then receive an authorization; the authorization may also be received by the processor. The person may then move to a second location at a second time. At this second location, an entry to a secured environment may be located, and the entry may be secured by a controllable barrier such as a lock. The processor may associate the authorization with the person by relating the time that the credential was presented, or the authorization was received, with the time that the person was at the first location where the credential receiver is located. The processor may then allow the person to enter the secured environment by transmitting an allow entry command to the controllable barrier when the person is at the entry point of the secured environment.

The credential presented by the person to obtain an authorization may include for example, without limitation, one or more of a credit card, a debit card, a bank card, an RFID tag, a mobile payment device, a mobile wallet device, an identity card, a mobile phone, a smart phone, a smart watch, smart glasses or goggles, a key fob, a driver's license, a passport, a password, a PIN, a code, a phone number, or a biometric identifier.

In one or more embodiments the secured environment may be all or portion of a building, and the controllable barrier may include a door to the building or to a portion of the building. In one or more embodiments the secured environment may be a case that contains one or more items (such as a display case with products for sale), and the controllable barrier may include a door to the case.

In one or more embodiments, the area may be a gas station, and the credential receiver may be a payment mechanism at or near a gas pump. The secured environment may be for example a convenience store at the gas station or a case (such as a vending machine for example) at the gas station that contains one or more items. A person may for example pay at the pump and obtain an authorization for pumping gas and for entering the convenience store or the product case to obtain other products.

In one or more embodiments, the credential may be or may include a form of payment that is linked to an account of the person with the credential, and the authorization received by the system may be an authorization to charge purchases by the person to this account. In one or more embodiments, the secured environment may contain sensors that detect when one or more items are taken by the person. Signals from the sensors may be received by the system's processor and the processor may then charge the person's account for the item or items taken. In one or more embodiments the person may provide input at the location where he or she presents the credential that indicates whether to authorize purchases of items in the secured environment.

In one or more embodiments, tracking of the person may also occur in the secured environment, using cameras in the secured environment. As described above with respect to an automated store, tracking may determine when the person is near an item storage area, and analysis of two or more images of the item storage area may determine that an item has moved. Combining these analyses allows the system to attribute motion of an item to the person, and to charge the item to the person's account if the authorization is linked to a payment account. Again as described with respect to an automated store, tracking and determining when a person is at or near an item storage area may include calculating a 3D field of influence volume around the person; determining when an item is moved or taken may use a neural network that inputs two or more images (such as before and after images) of the item storage area and outputs a probability that an item is moved.

In one or more embodiments, an authorization may be extended from one person to another person, such as another person who is in the same vehicle as the person with the credential. The processor may analyze camera images to determine that one person exits a vehicle and then presents a credential, resulting in an authorization. If a second person exits the same vehicle, that second person may also be authorized to perform certain actions, such as entering a secured area or taking items that will be charge to the account associated with the credential. Tracking the second person and determining what items that person takes may be performed as described above for the person who presents the credential.

In one or more embodiments, extension of an authorization may enable a person who provides a credential to take items and have them charged to an account associated with the credential; the items may or may not be in a secured environment having an entry with a controllable barrier. Tracking of the person may be performed using cameras, for example as described above. The system may determine what item or items the person takes by analyzing camera images, for example as described above. The processor associated with the system may also analyze camera images to determine when a person takes and item and then puts the item down prior to leaving an area; in this case the processor may determine that the person should not be charged for the item when leaving the area.

One or more embodiments of the invention may analyze camera images to locate a person in the store, and may then calculate a field of influence volume around the person. This field of influence volume may be simple or detailed. It may be a simple shape, such as a cylinder for example, around a single point estimate of a person's location. Tracking of landmarks or joints on the person's body may not be needed in one or more embodiments. When the field of influence volume intersects an item storage area during an interaction period, the system may analyze images captured at the beginning of this period or before, and images captured at the end of this period or afterwards. This analysis may determine whether an item on the shelf has moved, in which case this movement may be attributed to the person whose field of influence volume intersected the item storage area. Analysis of before and after images may be done for example using a neural network that takes these two images as input. The output of the neural network may include probabilities that each item has moved, and probabilities associated with each action of a set of possible actions that a person may have taken (such as for example taking, putting, or moving an item). The item and action with the highest probabilities may be selected and may be attributed to the person that interacted with the item storage area.

In one or more embodiments the cameras in a store may include ceiling cameras mounted on the store's ceiling. These ceiling cameras may be fisheye cameras, for example. Tracking people in the store may include projecting images from ceiling cameras onto a plane parallel to the floor, and analyzing the projected images.

In one or more embodiments the projected images may be analyzed by subtracting a store background image from each, and combining the differences to form a combined mask. Person locations may be identified as high intensity locations in the combined mask.

In one or more embodiments the projected images may be analyzed by inputting them into a machine learning system that outputs an intensity map that contains a likelihood that a person is at each location. The machine learning system may be a convolutional neural network, for example. An illustrative neural network architecture that may be used in one or more embodiments is a first half subnetwork consisting of copies of a feature extraction network, one copy for each projected image, a feature merging layer that combines outputs from the copies of the feature extraction network, and a second half subnetwork that maps combined features into the intensity map.

In one or more embodiments, additional position map inputs may be provided to the machine learning system. Each position map may correspond to a ceiling camera. The value of the position map at each location may a function of the distance between the location and the ceiling camera. Position maps may be input into a convolutional neural network, for example as an additional channel associated with each projected image.

In one or more embodiments the tracked location of a person may be a single point. It may be a point on a plane, such as the plane parallel to the floor onto which ceiling camera images are projected. In one or more embodiments the field of influence volume around a person may be a translated copy of a standardized shape, such as a cylinder for example.

One or more embodiments may include one or more modular shelves. Each modular shelf may contain at least one camera module on the bottom of the shelf, at least one lighting module on the bottom of the shelf, a right-facing camera on or near the left edge of the shelf, a left-facing camera on or near the right edge of the shelf, a processor, and a network switch. The camera module may contain two or more downward-facing cameras.

Modular shelves may function as item storage areas. The downward-facing cameras in a shelf may view items on the shelf below.

The position of camera modules and lighting modules in a modular shelf may be adjustable. The modular shelf may have a front rail and back rail onto which the camera and lighting modules may be mounted and adjusted. The camera modules may have one or more slots into which the downward-facing cameras are attached. The position of the downward-facing cameras in the slots may be adjustable.

One or more embodiments may include a modular ceiling. The modular ceiling may have a longitudinal rail mounted to the store's ceiling, and one or more transverse rails mounted to the longitudinal rail. The position of each transverse rail along the longitudinal rail may be adjustable. One or more integrated lighting-camera modules may be mounted to each transverse rail. The position of each integrated lighting-camera module may be adjustable along the transverse rail. An integrated lighting-camera module may include a lighting element surrounding a center area, and two or more ceiling cameras mounted in the center area. The ceiling cameras may be mounted to a camera module in the center area with one or more slots into which the cameras are mounted; the positions of the cameras in the slots may be adjustable.

One or more embodiments of the invention may track items in an item storage area by combining projected images from multiple cameras. The system may include a processor coupled to a sensor that detects when a shopper reaches into or retracts from an item storage area. The sensor may generate an enter signal when it detects that the shopper has reached into or towards the item storage area, and it may generate an exit signal when it detects that the shopper has retracted from the item storage area. The processor may also be coupled to multiple cameras that view the item storage area. The processor may obtain "before" images from each of the cameras that were captured before the enter signal, and "after" images from each of the cameras that were captured after the exit signal. It may project all of these images onto multiple planes in the item storage area. It may analyze the projected before images and the projected after images to identify an item taken from or put into the item storage are between the enter signal and the exit signal, and to associate this item with the shopper who interacted with the item storage area.

Analyzing the projected before images and the projected after images may include calculating a 3D volume difference between the contents of the item storage area before the enter signal and the contents of the item storage area after the exit signal. When the 3D volume difference indicates that contents are smaller after the exit signal, the system may input all or a portion of one of the projected before images into a classifier. When the 3D volume difference indicates that contents are greater after the exit signal, the system may input all or a portion of one of the projected after images into the classifier. The output of the classifier may be used as the identity of the item (or items) taken from or put into the item storage area. The classifier may be for example a neural network trained to recognize images of the items.

The processor may also calculate the quantity of items taken from or put into the item storage area from the 3D volume difference, and associate this quantity with the shopper. For example, the system may obtain the size of the item (or items) identified by the classifier, and compare this size to the 3D volume difference to calculate the quantity.

The processor may also associate an action with the shopper and the item based on whether the 3D volume difference indicates that the contents of the item storage area is smaller or larger after the interaction: if the contents are larger, then the processor may associate a put action with the shopper, and if they are smaller, then the processor may associate a take action with the shopper.

One or more embodiments may generate a "before" 3D surface of the item storage area contents from projected before images, and an "after" 3D surface of the contents from projected after images. Algorithms such as for example plane-sweep stereo may be used to generate these surfaces. The 3D volume difference may be calculated as the volume between these surfaces. The planes onto which before and after images are projected may be parallel to a surface of the item storage area (such as a shelf), or one or more of these planes may not be parallel to such a surface.

One or more embodiments may calculate a change region in each projected plane, and may combine these change regions into a change volume. The before 3D surface and after 3D surface may be calculated only in the change volume. The change region of a projected plane may be calculated by forming an image difference between each before projected image in that plane and each after projected image in the plane, for each camera, and then combining these differences across cameras. Combining the image differences across cameras may weight pixels in each difference based on the distance between the point in the plane in that image difference and the associated camera, and may form the combined change region as a weighted average across cameras. The image difference may be for example absolute pixel differences between before and after projected images. One or more embodiments may instead input before and after images into a neural network to generate image differences.

One or more embodiments may include a modular shelf with multiple cameras observing an item storage area (for example, below the shelf), left and right-facing cameras on the edges, a shelf processor, and a network switch. The processor that analyzes images may be a network of processors that include a store processor and the shelf processor. The left and right-facing cameras and the processor may provide a sensor to detect when a shopper reaches into or retracts from an item storage area, and to generate the associated enter and exit signals. The shelf processor may be coupled to a memory that stores camera images; when an enter signal is received, the shelf processor may retrieve before images from this memory. The shelf processor may send the before images to a store processor for analysis. It may obtain after images from the cameras or from the memory and also send them to the store computer for analysis.

Instead of integrating cameras into a modular shelf, one or more embodiments may incorporate a sensor bar that is installed into an existing shelving system. For example, a sensor bar may be installed so that it is proximal to the front edge of an existing upper shelf. It may contain cameras that are oriented to capture images of the lower shelf below, and distance sensors that detect distances to objects between the bar and the shelf below. It may contain a sensor bar processor that is connected to the cameras and distance sensors. The sensor bar processor may analyze data from the distance sensors to determine hand entry and hand exit events when a shopper reaches into and retracts from the shelf below. It may get before images from the cameras from a time at or near the hand entry event, and after images from a time at or near the hand exit event; these before and after images may be sent to a store processor that analyzes them to determine what item or items the shopper has moved (taken, replaced, or displaced) on the shelf below.

In one or more embodiments, a sensor bar may have mounting brackets that couple to a shelf support system. For example, the shelf support system may have uprights with slots into which shelf brackets are inserted, and the sensor bar mounting brackets may also fit into these slots. The sensor bar may be mounted into slots below those used by the upper shelf, and above those used by the lower shelf. The upper edge of the sensor bar mounting brackets may lie below the lower edge of the upper shelf brackets.

In one or more embodiments, the distance sensors may be optical time-of-flight sensors. They may measure distances in a detection zone that may for example include all or part of a vertical plane region between the upper and lower shelf. When distance data changes by more than a threshold amount, a hand entry event may be detected.

In one or more embodiments a sensor bar may include one or more lights that illuminate items on the shelf below. The sensor bar processor may control the lights, based for example on lighting data received from store processors. In one or more embodiments the lights may include disinfecting lights that emit radiation that disinfects one or both of the shelf and the items on the shelf; for example, the disinfecting lights may be ultraviolet lights that emit ultraviolet radiation. The sensor bar processor may activate one or more of the disinfecting lights for example after a hand exit event is detected.

In one or more embodiments a sensor bar may include electronic labels. The sensor bar processor may control the labels, based for example on label data received from store processors.

One or more embodiments may analyze projected before images and projected after images by inputting them or a portion of them into a neural network. The neural network may be trained to output the identity of the item or items taken from or put into the item storage area between the enter signal and the exit signal. It may also be trained to output an action that indicates whether the item is taken from or put into the storage area. One or more embodiments may use a neural network that contains a feature extraction layer applied to each input mage, followed by a differencing layer that calculates feature differences between each before and each corresponding after image, followed by one or more convolutional layers, followed by an item classifier layer and an action classifier layer.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other aspects, features and advantages of the invention will be more apparent from the following more particular description thereof, presented in conjunction with the following drawings wherein:

FIG. 5 shows an illustrative embodiment that identifies people in a store based on distinguishing characteristics such as body measurements and clothing color.

FIGS. 6A through 6E illustrate how one or more embodiments of the invention may determine a field of influence volume around a person by finding landmarks on the person's body and calculating an offset distance from these landmarks.

FIGS. 7A and 7B illustrate a different method of determining a field of influence volume around a person by calculating a probability distribution for the location of landmarks on a person's body and setting the volume to include a specified amount of the probability distribution.

FIG. 8 shows an illustrative method for tracking a person's movements through a store, which uses a particle filter for a probability distribution of the person's state, along with a physics model for motion prediction and a measurement model based on camera image projection observations.

FIG. 9 shows a conceptual model for how one or more embodiments may combine tracking of a person's field of influence with detection of item motion to attribute the motion to a person.

FIG. 14 shows a screenshot of an embodiment that identifies a person in a store and builds a 3D field of influence volume around the identified landmarks on the person.

FIGS. 27A, 27B, and 27C show projections of three of the fisheye camera images from FIGS. 26A through 26F onto a horizontal plane one meter above the floor.

FIGS. 28A, 28B, and 28C show binary masks of the foreground objects in FIGS. 27A, 27B, and 27C, respectively, as determined for example by background subtraction or motion filtering. FIG. 28D shows a composite foreground mask that combines all camera image projections to determine the position of people in the store.

FIG. 32 shows an illustrative embodiment that uses a machine learning system to detect person locations from camera images.

FIG. 35 shows fisheye camera images captured by the ceiling cameras in the scene.

FIG. 36 shows the fisheye camera images of FIG. 35 projected onto a common plane.

FIG. 55 shows components that may be used to obtain camera images before and after a user interaction with a shelf.

FIG. 57A shows an illustrative comparison of "before" and "after" projected images to determine a region in which items may have been added or removed.

FIG. 61 shows illustrative plane sweeping of a sample shelf from two cameras, showing that different objects come into focus in different planes that correspond to the heights of those objects.

DETAILED DESCRIPTION OF THE INVENTION

A sensor bar shelf monitor for example that may be mounted at the front of a shelf that monitors the shelf below will now be described. Embodiments may track a person by analyzing camera images and may therefore extend an authorization obtained by this person at one point in time and space to a different point in time or space. Embodiments may also enable an autonomous store system that analyzes camera images to track people and their interactions with items and may also enable camera calibration, optimal camera placement and computer interaction with a point of sale system. The computer interaction may involve a mobile device and a point of sale system for example. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims and the full scope of any equivalents, are what define the metes and bounds of the invention.

Figure 1:
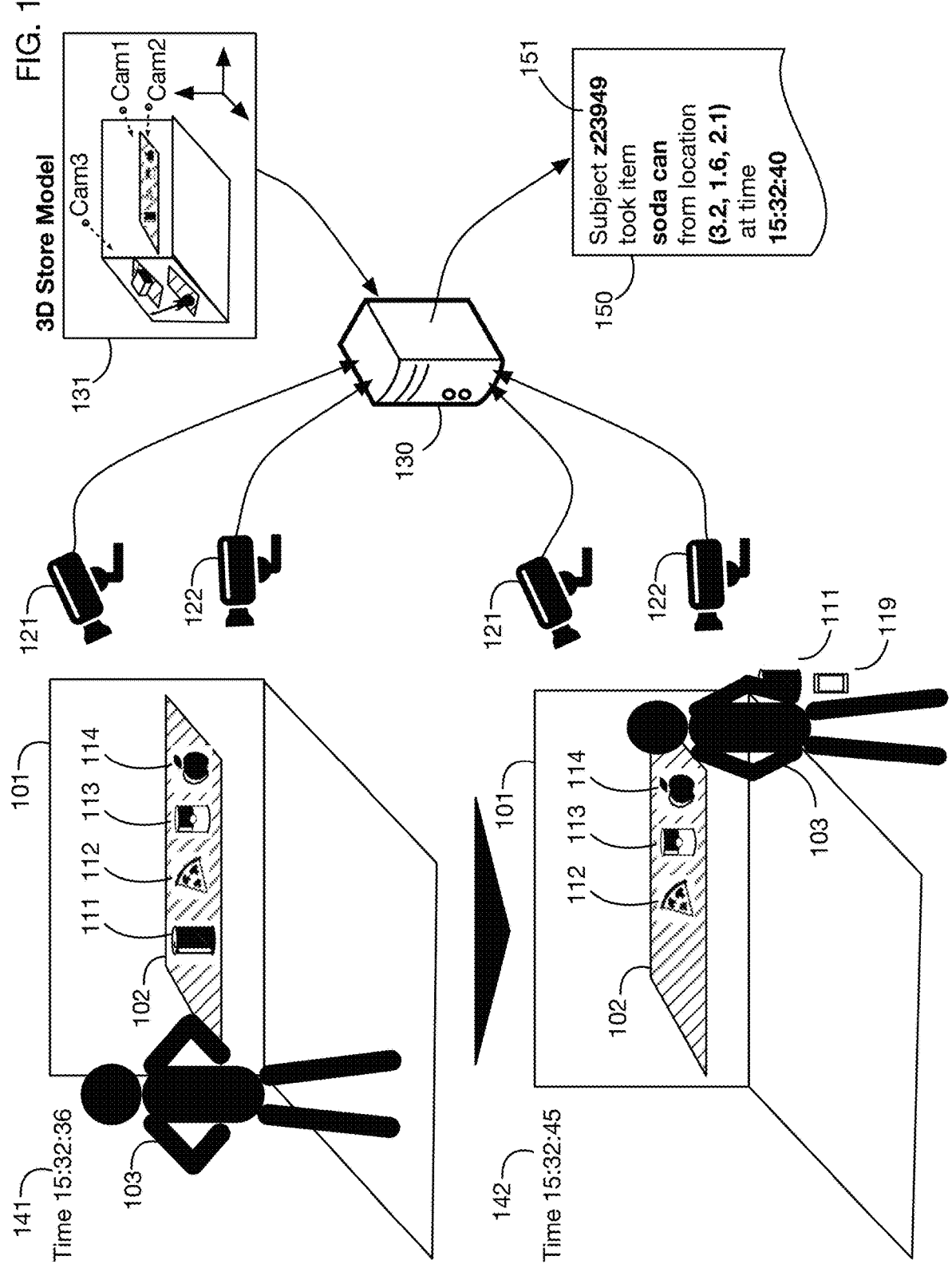
FIG. 1 illustrates operation of an embodiment of the invention that analyzes images from cameras in a store to detect that a person has removed a product from a shelf.

FIG. 1 shows an embodiment of an automated store. A store may be any location, building, room, area, region, or site in which items of any kind are located, stored, sold, or displayed, or through which people move. For example, without limitation, a store may be a retail store, a warehouse, a museum, a gallery, a mall, a display room, an educational facility, a public area, a lobby, an office, a home, an apartment, a dormitory, or a hospital or other health facility. Items located in the store may be of any type, including but not limited to products that are for sale or rent.

In the illustrative embodiment shown in FIG. 1, store 101 has an item storage area 102, which in this example is a shelf. Item storage areas may be of any type, size, shape and location. They may be of fixed dimensions or they may be of variable size, shape, or location. Item storage areas may include for example, without limitation, shelves, bins, floors, racks, refrigerators, freezers, closets, hangers, carts, containers, boards, hooks, or dispensers. In the example of FIG. 1, items 111, 112, 113 and 114 are located on item storage area 102. Cameras 121 and 122 are located in the store and they are positioned to observe all or portions of the store and the item storage area. Images from the cameras are analyzed to determine the presence and actions of people in the store, such as person 103 and in particular to determine the interactions of these people with items 111-114 in the store. In one or more embodiments, camera images may be the only input required or used to track people and their interactions with items. In one or more embodiments, camera image data may be augmented with other information to track people and their interactions with items. One or more embodiments of the system may utilize images to track people and their interactions with items for example without the use of any identification tags, such as RFID tags or any other non-image based identifiers associated with each item.

FIG. 1 illustrates two cameras, camera 121 and camera 122. In one or more embodiments, any number of cameras may be employed to track people and items. Cameras may be of any type; for example, cameras may be 2D, 3D, or 4D. 3D cameras may be stereo cameras, or they may use other technologies such as rangefinders to obtain depth information. One or more embodiments may use only 2D cameras and may for example determine 3D locations by triangulating views of people and items from multiple 2D cameras. 4D cameras may include any type of camera that can also gather or calculate depth over time, e.g., 3D video cameras.

Cameras 121 and 122 observe the item storage area 102 and the region or regions of store 101 through which people may move. Different cameras may observe different item storage areas or different regions of the store. Cameras may have overlapping views in one or more embodiments. Tracking of a person moving through the store may involve multiple cameras, since in some embodiments no single camera may have a view of the entire store.

Camera images are input into processor 130, which analyzes the images to track people and items in the store. Processor 130 may be any type or types of computer or other device. In one or more embodiments, processor 130 may be a network of multiple processors. When processor 130 is a network of processors, different processors in the network may analyze images from different cameras. Processors in the network may share information and cooperate to analyze images in any desired manner. The processor or processors 130 may be onsite in the store 101, or offsite, or a combination of onsite and offsite processing may be employed. Cameras 121 and 122 may transfer data to the processor over any type or types of network or link, including wired or wireless connections. Processor 130 includes or couples with memory, RAM or disk and may be utilized as a non-transitory data storage computer-readable media that embodiments of the invention may utilize or otherwise include to implement all functionality detailed herein.

Processor or processors 130 may also access or receive a 3D model 131 of the store and may use this 3D model to analyze camera images. The model 131 may for example describe the store dimensions, the locations of item storage areas and items and the location and orientation of the cameras. The model may for example include the floorplan of the store, as well as models of item storage areas such as shelves and displays. This model may for example be derived from a store's planogram, which details the location of all shelving units, their height, as well as which items are placed on them. Planograms are common in retail spaces, so should be available for most stores. Using this planogram, measurements may for example be converted into a 3D model using a 3D CAD package.

If no planogram is available, other techniques may be used to obtain the item storage locations. One illustrative technique is to measure the locations, shapes and sizes of all shelves and displays within the store. These measurements can then be directly converted into a planogram or 3D CAD model. A second illustrative technique involves taking a series of images of all surfaces within the store including the walls, floors and ceilings. Enough images may be taken so that each surface can be seen in at least two images. Images can be either still images or video frames. Using these images, standard 3D reconstruction techniques can be used to reconstruct a complete model of the store in 3D.

In one or more embodiments, a 3D model 131 used for analyzing camera images may describe only a portion of a site, or it may describe only selected features of the site. For example, it may describe only the location and orientation of one or more cameras in the site; this information may be obtained for example from extrinsic calibration of camera parameters. A basic, minimal 3D model may contain only this camera information. In one or more embodiments, geometry describing all or part of a store may be added to the 3D model for certain applications, such as associating the location of people in the store with specific product storage areas. A 3D model may also be used to determine occlusions, which may affect the analysis of camera images. For example, a 3D model may determine that a person is behind a cabinet and is therefore occluded by the cabinet from the viewpoint of a camera; tracking of the person or extraction of the person's appearance may therefore not use images from that camera while the person is occluded.

Cameras 121 and 122 (and other cameras in store 101 if available) may observe item storage areas such as area 102, as well as areas of the store where people enter, leave and circulate. By analyzing camera images over time, the processor 130 may track people as they move through the store. For example, person 103 is observed at time 141 standing near item storage area 102 and at a later time 142 after he has moved away from the item storage area. Using possibly multiple cameras to triangulate the person's position and the 3D store model 131, the processor 130 may detect that person 103 is close enough to item storage area 102 at time 141 to move items on the shelf. By comparing images of storage area 102 at times 141 and 142, the system may detect that item 111 has been moved and may attribute this motion to person 103 since that person was proximal to the item in the time range between 141 and 142. Therefore, the system derives information 150 that the person 103 took item 111 from shelf 102. This information may be used for example for automated checkout, for shoplifting detection, for analytics of shopper behavior or store organization, or for any other purposes. In this illustrative example, person 103 is given an anonymous tag 151 for tracking purposes. This tag may or may not be cross referenced to other information such as for example a shopper's credit card information; in one or more embodiments the tag may be completely anonymous and may be used only to track a person through the store. This enables association of a person with products without require identification of who that particular user is. This is important in locales where people typically wear masks when sick, or other garments which cover the face for example. Also shown is electronic device 119 that generally includes a display that the system may utilize to show the person's list of items, i.e., shopping cart list and with which the person may pay for the items for example.

In one or more embodiments, camera images may be supplemented with other sensor data to determine which products are removed or the quantity of a product that is taken or dispensed. For example, a product shelf such as shelf 102 may have weight sensors or motion sensors that assist in detecting that products are taken, moved, or replaced on the shelf. One or more embodiments may receive and process data indicating the quantity of a product that is taken or dispensed, and may attribute this quantity to a person, for example to charge this quantity to the person's account. For example, a dispenser of a liquid such as a beverage may have a flow sensor that measures the amount of liquid dispensed; data from the flow sensor may be transmitted to the system to attribute this amount to a person proximal to the dispenser at the time of dispensing. A person may also press a button or provide other input to determine what products or quantities should be dispensed; data from the button or other input device may be transmitted to the system to determine what items and quantities to attribute to a person.

Figure 2:
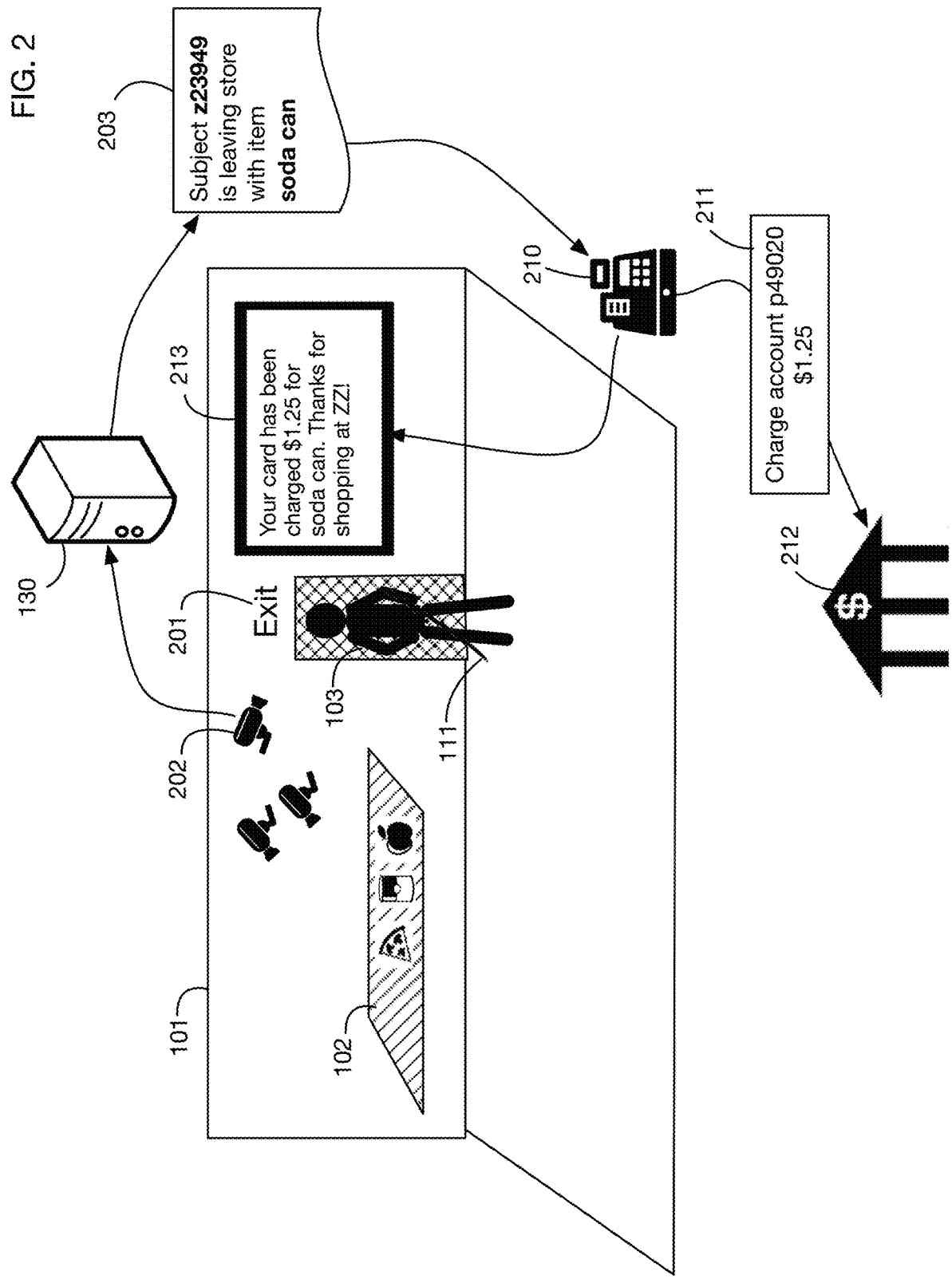
FIG. 2 continues the example shown in FIG. 1 to show automated checkout when the person leaves the store with an item.

FIG. 2 continues the example of FIG. 1 to show an automated checkout. In one or more embodiments, processor 130 or another linked system may detect that a person 103 is leaving a store or is entering an automated checkout area. For example, a camera or cameras such as camera 202 may track person 103 as he or she exits the store. If the system 130 has determined that person 103 has an item, such as item 111 and if the system is configured to support automated checkout, then it may transmit a message 203 or otherwise interface with a checkout system such as a point of sale system 210. This message may for example trigger an automated charge 211 for the item (or items) believed to be taken by person 103, which may for example be sent to financial institution or system 212. In one or more embodiments a message 213 may also be displayed or otherwise transmitted to person 103 confirming the charge, e.g., on the person's electronic device 119 shown in FIG. 1. The message 213 may for example be displayed on a display visible to the person exiting or in the checkout area, or it may be transmitted for example via a text message or email to the person, for example to a computer or mobile device 119 (see FIG. 1) associated with the user. In one or more embodiments the message 213 may be translated to a spoken message. The fully automated charge 211 may for example require that the identity of person 103 be associated with financial information, such as a credit card for example. One or more embodiments may support other forms of checkout that may for example not require a human cashier but may ask person 103 to provide a form of payment upon checkout or exit. A potential benefit of an automated checkout system such as that shown in FIG. 2 is that the labor required for the store may be eliminated or greatly reduced. In one or more embodiments, the list of items that the store believes the user has taken may be sent to a mobile device associated with the user for the user's review or approval.

Figure 3:
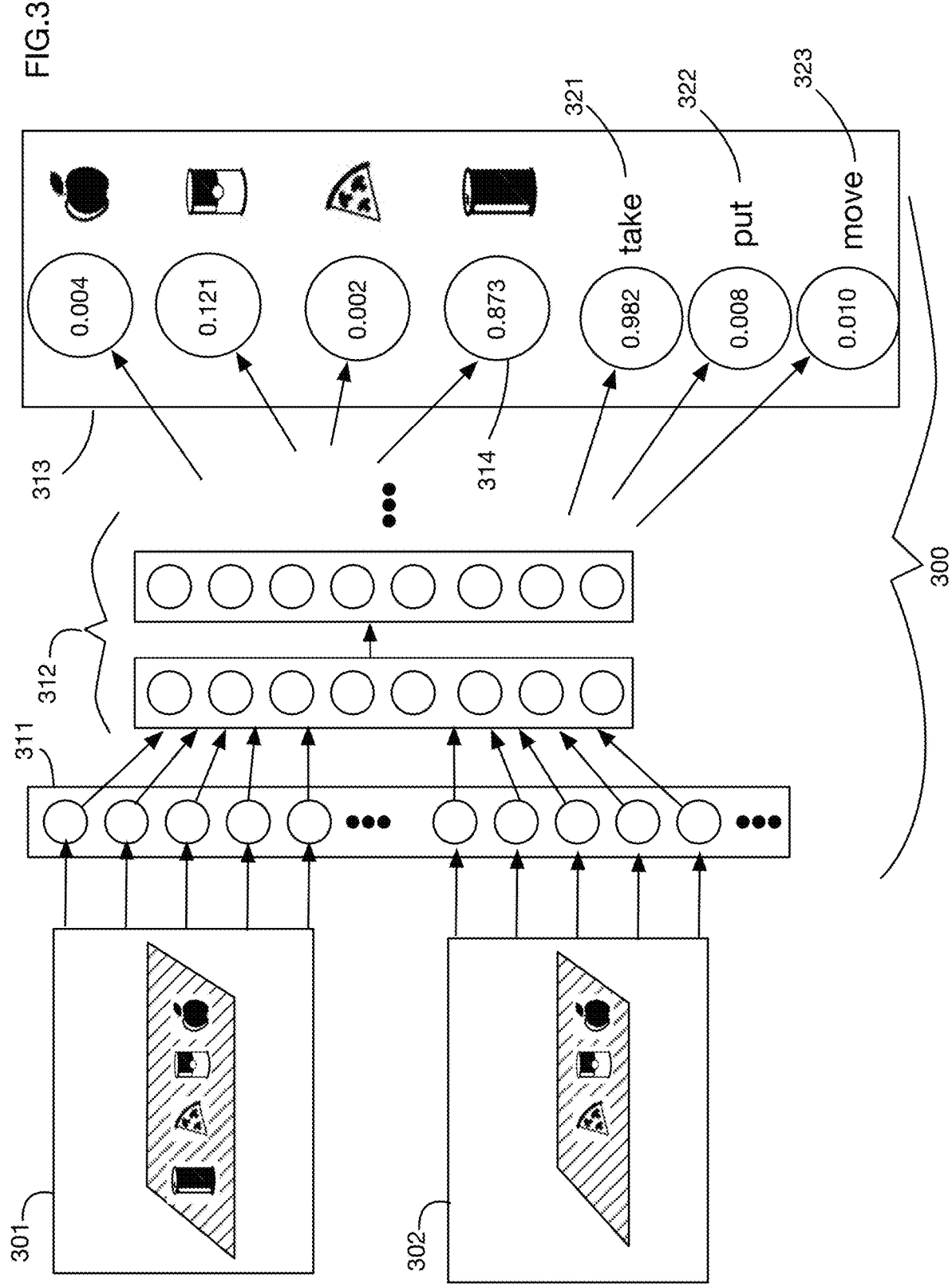
FIG. 3 shows an illustrative method of determining that an item has been removed from a shelf by feeding before and after images of the shelf to a neural network to detect what item has been taken, moved, or put back wherein the neural network may be implemented in one or more embodiments of the invention through a Siamese neural network with two image inputs for example.

As illustrated in FIG. 1, in one or more embodiments analysis of a sequence of two or more camera images may be used to determine that a person in a store has interacted with an item in an item storage area. FIG. 3 shows an illustrative embodiment that uses an artificial neural network 300 to identify an item that has been moved from a pair of images, e.g., an image 301 obtained prior to the move of the item and an image 302 obtained after the move of the item. One or more embodiments may analyze any number of images, including but not limited to two images. These images 301 and 302 may be fed as inputs into input layer 311 of a neural network 300, for example. (Each color channel of each pixel of each image may for example be set as the value of an input neuron in input layer 311 of the neural network.) The neural network 300 may then have any number of additional layers 312, connected and organized in any desired fashion. For example, without limitation, the neural network may employ any number of fully connected layers, convolutional layers, recurrent layers, or any other type of neurons or connections. In one or more embodiments the neural network 300 may be a Siamese neural network organized to compare the two images 301 and 302. In one or more embodiments, neural network 300 may be a generative adversarial network, or any other type of network that performs input-output mapping.

The output layer 313 of the neural network 300 may for example contain probabilities that each item was moved. One or more embodiments may select the item with the highest probability, in this case output neuron 313 and associate movement of this item with the person near the item storage area at the time of the movement of the item. In one or more embodiments there may be an output indicating no item was moved.

The neural network 300 of FIG. 3 also has outputs classifying the type of movement of the item. In this illustrative example there are three types of motions: a take action 321, which indicates for example that the item appeared in image 301 but not in image 302; a put action 322, which indicates for example that the item appears in image 302 but not in image 301; and a move action 323, which indicates for example that the item appears in both images but in a different location. These actions are illustrative; one or more embodiments may classify movement or rearrangement of items into any desired classes and may for example assign a probability to each class. In one or more embodiments, separate neural networks may be used to determine the item probabilities and the action class probabilities. In the example of FIG. 3, the take class 321 has the highest calculated probability, indicating that the system most likely detects that the person near the image storage area has taken the item away from the storage area.

The neural network analysis as indicated in FIG. 3 to determine which item or items have been moved and the types of movement actions performed is an illustrative technique for image analysis that may be used in one or more embodiments. One or more embodiments may use any desired technique or algorithm to analyze images to determine items that have moved and the actions that have been performed. For example, one or more embodiments may perform simple frame differences on images 301 and 302 to identify movement of items. One or more embodiments may preprocess images 301 and 302 in any desired manner prior to feeding them to a neural network or other analysis system. For example, without limitation, preprocessing may align images, remove shadows, equalize lighting, correct color differences, or perform any other modifications. Images may be processed with any classical image processing algorithms such as color space transformation, edge detection, smoothing or sharpening, application of morphological operators, or convolution with filters.

Figure 4:
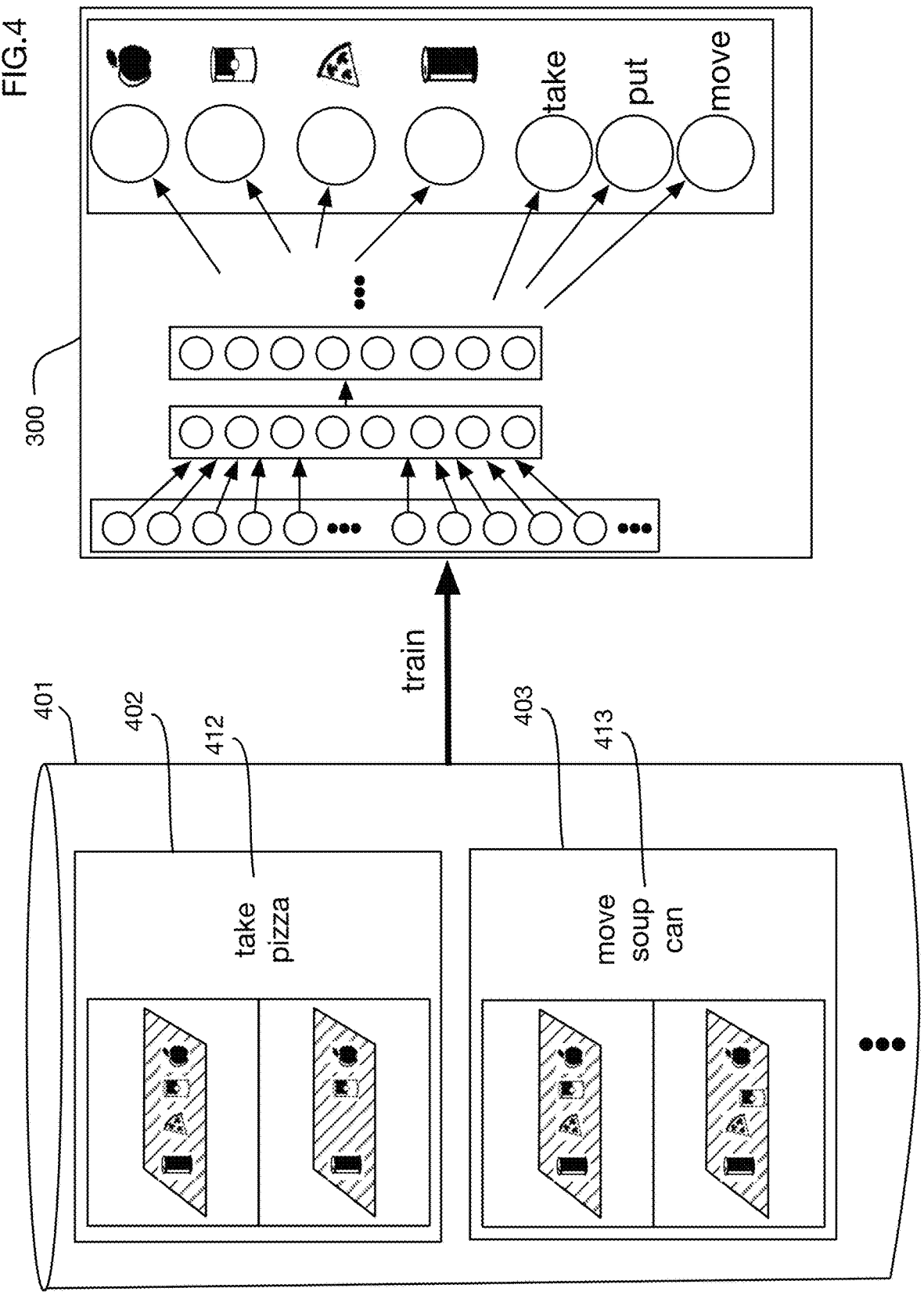
FIG. 4 illustrates training the neural network shown in FIG. 3.
Figure 4A:
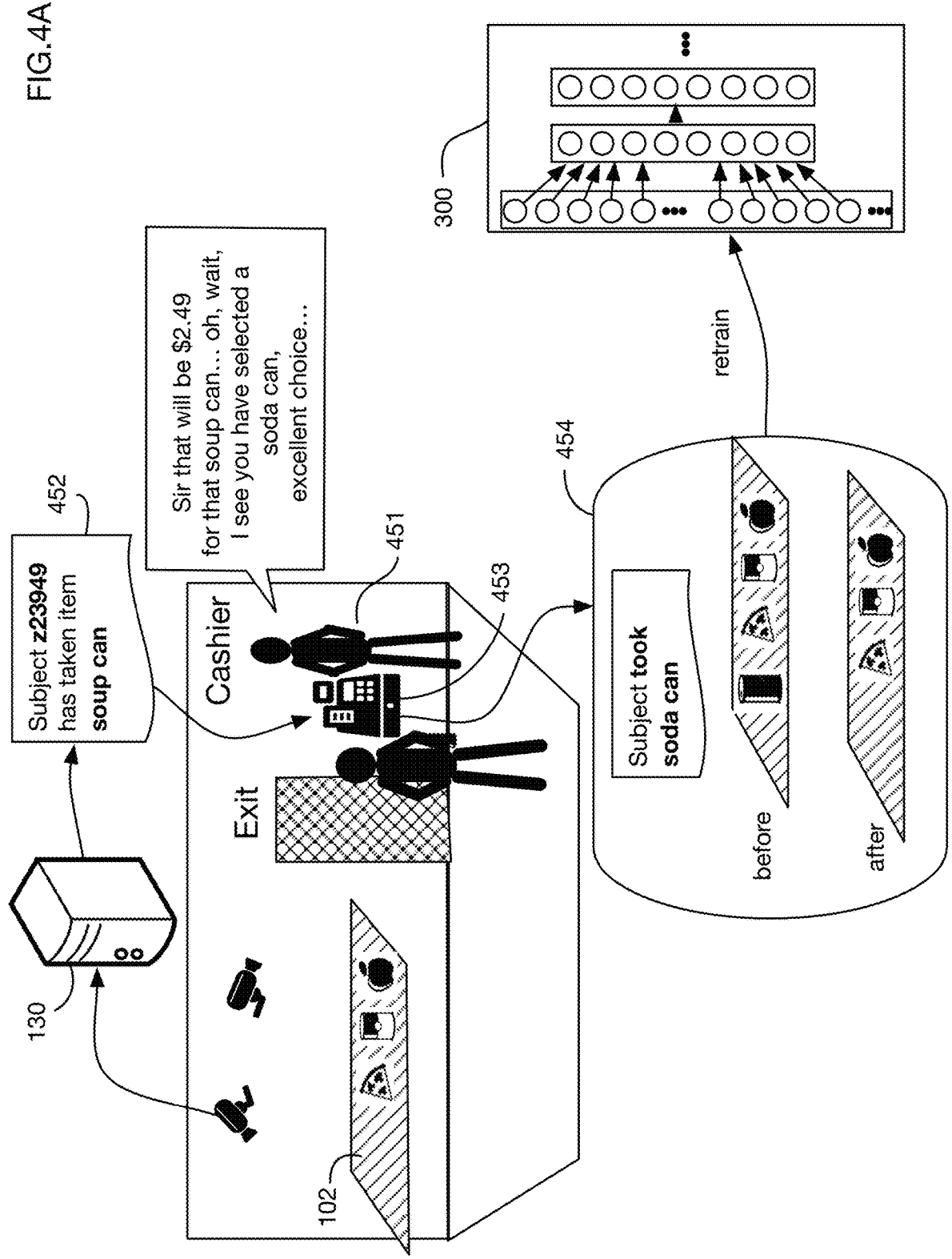
FIG. 4A illustrates an embodiment that allows manual review and correction of a detection of an item taken by a shopper and retraining of the neural network with the corrected example.

One or more embodiments may use machine learning techniques to derive classification algorithms such as the neural network algorithm applied in FIG. 3. FIG. 4 shows an illustrative process for learning the weights of the neural network 300 of FIG. 3. A training set 401 of examples may be collected or generated and used to train network 300. Training examples such as examples 402 and 403 may for example include before and after images of an item storage area and output labels 412 and 413 that indicate the item moved and the type of action applied to the item. These examples may be constructed manually, or in one or more embodiments there may be an automated training process that captures images and then uses checkout data that associates items with persons to build training examples. FIG. 4A shows an example of augmenting the training data with examples that correct misclassifications by the system. In this example, the store checkout is not fully automated; instead, a cashier 451 assists the customer with checkout. The system 130 has analyzed camera images and has sent message 452 to the cashier's point of sale system 453. The message contains the system's determination of the item that the customer has removed from the item storage area 102. However, in this case the system has made an error. Cashier 451 notices the error and enters a correction into the point of sale system with the correct item. The corrected item and the images from the camera may then be transmitted as a new training example 454 that may be used to retrain neural network 300. In time, the cashier may be eliminated when the error rate converges to an acceptable predefined level. In one or more embodiments, the user may show the erroneous item to the neural network via a camera and train the system without cashier 451. In other embodiments, cashier 451 may be remote and accessed via any communication method including video or image and audio-based systems.

In one or more embodiments, people in the store may be tracked as they move through the store. Since multiple people may be moving in the store simultaneously, it may be beneficial to distinguish between persons using image analysis, so that people can be correctly tracked. FIG. 5 shows an illustrative method that may be used to distinguish among different persons. As a new person 501 enters a store or enters a specified area or areas of the store at time 510, images of the person from cameras such as cameras 511, 512 and 513 may be analyzed to determine certain characteristics 531 of the person's appearance that can be used to distinguish that person from other people in the store. These distinguishing characteristics may include for example, without limitation: the size or shape of certain body parts; the color, shape, style, or size of the person's hair; distances between selected landmarks on the person's body or clothing; the color, texture, materials, style, size, or type of the person's clothing, jewelry, accessories, or possessions; the type of gait the person uses when walking or moving; the speed or motion the person makes with any part of their body such as hands, arms, legs, or head; and gestures the person makes. One or more embodiments may use high resolution camera images to observe biometric information such as a person's fingerprints or handprints, retina, or other features.

In the example shown in FIG. 5, at time 520 a person 502 enters the store and is detected to be a new person. New distinguishing characteristics 532 are measured and observed for this person. The original person 501 has been tracked and is now observed to be at a new location 533. The observations of the person at location 533 are matched to the distinguishing characteristics 531 to identify the person as person 501.

In the example of FIG. 5, although distinguishing characteristics are identified for persons 501 and 502, the identities of these individuals remain anonymous. Tags 541 and 542 are assigned to these individuals for internal tracking purposes, but the persons' actual identities are not known. This anonymous tracking may be beneficial in environments where individuals do not want their identities to be known to the autonomous store system. Moreover, sensitive identifying information, such as for example images of a person's face, need not be used for tracking; one or more embodiments may track people based on other less sensitive information such as the distinguishing characteristics 531 and 532. As previously described, in some areas, people wear masks when sick or otherwise wear face garments, making identification based on a user's face impossible.

The distinguishing characteristics 531 and 532 of persons 501 and 502 may or may not be saved over time to recognize return visitors to the store. In some situations, a store may want to track return visitors. For example, shopper behavior may be tracked over multiple visits if the distinguishing characteristics are saved and retrieved for each visitor. Saving this information may also be useful to identify shoplifters who have previously stolen from the store, so that the store personnel or authorities can be alerted when a shoplifter or potential shoplifter returns to the store. In other situations, a store may want to delete distinguishing information when a shopper leaves the store, for example if there are potential concern that the store may be collecting information that the shopper's do not want saved over time.

In one or more embodiments, the system may calculate a 3D field of influence volume around a person as it tracks the person's movement through the store. This 3D field of influence volume may for example indicate a region in which the person can potentially touch or move items. A detection of an item that has moved may for example be associated with a person being tracked only if the 3D field of influence volume for that person is near the item at the time of the item's movement.

Various methods may be used to calculate a 3D field of influence volume around a person. FIGS. 6A through 6E illustrate a method that may be used in one or more embodiments. (These figures illustrate the construction of a field of influence volume using 2D figures, for ease of illustration, but the method may be applied in three dimensions to build a 3D volume around the person.) Based on an image or images 601 of a person, image analysis may be used to identify landmarks on the person's body. For example, landmark 602 may be the left elbow of the person. FIG. 6B illustrates an analysis process that identifies 18 different landmarks on the person's body. One or more embodiments may identify any number of landmarks on a body, at any desired level of detail. Landmarks may be connected in a skeleton in order to track the movement of the person's joints. Once landmark locations are identified in the 3D space associated with the store, one method for constructing a 3D field of influence volume is to calculate a sphere around each landmark with a radius of a specified threshold distance. For example, one or more embodiments may use a threshold distance of 25 cm offset from each landmark. FIG. 6C shows sphere 603 with radius 604 around landmark 602. These spheres may be constructed around each landmark, as illustrated in FIG. 6D. The 3D field of influence volume may then be calculated as the union of these spheres around the landmarks, as illustrated with 3D field of influence volume 605 in FIG. 6E.

Another method of calculating a 3D field of influence volume around a person is to calculate a probability distribution for the location of each landmark and to define the 3D field of influence volume around a landmark as a region in space that contains a specified threshold amount of probability from this probability distribution. This method is illustrated in FIGS. 7A and 7B. Images of a person are used to calculate landmark positions 701, as described with respect to FIG. 6B. As the person is tracked through the store, uncertainty in the tracking process results in a probability distribution for the 3D location of each landmark. This probability distribution may be calculated and tracked using various methods, including a particle filter as described below with respect to FIG. 8. For example, for the right elbow landmark 702 in FIG. 7A, a probability density 703 may be calculated for the position of the landmark. (This density is shown in FIG. 7A as a 2D figure for ease of illustration, but in tracking it will generally be a 3D spatial probability distribution.) A volume may be determined that contains a specified threshold probability amount of this probability density for each landmark. For example, the volume enclosed by surface may enclose 95% (or any other desired amount) of the probability distribution 703. The 3D field of influence volume around a person may then be calculated as the union of these volumes 704 around each landmark, as illustrated in FIG. 7B. The shape and size of the volumes around each landmark may differ, reflecting differences in the uncertainties for tracking the different landmarks.

FIG. 8 illustrates a technique that may be used in one or more embodiments to track a person over time as he or she moves through a store. The state of a person at any point in time may for example be represented as a probability distribution of certain state variables such as the position and velocity (in three dimensions) of specific landmarks on the person's body. One approach to representing this probability distribution is to use a particle filter, where a set of particles is propagated over time to represent weighted samples from the distribution. In the example of FIG. 8, two particles 802 and 803 are shown for illustration; in practice the probability distribution at any point in time may be represented by hundreds or thousands of particles. To propagate state 801 to a subsequent point in time, one or more embodiments may employ an iterative prediction/correction loop. State 801 is first propagated through a prediction step 811, which may for example use a physics model to estimate for each particle what the next state of the particle is. The physics model may include for example, without limitation, constraints on the relative location of landmarks (for example, a constraint that the distance between the left foot and the left knee is fixed), maximum velocities or accelerations at which body parts can move and constraints from barriers in the store, such as floors, walls, fixtures, or other persons. These physics model components are illustrative; one or more embodiments may use any type of physics model or other model to propagate tracking state from one time period to another. The predict step 811 may also reflect uncertainties in movements, so that the spread of the probability distribution may increase over time in each predict step, for example. The particles after the prediction step 811 are then propagated through a correction step 812, which incorporates information obtained from measurements in camera images, as well as other information if available. The correction step uses camera images such as images 821, 822, 823 and information on the camera projections of each camera as well as other camera calibration data if available. As illustrated in images 821, 822 and 823, camera images may provide only partial information due to occlusion of the person or to images that capture only a portion of the person's body. The information that is available is used to correct the predictions, which may for example reduce the uncertainty in the probability distribution of the person's state. This prediction/correction loop may be repeated at any desired interval to track the person through the store.

By tracking a person as he or she moves through the store, one or more embodiments of the system may generate a 3D trajectory of the person through the store. This 3D trajectory may be combined with information on movement of items in item storage areas to associate people with the items they interact with. If the person's trajectory is proximal to the item at a time when the item is moved, then the movement of the item may be attributed to that person, for example. FIG. 9 illustrates this process. For ease of illustration, the person's trajectory and the item position are shown in two dimensions; one or more embodiments may perform a similar analysis in three dimensions using the 3D model of the store, for example. A trajectory 901 of a person is tracked over time, using a tracking process such as the one illustrated in FIG. 8, for example. For each person, a 3D field of influence volume 902 may be calculated at each point in time, based for example on the location or probability distribution of landmarks on the person's body. (Again, for ease of illustration the field of influence volume shown in FIG. 9 is in the two dimension, although in implementation this volume may be three dimensional.) The system calculates the trajectory of the 3D influence volume through the store. Using camera image analysis such as the analysis illustrated in FIG. 3, motion 903 of an item is detected at a location 904. Since there may be multiple people tracked in a store, the motion may be attributed to the person whose field of influence volume was at or near this location at the time of motion. Trajectory 901 shows that the field of influence volume of this tracked person intersected the location of the moved item during a time interval proximal in time to this motion; hence the item movement may be attributed to this person.

Figure 10:
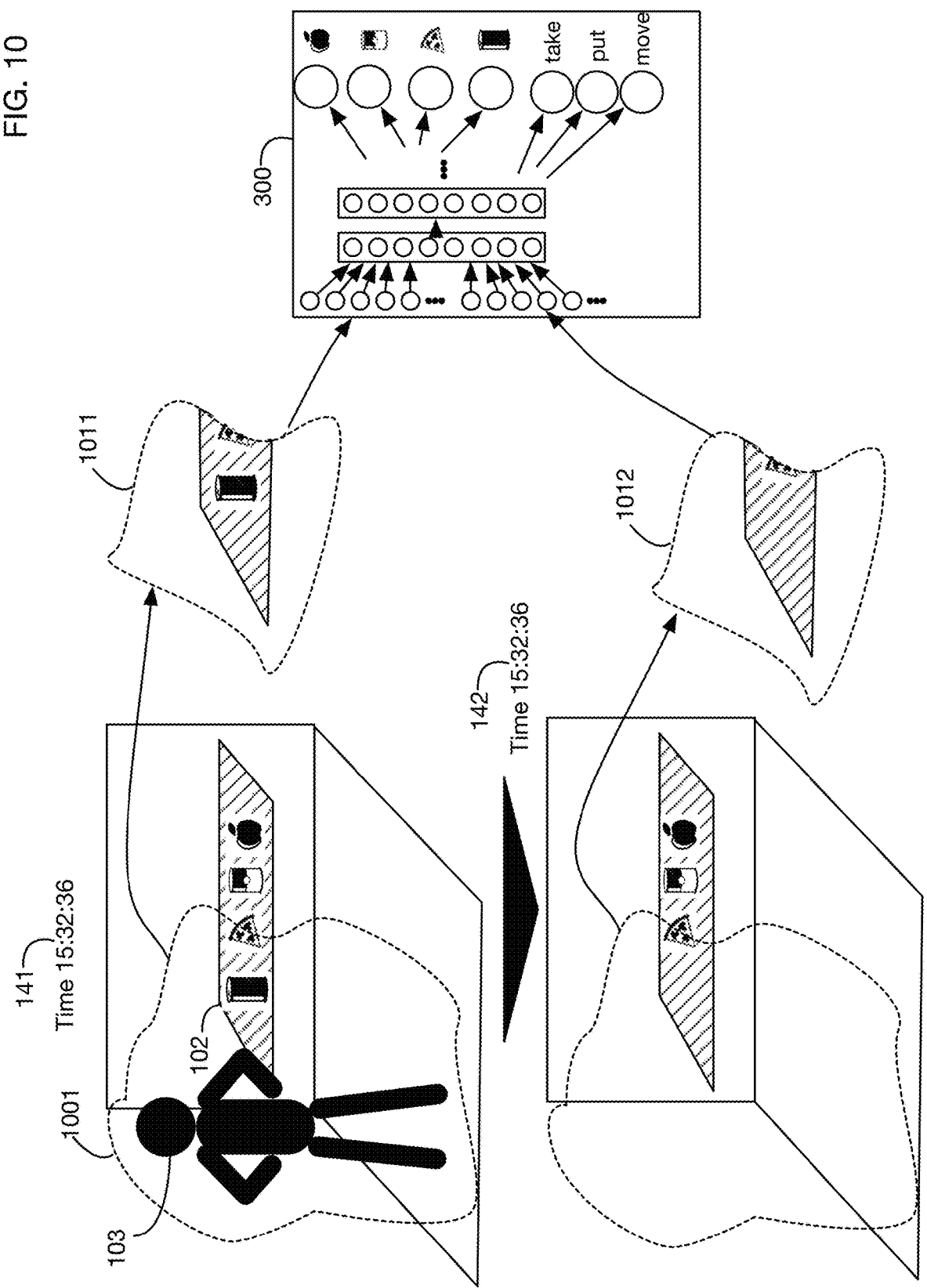
FIG. 10 illustrates an embodiment that attributes item movement to a person by intersecting the person's field of influence volume with an item storage area, such as a shelf and feeding images of the intersected region to a neural network for item detection.

In one or more embodiments the system may optimize the analysis described above with respect to FIG. 9 by looking for item movements only in item storage areas that intersect a person's 3D field of influence volume. FIG. 10 illustrates this process. At a point in time 141 or over a time interval, the tracked 3D field of influence volume 1001 of person 103 is calculated to be near item storage area 102. The system therefore calculates an intersection 1011 of the item storage area 102 and the 3D field of influence volume 1001 around person 1032 and locates camera images that contain views of this region, such as image 1011. At a subsequent time 142, for example when person 103 is determined to have moved away from item storage area 102, an image 1012 (or multiple such images) is obtained of the same intersected region. These two images are then fed as inputs to neural network 300, which may for example detect whether any item was moved, which item was moved (if any) and the type of action that was performed. The detected item motion is attributed to person 103 because this is the person whose field of influence volume intersected the item storage area at the time of motion. By applying the classification analysis of neural network 300 only to images that represent intersections of person's field of influence volume with item storage areas, processing resources may be used efficiently and focused only on item movement that may be attributed to a tracked person.

Figure 11:
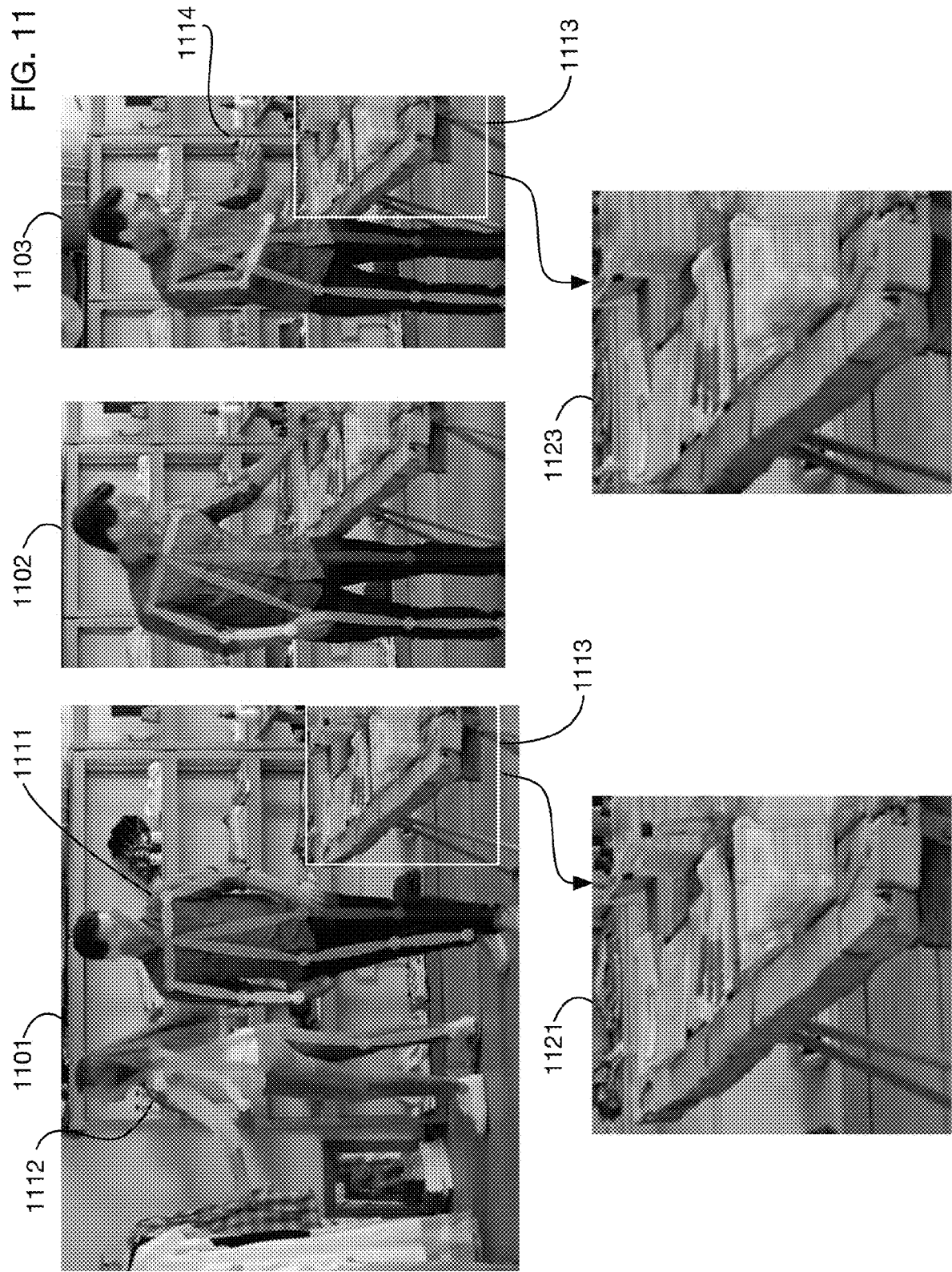
FIG. 11 shows screenshots of an embodiment of the system that tracks two people in a store and detects when one of the tracked people picks up an item.

FIGS. 11 through 15 show screenshots of an embodiment of the system in operation in a typical store environment. FIG. 11 shows three camera images 1101, 1102 and 1103 taken of shoppers moving through the store. In image 1101, two shoppers 1111 and 1112 have been identified and tracked. Image 1101 shows landmarks identified on each shopper that are used for tracking and for generating a 3D field of influence volume around each shopper. Distances between landmarks and other features such as clothing may be used to distinguish between shoppers 1111 and 1112 and to track them individually as they move through the store. Images 1102 and 1103 show views of shopper 1111 as he approaches item storage area 1113 and picks up an item 114 from the item storage area. Images 1121 and 1123 show close up views from images 1101 and 1103, respectively, of item storage area 1113 before and after shopper 1111 picks up the item.

Figure 12:
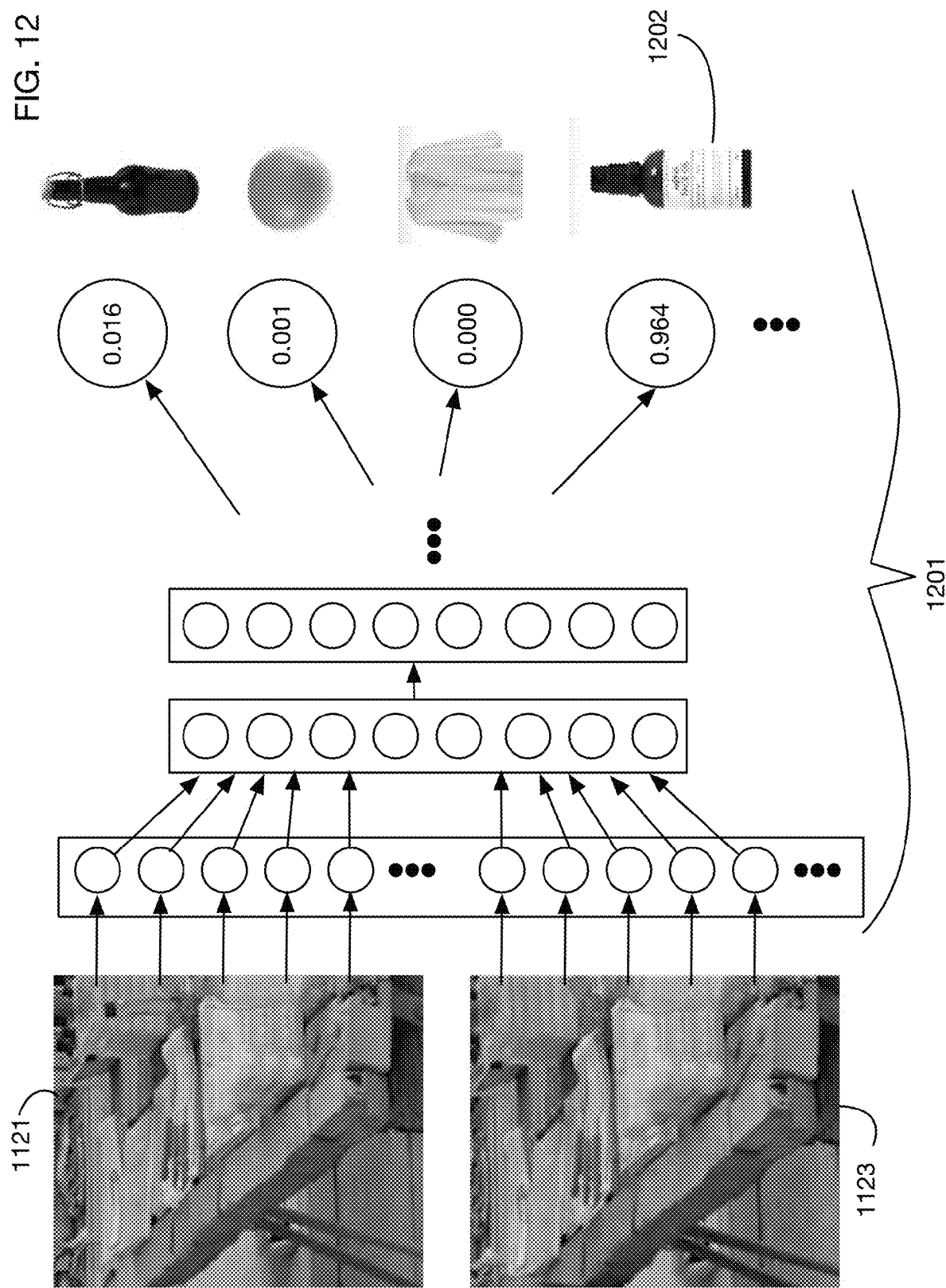
FIG. 12 shows screenshots of the item storage area of FIG. 11, illustrating how two different images of the item storage area may be input into a neural network for detection of the item that was moved by the person in the store.
Figure 13:
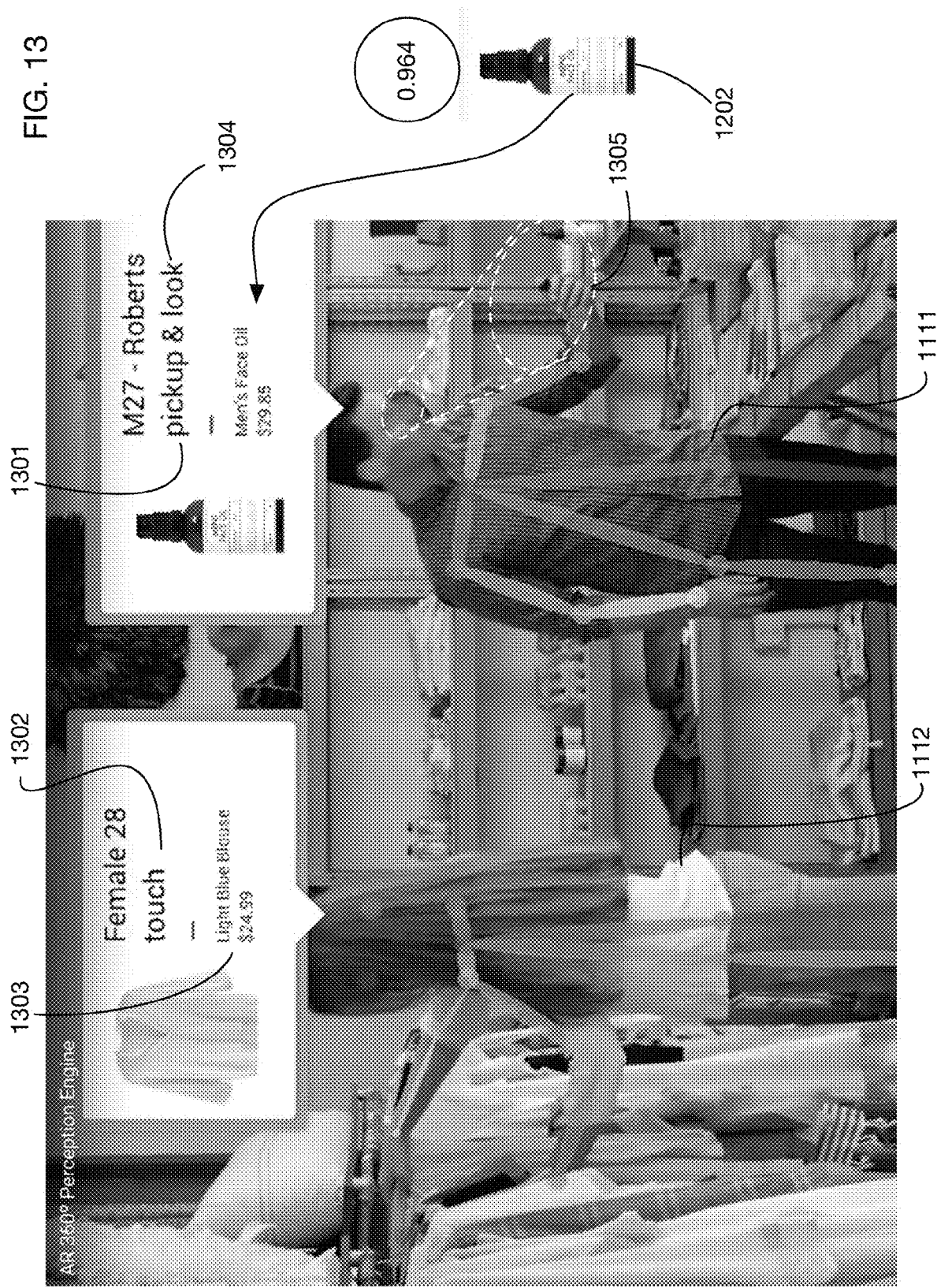
FIG. 13 shows the results of the neural network classification in FIG. 12, which tags the people in the store with the items that they move or touch.

FIG. 12 continues the example shown in FIG. 11 to show how images 1121 and 1123 of the item storage area are fed as inputs into a neural network 1201 to determine what item, if any, has been moved by shopper 1111. The network assigns the highest probability to item 1202. FIG. 13 shows how the system attributes motion of this item 1202 to shopper 1111 and assigns an action 1301 to indicate that the shopper picked up the item. This action 1301 may also be detected by neural network 1201, or by a similar neural network. Similarly, the system has detected that item 1303 has been moved by shopper 1112 and it assigns action 1302 to this item movement.

FIG. 13 also illustrates that the system has detected a "look at" action 1304 by shopper 1111 with respect to item 1202 that the shopper picked up. In one or more embodiments, the system may detect that a person is looking at an item by tracking the eyes of the person (as landmarks, for example) and by projecting a field of view from the eyes towards items. If an item is within the field of view of the eyes, then the person may be identified as looking at the item. For example, in FIG. 13 the field of view projected from the eyes landmarks of shopper 1111 is region 1305 and the system may recognize that item 1202 is within this region. One or more embodiments may detect that a person is looking at an item whether or not that item is moved by the person; for example, a person may look at an item in an item storage area while browsing and may subsequently choose not to touch the item.

In one or more embodiments, other head landmarks instead of or in addition to the eyes may be used to compute head orientation relative to the store reference frame to determine what a person is looking at. Head orientation may be computed for example via 3D triangulated head landmarks. One or more embodiments may estimate head orientation from 2D landmarks using for example a neural network that is trained to estimate gaze in 3D from 2D landmarks.

FIG. 14 shows a screenshot 1400 of the system creating a 3D field of influence volume around a shopper. The surface of the 3D field of influence volume 1401 is represented in this image overlay as a set of dots on the surface. The surface 1401 may be generated as an offset from landmarks identified on the person, such as landmark 1402 for the person's right foot for example. Screenshot 1410 shows the location of the landmarks associated with the person in the 3D model of the store.

Figure 15:
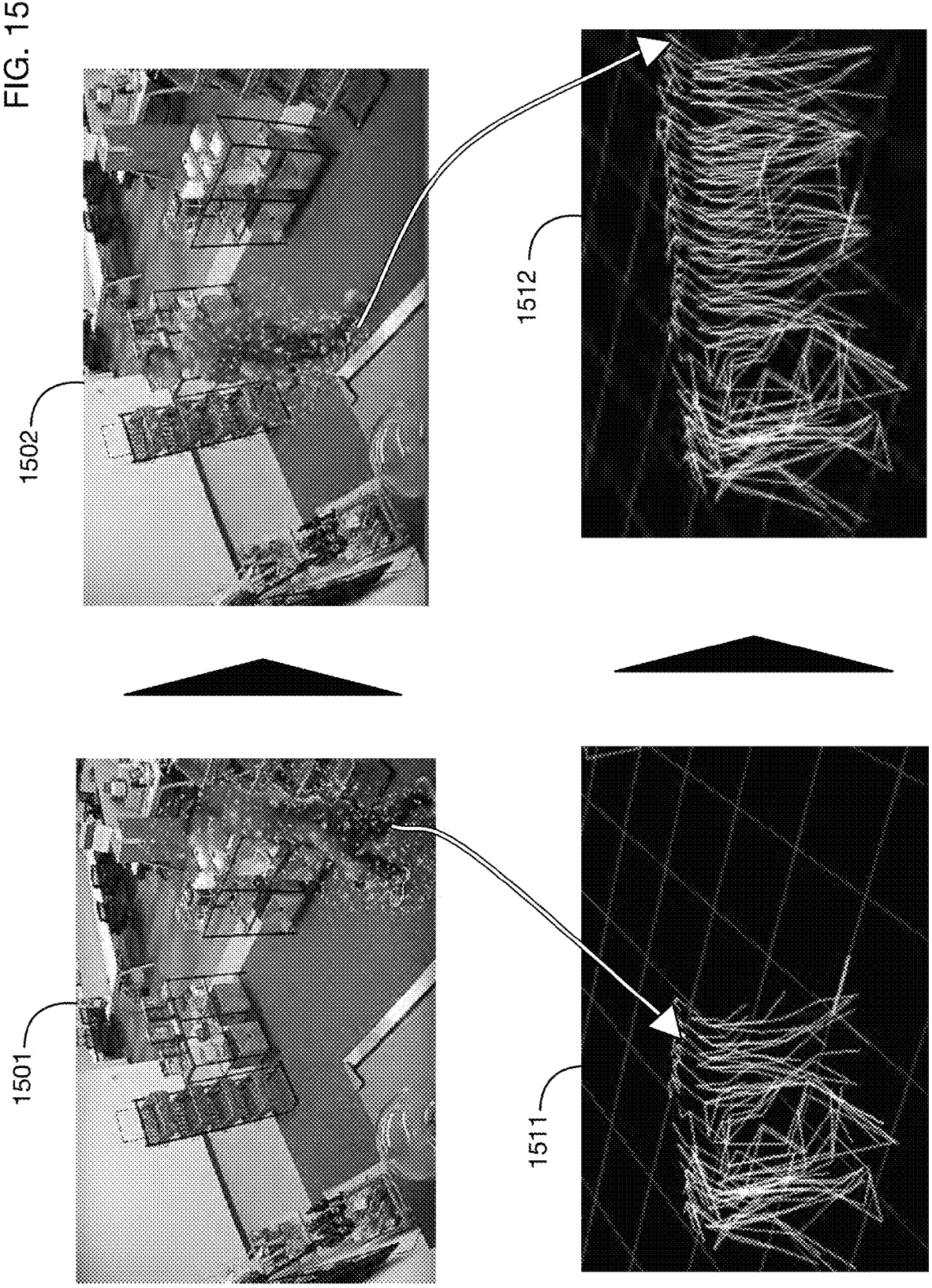
FIG. 15 shows tracking of the person of FIG. 14 as he moves through the store.

FIG. 15 continues the example of FIG. 14 to show tracking of the person and his 3D field of influence volume as he moves through the store in camera images 1501 and 1502 and generation of a trajectory of the person's landmarks in the 3D model of the store in screenshots 1511 and 1512.

Figure 16:
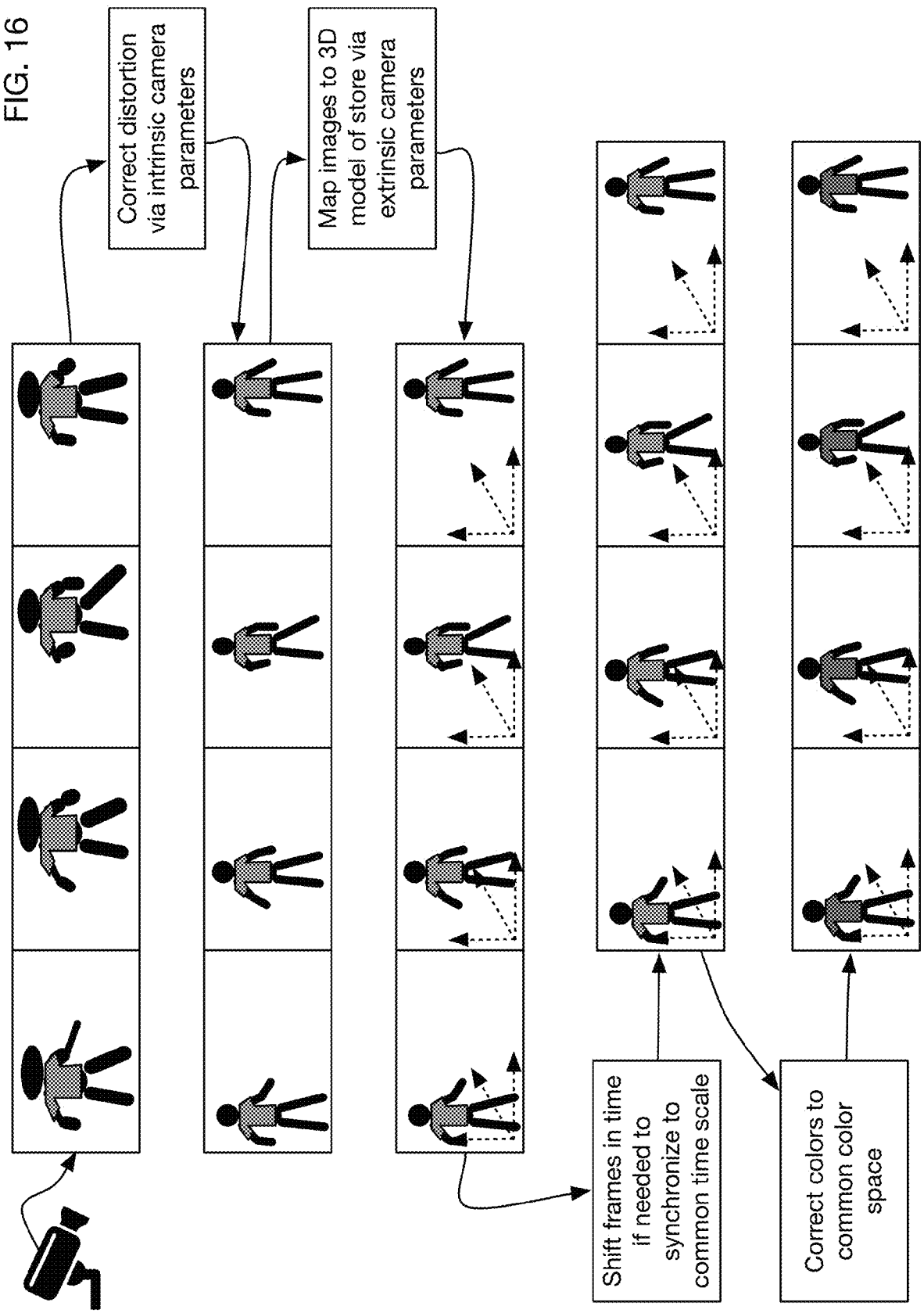
FIG. 16 illustrates an embodiment that applies multiple types of camera calibration corrections to images.

In one or more embodiments, the system may use camera calibration data to transform images obtained from cameras in the store. Calibration data may include for example, without limitation, intrinsic camera parameters, extrinsic camera parameters, temporal calibration data to align camera image feeds to a common time scale and color calibration data to align camera images to a common color scale. FIG. 16 illustrates the process of using camera calibration data to transform images. A sequence of raw images 1601 is obtained from camera 121 in the store. A correction 1602 for intrinsic camera parameters is applied to these raw images, resulting in corrected sequence 1603. Intrinsic camera parameters may include for example the focal length of the camera, the shape and orientation of the imaging sensor, or lens distortion characteristics. Corrected images 1603 are then transformed in step 1604 to map the images to the 3D store model, using extrinsic camera parameters that describe the camera projection transformation based on the location and orientation of the camera in the store. The resulting transformed images 1605 are projections aligned with respect to a coordinate system 1606 of the store. These transformed images 1605 may then be shifted in time to account for possible time offsets among different cameras in the store. This shifting 1607 synchronizes the frames from the different cameras in the store to a common time scale. In the last transformation 1609, the color of pixels in the time corrected frames 1608 may be modified to map colors to a common color space across the cameras in the store, resulting in final calibrated frames 1610. Colors may vary across cameras because of differences in camera hardware or firmware, or because of lighting conditions that vary across the store; color correction 1609 ensures that all cameras view the same object as having the same color, regardless of where the object is in the store. This mapping to a common color space may for example facilitate the tracking of a person or an item selected by a person as the person or item moves from the field of view of one camera to another camera, since tracking may rely in part on the color of the person or item.

Figure 17:
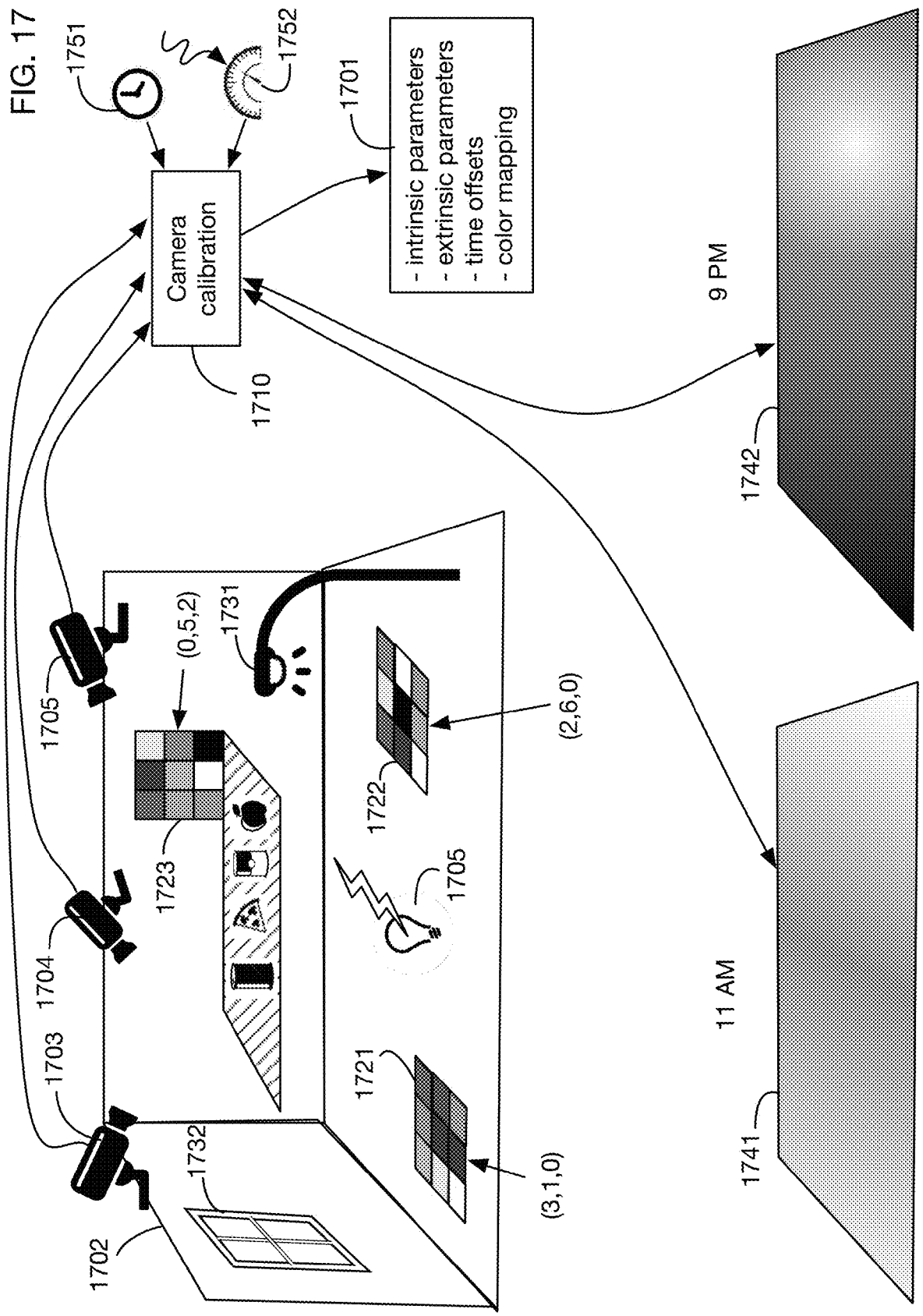
FIG. 17 illustrates an embodiment that generates camera calibration data by capturing images of markers placed throughout a store and also corrects for color variations due to hue, saturation or luminance changes across the store and across time.

The camera calibration data illustrated in FIG. 16 may be obtained from any desired source. One or more embodiments may also include systems, processes, or methods to generate any or all of this camera calibration data. FIG. 17 illustrates an embodiment that generates camera calibration data 1701, including for example any or all of intrinsic camera parameters, extrinsic camera parameter, time offsets for temporal synchronization and color mapping from each camera to a common color space. Store 1702 contains for this example three cameras, 1703, 1704 and 1705. Images from these cameras are captured during calibration procedures and are analyzed by camera calibration system 1710. This system may be the same as or different from the system or systems used to track persons and items during store operations. Calibration system 1710 may include or communicate with one or more processors. For calibration of intrinsic camera parameters, standard camera calibration grids for example may be placed in the store 1702. For calibration of extrinsic camera parameters, markers of a known size and shape may for example be placed in known locations in the store, so that the position and orientation of cameras 1703, 1704 and 1705 may be derived from the images of the markers. Alternatively, an iterative procedure may be used that simultaneously solves for marker positions and for camera positions and orientations.

A temporal calibration procedure that may be used in one or more embodiments is to place a source of light 1705 in the store and to pulse a flash of light from the source 1705. The time that each camera observes the flash may be used to derive the time offset of each camera from a common time scale. The light flashed from source 1705 may be visible, infrared, or of any desired wavelength or wavelengths. If all cameras cannot observe a single source, then either multiple synchronized light sources may be used, or cameras may be iteratively synchronized in overlapping groups to a common time scale.

A color calibration procedure that may be used in one or more embodiments is to place one or more markers of known colors into the store and to generate color mappings from each camera into a known color space based on the images of these markers observed by the cameras. For example, color markers 1721, 1722 and 1723 may be placed in the store; each marker may for example have a grid of standard color squares. In one or more embodiments the color markers may also be used for calibration of extrinsic parameters; for example, they may be placed in known locations as shown in FIG. 17. In one or more embodiments items in the store may be used for color calibration if for example they are of a known color.

Based on the observed colors of the markers 1721, 1722 and 1723 in a specific camera, a mapping may be derived to transform the observed colors of the camera to a standard color space. This mapping may be linear or nonlinear. The mapping may be derived for example using a regression or using any desired functional approximation methodology.

The observed color of any object in the store, even in a camera that is color calibrated to a standard color space, depends on the lighting at the location of the object in the store. For example, in store 1702 an object near light 1731 or near window 1732 may appear brighter than objects at other locations in the store. To correct for the effect of lighting variations on color, one or more embodiments may create and/or use a map of the luminance or other lighting characteristics across the store. This luminance map may be generated based on observations of lighting intensity from cameras or from light sensors, on models of the store lighting, or on a combination thereof. In the example of FIG. 17, illustrative luminance map 1741 may be generated during or prior to camera calibration and it may be used in mapping camera colors to a standard color space. Since lighting conditions may change at different times of day, one or more embodiments may generate different luminance maps for different times or time periods. For example, luminance map 1742 may be used for nighttime operation, when light from window 1732 is diminished but store light 1731 continues to operate.

In one or more embodiments, filters may be added to light sources or to cameras, or both, to improve tracking and detection. For example, point lights may cause glare in camera images from shiny products. Polarizing filters on light may reduce this glare, since polarized light generates less glare. Polarizing filters on light sources may be combined with polarizers on cameras to further reduce glare.

In addition to or instead of using different luminance maps at different times to account for changes in lighting conditions, one or more embodiments may recalibrate cameras as needed to account for the effects of changing lighting conditions on camera color maps. For example, a timer 1751 may trigger camera calibration procedure 1710, so that for example camera colors are recalibrated at different times of day. Alternatively, or in addition, light sensors 1752 located in store 1702 may trigger camera calibration procedure 1710 when the sensor or sensors detect that lighting conditions have changed or may have changed. Embodiments of the system may also sub-map calibration to specific areas of images, for example if window 1732 allows sunlight in to a portion of the store. In other words, the calibration data may also be based on area and time to provide even more accurate results.

Figure 18:
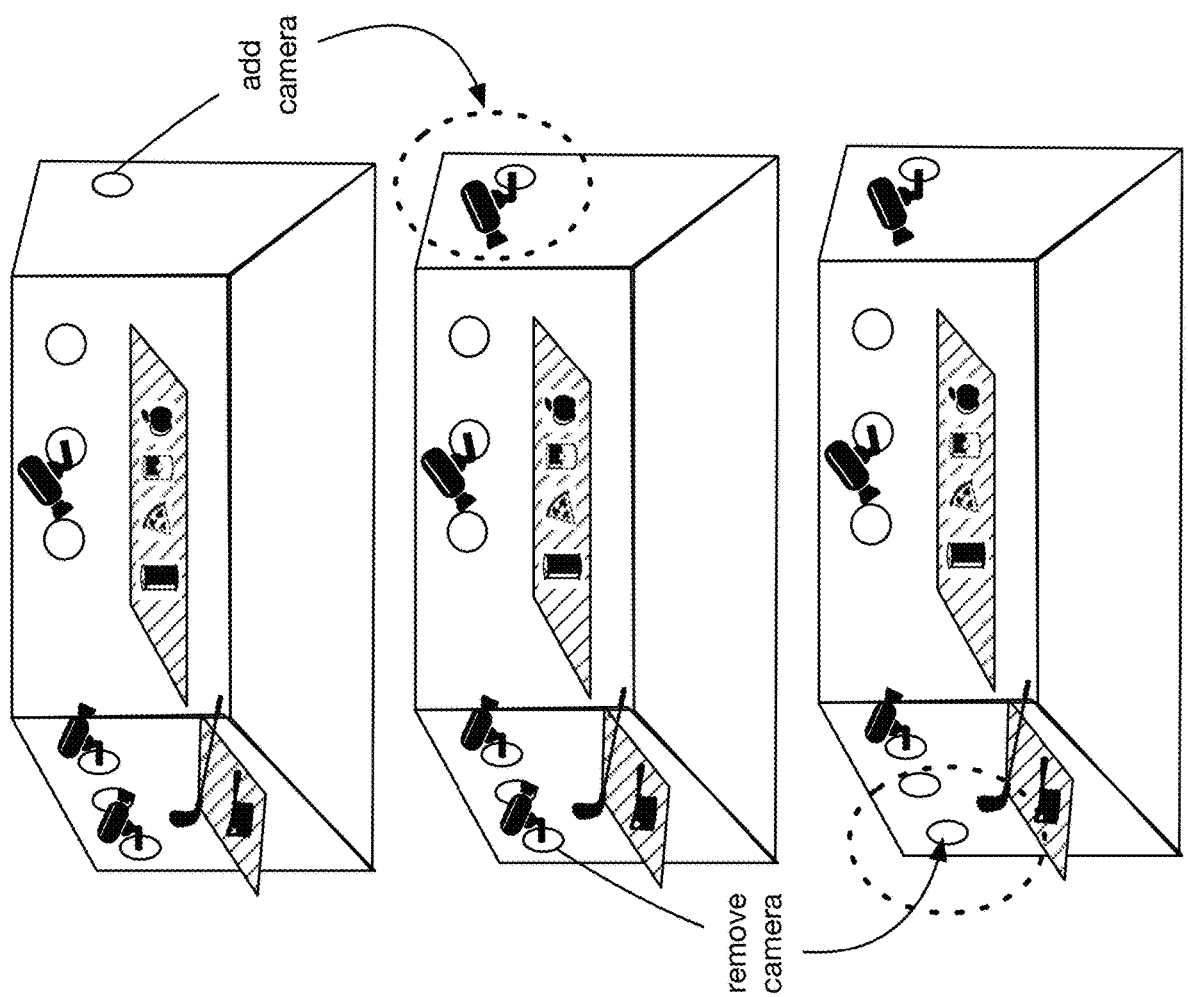
FIG. 18 illustrates an embodiment that calculates an optimal camera configuration for a store by iteratively optimizing a cost function that measures the number of cameras and the coverage of items by camera fields of view.

In one or more embodiments, camera placement optimization may be utilized in the system. For example, in a 2D camera scenario, one method that can be utilized is to assign a cost function to camera positions to optimize the placement and number of cameras for a particular store. In one embodiment, assigning a penalty of 1000 to any item that is only found in one image from the cameras results in a large penalty for any item only viewable by one camera. Assigning a penalty of 1 to the number of cameras results in a slight penalty for additional cameras required for the store. By penalizing camera placements that do not produce at least two images or a stereoscopic image of each item, then the number of items for which 3D locations cannot be obtained is heavily penalized so that the final camera placement is under a predefined cost. One or more embodiments thus converge on a set of camera placements where two different viewpoints to all items is eliminated given enough cameras. By placing a cost function on the number of cameras, the iterative solution according to this embodiment thus is employed to find at least one solution with a minimal number of cameras for the store. As shown in the upper row of FIG. 18, the items on the left side of the store only have one camera, the middle camera pointing towards them. Thus, those items in the upper right table incur a penalty of 1000 each. Since there are 3 cameras in this iteration, the total cost is 2003. In the next iteration, a camera is added as shown in the middle row of the figure. Since all items can now be seen by at least two cameras, the cost drops to zero for items, while another camera has been added so that the total cost is 4. In the bottom row as shown for this iteration, a camera is removed, for example by determining that certain items are viewed by more than 2 cameras as shown in the middle column of the middle row table, showing 3 views for 4 items. After removing the far-left camera in the bottom row store, the cost decreases by 1, thus the total cost is 3. Any number of camera positions, orientations and types may be utilized in embodiments of the system. One or more embodiments of the system may optimize the number of cameras by using existing security cameras in a store and by moving those cameras if needed or augmenting the number of cameras for the store to leverage existing video infrastructure in a store, for example in accordance with the camera calibration previously described. Any other method of placing and orienting cameras, for example equal spacing and a predefined angle to set an initial scenario may be utilized.

In one or more embodiments, one or more of the techniques described above to track people and their interactions with an environment may be applied to extend an authorization obtained by a person at one point in time and space to another point in time or space. For example, an authorization may be obtained by a person at an entry point to an area or a check point in the area and at an initial point in time. The authorization may authorize the person to perform one or more actions, such as for example to enter a secure environment such as a locked building, or to charge purchases to an account associated with the person. The system may then track this person to a second location at a subsequent point in time and may associate the previously obtained authorization with that person at the second location and at the subsequent point in time. This extension of an authorization across time and space may simplify the interaction of the person with the environment. For example, a person may need to or choose to present a credential (such as a payment card) at the entry point to obtain an authorization to perform purchases; because the system may track that person afterwards, this credential may not need to be presented again to use the previously obtained authorization. This extension of authorization may for example be useful in automated stores in conjunction with the techniques described above to determine which items a person interacts with or takes within the store; a person might for example present a card at a store entrance or at a payment kiosk or card reader associated with the store and then simply take items as desired and be charged for them automatically upon leaving the store, without performing any explicit checkout.

Figure 19:
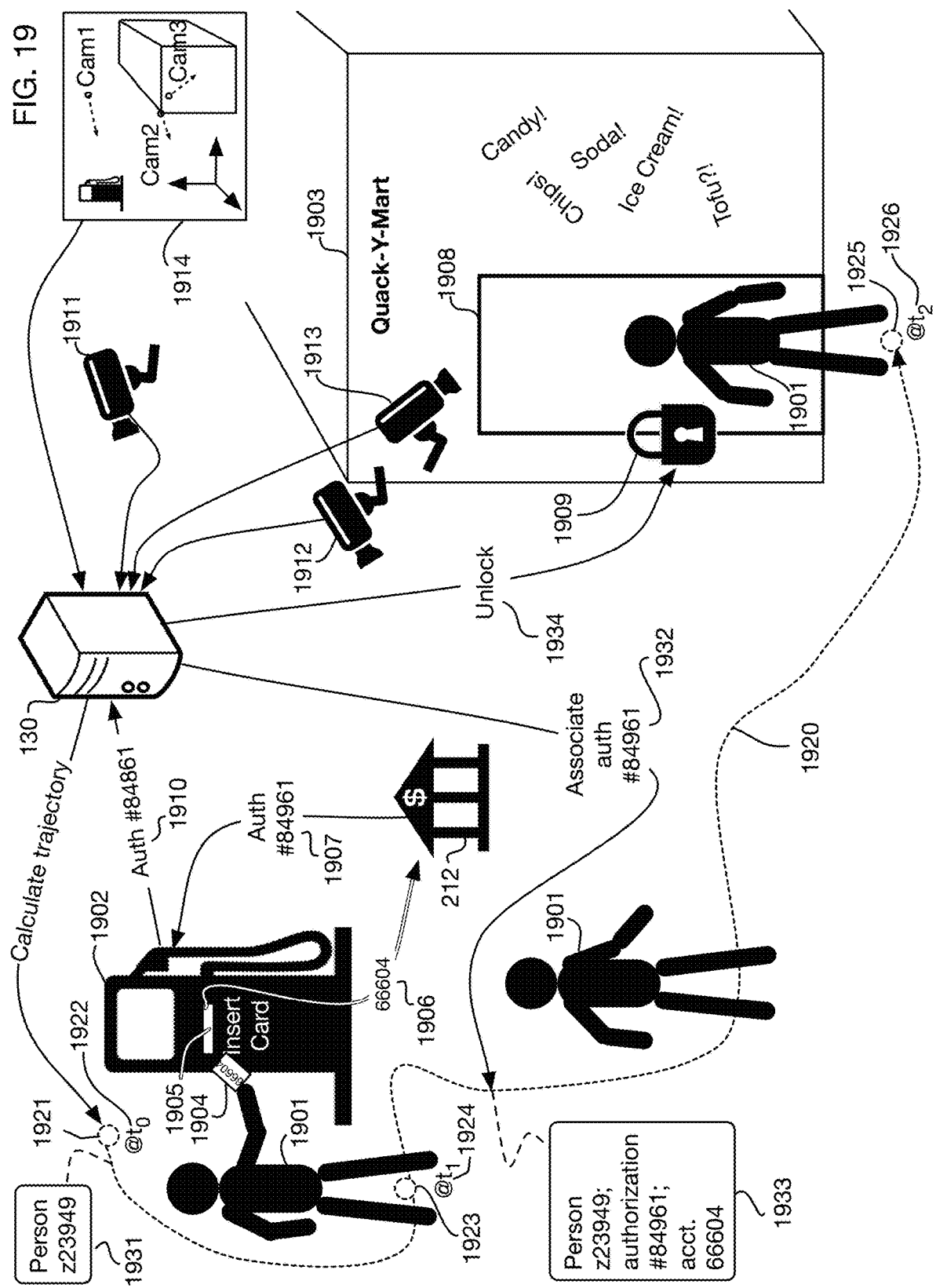
FIG. 19 illustrates an embodiment installed at a gas station that extends an authorization from a card reader at a gas pump to provide automated access to a store where a person may take products and have them charged automatically to the card account.

FIG. 19 shows an illustrative embodiment that enables authorization extension using tracking via analysis of camera images. This figure and several subsequent figures illustrate one or more aspects of authorization extension using a gas station example. This example is illustrative; one or more embodiments may enable authorization extension at any type of site or area. For example, without limitation, authorization extension may be applied to or integrated into all of or any portion of a building, a multi-building complex, a store, a restaurant, a hotel, a school, a campus, a mall, a parking lot, an indoor or outdoor market, a residential building or complex, a room, a stadium, a field, an arena, a recreational area, a park, a playground, a museum, or a gallery. It may be applied or integrated into any environment where an authorization obtained at one time and place may be extended to a different time or different place. It may be applied to extend any type of authorization.

In the example shown in FIG. 19, a person 1901 arrives at a gas station and goes to gas pump 1902. To obtain gas (or potentially to authorize other actions without obtaining gas), person 1901 presents a credential 1904, such as for example a credit or debit card, into credential reader 1905 on or near the pump 1902. The credential reader 1905 transmits a message 1906 to a bank or clearinghouse 212 to obtain an authorization 1907, which allows user 1901 to pump gas from pump 1902.

In one or more embodiments, a person may present any type of credential to any type of credential reader to obtain an authorization. For example, without limitation, a credential may be a credit card, a debit card, a bank card, an RFID tag, a mobile payment device, a mobile wallet device, a mobile phone, a smart phone, a smart watch, smart glasses or goggles, a key fob, an identity card, a driver's license, a passport, a password, a PIN, a code, a phone number, or a biometric identifier. A credential may be integrated into or attached to any device carried by a person, such as a mobile phone, smart phone, smart watch, smart glasses, key fob, smart goggles, tablet, or computer. A credential may be worn by a person or integrated into an item of clothing or an accessory worn by a person. A credential may be passive or active. A credential may or may not be linked to a payment mechanism or an account. In one or more embodiments a credential may be a password, PIN, code, phone number, or other data typed or spoken or otherwise entered by a person into a credential reader. A credential reader may be any device or combination of devices that can read or accept a presented credential. A credential reader may or may not be linked to a remote authorization system like bank 212. In one or more embodiments a credential reader may have local information to authorize a user based on a presented credential without communicating with other systems. A credential reader may read, recognize, accept, authenticate, or otherwise process a credential using any type of technology. For example, without limitation, a credential reader may have a magnetic stripe reader, a chip card reader, an RFID tag reader, an optical reader or scanner, a biometric reader such as a fingerprint scanner, a near field communication receiver, a Bluetooth receiver, a Wi-Fi receiver, a keyboard or touchscreen for typed input, or a microphone for audio input. A credential reader may receive signals, transmit signals, or both.

In one or more embodiments, an authorization obtained by a person may be associated with any action or actions the person is authorized to perform. These actions may include, but are not limited to, financial transactions such as purchases. Actions that may be authorized may include for example, without limitation, entry to or exit from a building, room, or area; purchasing or renting of items, products, or services; use of items, products, or services; or access to controlled information or materials.

In one or more embodiments, a credential reader need not be integrated into a gas pump or into any other device. It may be standalone, attached to or integrated into any device, or distributed across an area. A credential reader may be located in any location in an area, including for example, without limitation, at an entrance, exit, check-in point, checkpoint, control point, gate, door, or other barrier. In one or more embodiments, several credential readers may be located in an area; multiple credential readers may be used simultaneously by different persons.

The embodiment illustrated in FIG. 19 extends the authorization for pumping gas obtained by person 1901 to authorize one or more other actions by this person, without requiring the person to re-present credential 1904. In this illustrative example, the gas station has an associated convenience store 1903 where customers can purchase products. The authorization extension embodiment may enable the convenience store to be automated, for example without staff. Because the store 1903 may be unmanned, the door 1908 to the store may be locked, for example with a controllable lock 1909, thereby preventing entry to the store by unauthorized persons. The embodiment described below extends the authorization of person 1901 obtained by presenting credential 1904 at the pump 1902 to enable the person 1901 to enter store 1903 through locked door 1908.

One or more embodiments may enable authorization extension to allow a user to enter a secured environment of any kind, including but not limited to a store such as convenience store 1903 in FIG. 19. The secured environment may have an entry that is secured by a barrier, such as for example, without limitation, a door, gate, fence, grate, or window. The barrier may not be a physical device preventing entry; it may be for example an alarm that must be disabled to enter the secured environment without sounding the alarm. In one or more embodiments the barrier may be controllable by the system so that for example commands may be sent to the barrier to allow (or to disallow) entry. For example, without limitation, an electronically controlled lock to a door or gate may provide a controllable barrier to entry.

In FIG. 19, authorization extension may be enabled by tracking the person 1901 from the point of authorization to the point of entry to the convenience store 1903. Tracking may be performed using one or more cameras in the area. In the gas station example of FIG. 19, cameras 1911, 1912 and 1913 are installed in or around the area of the gas station. Images from the cameras are transmitted to processor 130, which processes these images to recognize people and to track them over a time period as they move through the gas station area. Processor 130 may also access and use a 3D model 1914. The 3D model 1914 may for example describe the location and orientation of one or more cameras in the site; this data may be obtained for example from extrinsic camera calibration. In one or more embodiments, the 3D model 1914 may also describe the location of one or more objects or zones in the site, such as the pump and the convenience store in the gasoline station site of FIG. 19. The 3D model 1914 need not be a complete model of the entire site; a minimal model may for example contain only enough information on one or more cameras to support tracking of persons in locations or regions of the site that are relevant to the application.

Recognition, tracking and calculation of a trajectory associated with a person may be performed for example as described above with respect to FIGS. 1 through 10 and as illustrated in FIG. 15. Processor 130 may calculate a trajectory 1920 for person 1901, beginning for example at a point 1921 at time 1922 when the person enters the area of the gas station or is first observed by one or more cameras. The trajectory may be continuously updated as the person moves through the area. The starting point 1921 may or may not coincide with the point 1923 at which the person presents credential 1904. On beginning tracking of a person, the system may for example associate a tag 1931 with the person 1901 and with the trajectory 1920 that is calculated over a period of time for this person as the person is tracked through the area. This tag 1931 may be associated with distinguishing characteristics of the person (for example as described above with respect to FIG. 5). In one or more embodiments it may be an anonymous tag that is an internal identifier used by processor 130.

The trajectory 1920 calculated by processor 130, which may be updated as the person 1901 moves through the area, may associate locations with times. For example, person 1901 is at location 1921 at time 1922. In one or more embodiments the locations and the times may be ranges rather than specific points in space and time. These ranges may for example reflect uncertainties or limitations in measurement, or the effects of discrete sampling. For example, if a camera captures images every second, then a time associated with a location obtained from one camera image may be a time range with a width of two seconds. Sampling and extension of a trajectory with a new point may also occur in response to an event, such as a person entering a zone or triggering a sensor, instead of or in addition to sampling at a fixed frequency. Ranges for location may also reflect that a person occupies a volume in space, rather than a single point. This volume may for example be or be related to the 3D field of influence volume described above with respect to FIGS. 6A through 7B.

The processor 130 tracks person 1901 to location 1923 at time 1924, where credential reader 1905 is located. In one or more embodiments location 1923 may be the same as location 1921 where tracking begins; however, in one or more embodiments the person may be tracked in an area upon entering the area and may provide a credential at another time, such as upon entering or exiting a store. In one or more embodiments, multiple credential readers may be present; for example, the gas station in FIG. 19 may have several pay-at-the-pump stations at which customers can enter credentials. Using analysis of camera images, processor 130 may determine which credential reader a person uses to enter a credential, which allows the processor to associate an authorization with the person, as described below.

As a result of entering credential 1904 into credential reader 1905, an authorization 1907 is provided to gas pump 1902. This authorization, or related data, may also be transmitted to processor 130. The authorization may for example be sent as a message 1910 from the pump or credential reader, or directly from bank or payment processor (or another authorization service) 212. Processor 130 may associate this authorization with person 1901 by determining that the trajectory 1920 of the person is at or near the location of the credential reader 1904 at or near the time that the authorization message is received or the time that the credential is presented to the credential reader 1905. In embodiments with multiple credential readers in an area, the processor 130 may associate a particular authorization with a particular person by determining which credential reader that authorization is associated with and by correlating the time of that authorization and the location of that credential reader with the trajectories of one or more people to determine which person is at or near that credential reader at that time. In some situations, the person 1901 may wait at the credential reader 1905 until the authorization is received; therefore processor 130 may use either the time that the credential is presented or the time that the authorization is received to determine which person is associated with the authorization.

By determining that person 1901 is at or near location 1923 at or near time 1924, determining that location 1923 is the location of credential reader 1905 (or within a zone near the credential reader) and determining that authorization 1910 is associated with credential reader 1905 and is received at or near time 1924 (or is associated with presentation of a credential at or near time 1924), processor 130 may associate the authorization with the trajectory 1920 of person 1901 after time 1924. This association 1932 may for example add an extended tag 1933 to the trajectory that includes authorization information and may include account or credential information associated with the authorization. Processor 130 may also associate certain allowed actions with the authorization; these allowed actions may be specific to the application and may also be specific to the particular authorization obtained for each person or each credential.

Processor 130 then continues to track the trajectory 1920 of person 1901 to the location 1925 at time 1926. This location 1925 as at the entry 1908 to the convenience store 1903, which is locked by lock 1909. Because in this example the authorization obtained at the pump also allows entry into the store, processor 130 transmits command 1934 to the controllable lock 1909, which unlocks door 1908 to allow entry to the store. (Lock 1909 is shown symbolically as a padlock; in practice it may be integrated into door 1908 or any barrier, along with electronic controls to actuate the barrier to allow or deny entry.) The command 1934 to unlock the barrier is issued automatically at or near time 1926 when person 1901 arrives at the door, because camera images are processed to recognize the person, to determine that the person is at the door at location 1925 and to associate this person with the authorization obtained previously as a result of presenting the credential 1904 at previous time 1924.

Figure 20:
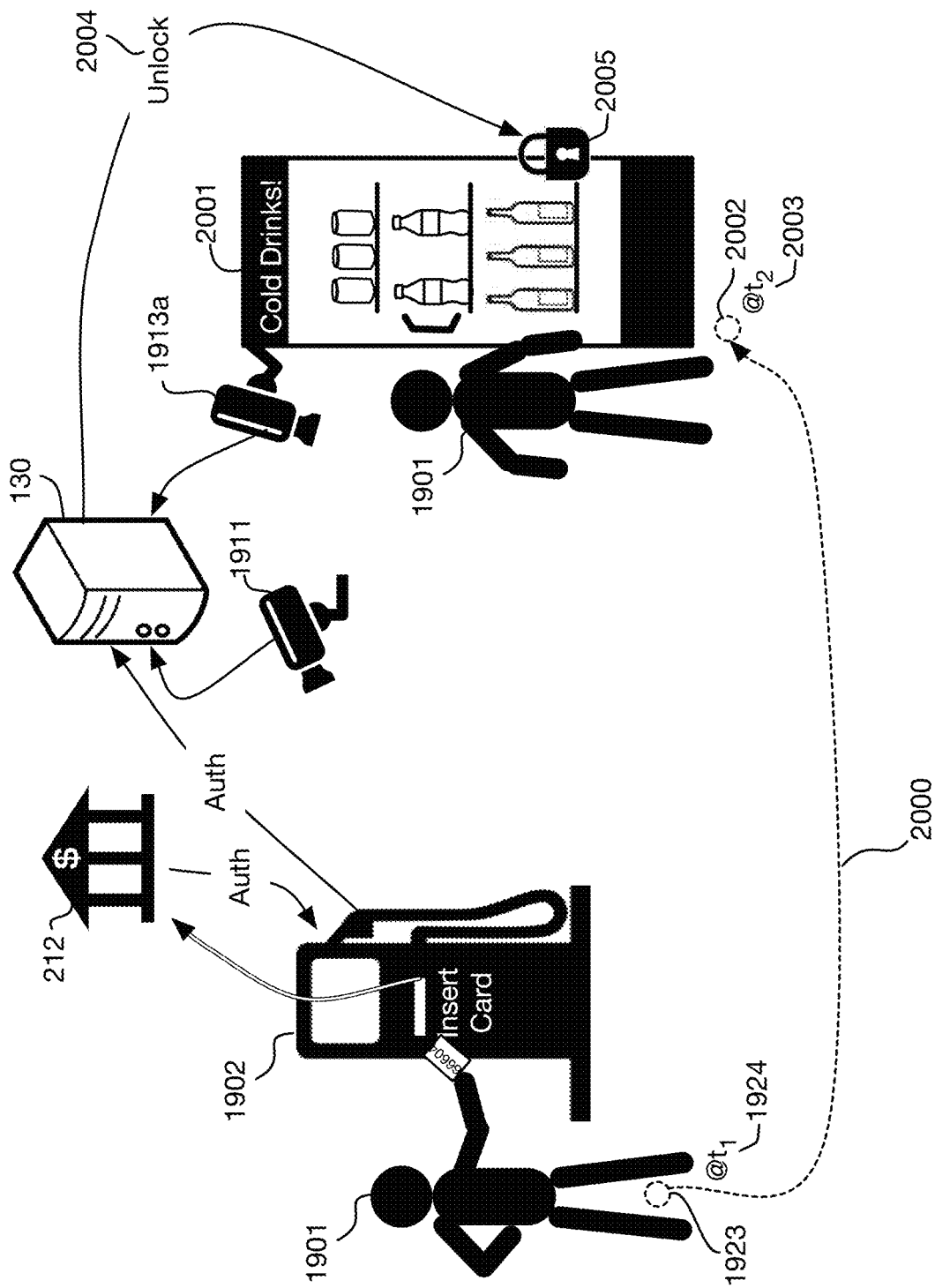
FIG. 20 shows a variation of the embodiment of FIG. 19, where a locked case containing products is automatically unlocked when the person who paid at a pump is at the case.

One or more embodiments may extend authorization obtained at one point in time to allow entry to any type of secure environment at a subsequent point in time. The secure environment may be for example a store or building as in FIG. 19, or a case or similar enclosed container as illustrated in FIG. 20. FIG. 20 illustrates a gas station example that is similar to the example shown in FIG. 19; however, in FIG. 20, products are available in an enclosed and locked case as opposed to (or in addition to) in a convenience store. For example, a gas station may have cases with products for sale next to or near gas pumps, with authorization to open the cases obtained by extending authorization obtained at a pump. In the example of FIG. 20, person 1901 inserts a credential into pump 1902 at location 1923 and time 1924, as described with respect to FIG. 19. Processor 130 associates the resulting authorization with the person and with the trajectory 2000 of the person after time 1924. Person 1901 then walks to case 2001 that contains products for sale. The processor tracks the path of the person to location 2002 at time 2003, by analyzing images from cameras 1911 and 1913a. It then issues command 2004 to unlock the controllable lock 2005 that locks the door of case 2001, thereby opening the door so that the person can take products.

In one or more embodiments, a trajectory of a person may be tracked and updated at any desired time intervals. Depending for example on the placement and availability of cameras in the area, a person may pass through one or more locations where cameras do not observe the person; therefore, the trajectory may not be updated in these "blind spots". However, because for example distinguishing characteristics of the person being tracked may be generated during one or more initial observations, it may be possible to pick up the track of the person after he or she leaves these blind spots. For example, in FIG. 20, camera 1911 may provide a good view of location 1924 at the pump and camera 1913a may provide a good view of location 2002 at case 2001, but there may be no views or limited views between these two points. Nevertheless, processor 130 may recognize that person 1901 is the person at location 2002 at time 2003 and is therefore authorized to open the case 2001, because the distinguishing characteristics viewed by camera 1913a at time 2003 match those viewed by camera 1911 at time 1924.

Figure 21:
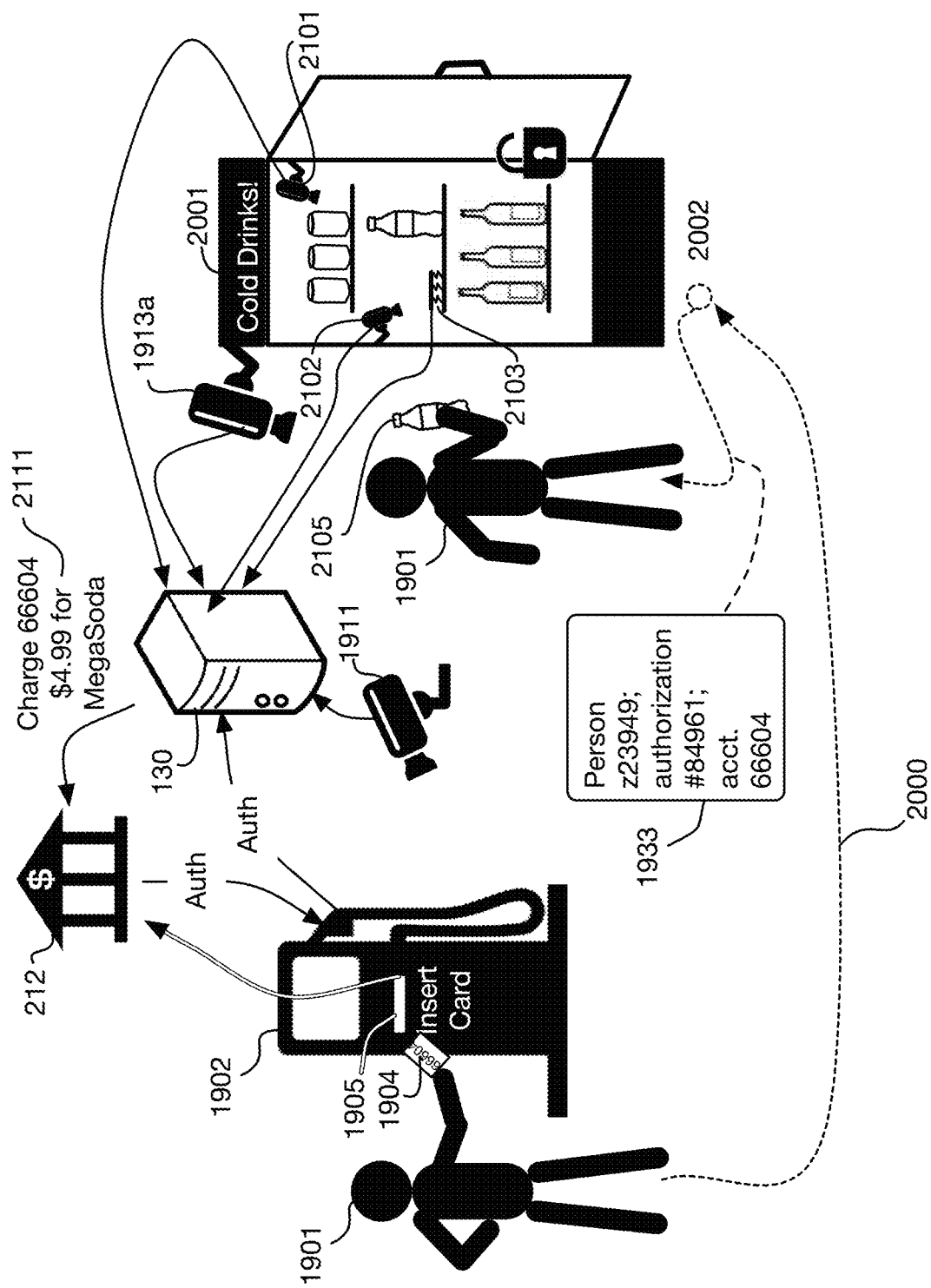
FIG. 21 continues the example of FIG. 20, showing that the products taken by the person from the case may be tracked using cameras or other sensors and may be charged to the card account used at the pump.

FIG. 21 continues the example of FIG. 20. Case 2001 is opened when person 1901 is at location 2002. The person then reaches into the case and removes item 2105. Processor 130 analyzes data from cameras or other sensors that detect removal of item 2105 from the case. In the example in FIG.

21, these sensors include camera 2101, camera 2102 and weight sensor 2103. Cameras 2101 and 2102 may for example be installed inside case 2001 and positioned and oriented to observe the removal of an item from a shelf. Processor 130 may determine that person 1901 has taken a specific item using for example techniques described above with respect to FIGS. 3 and 4. In addition, or alternatively, one or more other sensors may detect removal of a product. For example, a weight sensor may be placed under each item in the case to detect when the item is removed and data from the weight sensor may be transmitted to processor 130. Any type or types of sensors may be used to detect or confirm that a user takes an item. Detection of removal of a product, using any type of sensor, may be combined with tracking of a person using cameras in order to attribute the taking of a product to a specific user.

In the scenario illustrated in FIG. 21, person 1901 removes product 2105 from case 2001. Processor 130 analyzes data from one or more of cameras 2102, 2101, 1913a and sensor 2103, to determine the item that was taken and to associate that item with person 1901 (based for example on the 3D influence volume of the person being located near the item at the time the item was moved). Because authorization information 1933 is also associated with the person at the time the item is taken, processor 130 may transmit message 2111 to charge the account associated with the user for the item. This charge may be pre-authorized by the person 1901 by previously presenting credential 1904 to credential reader 1905.

Figure 22:
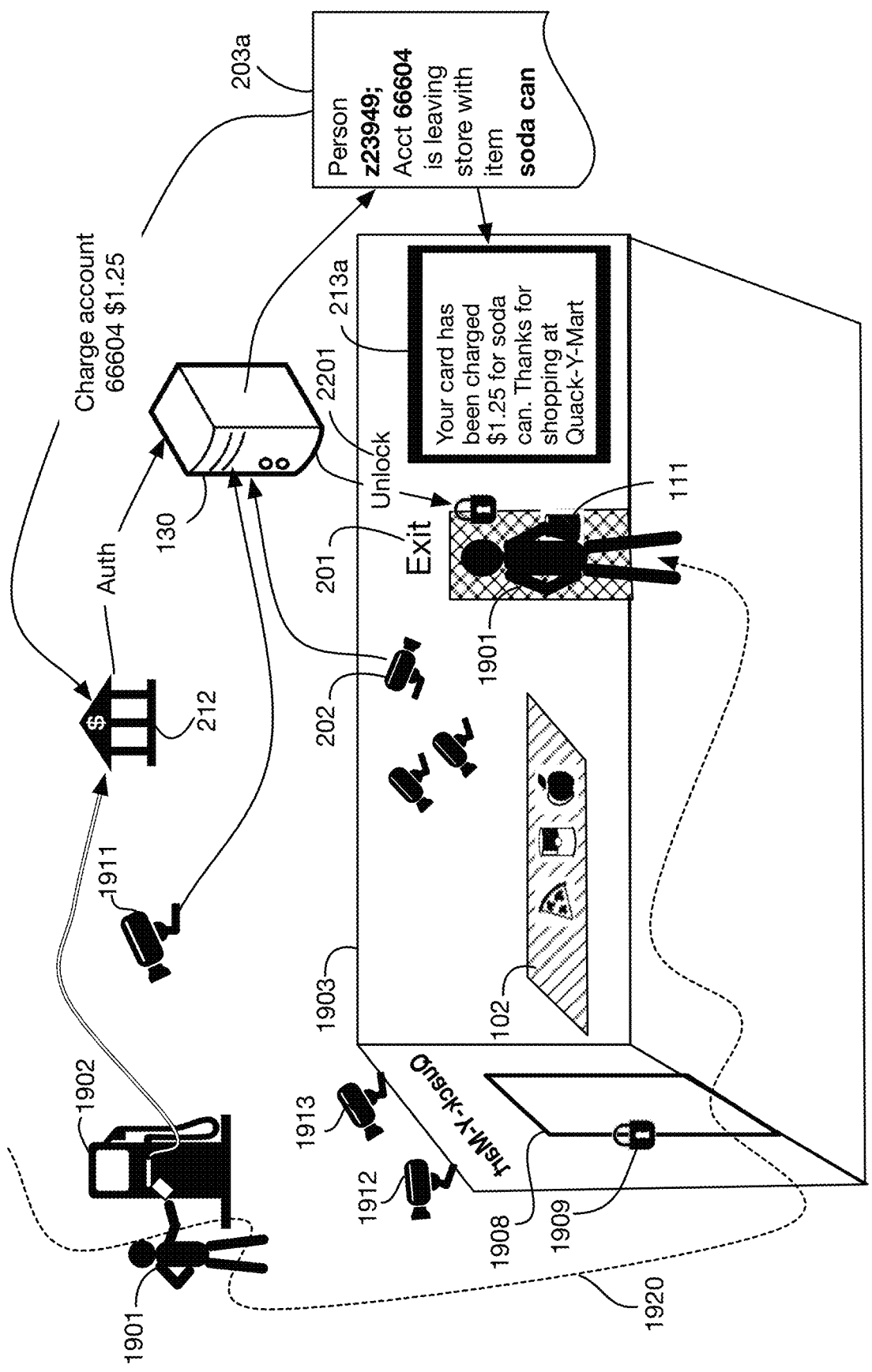
FIG. 22 continues the example of FIG. 19, illustrating tracking the person once he or she enters the store, analyzing images to determine what products the person has taken and charging the account associated with the card entered at the pump.

FIG. 22 extends the example of FIG. 19 to illustrate the person entering the convenience store and taking an item. This example is similar in some respects to the previous example of FIG. 21, in that the person takes an item from within a secure environment (a case in FIG. 21, a convenience store in FIG. 22) and a charge is issued for the item based on a previously obtained authorization. This example is also similar to the example illustrated in FIG. 2, with the addition that an authorization is obtained by person 1901 at pump 1902, prior to entering the convenience store 1903. External cameras 1911, 1912 and 1913 track person 1901 to the entrance 1908 and processor 130 unlocks lock 1909 so that person 1901 may enter the store. Afterwards images from internal cameras such as camera 202 track the person inside the store and the processor analyzes these images to determine that the person takes item 111 from shelf 102. At exit 201, message 203a is generated to automatically charge the account of the person for the item; the message may also be sent to a display in the store (or for example on the person's mobile phone) indicating what item or items are to be charged. In one or more embodiments the person may be able to enter a confirmation or to make modifications before the charge is transmitted. In one or more embodiments the processor 130 may also transmit an unlock message 2201 to unlock the exit door; this barrier at the exit may for example force unauthorized persons in the store to provide a payment mechanism prior to exiting.

In a variation of the example of FIG. 22, in one or more embodiments a credential may be presented by a person at entrance 1908 to the store, rather than at a different location such as at pump 1902. For example, a credential reader may be placed within or near the entrance 1908. Alternatively, the entrance to the store may be unlocked and the credential may be presented at the exit 201. More generally, in one or more embodiments a credential may be presented and an authorization may be obtained at any point in time and space and may then be used within a store (or at any other area) to perform one or more actions; these actions may include, but are not limited to, taking items and having them charged automatically to an authorized account. Controllable barriers, for example on entry or on exit, may or may not be integrated into the system. For example, the door locks at the store entrance 1908 and at the exit 201 may not be present in one or more embodiments. An authorization obtained at one point may authorize only entry to a secure environment through a controllable barrier, it may authorize taking and charging of items, or it may authorize both (as illustrated in FIG. 22).

Figure 23:
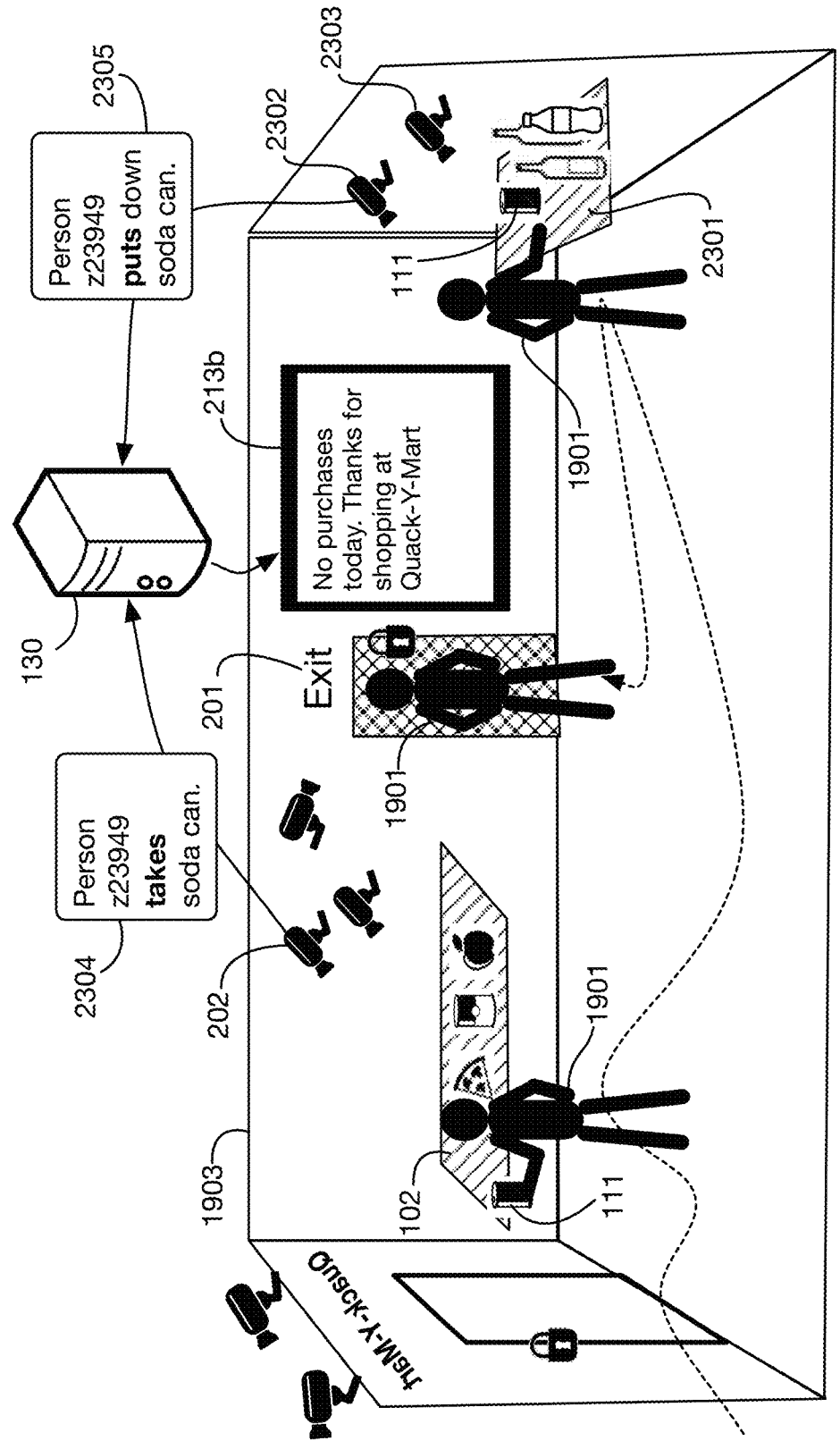
FIG. 23 shows a variation of the example of FIG. 22, illustrating tracking that the person picks up and then later puts down an item, so that the item is not charged to the person.

FIG. 23 shows a variation on the scenario illustrated in FIG. 22, where a person removes and item from a shelf but then puts it down prior to leaving the store. As in FIG. 22, person 1901 takes item 111 from shelf 102. Prior to exiting the store, person 1901 places item 111 back onto a different shelf 2301. Using techniques such as those described above with respect to FIGS. 3 and 4, processor 130 initially determines take action 2304, for example by analyzing images from cameras such as camera 202 that observe shelf 102. Afterwards processor 130 determines put action 2305, for example by analyzing images from cameras such as cameras 2302 and 2303 that observe shelf 2301. The processor therefore determines that person 1901 has no items in his or her possession upon leaving the store and transmits message 213b to a display to confirm this for the person.

Figure 24:
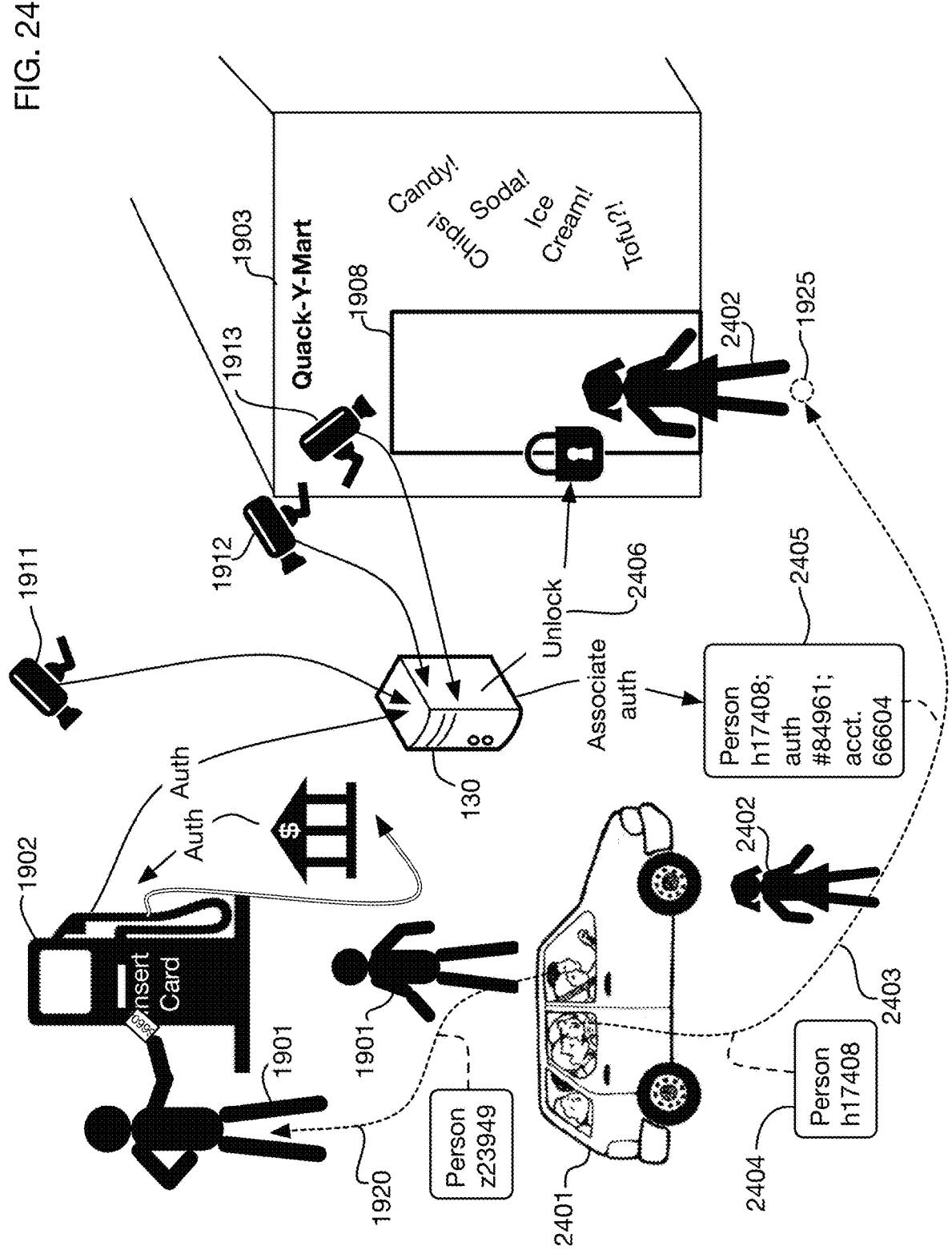
FIG. 24 shows another variation of the example of FIG. 19, where the authorization obtained at the pump may apply to a group of people in a car.

One or more embodiments may enable extending an authorization from one person to another person. For example, an authorization may apply to an entire vehicle and therefore may authorize all occupants of that vehicle to perform actions such as entering a secured area or taking and purchasing products. FIG. 24 illustrates an example that is a variation of the example of FIG. 19. Person 1901 goes to gas pump 1902 to present a credential to obtain an authorization. Camera 1911 (possibly in conjunction with other cameras) captures images of person 1901 exiting vehicle 2401. Processor 130 analyzes these images and associates person 1901 with vehicle 2401. The processor analyzes subsequent images to track any other occupants of the vehicle that exit the vehicle. For example, a second person 2402 exits vehicle 2401 and is detected by the cameras in the gas station. The processor generates a new trajectory 2403 for this person and assigns a new tag 2404 to this trajectory. After the authorization of person 1901 is obtained, processor 130 associates this authorization with person 2402 (as well as with person 1901), since both people exited the same vehicle 2401. When person 2402 reaches location 1925 at entry 1908 to store 1903, processor 130 sends a command 2406 to allow access to the store, since person 2402 is authorized to enter by extension of the authorization obtained by person 1901.

Figure 25B:
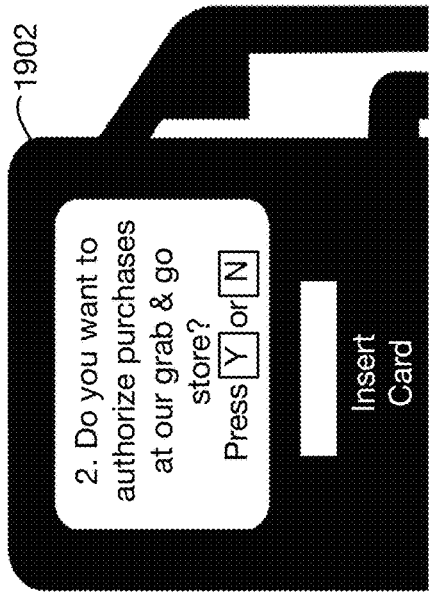
FIGS. 25A, 25B and 25C illustrate an embodiment that queries a user as to whether to extend authorization from the pump to purchases at a store for the user and also for other occupants of the car.
Figure 25C:
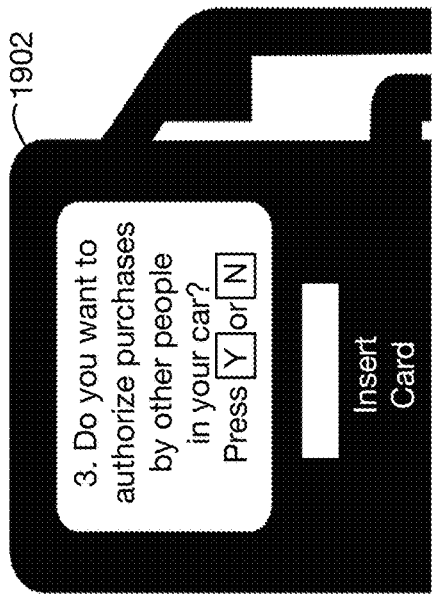
Figure 25A:
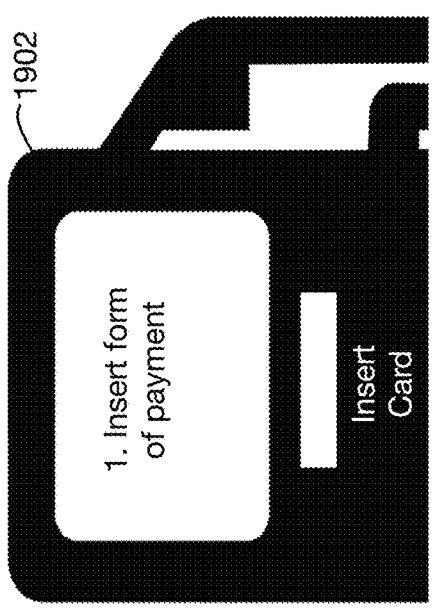
Figure 26C:
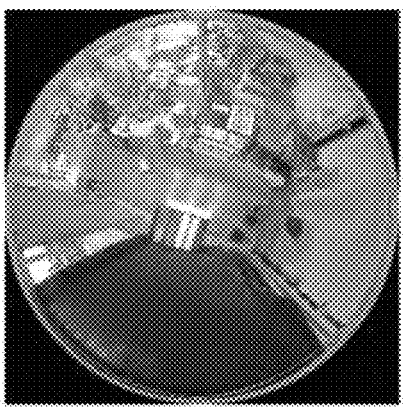
FIGS. 26A through 26F show illustrative camera images from six ceiling-mounted fisheye cameras that may be used for tracking people through a store.
Figure 26F:
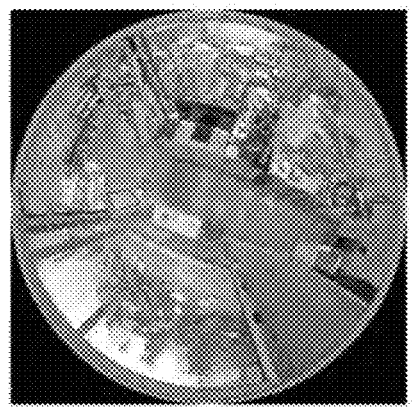
Figure 26B:
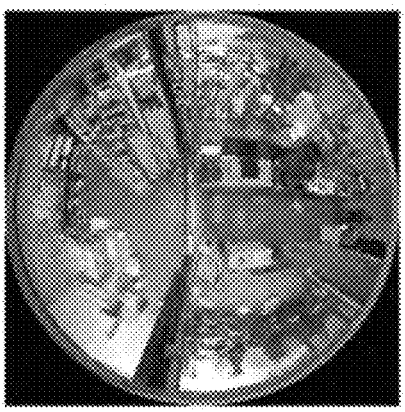
Figure 26E:
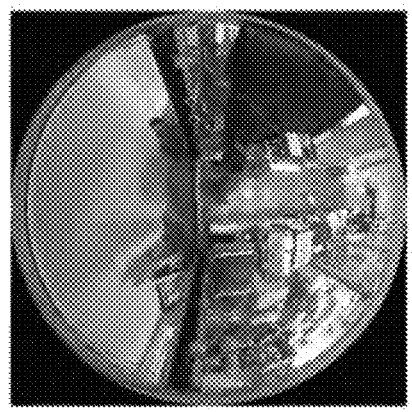
Figure 26A:
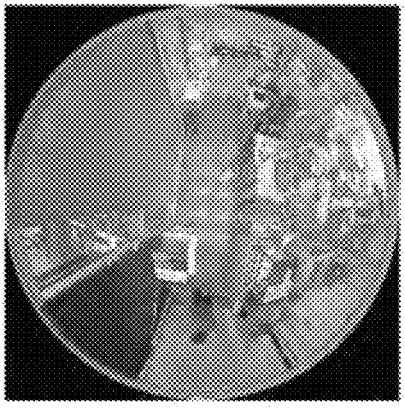
Figure 26D:
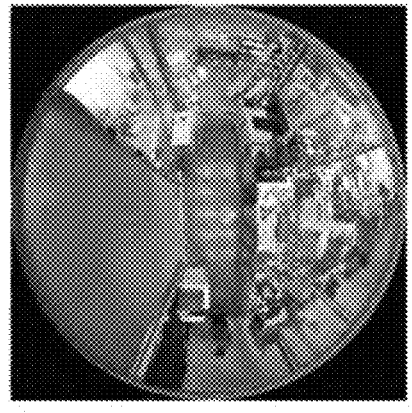
Figure 29C:
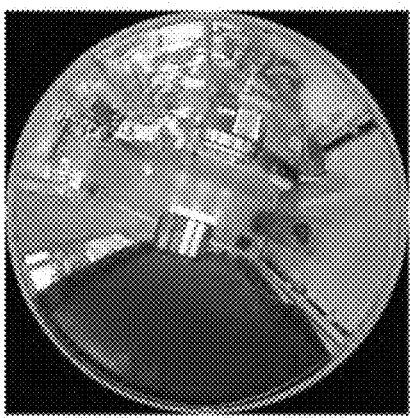
FIGS. 29A through 29F show a cylinder generated around one of the persons in the store, as viewed from each of the six fisheye cameras.
Figure 29F:
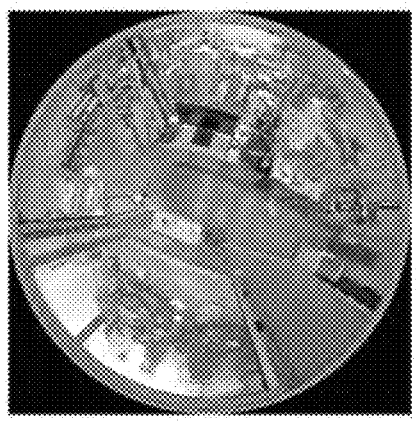
Figure 29B:
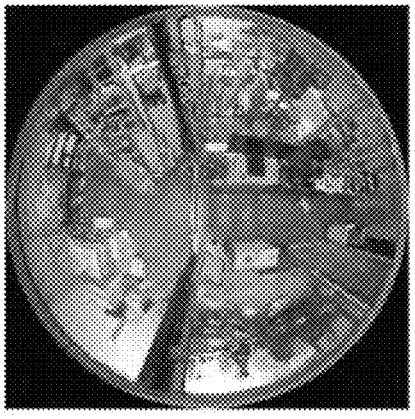
Figure 29E:
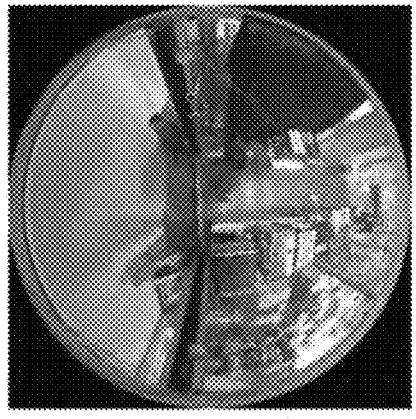
Figure 29A:
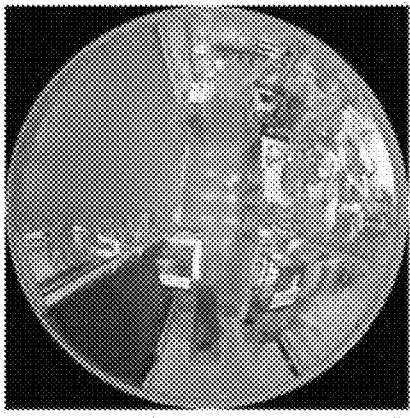
Figure 29D:
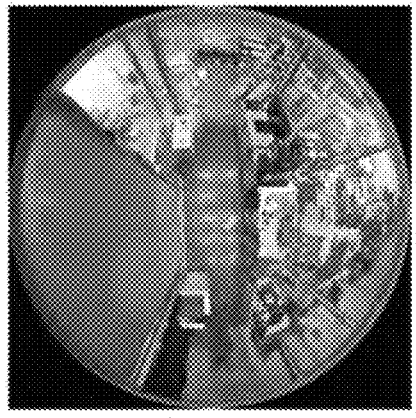

One or more embodiments may query a person to determine whether authorization should be extended and if so to what extent. For example, a person may be able to selectively extend authorization to certain locations, for certain actions, for a certain time period, or to selected other people. FIGS. 25A, 25B and 25C show an illustrative example with queries provided at gas pump 1902 when person 1901 presents a credential for authorization. The initial screen shown in FIG. 25A asks the user to provide the credential. The next screen shown in FIG. 25B asks the user whether to extend authorization to purchases as the attached convenience store; this authorization may for example allow access to the store through the locked door and may charge items taken by the user automatically to the user's account. The next screen in FIG. 25C asks the user if he or she wants to extend authorization to other occupants of the vehicle (as in FIG. 24). These screens and queries are illustrative; one or more embodiments may provide any types of queries or receive any type of user input (proactively from the user or in response to queries) to determine how and whether authorization should be extended. Queries and responses may for example be provided via a mobile phone as opposed to on a screen associated with a credential reader, or via any other device or devices.

Returning now to the tracking technology that tracks people through a store or an area using analysis of camera images, in one or more embodiments it may be advantageous or necessary to track people using multiple ceiling-mounted cameras, such as fisheye cameras with wide fields of view (such as 180 degrees). These cameras provide potential benefits of being less obtrusive, less visible to people, and less accessible to people for tampering. Ceiling-mounted cameras also usually provide unoccluded views of people moving through an area, unlike wall cameras that may lose views of people as they move behind fixtures or behind other people. Ceiling-mounted fisheye cameras are also frequently already installed, and they are widely available.

One or more embodiments may simultaneously track multiple people through an area using multiple ceiling-mounted cameras using the technology described below. This technology provides potential benefits of being highly scalable to arbitrarily large spaces, inexpensive in terms of sensors and processing, and adaptable to various levels of detail as the area or space demands. It also offers the advantage of not needing as much training as some deep-learning detection and tracking approaches. The technology described below uses both geometric projection and appearance extraction and matching.

FIGS. 26A through 26F show views from six different ceiling-mounted fisheye cameras installed in an illustrative store. The images are captured at substantially the same time. The cameras may for example be calibrated intrinsically and extrinsically, as described above. The tracking system therefore knows where the cameras are located and oriented in the store, as described for example in a 3D model of the store. Calibration also provides a mapping from points in the store 3D space to pixels in a camera image, and vice-versa.

Tracking directly from fisheye camera images may be challenging, due for example to the distortion inherent in the fisheye lenses. Therefore, in one or more embodiments, the system may generate a flat planar projection from each camera image to a common plane. For example, in one or more embodiments the common plane may be a horizontal plane 1 meter above the floor or ground of the site. This plane has an advantage that most people walking in the store intersect this plane. FIGS. 27A, 27B, and 27C show projections of three of the fisheye images from FIGS. 26A through 26F onto this plane. Each point in the common plane 1 meter above the ground corresponds to a pixel in the planar projections at the same pixel coordinates. Thus, the pixels at the same pixel coordinates in each of the image projections onto the common plane, such as the images 27A, 27B, and 27C, all correspond to the same 3D point in space. However, since the cameras may be two-dimensional cameras that do not capture depth, the 3D point may be sampled anywhere along the ray between it and the camera.

Specifically, in one or more embodiments the planar projections 27A, 27B and 27C may be generated as follows. Each fisheye camera may be calibrated to determine the correspondence between a pixel in the fisheye image (such as image 26A for example) and a ray in space starting at the focal point of the camera. To project from a fisheye image like image 26A to a plane or any other surface in a store or site, a ray may be formed from the camera focal point to that point on the surface, and the color or other characteristics of the pixel in the fisheye image associated with that ray may be assigned to that point on the surface.

When an object is at a 1-meter height above the floor, all cameras will see roughly the same pixel intensities in their respective projective planes, and all patches on the projected 2D images will be correlated if there is an object at the 1-meter height. This is similar to the plane sweep stereo method known in the art, with the provision that the technique described here projects onto a plane that is parallel to the floor as people will be located there (not flying above the floor). Analysis of the projected 2D images may also take into account the walkable space of a store or site, and occlusions of some parts of the space in certain camera images. This information may be obtained for example from a 3D model of the store or site.

In some situations, it may be possible for points on a person that are 1-meter high from the floor to be occluded in one or more fisheye camera views by other people or other objects. The use of ceiling-mounted fisheye cameras minimizes this risk, however, since ceiling views provide relatively unobstructed views of people below. For store fixtures or features that are in fixed locations, occlusions may be pre-calculated for each camera, and pixels on the 1-meter plane projected image for that camera that are occluded by these features or fixtures may be ignored. For moving objects like people in the store, occlusions may not be pre-calculated; however, one or more embodiments may estimate these occlusions based on the position of each person in the store in a previous frame, for example.

To track moving objects, in particular people, one or more embodiments of the system may incorporate a background subtraction or motion filter algorithm, masking out the background from the foreground for each of the planar projected images. FIGS. 28A, 28B, and 28C show foreground masks for the projected planar images 27A, 27B, and 27C, respectively. A white pixel shows a moving or non-background object, and a black pixel shows a stationary or background object. (These masks may be noisy, for example because of lighting changes or camera noise.) The foreground masks may then be combined to form mask 28D. Foreground masks may be combined for example by adding the mask values or by binary AND-ing them as shown in FIG. 28D. The locations in FIG. 28D where the combined mask is non-zero show where the people are located in the plane at 1-meter above the ground.

In one or more embodiments, the individual foreground masks for each camera may be filtered before they are combined. For example, a gaussian filter may be applied to each mask, and the filtered masks may be summed together to form the combined mask. In one or more embodiments, a thresholding step may be applied to locate pixels in the combined mask with values above a selected intensity. The threshold may be set to a value that identifies pixels associated with a person even if some cameras have occluded views of that person.

After forming a combined mask, one or more embodiments of the system may for example use a simple blob detector to localize people in pixel space. The blob detector may filter out shapes that are too large or too small to correspond to an expected cross-sectional size of a person at 1-meter above the floor. Because pixels in the selected horizontal plane correspond directly to 3D locations in the store, this process yields the location of the people in the store.

Tracking a person over time may be performed by matching detections from one time step to the next. An illustrative tracking framework that may be used in one or more embodiments is as follows:

(1) Match new detections to existing tracks, if any. This may be done via position and appearance, as described below.

(2) Update existing tracks with matched detections. Track positions may be updated based on the positions of the matched detections.

(3) Remove tracks that have left the space or have been inactive (such as false positives) for some period of time.

(4) Add unmatched detections from step (1) to new tracks. The system may optionally choose to add tracks only at entry points in the space.

The tracking algorithm outlined above thus maintains the positions in time of all tracked persons.

As described above in step (1) of the illustrative tracking framework, matching detections to tracks may be done based on either or both of position and appearance. For example, if a person detection at a next instant in time is near the previous position of only one track, this detection may be matched to that track based on position alone. However, in some situations, such as a crowded store, it may be more difficult to match detections to tracks based on position alone. In these situations, the appearance of persons may be used to assist with matching.

In one or more embodiments, an appearance for a detected person may be generated by extracting a set of images that have corresponding pixels for that person. An approach to extracting these images that may be used in one or more embodiments is to generate a surface around a person (using the person's detected position to define the location of the surface), and to sample the pixel values for the 3D points on the surface for each camera. For example, a cylindrical surface may be generated around a person's location, as illustrated in FIGS. 29A through 29F. These figures show the common cylinder (in red) as seen from each camera. The surface normal vectors of the cylinder (or other surface) may be used to only sample surface points that are visible from each camera. For each detected person, a cylinder may be generated around a center vertical axis through the person's location (defined for example as a center of the blob associated with that person in the combined foreground mask); the radius and height of the cylinder may be set to fixed values, or they may be adapted for the apparent size and shape of the person.

Figure 30G:
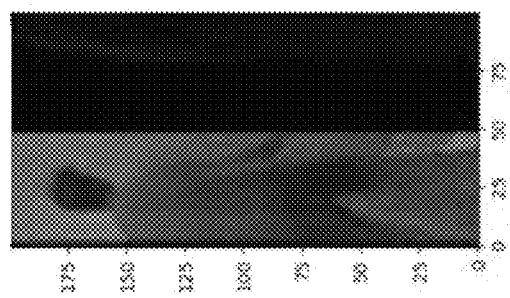
FIG. 30G shows a composite of the six projections of FIGS. 30A through 30F.
Figure 30C:
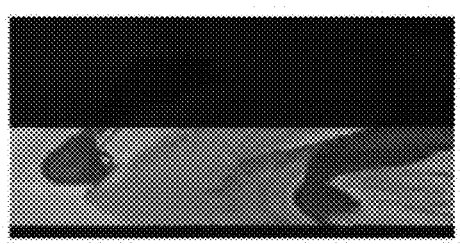
FIGS. 30A through 30F show projections of the six fisheye camera views onto the cylinders shown in FIGS. 29A through 29F, respectively.
Figure 30F:
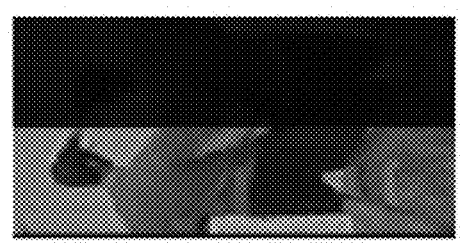
Figure 30B:
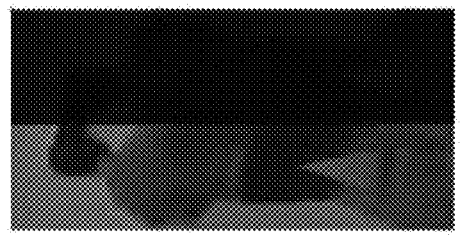
Figure 30E:
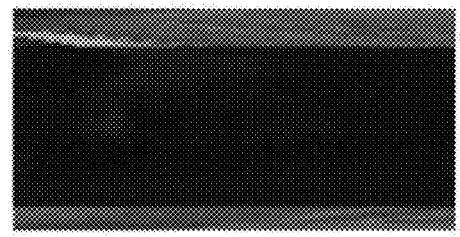
Figure 30A:
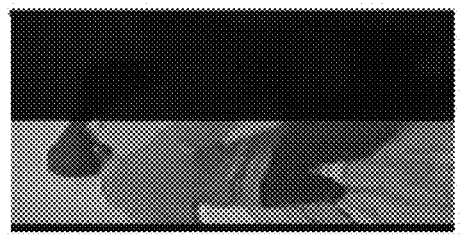
Figure 30D:
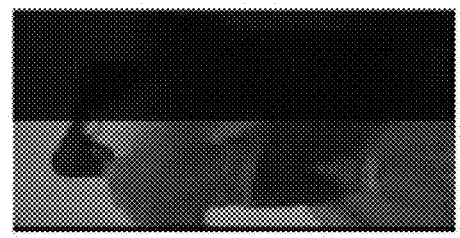

As shown in FIGS. 29A through 29F, a cylindrical surface is localized in each of the original camera views (FIGS. 26A through 26F) based on the intrinsics/extrinsics of each camera. The points on the cylinder are sampled from each image and form the projections shown in FIGS. 30A through 30F. Using surface normal vectors of the cylinders, the system may only sample the points that would be visible in each camera, if there was an opaque surface of the cylinder. The occluded points are darkened in FIGS. 30A through 30F. An advantage of this approach is that the cylindrical surface provides a corresponding view from each camera, and the views can be combined into a single view, taking into account the visibilities at each pixel. Visibility for each pixel in each cylindrical image for each camera may take into account both the front and back sides of the cylinder as viewed from the camera, and occlusion by other cylinders around other people. Occlusions may be calculated for example using a method similar to a graphics pipeline: cylinders closer to the camera may be projected first, and the pixels on the fisheye image that are mapped to those cylinders are removed (e.g., set to black) so that they are not projected onto other cylinders; this process repeats until all cylinders receive projected pixels from the fisheye image. Cylindrical projections from each camera may be combined for example as follows: back faces may be assigned a 0 weight, and visible, unoccluded pixels may be assigned a 1 weight; the combined image may be calculated as a weighted average for all projections onto the cylinder. Combining the occluded cylindrical projections creates a registered image of the tracked person that facilitates appearance extraction. The combined registered image corresponding to cylindrical projections 30A through 30F is shown in FIG. 30G.

Appearance extraction from image 30G may for example be done by histograms, or by any other dimensionality reduction method. A lower dimensional vector may be formed from the composite image of each tracked person and used to compare it with other tracked subjects. For example, a neural network may be trained to take composite cylindrical images as input, and to output a lower-dimensional vector that is close to other vectors from the same person and far from vectors from other persons. To distinguish between people, vector-to-vector distances may be computed and compared to a threshold; for example, a distance of 0.0 to 0.5 may indicate the same person, and a greater distance may indicate different people. One or more embodiments may compare tracks of people by forming distributions of appearance vectors for each track, and comparing distributions using a distribution-to-distribution measure (such as KL-divergence, for example). A discriminant between distributions may be computed to label a new vector to an existing person in a store or site.

A potential advantage of the technique described above over appearance vector and people matching approaches known in the art is that it may be more robust in a crowded space, where there are many potential occlusions of people in the space. By combining views from multiple cameras, while taking into account visibility and occlusions, this technique may succeed in generating usable appearance data even in crowded spaces, thereby providing robust tracking. This technique treats the oriented surface (cylinder in this example) as the basic sampling unit and generates projections based on visibility of 3D points from each camera. A point on a surface is not visible from a camera if the normal to that surface points away from the camera (dot product is negative). Furthermore, in a crowded store space, sampling the camera based on physical rules (visibility and occlusion) and cylindrical projections from multiple cameras provides cleaner images of individuals without pixels from other individuals, making the task of identifying or separating people easier.

Figures 31A, 31B:
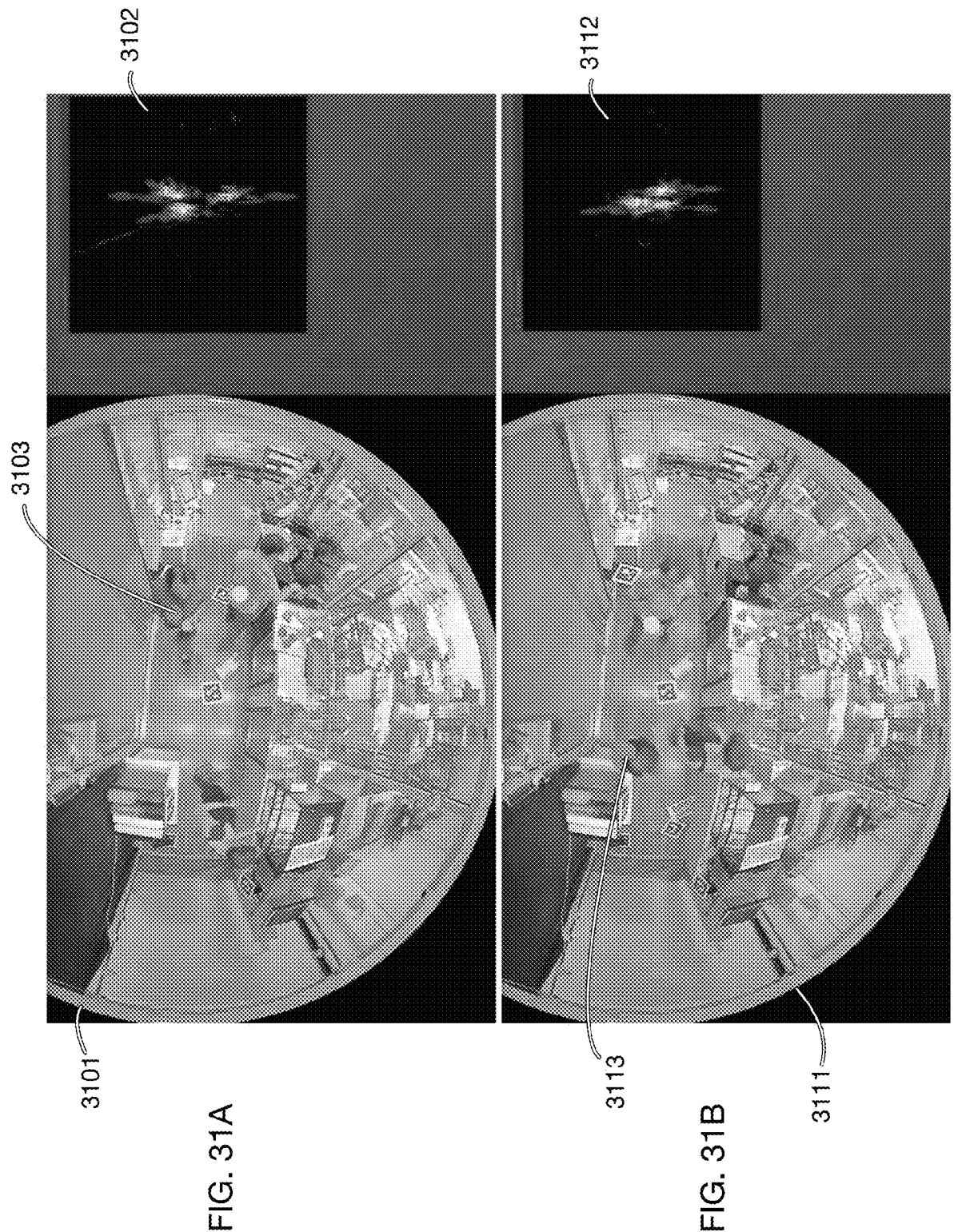
FIGS. 31A and 31B show screenshots at two different points in time of an embodiment of a people tracking system using the fisheye cameras described above.

FIGS. 31A and 31B show screenshots at two points in time from an embodiment that incorporates the tracking techniques described above. Three people in the store are detected and tracked as they move, using both position and appearance. The screenshots show fisheye views 3101 and 3111 from one of the fisheye cameras, with the location of each person indicated with a colored dot overlaying the person's image. They also show combined masks 3102 and 3112 for the planar projections to the plane 1 meter above the ground, as discussed above with respect to FIG. 27D. The brightest spots in combined masks 3102 and 3112 correspond to the detection locations. As an illustration of tracking, the location of one of the persons moves from location 3103 at the time corresponding to FIG. 31A to the location 3113 at the subsequent time corresponding to FIG. 31B.

Embodiments of the invention may utilize more complicated models, for example spherical models for heads, additional cylindrical models for upper and lower arms and/or upper and lower legs as well. These embodiments enable more detailed differentiation of users, and may be utilized in combination with gait analysis, speed of movement, any derivative of position, including velocity acceleration, jerk or any other frequencies of movement to differentiate users and their distinguishing characteristics. In one or more embodiments, the complexity of the model may be altered over time or as needed based on the number of users in a given area for example. Other embodiments may utilize simple cylindrical or other geometrical shapes per user based on the available computing power or other factors, including the acceptable error rate for example.

As an alternative to identifying people in a store by performing background subtraction on camera images and combining the resulting masks, one or more embodiments may train and use a machine learning system that processes a set of camera images directly to identify persons. The input to the system may be or may include the camera images from all cameras, or all cameras in a relevant area. The output may be or may include an intensity map with higher values indicating a greater likelihood that a person is at that location. The machine learning system may be trained for example by capturing camera images while people move around the store area, and manually labeling the people's positions to form training data. Camera images may be used as inputs directly, or in one or more embodiments they may be processed, and the processed images may be used as inputs. For example, images from ceiling fisheye cameras may be projected onto a plane parallel to the floor, as described above, and the projected images may be used as inputs to the machine learning system.

FIG. 32 illustrates an example of a machine learning system that detects person positions in a store from camera images. This illustrative embodiment has three cameras 3201, 3202, and 3203 in the store 3200. At a point in time, these three cameras capture images 3211, 3212, and 3213, respectively. These three images are input into a machine learning system 3220 that has learned (or is learning) to map from the collection of camera images to an intensity map 3221 of likely person positions in the store.

In the example shown in FIG. 32, the output of system 3220 is the likely horizontal position of persons in the store. Vertical position is not tracked. Although people occupy 3D space, horizontal position is generally all that is required to determine where each person is in a store, and to associate item motion with a person. Therefore, the intensity map 3221 maps xy position along the floor of the store into an intensity that represents how likely a person's centroid (or other point or points of a person) is at that horizontal location. This intensity map may be represented as a grayscale image, for example, with whiter pixels representing higher probability of a person at that location.

The person detection system illustrated in FIG. 32 represents a significant simplification over systems that attempt to detect landmarks on a person's body or other features of a person's geometry. A person's location is represented only by a single 2D point, possibly with a zone around this point with a falloff in probability. This simplification makes detection potentially more efficient and more robust. Processing power to perform detection may be reduced using this method, thereby reducing the cost of installation for a system and enabling real-time person tracking.

Figure 32A:
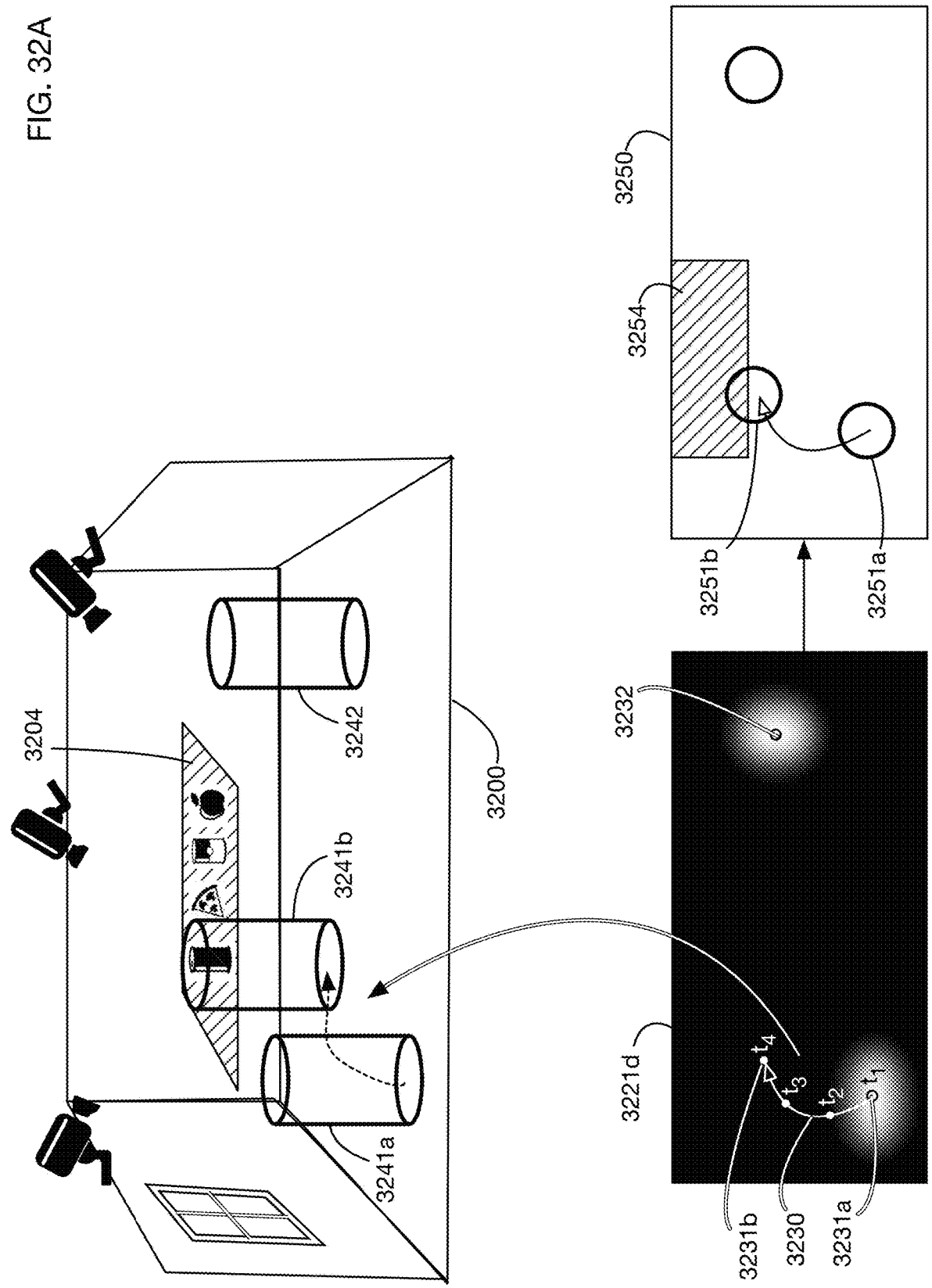
FIG. 32A shows generation of 3D or 2D fields of influence around person locations generated by a machine learning system.

In one or more embodiments, a 3D field of influence volume may be constructed for a person around the 2D point that represents that person's horizontal position. That field of influence volume may then be used to determine which item storage areas a person interacts with and the times of these interactions. For example, the field of influence volume may be used as described above with respect to FIG. 10. FIG. 32A shows an example of generating a 3D field of influence volume from a 2D location of a person, as determined for example by the machine learning system 3220 of FIG. 32. In this example, a machine learning system or other system generates 2D location data 3221d. This data includes and extends the intensity map data 3221 of FIG. 32. From the intensity data, the system estimates a point 2D location for each person in the store. These points are 3231a for a first shopper, and 3232 for a second shopper. The 2D point may be calculated for example as the weighted average of points in a region surrounding a local maximum of intensity, with weights proportional to the intensity of each point. The first shopper moves, and the system tracks the trajectory 3230 of this shopper's 2D location. This trajectory 3230 may for example consist of a sequence of locations, each associated with a different time. For example, at time $t_1$ the first shopper is at location 3231a, and at time $t_4$ the shopper arrives at 2D point 3231b. For each 2D point location of a shopper at different points in time, the system may generate a 3D field of influence volume around that point. This field of influence volume may be a translated copy of a standard shape that is used for all shoppers and for all points in time. For example, in FIG. 32A the system generates a cylinder of a standard height and radius, with the center axis of the cylinder passing through the 2D location of the shopper. Cylinder 3241a for the first shopper corresponds to the field of influence volume at point 3231a at time $t_1$, and cylinder 3242 for the second shopper corresponds to the field of influence volume at point 3232. The cylinder is illustrative; one or more embodiments may use any type of shape for a 3D field of influence volume, including for example, without limitation, a cylinder, a sphere, a cube, a parallelepiped, an ellipsoid, or any combinations thereof. The selected shape may be used for all shoppers and for all locations of the shoppers. Use of a simple, standardized volume around a tracked 2D location provides significant efficiency benefits compared to tracking the specific location of landmarks or other features and constructing a detailed 3D shape for each shopper.

When the first shopper reaches 2D location 3231b at time $t_4$, the 3D field of influence volume 3241b intersects the item storage area 3204. This intersection implies that the shopper may interact with items on the shelf, and it may trigger the system to track the shelf to determine movement of items and to attribute those movements to the first shopper. For example, images of the shelf 3204 before the intersection occurs, or at the beginning of the intersection time period may be compared to images of the shelf after the shopper moves away and the volume no longer intersects the shelf, or at the end of the intersection time period.

One or more embodiments may further simplify detection of intersections by performing this analysis completely or partially in 2D instead of in 3D. For example, a 2D model 3250 of the store may be used, which shows the 2D location of item storage areas such as area 3254 corresponding to shelf 3204. In 2D, the 3D field of influence cylinders become 2D field of influence areas that are circles, such as circles 3251a and 3251b corresponding to cylinders 3241a and 3241b in 3D. The intersection of 2D field of influence area 3251b with 2D shelf area 3254 indicates that the shopper may be interacting with the shelf, triggering the analyses described above. In one or more embodiments, analyzing fields of influence areas and intersections in 2D instead of 3D may provide additional efficiency benefits by reducing the amount of computation and modeling required.

Figure 33:
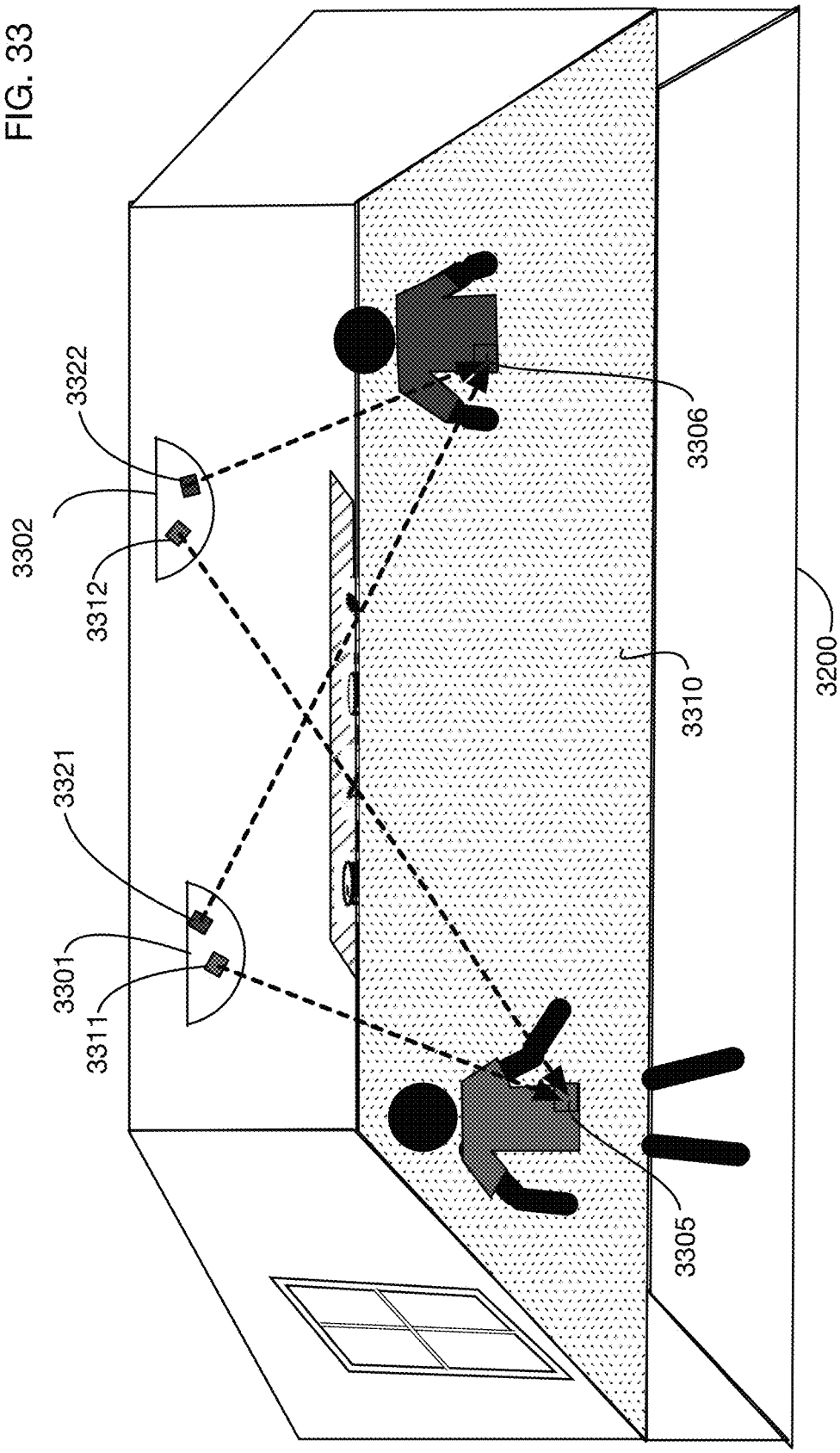
FIG. 33 illustrates projection of ceiling camera images onto a plane parallel to the floor, so that pixels corresponding to the same person location on this plane are aligned in the projected images.

As described above, and as illustrated in FIGS. 26 through 31, in one or more embodiments it may be advantageous to perform person tracking and detection using ceiling-mounted cameras, such as fisheye cameras. Camera images from these cameras, such as images 26A through 26F, may be used as inputs to the machine learning system 3220 in FIG. 32. Alternatively, or in addition, these fisheye images may be projected onto one or more planes, and the projected images may be inputs to machine learning system 3220. Projecting images from multiple cameras onto a common plane may simplify person detection since unoccluded views of a person in the projected images will overlap at the points where the person intersects this plane. This technique is illustrated in FIG. 33, which shows two dome fisheye cameras 3301 and 3302 installed on the ceiling of store 3200. Images captured by fisheye cameras 3301 and 3302 are projected onto an imaginary plane 3310 parallel to the floor of the store, at approximately waist level for a typical shopper. The projected pixel locations on plane 3310 coincide with actual locations of objects at this height if they are not occluded by other objects. For example, pixels 3311 and 3312 in fisheye camera images from cameras 3301 and 3302, respectively, are projected to the same position 3305 in plane 3310, since one of the shoppers intersects plane 3310 at this location. Similarly, pixels 3321 and 3322 are projected to the same position 3306, since the other shopper intersects plane 3310 at this location.

Figure 34B:
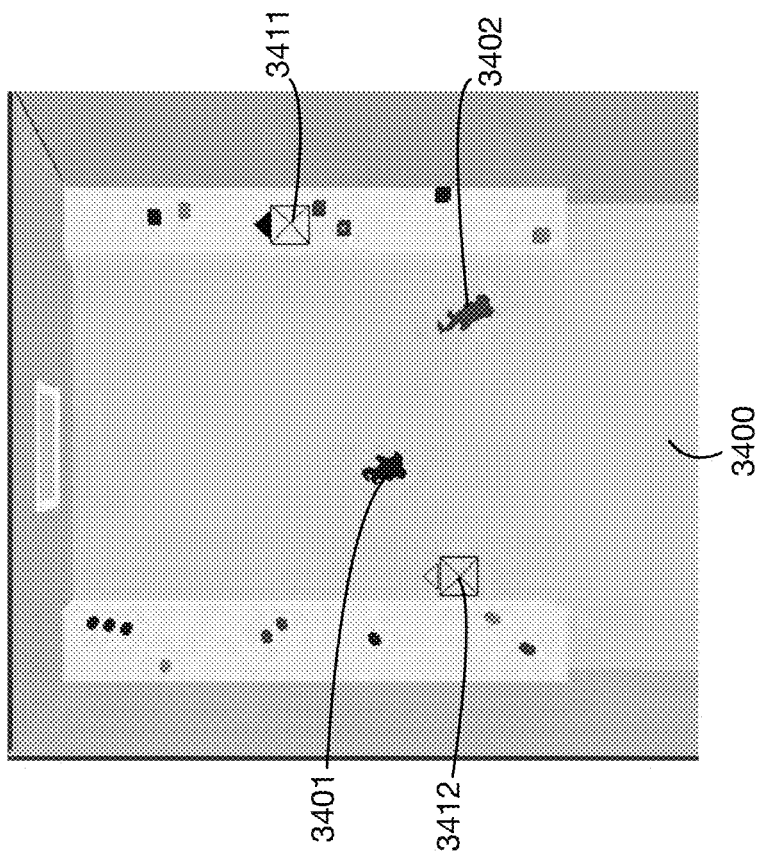
FIGS. 34A and 34B show an artificial 3D scene that is used in FIGS. 35 through 41 to illustrate embodiments of the invention that use projected images and machine learning for person detection.
Figure 34A:
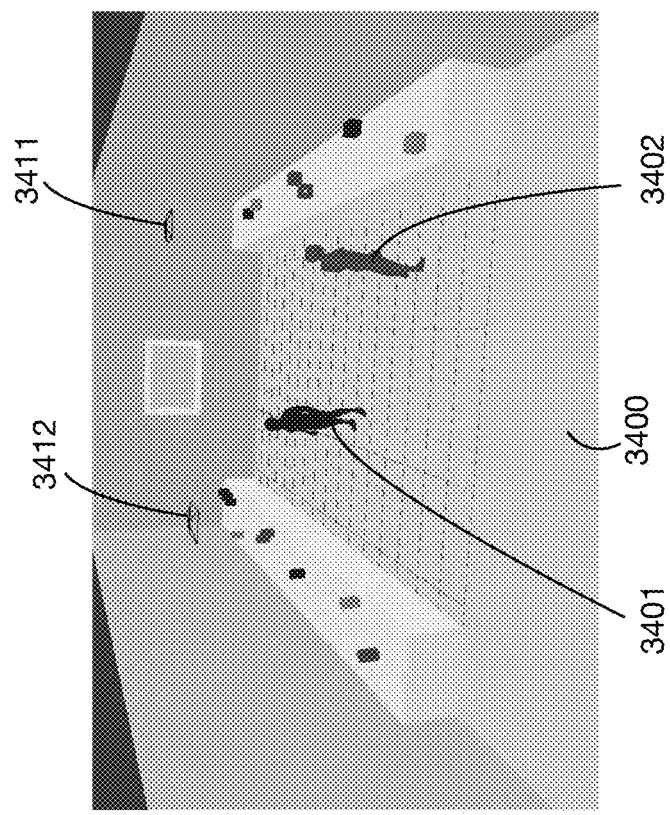

FIGS. 34AB through 37 illustrate this technique of projecting fisheye images onto a common plane for an artificially generated scene. FIG. 34A shows the scene from a perspective view, and FIG. 34B shows the scene from a top view. Store 3400 has a floor area between two shelves; two shoppers 3401 and 3402 are currently in this area. Store 3400 has two ceiling-mounted fisheye cameras 3411 and 3412. (The ceiling of the store is not shown to simplify illustration). FIG. 35 shows fisheye images 3511 and 3512 captured from cameras 3411 and 3412, respectively. Although these fisheye images may be input directly into a machine learning system, the system would have to learn how to relate the position of an object in one image to the position of that object in another image. For example, shopper 3401 appears at location 3513 in image 3511 from camera 3411, and at a different location 3514 in image 3512 from camera 3412. While it may be possible for a machine learning system to learn these correspondences, a large amount of training data may be needed. FIG. 36 shows the projection of the two fisheye images onto a common plane, in this case a plane one meter above the floor. Image 3511 is transformed with projection 3601 into image 3611, and image 3512 is transformed with projection 3601 into image 3612. The height of the projection plane in this case is selected to intersect the torso of most shoppers; in one or more embodiments any plane or planes may be used for projection. One or more embodiments may project fisheye images onto multiple planes at different heights, and may use all of these projections as inputs to a machine learning system to detect people.

Figure 37:
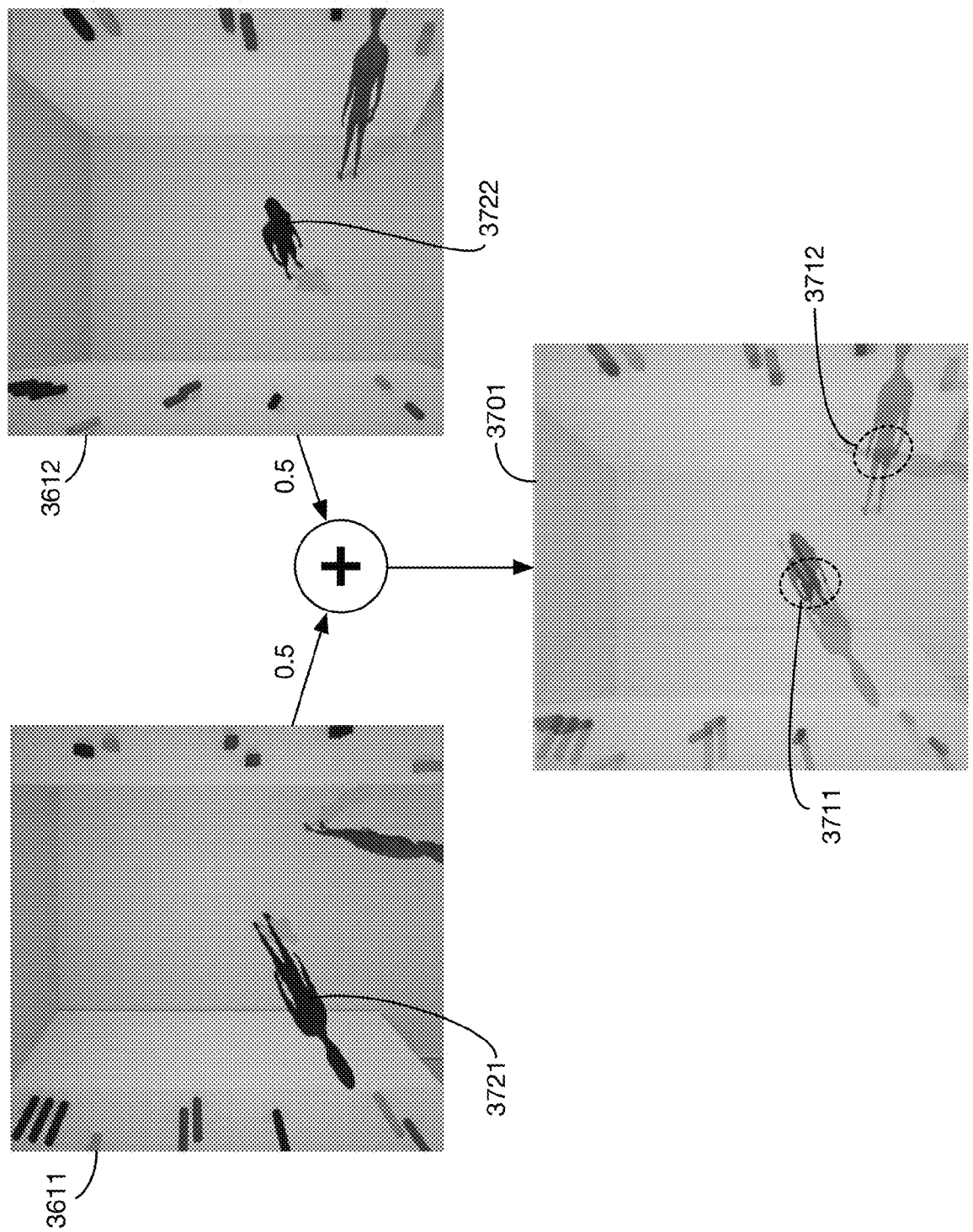
FIG. 37 shows the overlap of the projected images of FIG. 36, illustrating the coincidence of pixels for persons at the intersection of the projected plane.

FIG. 37 shows images 3611 and 3612 overlaid onto one another to illustrate that locations of shoppers coincide in these two images. For illustration, the images are alpha weighted each by 0.5 and then summed. The resulting overlaid image 3701 shows location of overlap 3711 for shopper 3401, and location of overlap 3712 for shopper 3402. These locations correspond to the intersection of the projection plane with each shopper. As described above with respect to FIGS. 27ABC and 28ABCD, in one or more embodiments the intersection areas 3711 and 3712 may be used directly to detect persons, for example via thresholding of intensity and blob detection. Alternatively, or in addition, the projected images 3611 and 3612 may be input into a machine learning system, as described below.

As illustrated in FIG. 37, the appearance of a person in a camera image, even when this image is projected onto a common plane, varies depending on the location of the camera. For example, the FIG. 3721 in image 3611 is different from the FIG. 3722 in image 3612, although these figures overlap in region 3711 in combined image 3701. Because of this camera location dependence for images, knowledge of the camera locations may improve the ability of a machine learning system to detect people in camera images. The inventors have discovered that an effective technique to account for camera location is to extend each projected image with an additional "channel" that reflects the distance between each associated point on the projected plane and the camera location. Unexpectedly, adding this channel as an input feature may dramatically reduce the amount of training data needed to train a machine learning system to recognize person locations. This technique of projecting camera images to a common plane and adding a channel of distance information to each image is not known in the art. Encoding distance information as an additional image channel also has the benefit that a machine learning system (such as a convolutional neural network, as described below) organized to process images may be adapted easily to accommodate this additional channel as an input.

Figure 38:
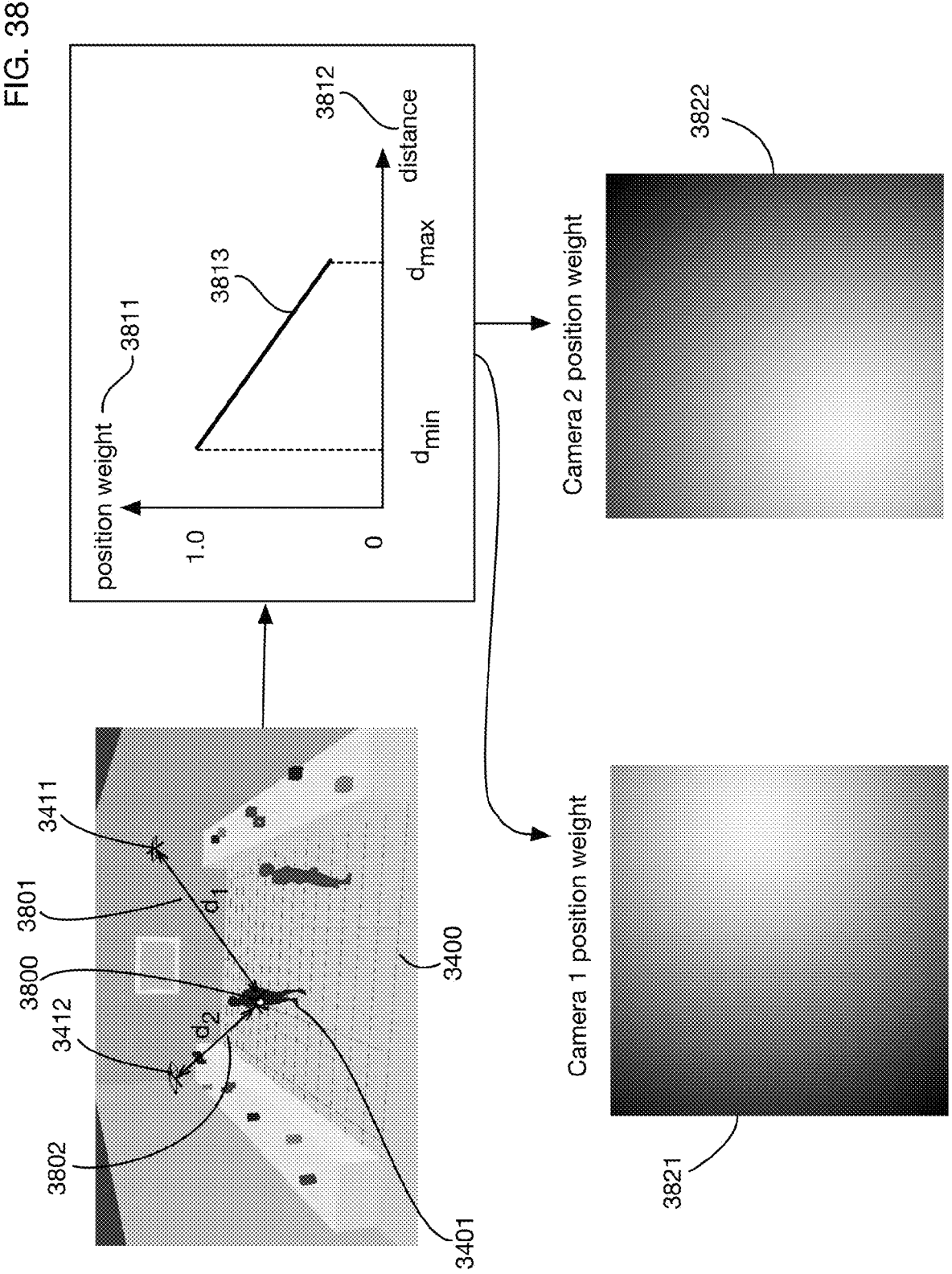
FIG. 38 shows an illustrative embodiment that augments projected images with a position weight map that reflects the distance of each point from the camera that captures each image.

FIG. 38 illustrates a technique that may be used in one or more embodiments to generate a camera distance channel associated with projected images. For each point on the projected plane (such as the plane one meter above the floor), a distance to each camera may be determined. These distances may be calculated based on calibrated camera positions, for example. For instance, at point 3800, which is on the intersection of the projected plane with the torso of shopper 3401, these distances are distance 3801 to camera 3411 and distance 3802 to camera 3412. Distances may be calculated in any desired metric, including but not limited to a Euclidean metric as shown in FIG. 38. Based on the distance between a camera and each point on the projected plane, a position weight 3811 may be calculated for each point. This position weight may for example be used by the machine learning system to adjust the importance of pixels at different positions on an image. The position weight 3811 may be any desired function of the distance 3812 between the camera and the position. The illustrative position weight curve 3813 shown in FIG. 38 is a linear, decreasing function of distance, with a maximum weight 1.0 at the minimum distance. The position weight may decrease to 0 at the maximum distance, or it may be set to some other desired minimum weight value. One or more embodiments may use position weight functions other than linear functions. In one or more embodiments the position weight may also be a function of other variables in addition to distance from the camera, such as distance from lights or obstacles, proximity to shelves or other zones of interest, presence of occlusions or shadows, or any other factors.

Illustrative position weight maps 3821 for camera 3411 and 3822 for camera 3412 are shown in FIG. 38 as grayscale images. Brighter pixels in the grayscale images correspond to higher position weights, which correspond to shorter distances between the camera and the position on the projected plane associated with that pixel.

Figure 39:
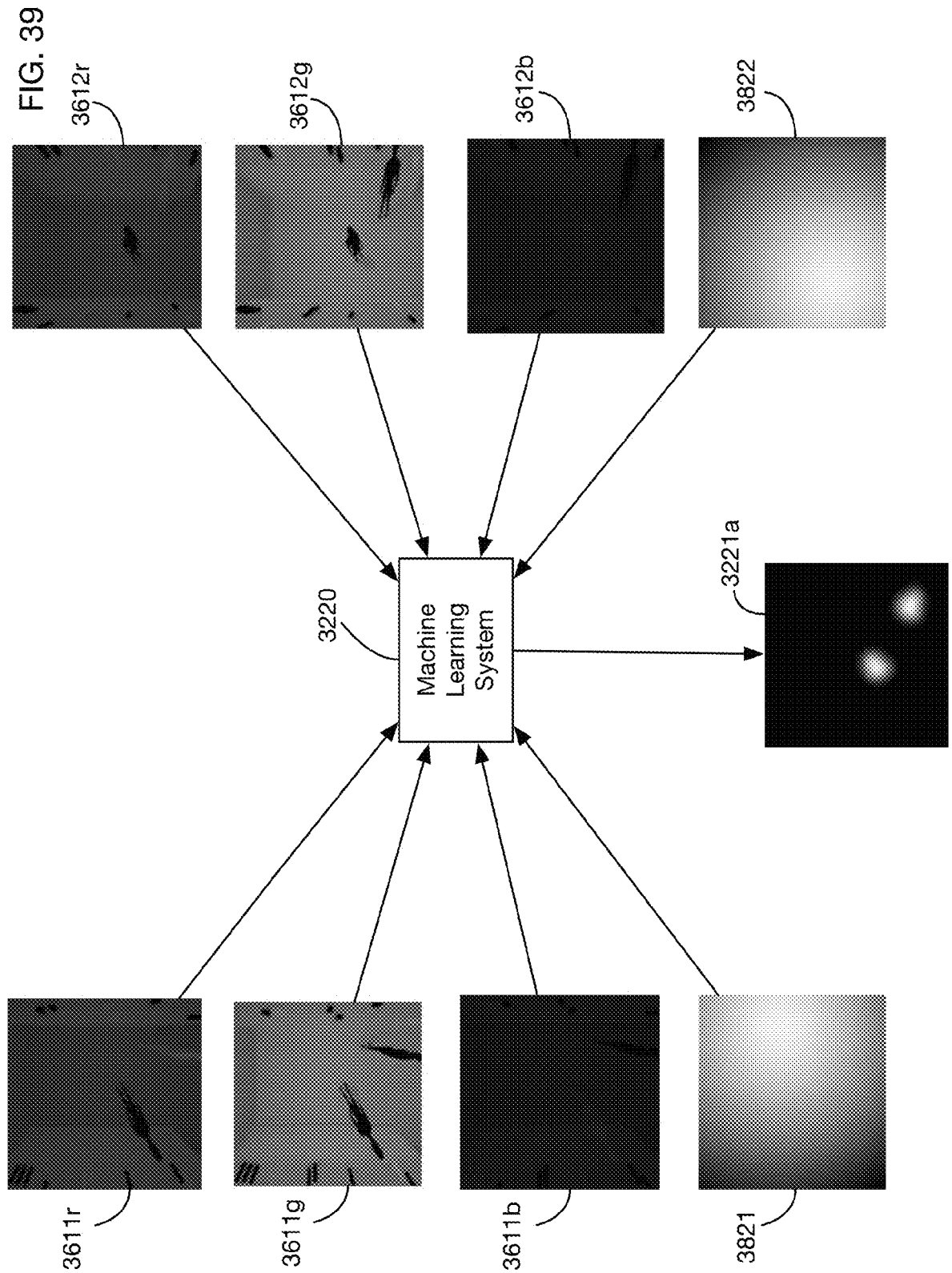
FIG. 39 shows an illustrative machine learning system with inputs from each camera in a store, where each input has four channels representing three color channels augmented with a position weight channel.

FIG. 39 illustrates how the position weight maps generated in FIG. 38 may be used in one or more embodiments for person detection. Projected images 3611 and 3612, from cameras 3411 and 3412, respectively, may be separated into color channels. FIG. 39 illustrates separating these images into RGB color channels; these channels are illustrative, and one or more embodiments may use any desired decomposition of images into channels using any color space or any other image processing methods. The RGB channels are combined with a fourth channel representing the position weight map for the camera that captured the image. The four channels for each image are input into machine learning system 3220, which generates an output 3221a with detection probabilities for each pixel. Therefore image 3611 corresponds to four inputs 3611r, 3611g, 3611b, and 3821; and image 3612 corresponds to four inputs 3612r, 3612g, 3612b, and 3822. To simplify the machine learning system, in one or more embodiments the position weight maps 3821 and 3822 may be scaled to have the same size as the associated color channels.

Figure 40:
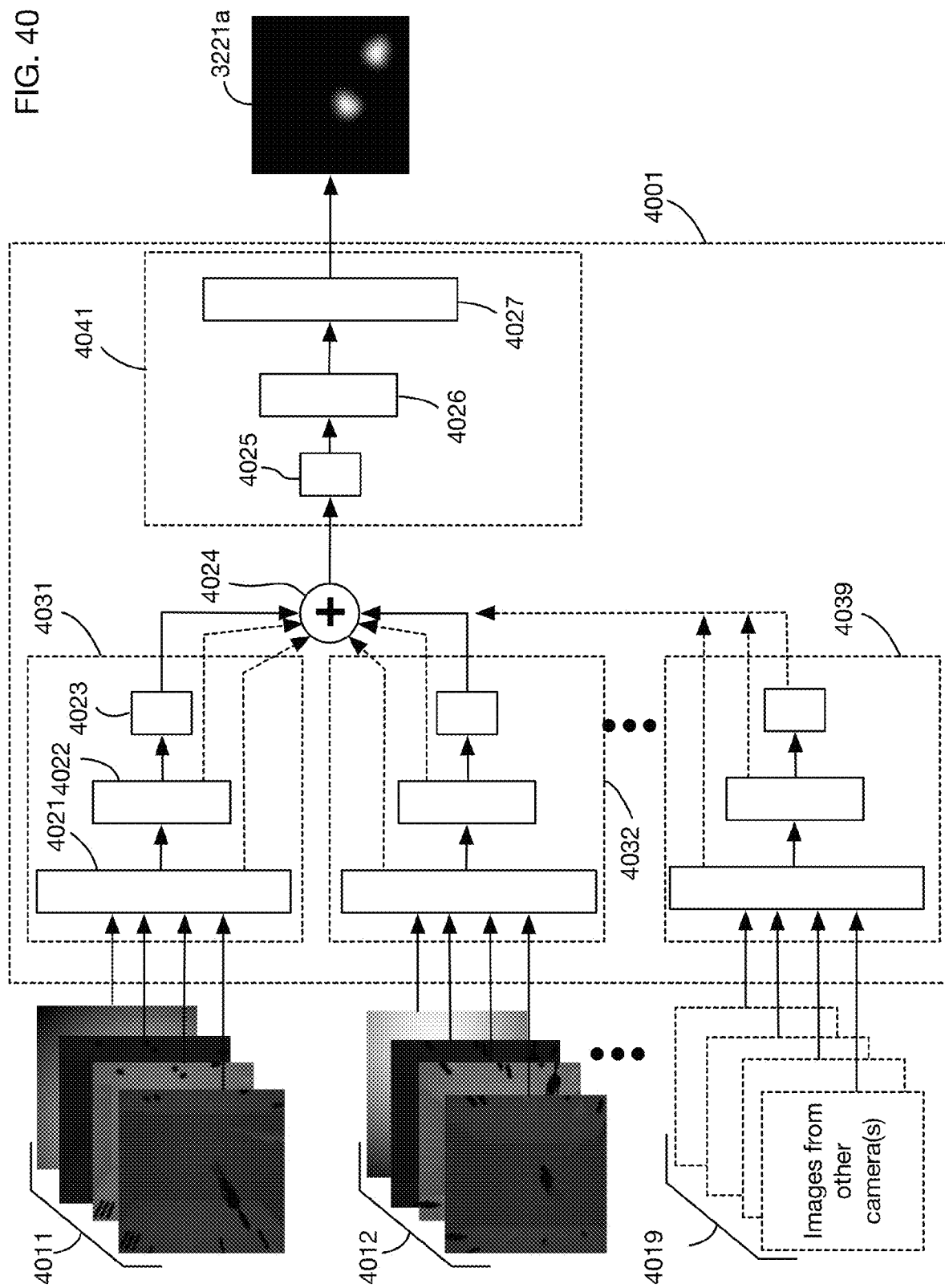
FIG. 40 shows an illustrative neural network architecture that may be used in one or more embodiments to detect persons from camera images.

Machine learning system 3220 may incorporate any machine learning technologies or methods. In one or more embodiments, machine learning system 3220 may be or may include a neural network. FIG. 40 shows an illustrative neural network 4001 that may be used in one or more embodiments. In this neural network, inputs are 4 channels for each projected image, with the fourth channel containing position weights as described above. Inputs 4011 represent the four channels from the first camera, inputs 4012 represent the four channels from the second camera, and there may be additional inputs 4019 from any number of additional cameras (also augmented with position weights). By scaling all image channels, including the position weights channels, to the same size, all inputs may share the same coordinate system. Thus, for a system with N cameras, and images of size H×W, the total number of input values for the network may be N*H*W*4. More generally with C channels per image (including potentially position weights), the total of number of inputs may be N*H*W*C.

The illustrative neural network 4001 may be for example a fully convolutional network with two halves: a first (left) half that is built out of N copies (for N cameras) of a feature extraction network, which may consist of layers of decreasing size; and a second (right) half that maps the extracted features into positions. In between the two halves may be a feature merging layer 4024, which may for example be an average over the N feature maps. The first half of the network may have for example N copies of a standard image classification network. The final classifier layer of this image classification network may be removed, and the network may be used as a pre-trained feature extractor. This network may be pretrained on a dataset such as the ImageNet dataset, which is a standard objects dataset with images and labels for various types of objects, including but not limited to people. The lower layers (closer to the image) in the network generally mirror the pixel statistics and primitives. Pre-trained weights may be augmented with additional weights for the position maps, which may be initialized with random values. Then the entire network may be trained with manually labeled person positions, as described below with respect to FIG. 41. All weights, including the pretrained weights, may vary during training with the labeled dataset. In the illustrative network 4001, the copies of the image classification network (which extracts image features) are 4031, 4032, and 4039. (There may be additional copies if there are additional cameras.) Each of these copies 4031, 4032, and 4039 may have identical weights.

The first half of the network 4031 (and thus also 4032 and 4039) may for example reduce the spatial size of the feature maps several times. The illustrative network 4031 reduces the size three times, with the three layers 4021, 4022, and 4023. For example, for inputs such as input 4011 of size H×W×C, the output feature maps of layers 4021, 4022, and 4023 may be of sizes H/8×W/8, H/16×W/16, and H/32×W/32, respectively. In this illustrative network, all C channels of input 4011 are input into layer 4021 and are processed together to form output features of size H/8×W/8, which are fed downstream to layer 4022. These values are illustrative; one or more embodiments may use any number of feature extraction layers with input and output sizes of each layer of any desired dimensions.

The feature merging layer 4024 may be for example an averaging over all of the feature maps that are input into this merging layer. Since inputs from all cameras are weighted equally, the number of cameras can change dynamically without changing the network weights. This flexibility is a significant benefit of this neural network architecture. It allows the system to continue to function if one or more cameras are not working. It also allows new cameras to be added at any time without requiring retraining of the system. In addition, the number of cameras used can be different during training compared to during deployment for operational person detection. In comparison, person detection systems known in the art may not be robust when cameras change or are not functioning, and they may require significant retraining whenever the camera configuration of a store is modified.

The output features from the final reduction layer 4023, and the duplicate final reduction layers for the other cameras, are input into the feature merging layer 4024. In one or more embodiments, features from one or more previous reduction layers may also be input into the feature merging layer 4024; this combination may for example provide a mixture of lower-level features from earlier layers and higher-level features from later layers. For example, lower-level features from an earlier layer (or from multiple earlier layers) may be averaged across cameras to form a merged lower-level feature output, which may be input into the second half network 4041 along with the average of the higher-level features.

The output of the feature merging layer 4024 (which reduces N sets of feature maps to 1 set) is input into the second half network 4041. The second half network 4041 may for example have a sequence of transposed convolution layers (also known as deconvolution layers), which increase the size of the outputs to match the size H×W of the input image. Any number of deconvolution layers may be used; the illustrative network 4041 has three deconvolution layers 4024, 4026, and 4027.

The final output 3221a from the last deconvolution layer 4027 may be interpreted as a "heat map" of person positions. Each pixel in the output heat map 3221a corresponds to an x,y coordinate in the projected plane onto which all camera images are projected. The output 3221a is shown as a grayscale image, with brighter pixels corresponding to higher values of the outputs from neural network 4001. These values may be scaled for example to the range 0.0 to 1.0. The "hot spots" of the heat map correspond to person detections, and the peaks of the hot spots represent the x,y locations of the centroid of each person. Because the network 4001 does not have perfect precision in detecting the position of persons, the output heat map may contain zones of higher or moderate intensity around the centroids of the hot spots.

Figure 41:
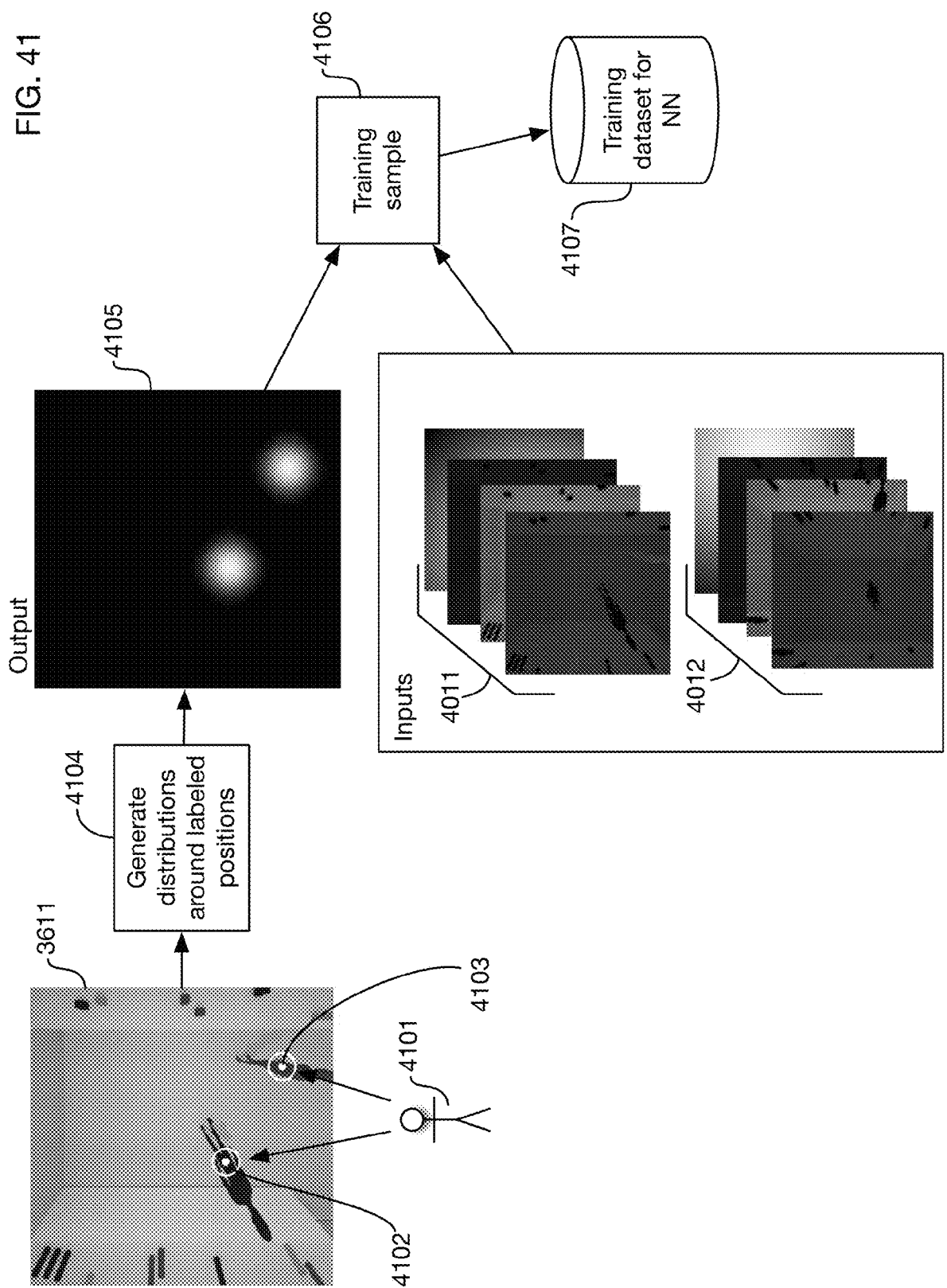
FIG. 41 shows an illustrative process of generating training data for a machine learning person detection system.

The machine learning system such as neural network 4001 may be trained using images captured from cameras that are projected to a plane and then manually labeled to indicate person positions within the images. This process is illustrated in FIG. 41. A camera image is captured while persons are in the store area, and it is projected onto a plane to form an image 3611. A user 4101 reviews this image (as well as other images captured during this session or other sessions, from the same camera or from other cameras), and the user manually labels the position of the persons at the centroid of the area where they intersect the projection plane. The user 4101 picks points such as 4102 and 4103 for the person locations. The training system then generates 4104 a probability density distribution around the selected points. For example, the distribution in one or more embodiments may be a two-dimensional gaussian of some specified width centered on the selected points. The target output 4105 may be for example the sum of the distributions generated in step 4104 at each pixel. One or more embodiments may use any type of probability distribution around the point or points selected by the user to indicate person positions. The target output 4105 is then combined with camera inputs (and position weights) from all cameras used for training, such as inputs 4011 and 4012, to form a training sample 4106. This training sample is added to a training dataset 4107 that is used to train the neural network.

An illustrative training process that may be used in one or more embodiments is to have one or more people move through a store, and to sample projected camera images at fixed time intervals (for example every one second). The sampled images may be labeled and processed as illustrated in FIG. 41. On each training iteration a random subset of the cameras in an area may be selected to be used as inputs. The plane projections may also be performed on randomly selected planes parallel to the floor within some height range above the store. In addition, random data augmentation may be performed to generate additional samples; for example, synthesized images may be generated to deform the shapes or colors of persons, or to move their images to different areas of the store (and to move the labeled positions accordingly).

Tracking of persons and item movements in a store or other area may use any cameras (or other sensors), including "legacy" surveillance cameras that may already be present in a store. Alternatively, or in addition, one or more embodiments of the system may include modular elements with cameras and other components that simplify installation, configuration, and operation of an automated store system. These modular components may support a turnkey installation of an automated store, potentially reducing installation and operating costs. Quality of tracking of persons and items may also be improved using modular components that are optimized for tracking.

Figure 42:
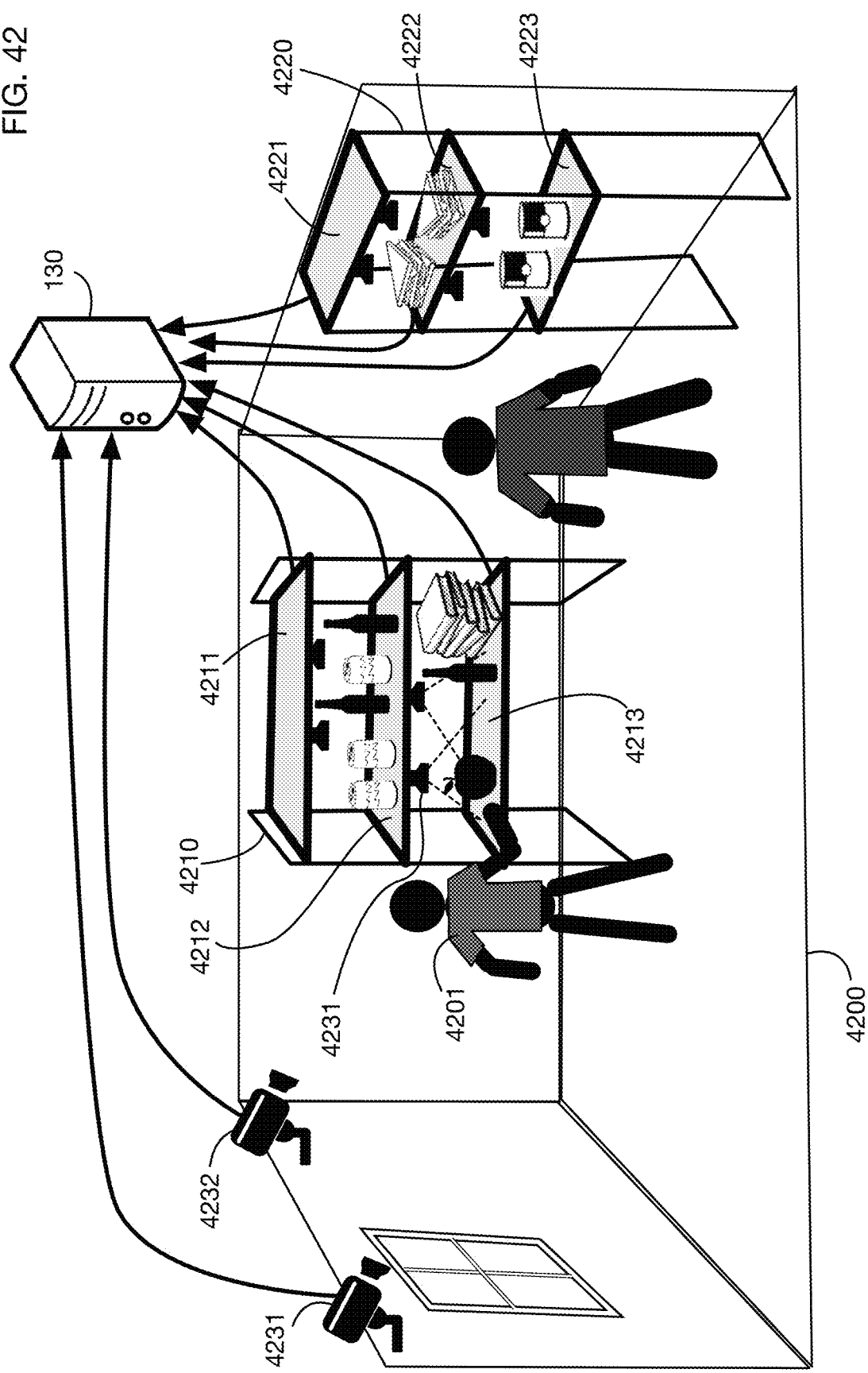
FIG. 42 shows an illustrative store with modular "smart" shelves that integrate cameras, lighting, processing, and communication to detect movement of items on the shelves.

FIG. 42 illustrates a store 4200 with modular "smart" shelves that may be used to detect taking, moving, or placing of items on a shelf. A smart shelf may for example contain cameras, lighting, processing, and communications components in an integrated module. A store may have one or more cabinets, cases, or shelving units with multiple smart shelves stacked vertically. Illustrative store 4200 has two shelving units 4210 and 4220. Shelving unit 4210 has three smart shelves, 4211, 4212, and 4213. Shelving unit 4220 has three smart shelves, 4221, 4222, and 4223. Data may be transmitted from each smart shelf to computer 130, for analysis of what item or items are moved on each shelf. Alternatively, or in addition, in one or more embodiments each shelving unit may act as a local hub, and may consolidate data from each smart shelf in the shelving unit and forward this consolidated data to computer 130. The shelving units 4210 and 4220 may also perform local processing on data from each smart shelf. In one or more embodiments, an automated store may be structured for example as a hierarchical system with the entire store at the top level, "smart" shelving units at the second level, smart shelves at the third level, and components such as cameras or lighting at the fourth level. One or more embodiments may organize elements in hierarchical structures with any number of levels. For example, stores may be divided into regions, with local processing performed for each region and then forwarded to a top-level store processor.

The smart shelves shown in FIG. 42 have cameras mounted on the bottom of the shelf; these cameras observe items on the shelf below. For example, camera 4231 on shelf 4212 observes items on shelf 4213. When user 4201 reaches for an item on shelf 4213, cameras on either or both of shelves 4212 and 4213 may detect entry of the user's hand into the shelf area, and may capture images of shelf contents that may be used to determine which item or items are taken or moved. This data may be combined with images from other store cameras, such as cameras 4231 and 4232, to track the shoppers and attribute item movements to specific shoppers.

Figure 43:
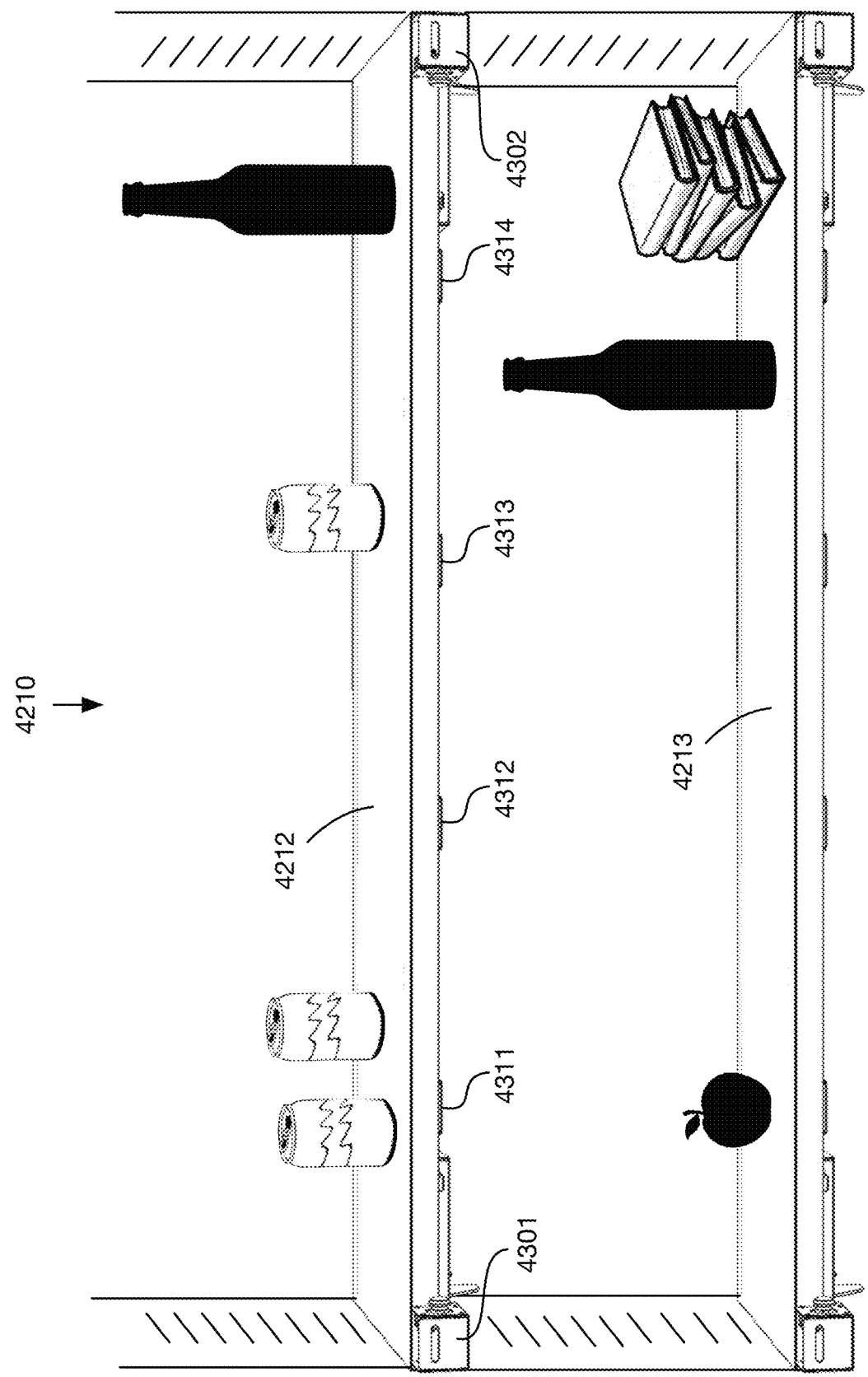
FIG. 43 shows a front view of an illustrative embodiment of a smart shelf.

FIG. 43 shows an illustrative embodiment of a smart shelf 4212, viewed from the front. FIGS. 44 through 47 show additional views of this embodiment. Smart shelf 4212 has cameras 4301 and 4302 at the left and right ends, respectively, which face inward along the front edge of the shelf. Thus the left end camera 4301 is rightward-facing, and the right end camera 4302 is leftward-facing. These cameras may be used for example to detect when a user's hand moves into or out of the shelf area. These cameras 4301 and 4302 may be used in combination with similar cameras on shelves above and/or below shelf 4212 in a shelving unit (such as shelves 4211 and 4213 in FIG. 42) to detect hand events. For example, the system may use multiple hand detection cameras to triangulate the position of a hand going into a shelf. With two cameras observing a hand, the position of a hand can be determined from the two images. With multiple cameras (for example four or more) observing a shelf, the system may be able to determine the position of more than one hand at a time since the multiple views can compensate for potential occlusions. Images of the shelf just prior to a hand entry event may be compared to images of the shelf just after a hand exit event, in order to determine which item or items may have been taken, moved, or added to the shelf. In one or more embodiments other detection technologies may be used instead of or in addition to the cameras 4301 and 4302 to detect hand entry and hand exit events for the shelf; these technologies may include for example, without limitation, light curtains, sensors on a door that must be opened to access the shelf or the shelving unit, ultrasonic sensors, and motion detectors.

Smart shelf 4212 may also have one or more downward-facing camera modules mounted on the bottom side of the shelf, facing the shelf 4213 below. For example, shelf 4214 has camera modules 4311, 4312, 4313, and 4314 mounted on the bottom side of the shelf. The number of camera modules and their positions and orientations may vary across installations, and also may vary across individual shelves in a store. These camera modules may capture images of the items on the shelf. Changes in these images may be analyzed by the system, by a processor on the shelf or on a shelving unit, or by both, to determine what items have been taken, moved, or added to the shelf below.

Figure 44A:
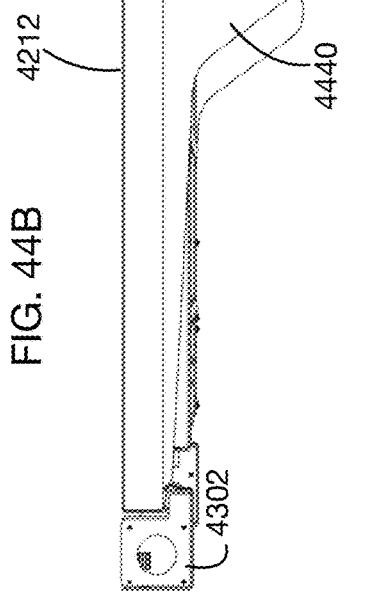
FIGS. 44A, 44B, and 44C show top, side, and bottom views of the smart shelf of FIG. 43.
Figure 44B:
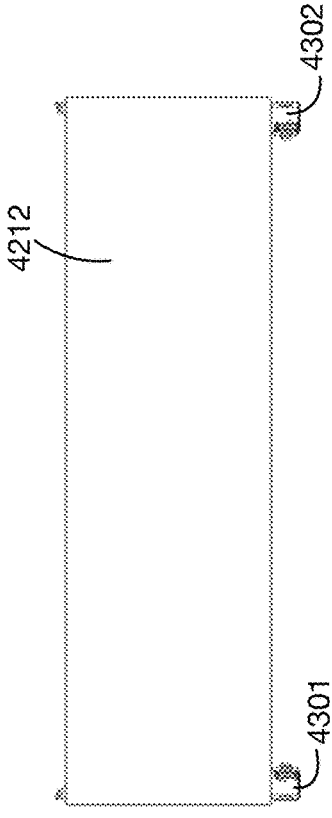

FIGS. 44A and 44B show a top view and a side view, respectively, of smart shelf 4212. Brackets 4440 may be used for example to attach shelf 4212 to a shelving unit; the shape and position of mounting brackets or similar attachment mechanisms may vary across embodiments.

Figure 44C:
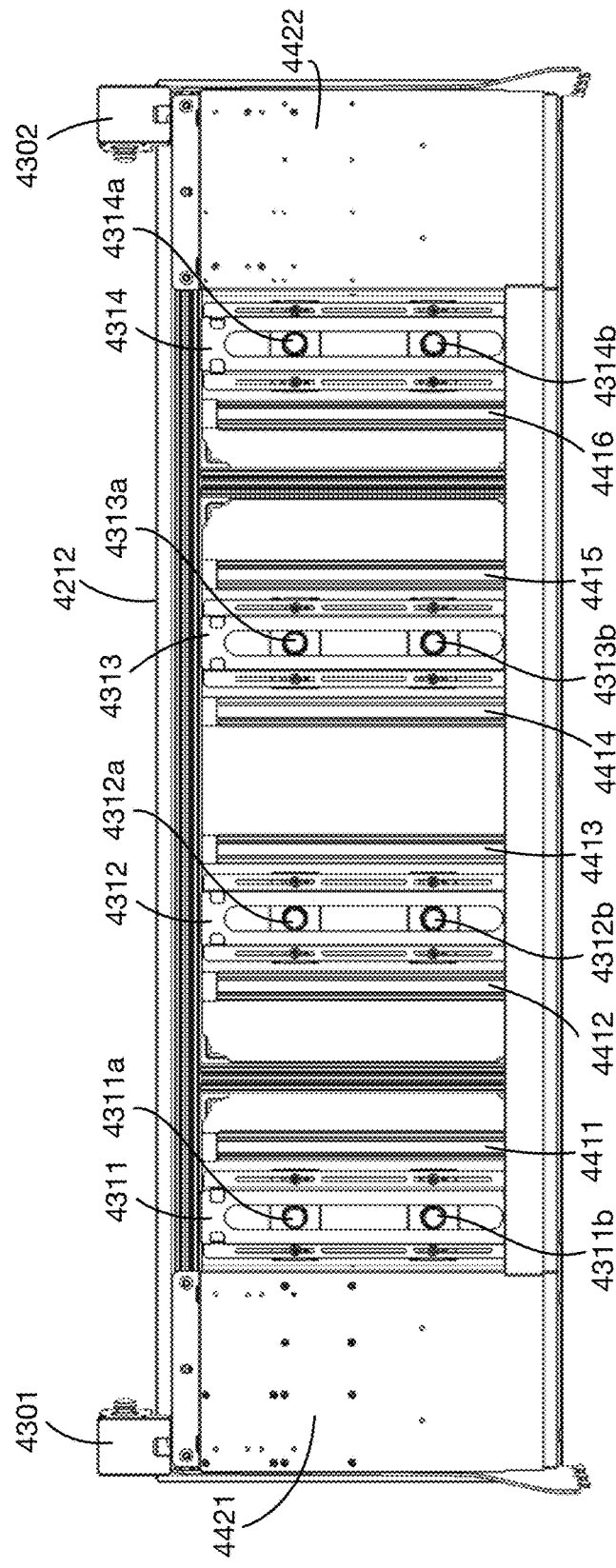

FIG. 44C shows a bottom view of smart shelf 4212. All cameras are visible in this view, including the inside-facing cameras 4301 and 4302, and the downward-facing cameras associated with camera modules 4311, 4312, 4313, and 4314. In this illustrative embodiment, each camera module contains two cameras: cameras 4311a and 4311b in module 4311, cameras 4312a and 4312b in module 4312, cameras 4313a and 4313b in module 4313, and cameras 4314a and 4314b in module 4314. This configuration is illustrative; camera modules may contain any number of cameras. Use of two or more cameras per camera module may assist with stereo vision, for example, in order to generate a 3D view of the items on the shelf below, and a 3D representation of the changes in shelf contents when a user interacts with items on the shelf.

Shelf 4212 also contains light modules 4411, 4412, 4413, 4414, 4415, and 4416. These light modules may be LED light strips, for example. Embodiments of a smart shelf may contain any number of light modules, in any locations. The intensity, wavelengths, or other characteristics of the light emitted by the light modules may be controlled by a processor on the smart shelf. This control of lighting may enhance the ability of the camera modules to accurately detect item movements and to capture images that allow identification of the items that have moved. Lighting control may also be used to enhance item presentation, or to highlight certain items such as items on sale or new offerings.

Figure 45:
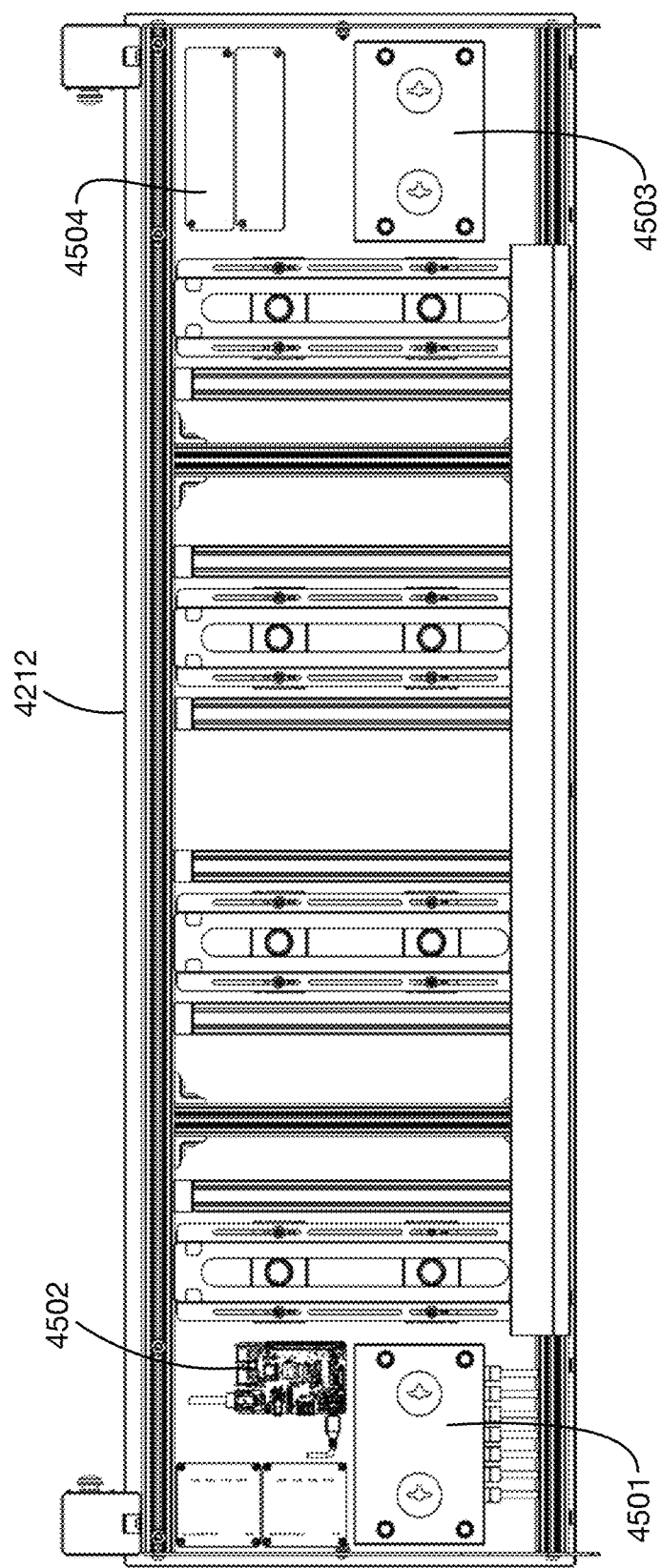
FIG. 45 shows a bottom view of the smart shelf of FIG. 44C with the electronics covers removed to show the components.

Smart shelf 4212 contains integrated electronics, including a processor and network switches. In the illustrative smart shelf 4212, these electronics are contained in areas 4421 and 4422 at the ends of the shelf. One or more embodiments may locate any components at any position on the shelf. FIG. 45 shows a bottom view smart shelf 4212 with the covers to electronics areas 4421 and 4422 removed, to show the components. Two network switches 4501 and 4503 are included; these switches may provide for example connections to each camera and to each lighting module, and a connection between the smart shelf and the store computer or computers. A processor 4502 is included; it may be for example a Raspberry Pi® or similar embedded computer. Power supplies 4504 may also be included; these power supplies may provide AC to DC power conversion for example.

Figure 46B:
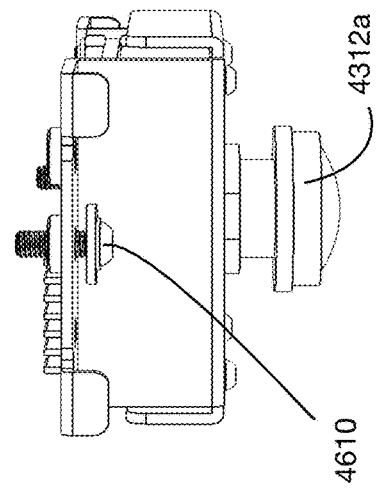
FIGS. 46A and 46B show bottom and side views, respectively, of a camera module that may be installed into the smart shelf of FIG. 45.
Figure 46A:
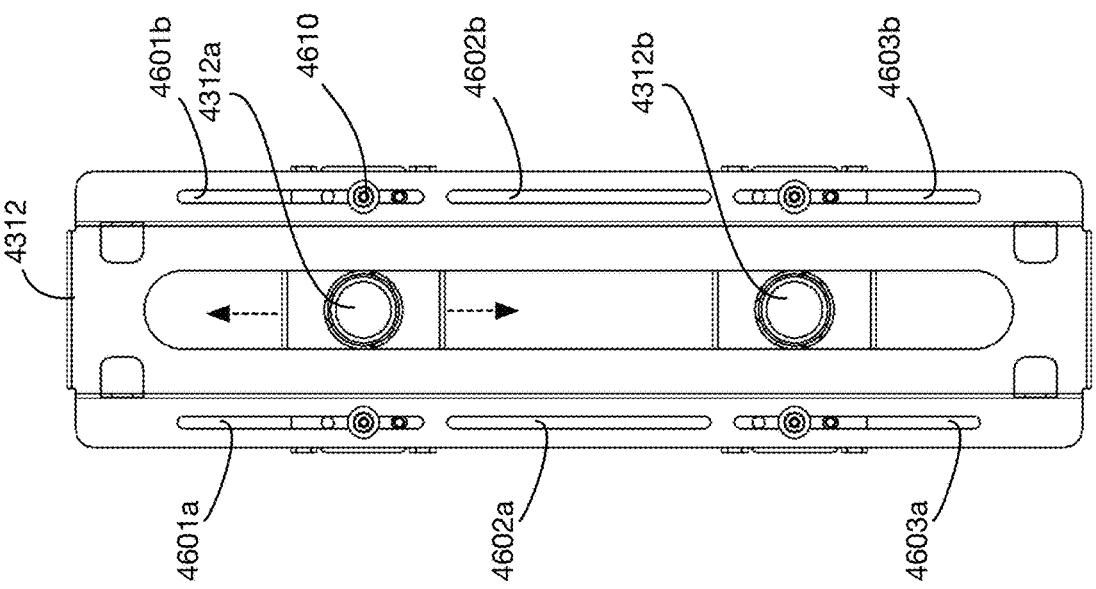

FIG. 46A shows a bottom view of a single camera module 4312. This module provides a mounting bracket onto which multiple cameras may be mounted in any desired positions. Camera positions and numbers may be modified based on characteristics such as item size, number of items, and distance between shelves. The bracket has slots 4601a, 4602a, 4603a on the left, and corresponding slots 4601b, 4602b, and 4603b on the right. Individual cameras may be installed at any desired position in any of these slots. Positions of cameras may be adjusted after initial installation. Camera module 4312 has two cameras 4312a and 4312b installed in the top and bottom slot pairs; the center slot pair 4602a and 4602b is unoccupied in this illustrative embodiment. FIG. 46B shows an individual camera 4312a from a side view. Screw 4610 is inserted through one of the slots on the bracket 4312 to install the camera; a corresponding screw on the far side of the camera attaches the camera to the opposing slot in the bracket.

Figure 47:
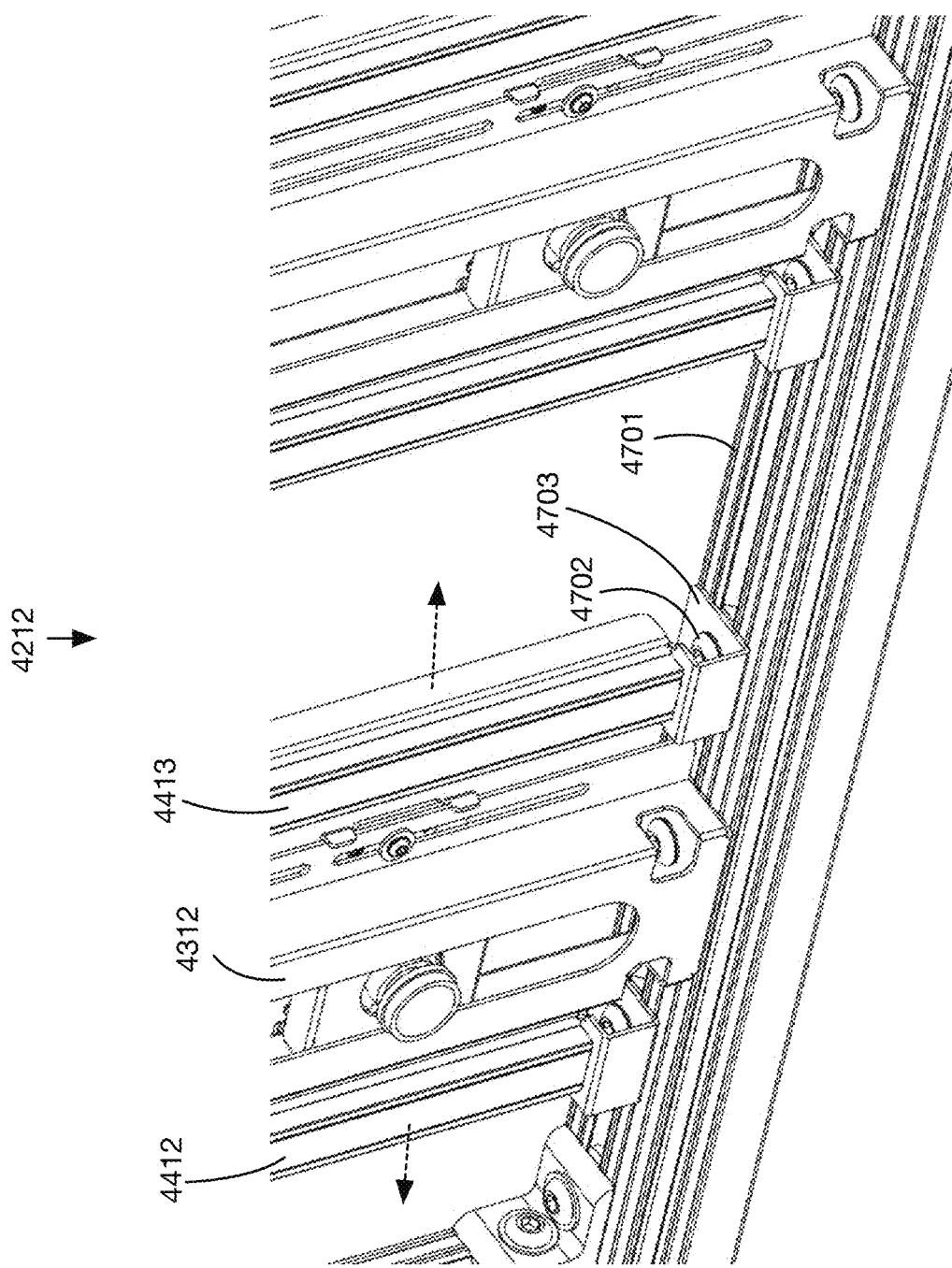
FIG. 47 shows a rail mounting system that may be used on the smart shelf of FIG. 45, which allows lighting and camera modules to be installed at any desired positions along the shelf.

FIG. 47 illustrates how camera modules and lighting modules may be installed at any desired positions in smart shelf 4212. Additional camera modules and lighting modules may also be added in any available positions, and positions of installed components may be adjusted. These modules mount to a rail 4701 at one end of the shelf (and to a corresponding rail at the other end, which is not shown in FIG. 47). This rail 4701 has slots into which screws are attached to hold end brackets of the modules against the rail. For example, lighting module 4413 has an end bracket 4703, and screw 4702 attaches through this end bracket into a groove in rail 4701. Similar attachments are used to attach other modules such as camera module 4312 and lighting module 4412.

Figure 48:
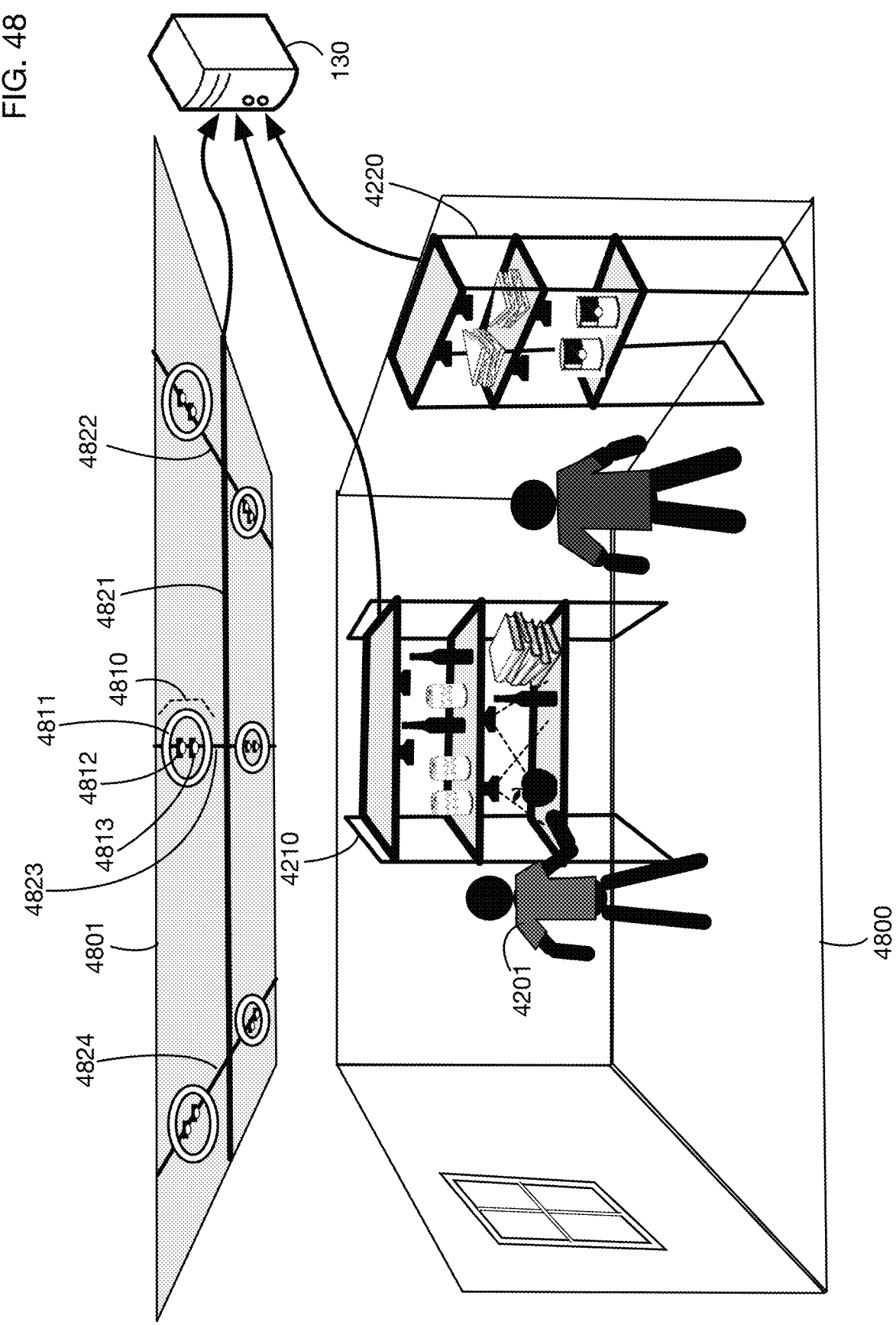
FIG. 48 shows an illustrative store with a modular, "smart" ceiling system into which camera and lighting modules may be installed at any desired positions and spacings.

One or more embodiments may include a modular, "smart" ceiling that incorporates cameras, lighting, and potentially other components at configurable locations on the ceiling. FIG. 48 shows an illustrative embodiment of a store 4800 with a smart ceiling 4801. This illustrative ceiling has a center longitudinal rail 4821 onto which transverse rails, such as rail 4822, may be attached at any desired locations. Lighting and camera modules may be attached to the transverse rails at any desired locations. This combined longitudinal and transverse railing system provides complete two degree of freedom positioning for lights and cameras. In the configuration shown in FIG. 48, three transverse rails 4822, 4823, and 4824 each hold two integrated lighting-camera modules. For example, transverse rail 4823 holds integrated lighting-camera module 4810, which contains a circular light strip 4811, and two cameras 4812 and 4813 in the central area inside the circular light strip. In one or more embodiments, the rails or other mounting mechanisms of the ceiling may hold any type or types of lighting or camera components, either integrated like module 4810 or standalone. The rail configuration shown in FIG. 48 is illustrative; one or more embodiments may provide any type of lighting-camera mounting mechanisms in any desired configuration. For example, mounting rails or other mounting mechanisms may be provided in any desired geometry, not limited to the longitudinal and transverse rail configuration illustrated in FIG. 48.

Data from ceiling 4801 may be transmitted to store computer 130 for analysis. In one or more embodiments, ceiling 4801 may contain one or more network switches, power supplies, or processors, in addition to cameras and lights. Ceiling 4801 may perform local processing of data from cameras before transmitting data to the central store computer 130. Store computer 130 may also transmit commands or other data to ceiling 4801, for example to control lighting or camera parameters.

The embodiment illustrated in FIG. 48 has a modular smart ceiling 4801 as well as modular shelving units 4210 and 4220 with smart shelves. Data from ceiling 4801 and from shelves in 4210 and 4220 may be transmitted to store computer 130 for analysis. For example, computer 130 may process images from ceiling 4801 to track persons in the store, such as shopper 4201, and may process images from shelves in 4210 and 4220 to determine what items are taken, moved, or placed on the shelves. By correlating person positions with shelf events, computer 130 may determine which shoppers take items, thereby supporting a fully or partially automated store. The combination of smart ceiling and smart shelves may provide a partially or fully turnkey solution for an automated store, which may be configured based on factors such as the store's geometry, the type of items sold, and the capacity of the store.

Figure 49:
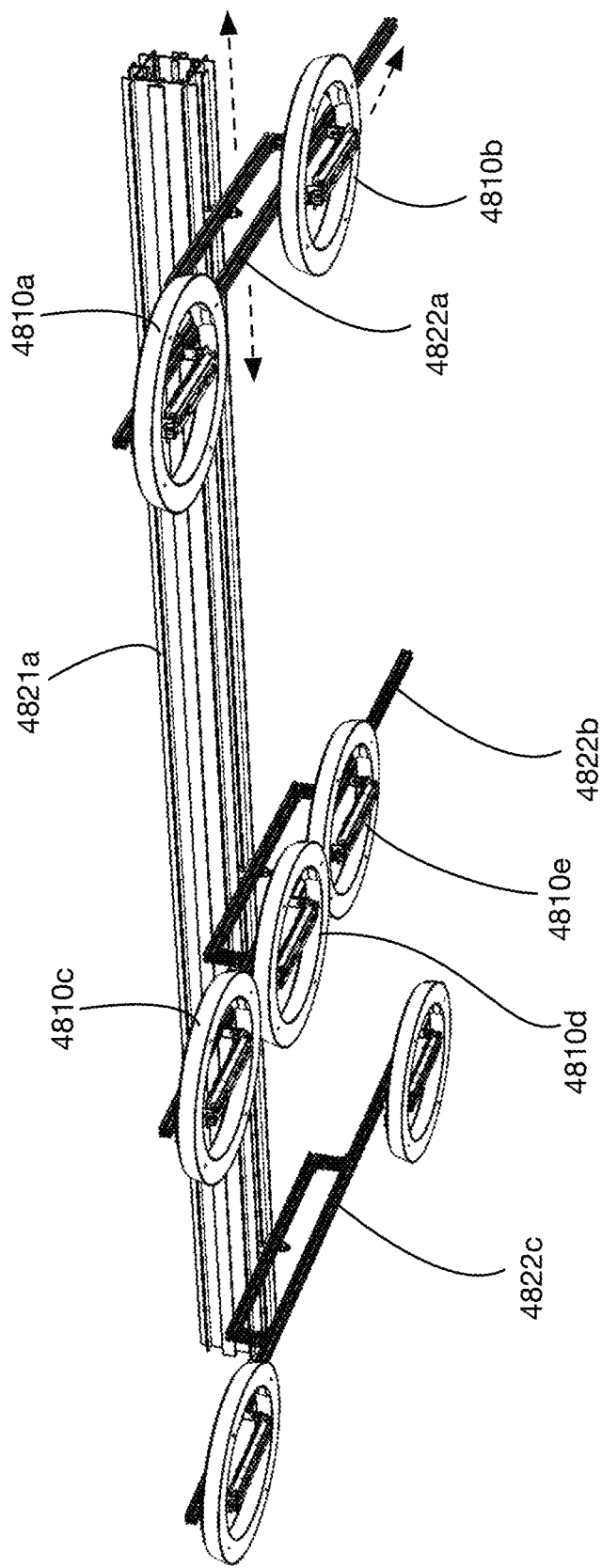
FIG. 49 shows an illustrative smart ceiling system that supports installation of integrated lighting-camera modules at any desired horizontal positions.

FIG. 49 shows an embodiment of a modular ceiling similar to the ceiling of FIG. 48. A central longitudinal rail 4821*a* provides a mounting surface for transverse rails 4822*a*, 4822*b*, and 4822*c*, which in turn provide mounting surfaces for integrating lighting-camera modules. The transverse rails may be located at any points along longitudinal rail 4821*a*. Any number of transverse rails may be attached to the longitudinal rail. Any number of integrated lighting-camera modules, or other compatible modules, may be attached to the transverse rails at any positions. Transverse rail 4822*a* has two lighting-camera modules 4810*a* and 4810*b*, and transverse rail 4822*b* has three lighting-camera modules 4810*c*, 4810*d*, and 4810*e*. The positions of the lighting-camera modules vary across the three transverse rails to illustrate the flexibility of the mounting system.

Figure 50:
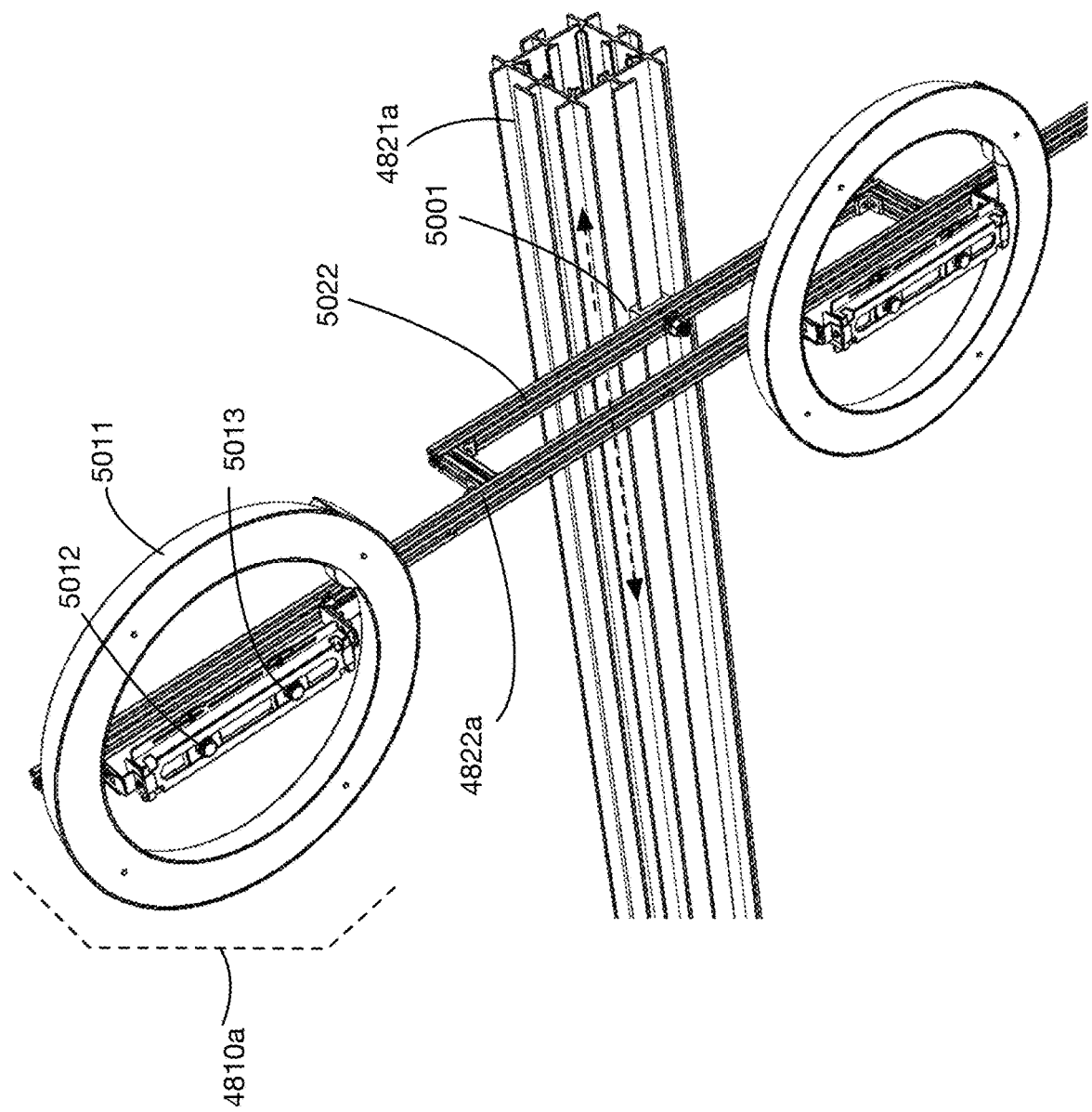
FIG. 50 shows a closeup view of a portion of the smart ceiling system of FIG. 49, showing the main longitudinal rail, and a moveable transverse rail onto which integrated lighting-camera modules are mounted.

FIG. 50 shows a closeup view of transverse rail 4822*a* and lighting-camera module 4810*a*. Transverse rail 4822*a* has a crossbar 5022 with a C-shaped attachment 5001 that clamps around a corresponding protrusion on rail 4821*a*. The position of the transverse rail 4822*a* is adjustable along the longitudinal rail 4821*a*. Lighting-camera module 4810*a* has a circularly shaped annular light 5011 with a pair of cameras 5012 and 5013 in a central area surrounded by the light 5011. The two cameras 5012 and 5013 may be used for example to provide stereo vision. Alternatively, or in addition, two or more cameras per lighting-camera module may provide redundancy so that person tracking can continue even if one camera is down. The circular shape of light 5011 provides a diffuse light that may improve tracking by reducing reflections and improving lighting consistency across a scene. This circular shape is illustrative; one or more embodiments may use lights of any size or shape, including for example, without limitation, any polygonal or curved shape. Lights may be for example triangular, square, rectangular, pentagonal, hexagonal, or shaped like any regular or irregular polygon. In one or more embodiments lights may consist of multiple segments or multiple polygons or curves. In one or more embodiments, a light may surround a central area without lighting elements, and one or more cameras may be placed in this central area.

In one or more embodiments the light elements such as light 5011 may be controllable, so that the intensity, wavelength, or other characteristics of the emitted light may be modified. Light may be modified for example to provide consistent lighting throughout the day or throughout a store area. Light may be modified to highlight certain sections of a store. Light may be modified based on camera images received by the cameras coupled to the light elements, or based on any other camera images. For example, if the store system is having difficulty tracking shoppers, modification of emitted light may improve tracking by enhancing contrast or by reducing noise.

Figure 51:
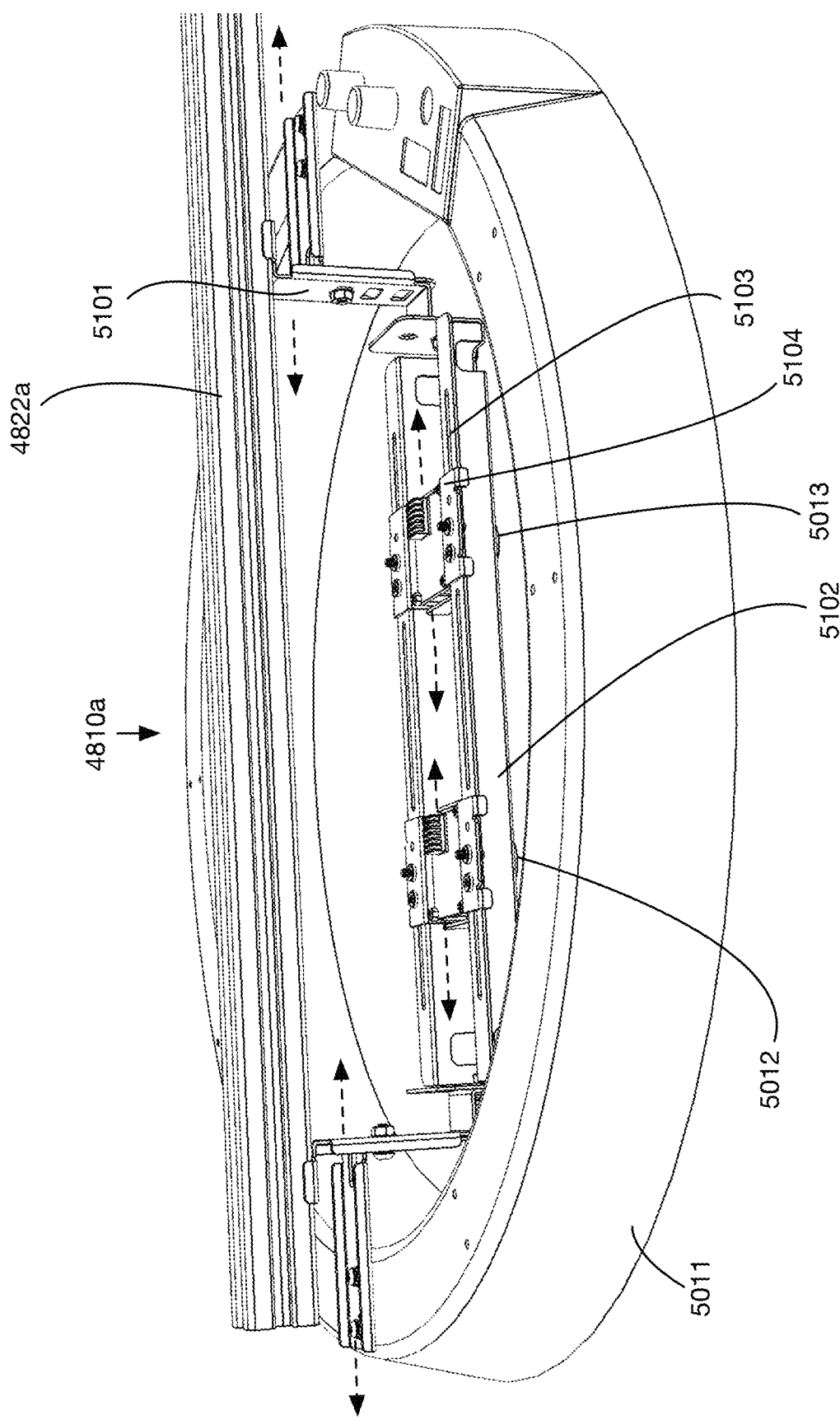
FIG. 51 shows a closeup view of an integrated lighting-camera module of FIG. 50.

FIG. 51 shows a closeup view of integrated lighting-camera module 4810*a*. A bracket system 5101 connects to light 5011 (at two sides) and to the two cameras 5012 and 5013 in the center of the light, and this bracket 5101 has connections to rail 4822*a* that may be positioned at any points along the rail. The center horizontal section 5102 of the bracket system 5101 provides mounting slots for the cameras, such as slot 5103 into which camera mount 5104 for camera 5013 is mounted; these slots allow the number and position of cameras to be modified as needed. In one or more embodiments this central camera mounting bracket 5102 may be similar to or identical to the shelf camera mounting bracket shown in FIG. 46A, for example. In one or more embodiments, ceiling cameras such as camera 5013 may also be similar to or identical to the shelf cameras such as camera 4312*a* shown in FIG. 46A. Use of similar or identical components in both smart shelves and smart ceilings may further simplify installation, operation, and maintenance of an automated store, and may reduce cost through use of common components.

Figure 52:
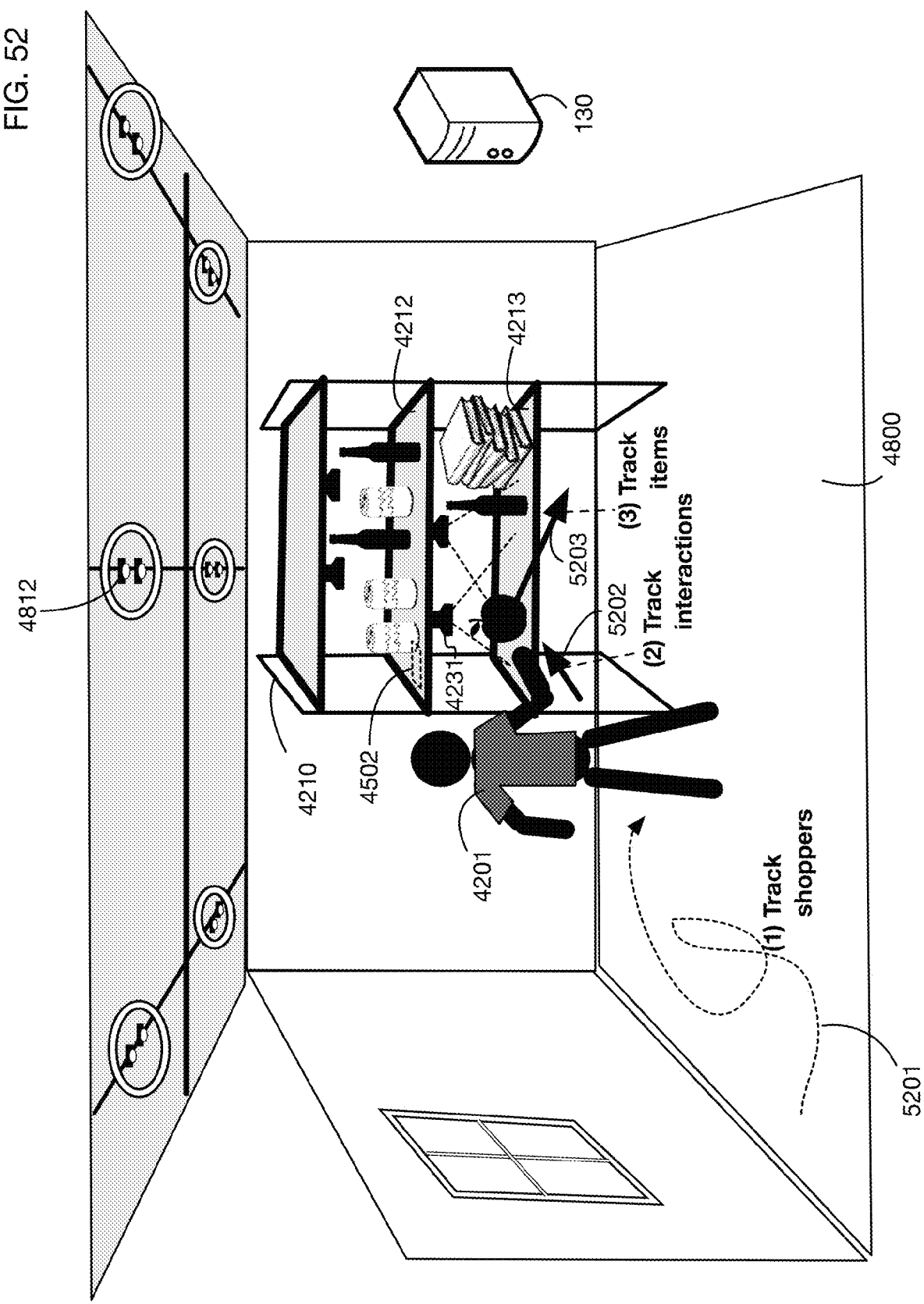
FIG. 52 shows an autonomous store system with components that perform three functions: (1) tracking shoppers through the store; (2) tracking shoppers' interactions with items on a shelf; and (3) tracking movement of items on a shelf.
Figure 53:
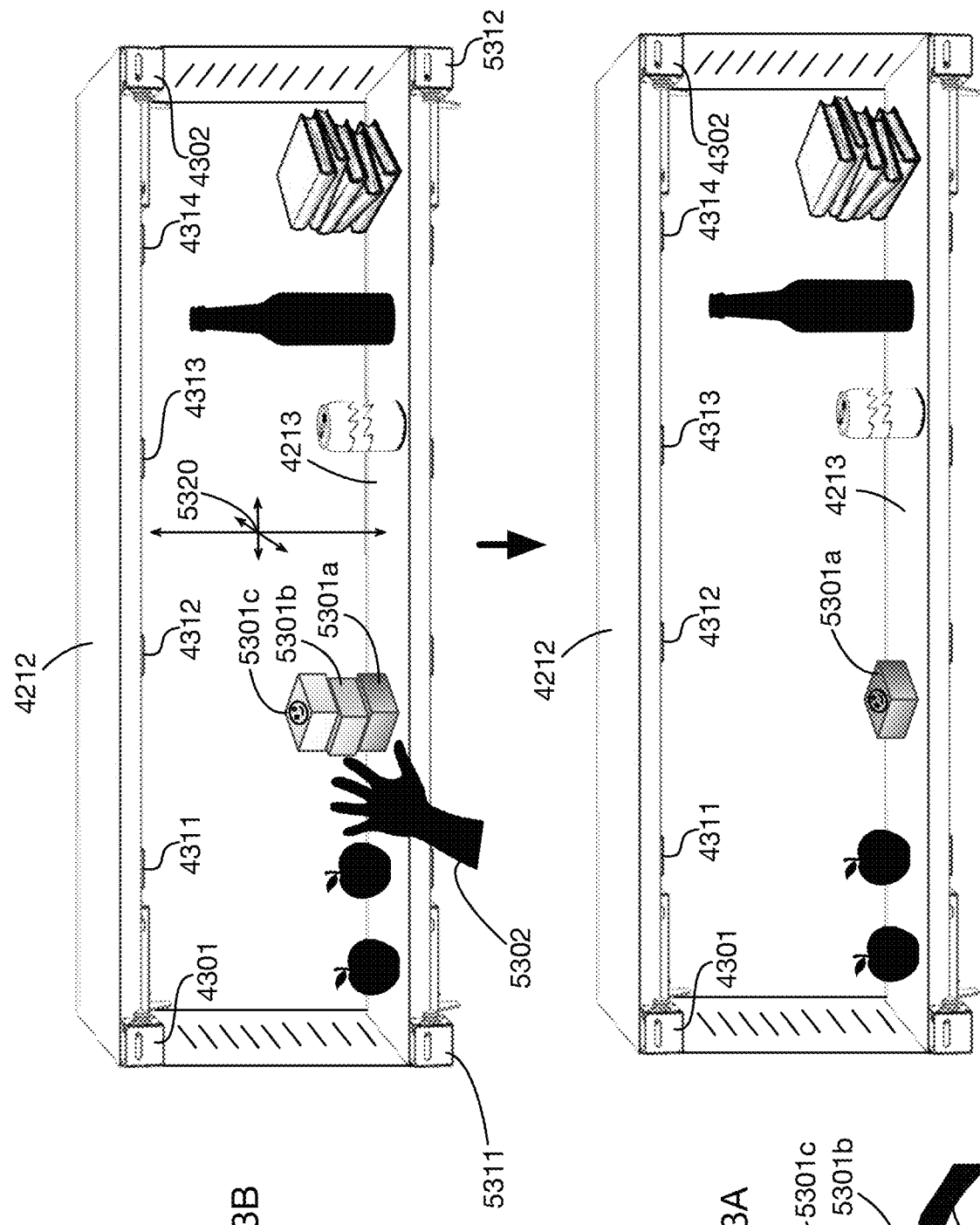
FIGS. 53A and 53B show an illustrative shelf of an autonomous store that a shopper interacts with to remove items from the shelf; 53B is a view of the shelf before the shopper reaches into the shelf to take items, and 53A is a view of the shelf after this interaction.

Automation of a store may incorporate three general types of processes, as illustrated in FIG. 52 for store 4800: (1) tracking the movements 5201 of shoppers such as 4201 through the store, (2) tracking the interactions 5202 of shoppers with item storage areas such as shelf 4213, and (3) tracking the movement 5203 of items, when shoppers take items from the shelf, put them back, or rearrange them. In the illustrative automated store 4800 shown in FIG. 52, these three tracking processes are performed using combinations of cameras and processors. For example, movement 5201 of shoppers may be tracked by ceiling cameras such as camera 4812. A processor or processors 130 may analyze images from these ceiling cameras using for example methods described above with respect to FIGS. 26 through 41. Interactions 5202 and item movements 5203 may be tracked for example using cameras integrated into shelves or other storage fixtures, such as camera 4231. Analysis of these images may be performed using either or both of store processors 130 and processors such as 4502 integrated into shelves. One or more embodiments may use combinations of these techniques; for example, ceiling cameras may also be used to track interactions or item movements when they have unobstructed views the item storage areas.

FIGS. 53 through 62 describe methods and systems that may be used in one or more embodiments to perform tracking of interactions and item movements. FIGS. 53A and 53B show an illustrative scenario that is used as an example to describe these methods and systems. FIG. 53B shows an item storage area before a shopper reaches into the shelf with hand 5302, and FIG. 53A shows this item storage area after the shopper interacts with the shelf to remove items. The entire item storage area 5320 is the volume between shelves 4213 and 4212. Detection of the interaction of hand 5302 with this item storage area may be performed for example by analyzing images from side-facing cameras 4301 and 4302 on shelf 4212. Side-facing cameras from other shelves may also be used, such as the cameras 5311 and 5312 on shelf 4213. In one or more embodiments other sensors may be used instead of or in addition to cameras to detect the interaction of the shopper with the item storage area. Typically the shopper interacts with an item storage area by reaching a hand 5302 into the area; however, one or more embodiments may track any type of interaction of a shopper with an item storage area, via any part of the shopper's body or any instrument or tool the shopper may use to reach into the area or otherwise interact with items in the area.

Item storage area 5320 contains multiple items of different types. In the illustrative interaction, the shopper reaches for the stack of items 5301*a*, 5301*b*, and 5301*c*, and removes two items 5301*b* and 5301*c* from the stack. Determination of which item or items a shopper has removed may be performed for example by analyzing images from cameras on the upper shelf 4212 which face downward into item storage area 5320. These analyses may also determine that a shopper has added one or more items (for example by putting an item back, or by moving it from one shelf to another), or has displaced items on the shelf. Cameras may include for example the cameras in camera modules 4311, 4312, 4313, and 4314. Cameras that observe the item storage area to detect item movement are not limited to those on the bottom of a shelf above the item storage area; one or more embodiments may use images from any camera or cameras mounted in any location in the store to observe the item storage area and detect item movement.

Item movements may be detected by comparing "before" and "after" images of the item storage area. In some situations, it may be beneficial to compare before and after images from multiple cameras. Use of multiple cameras in different locations or orientations may for example support generation of a three-dimensional view of the changes in items in the item storage area, as described below. This three-dimensional view may be particularly valuable in scenarios such as the one illustrated in FIGS. 53A and 53B, where the item storage area has a stack of items. For example, the before and after images comparing stack 5301*a*, 5301*b*, and 5301*c* to the single "after" item 5301*a* may look similar from a single camera located directly above the stack; however, views from cameras in different locations may be used to determine that the height of the stack has changed.

Constructing a complete three-dimensional view of the before and after contents of an item storage area may be done for example using any stereo or multi-view vision techniques known in the art. One such technique that may be used in one or more embodiments is plane-sweep stereo, which projects images from multiple cameras onto multiple planes at different heights or at different positions along a sweep axis. (The sweep axis is often but not necessarily vertical.) While this technique is effective at constructing 3D volumes from 2D images, it may be computationally intensive to perform for an entire item storage area. This computational cost may significantly add to power expenses for operating an automated store. It may also introduce delays into the process of identifying item movements and associating these movements with shoppers. To address these issues, the inventors have discovered that an optimized process can effectively generate 3D views of the changes in an item storage area with significantly lower computational costs. This optimized process performs relatively inexpensive 2D image comparisons to identify regions where items may have moved, and then performs plane sweeping (or a similar algorithm) only in these regions. This optimization may dramatically reduce power consumption and delays; for example, whereas a full 3D reconstruction of an entire shelf may take 20 seconds, an optimized reconstruction may take 5 seconds or less. The power costs for a store may also be reduced, for example from thousands of dollars per month to several hundred. Details of this optimized process are described below.

Some embodiments or installations may not perform this optimization, and may instead perform a full 3D reconstruction of before and after contents of an entire item storage area. This may be feasible or desirable for example for a very small shelf or if power consumption or computation time are not concerns.

Figure 54:
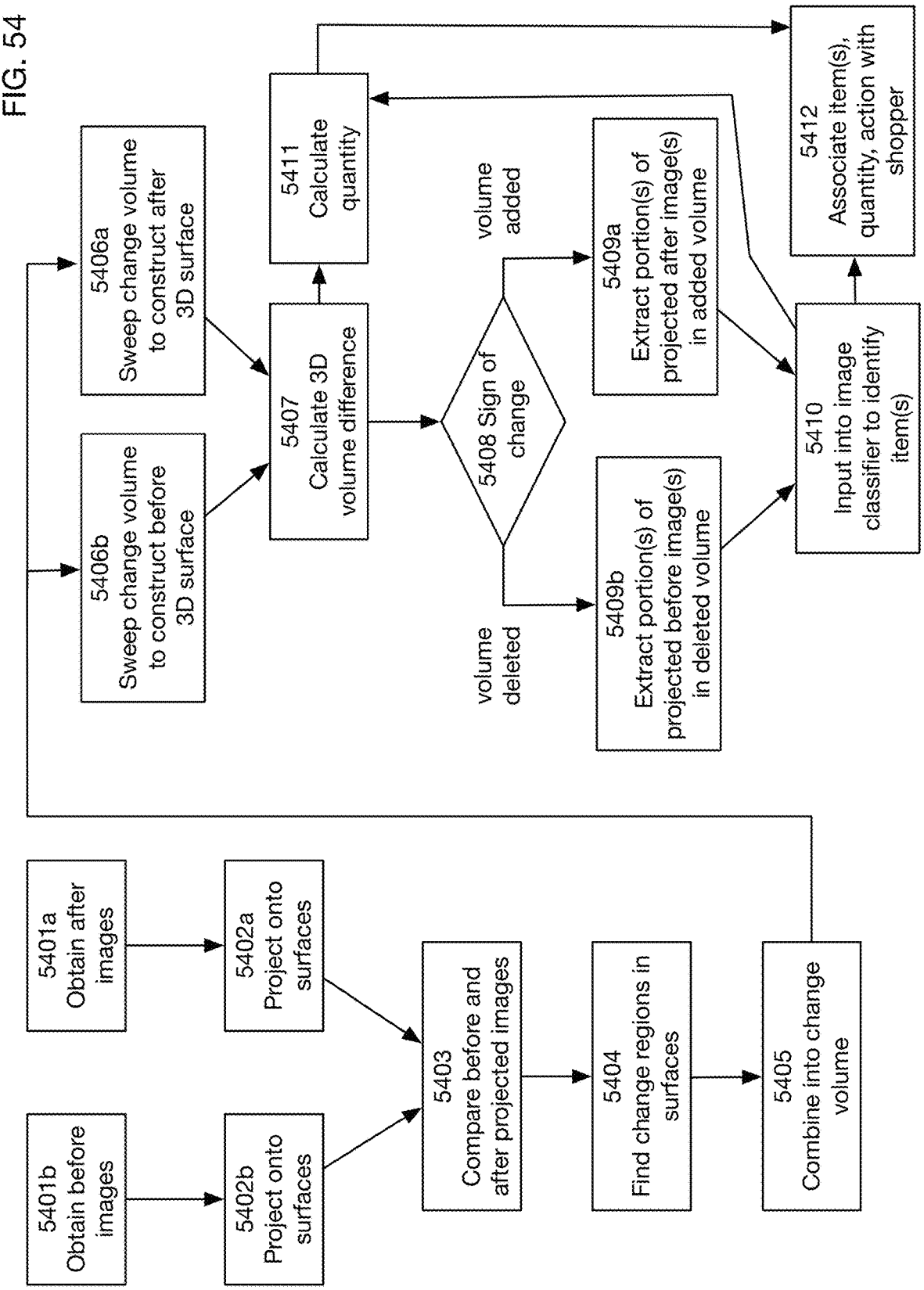
FIG. 54 shows an illustrative flowchart for a process that may be used in one or more embodiments to determine removal of, addition of, or movement of items on a shelf or other storage area; this process combines projected images from multiple cameras onto multiple surfaces to determine changes.

FIG. 54 shows a flowchart of an illustrative sequence of steps that may be used in one or more embodiments to identify items in an item storage area that move. These steps may be reordered, combined, rearranged, or otherwise modified in one or more embodiments; some steps may be omitted in one or more embodiments. These steps may be executed by any processor or combination or network of processors, including for example, without limitation, processors integrated into shelves or other item storage units, store processors that process information from across the store or in a region in the store, or processors remote from the store. Steps 5401*a* and 5401*b* obtain camera images from the multiple cameras that observe the item storage area. Step 5401*b* obtains a "before" image from each camera, which was captured prior to the start of the shopper's interaction with the item storage area; step 5401*a* obtains an "after" image from each camera, after this interaction. (The discussion below with respect to FIG. 55 describes these image captures in greater detail.) Thus, if there are C cameras observing the item storage area, 2C images are obtained—C "before" images and C "after" images.

Steps 5402*b* and 5402*a* project the before and after images, respectively, from each camera onto surfaces in the item storage area. These projections may be similar for example to the projections of shopper images described above with respect to FIG. 33. The cameras that observe the item storage area may include for example fisheye cameras that capture a wide field of view, and the projections may map the fisheye images onto planar images. The surfaces onto which images are projected may be surfaces of any shapes or orientations. In the simplest scenario, the surfaces may be for example parallel planes at different heights above a shelf. The surfaces may also be vertical planes, slanted planes, or curved surfaces. Any number of surfaces may be used. If there are C cameras observing the item storage area, and images from these cameras are each projected onto S surfaces, then after steps 5202*a* and 5402*b* there will be C×S projected after images and C×S projected before images, for a total of 2C×S projected images.

Step 5403 then compares the before and after projected images. Embodiments may use various techniques to compare images, such as pixel differencing, feature extraction and feature comparison, or input of image pairs into a machine learning system trained to identify differences. The result of step 5403 may be C×S image comparisons, each comparing before and after images from a single camera projected to a single surface. These comparisons may then be combined across cameras in step 5404 to identify a change region for each surface. The change region for a surface may be for example a 2D portion of that surface where multiple camera projections to that 2D portion indicate a change between the before and after images. It may represent a rough boundary around a region where items may have moved. Generally, the C×S image comparisons will be combined in step 5404 into S change regions, one associated with each surface. Step 5405 then combines the S change regions into a single change volume in 3D space within the item storage area. This change volume may be for example a bounding box or other shape that contains all of the S change regions.

Steps 5406*b* and 5406*a* then construct before and after 3D surfaces, respectively, within the change volume. These surfaces represent the surfaces of the contents of the item storage area within the change volume before and after the shopper interaction with the items. The 3D surfaces may be constructed using a plane-sweep stereo algorithm or a similar algorithm that determines 3D shape from multiple camera views. Step 5407 then compares these two 3D surfaces to determine the 3D volume difference between the before contents and the after contents. Step 5408 then checks the sign of the volume change: if volume is added from the before to the after 3D surface, then one or more items have been put on the shelf; if volume is deleted, then one or more items have been taken from the shelf.

Images of the before or after contents of the 3D volume difference may then be used to determine what item or items have been taken or added. If volume has been deleted, then step 5409*b* extracts a portion of one or more projected before images that intersect the deleted volume region; similarly, if volume has been added, then step 5409*a* extracts a portion of one or more projected after images that intersect the added volume region. The extracted image portion or portions may then be input in step 5410 into an image classifier that identifies the item or items removed or added. The classifier may have been trained on images of the items available in the store. In one or more embodiments the classifier may be a neural network; however, any type of system that maps images into item identities may be used.

In one or more embodiments, the shape or size of the 3D volume difference, or any other metrics derived from the 3D volume difference, may also be input into the item classifier. This may aid in identifying the item based on its shape or size, in addition to its appearance in camera images.

The 3D volume difference may also be used to calculate in step 5411 the quantity of items added or removed from the item storage area. This calculation may occur after identifying the item or items in step 5410, since the volume of each item may be compared with the total volume added or removed to calculate the item quantity.

The item identity determined in step 5410 and the quantity determined in step 5411 may then be associated in step 5412 with the shopper who interacted with the item storage area. Based on the sign 5408 of the volume change, the system may also associate an action such as put, take, or move with the shopper. Shoppers may be tracked through the store for example using any of the methods described above, and proximity of a shopper to the item storage area during the interaction time period may be used to identify the shopper to associate with the item and the quantity.

FIG. 55 illustrates components that may be used to implement steps 5401*a* and 5401*b* of FIG. 55, to obtain after images and before images from the cameras. Acquisition of before and after images may be triggered by events generated by one or more sensor subsystems 5501 that detect when a shopper enters or exits an item storage area. Sensors 5501 may for example include side-facing cameras 4301 and 4302, in combination with a processor or processors that analyze images from these cameras to detect when a shopper reaches into or retracts from an item storage area. Embodiments may use any type or types of sensors to detect entry and exit, including but not limited to cameras, motion sensors, light screens, or detectors coupled to physical doors or other barriers that are opened to enter an item storage area. For the camera sensors 4301 and 4302 illustrated in FIG. 55, images from these cameras may for example be analyzed by processor 4502 that is integrated into the shelf 4212 above the item storage area, by store processor 130, or by a combination of these processors. Image analysis may for example detect changes and look for the shape or size of a hand or arm.

The sensor subsystem 5501 may generate signals or messages when events are detected. When the sensor subsystem detects that a shopper has entered or is entering an item storage area, it may generate an enter signal 5502, and when it detects that the shopper has exited or is exiting this area, it may generate an exit signal 5503. Entry may correspond for example to a shopper reaching a hand into a space between shelves, and exit may correspond to the shopper retracting the hand from this space. In one or more embodiments these signals may contain additional information, such as for example the item storage area affected, or the approximate location of the shopper's hand. The enter and exit signals trigger acquisition of before and after images, respectively, captured by the cameras that observe the item storage area with which the shopper interacts. In order to obtain images prior to the enter signal, camera images may be continuously saved in a buffer. This buffering is illustrated in FIG. 55 for three illustrative cameras 4311*a*, 4311*b*, and 4312*a* mounted on the underside of shelf 4212. Frames captured by these cameras are continuously saved in circular buffers 5511, 5512, and 5513, respectively. These buffers may be in a memory integrated into or coupled to processor 4502, which may also be integrated into shelf 4212. In one or more embodiments, camera images may be saved to a memory located anywhere, including but not limited to a memory physically integrated into an item storage area shelf or fixture. For the architecture illustrated in FIG. 55, frames are buffered locally in the shelf 4212 that also contains the cameras; this architecture limits network traffic between the shelf cameras and devices elsewhere in the store. The local shelf processor 4502 manages the image buffering, and it may receive the enter signal 5502 and exit signals 5503 from the sensor subsystem. In one or more embodiments, the shelf processor 4502 may also be part of the sensor subsystem, in that this processor may analyze images from the side cameras 4301 and 4302 to determine when the shopper enters or exits the item storage area.

When the enter and exit signals are received by a processor, for example by the shelf processor 4502, the store server 130, or both, the processor may retrieve before images 5520*b* from the saved frames in the circular buffers 5511, 5512, and 5513. The processor may lookback prior to the enter signal any desired amount of time to obtain before images, limited only by the size of the buffers. The after images 5520*a* may be retrieved after the exit signal, either directly from the cameras or from the circular buffers. In one or more embodiments, the before and after images from all cameras may be packaged together into an event data record, and transmitted for example to a store server 130 for analyses 5521 to determine what item or items have been taken from or put onto the item storage area as a result of the shopper's interaction. These analyses 5521 may be performed by any processor or combination of processors, including but not limited to shelf processors such as 4502 and store processors such as 130.

Figure 56A:
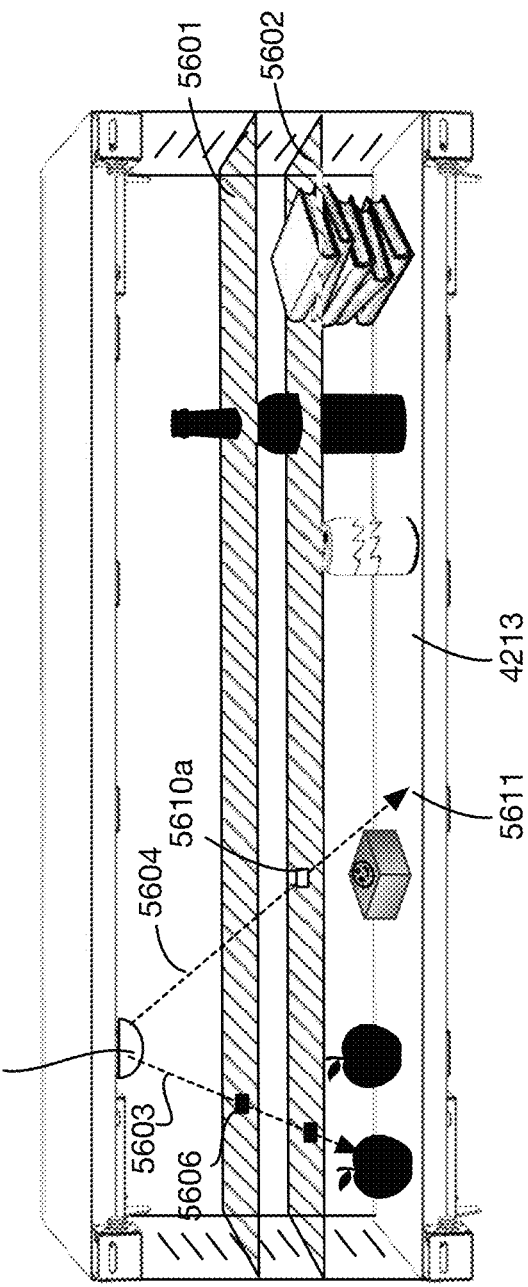
FIGS. 56A and 56B show projections of camera images onto illustrative planes in an item storage area.
Figure 56B:
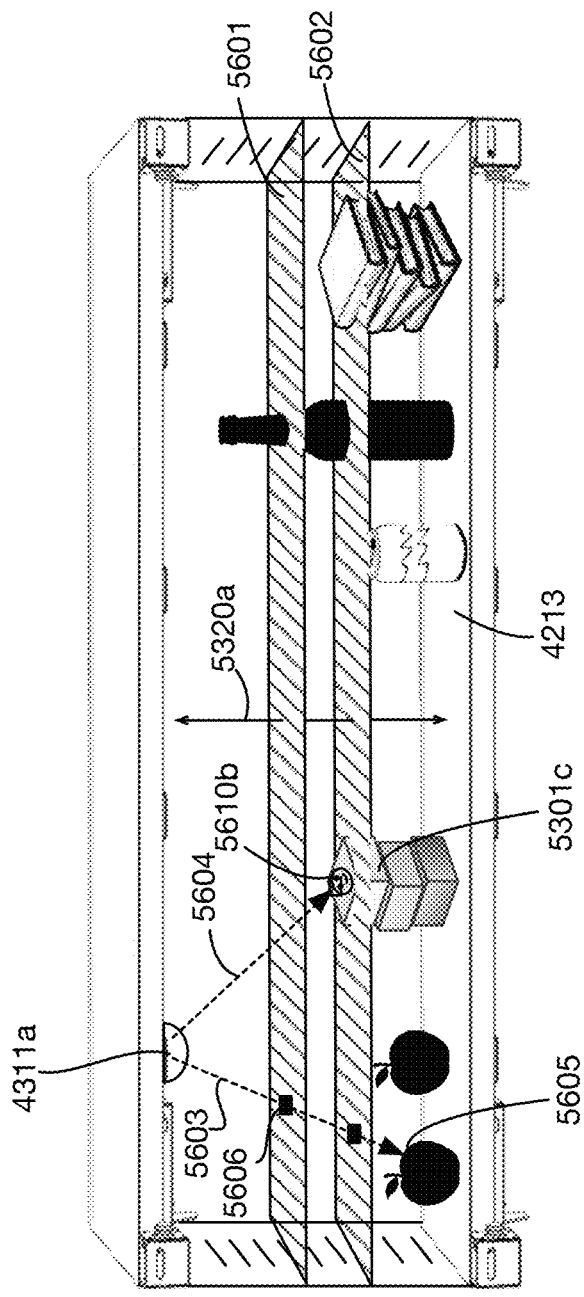

Analyses 5521 to identify items taken, put, or moved from the set of before and after images from the cameras may include projection of before and after images onto one or more surfaces. The projection process may be similar for example to the projections described above with respect to FIGS. 33 through 40 to track people moving through a store. Cameras observing an item storage area may be, but are not limited to, fisheye cameras. FIGS. 56B and 56A show projection of before and after images, respectively, from camera 4311*a* onto two illustrative surfaces 5601 and 5602 in the item storage area illustrated in FIGS. 53B and 53A. Two surfaces are shown for ease of illustration; images may be projected onto any number of surfaces. In this example, the surfaces 5601 and 5602 are planes that are parallel to the item storage shelf 4213, and are perpendicular to axis 5620*a* that sweeps from this shelf to the shelf above. Surfaces may be of any shape and orientation; they are not necessarily planar nor are they necessarily parallel to a shelf. Projections may map pixels along rays from the camera until they intersect with the surface of projection. For example, pixel 5606 at the intersection of ray 5603 with projected plane 5601 has the same color in both the before projected image in FIG. 56B and the after projected image in FIG. 56A, because object 5605 is unchanged on shelf 4213 from the before state to the after state. However, pixel 5610*b* in plane 5602 along ray 5604 in FIG. 56B reflects the color of object 5301*c*, but pixel 5610*a* in plane 5602 reflects the color of the point 5611 of shelf 4213, since item 5301*c* is removed between the before state and the after state.

Projected before and after images may be compared to determine an approximate region in which items may have been removed, added, or moved. This comparison is illustrated in FIG. 57A. Projected before image 5701*b* is compared to projected after image 5701*a*; these images are both from the same camera, and are both projected to the same surface. One or more embodiments may use any type of image comparison to compare before and after images. For example, without limitation, image comparison may be a pixel-wise difference, a cross-correlation of images, a comparison in the frequency domain, a comparison of one image to a linear transformation of another, comparisons of extracted features, or a comparison via a trained machine learning system that is trained to recognize certain types of image differences. FIG. 57A illustrates a simple pixel-wise difference operation 5403, which results in a difference image 5702. (Black pixels illustrate no difference, and white pixels illustrate a significant difference.) The difference 5702 may be noisy, due for example to slight variations in lighting between before and after images, or to inherent camera noise. Therefore, one or more embodiments may apply one or more operations 5704 to process the image difference to obtain a difference region. These operations may include for example, without limitation, linear filtering, morphological filtering, thresholding, and bounding operations such as finding bounding boxes or convex hulls. The resulting difference 5705 contains a change region 5706 that may be for example a bounding box around the irregular and noisy area of region 5703 in the original difference image 5702.

Figure 57B:
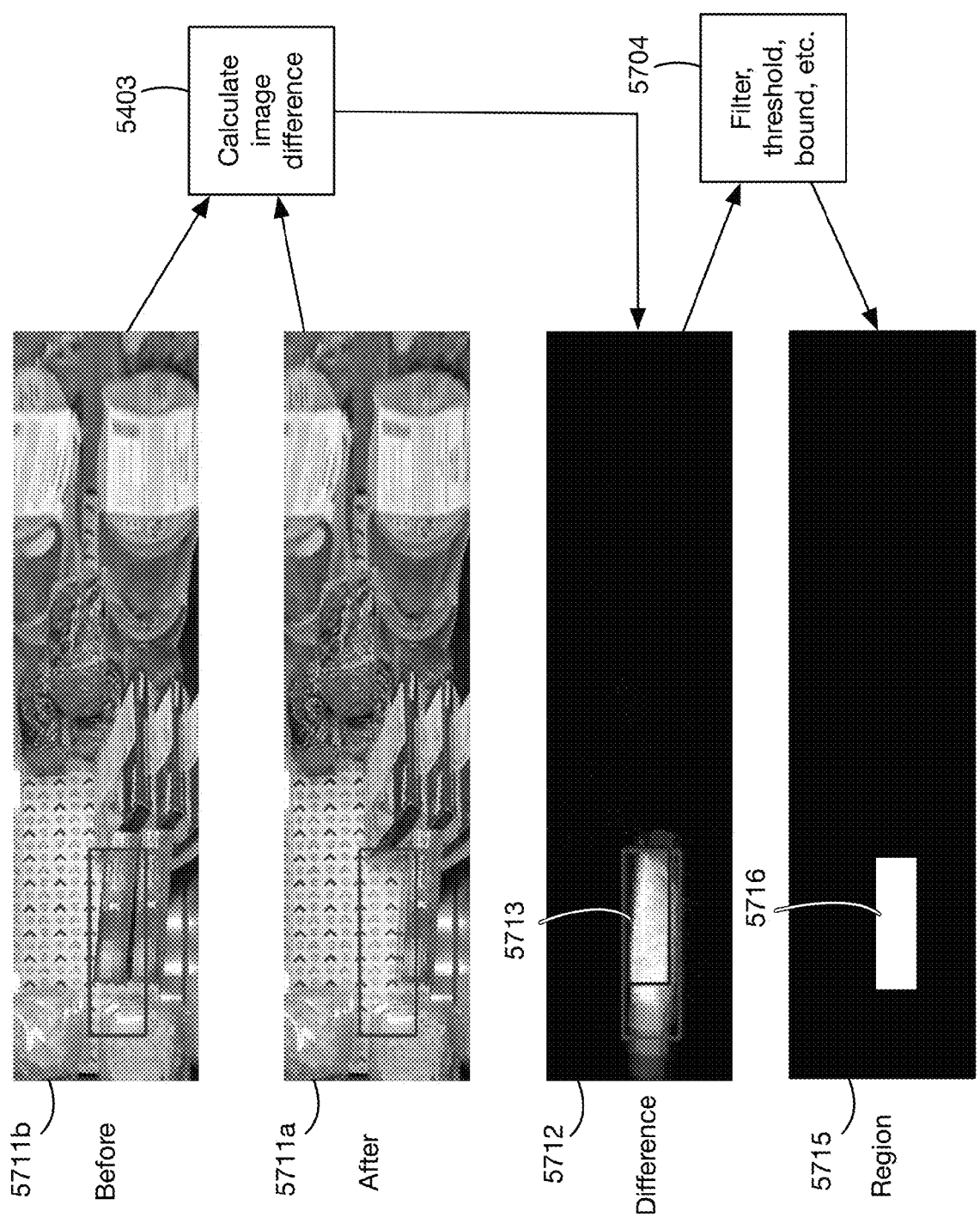
FIG. 57B shows the comparison process of FIG. 57A applied to actual images from a sample shelf.

FIG. 57B illustrates image differencing on before projected image 5711*b* and after projected image 5711*a* captured from an actual sample shelf. The difference image 5712 has a noisy region 5713 that is filtered and bounded to identify a change region 5716.

Figure 58:
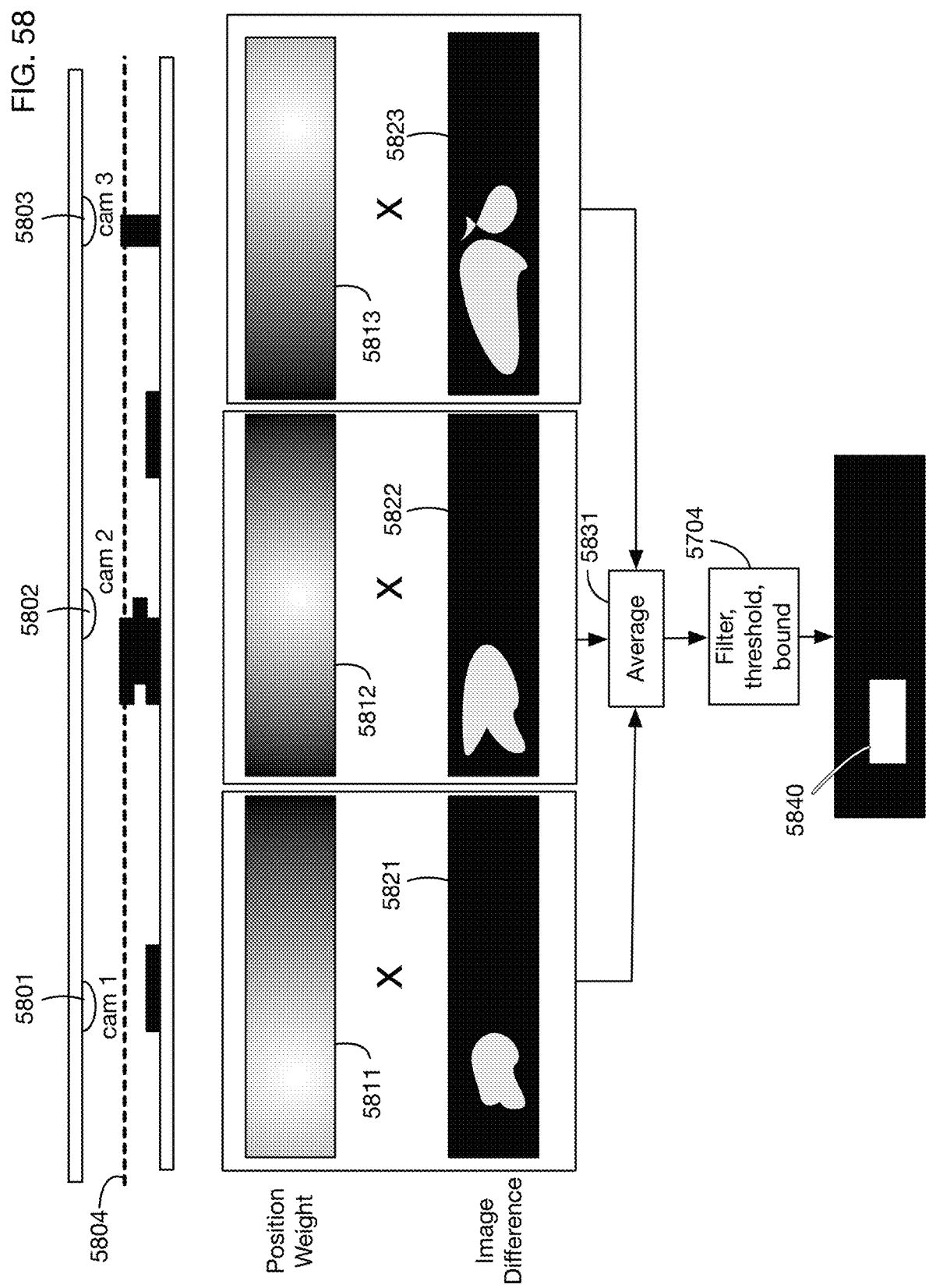
FIG. 58 shows an illustrative process that combines image differences from multiple cameras, with weights applied to each image difference based on the distance of each projected pixel from the respective camera.

Projected image differences, using any type of image comparison, may be combined across cameras to form a final difference region for each projected surface. This process is illustrated in FIG. 58. Three cameras 5801, 5802, and 5803 capture images of an item storage area before and after a shopper interaction, and these images are projected onto plane 5804. The differences between the projected before and after images are 5821, 5822, and 5823 for cameras 5801, 5802, and 5803, respectively. While these differences may be combined directly (for example by averaging them), one or more embodiments may further weight the differences on a pixel basis by a factor that reflects the distance of each projected pixel to the respective camera. This process is similar to the weighting described above with respect to FIG. 38 for weighting of projected images of shoppers for shopper tracking. Illustrative pixel weights associated with images 5821, 5822, and 5823 are 5811, 5812, and 5813, respectively. Lighter pixels in the position weight images represent higher pixel weights. The weights may be multiplied by the image differences, and the products may be averaged in operation 5831. The result may then be filtered or otherwise transformed in operation 5704, resulting in a final change region 5840 for that projected plane 5804.

Figure 59:
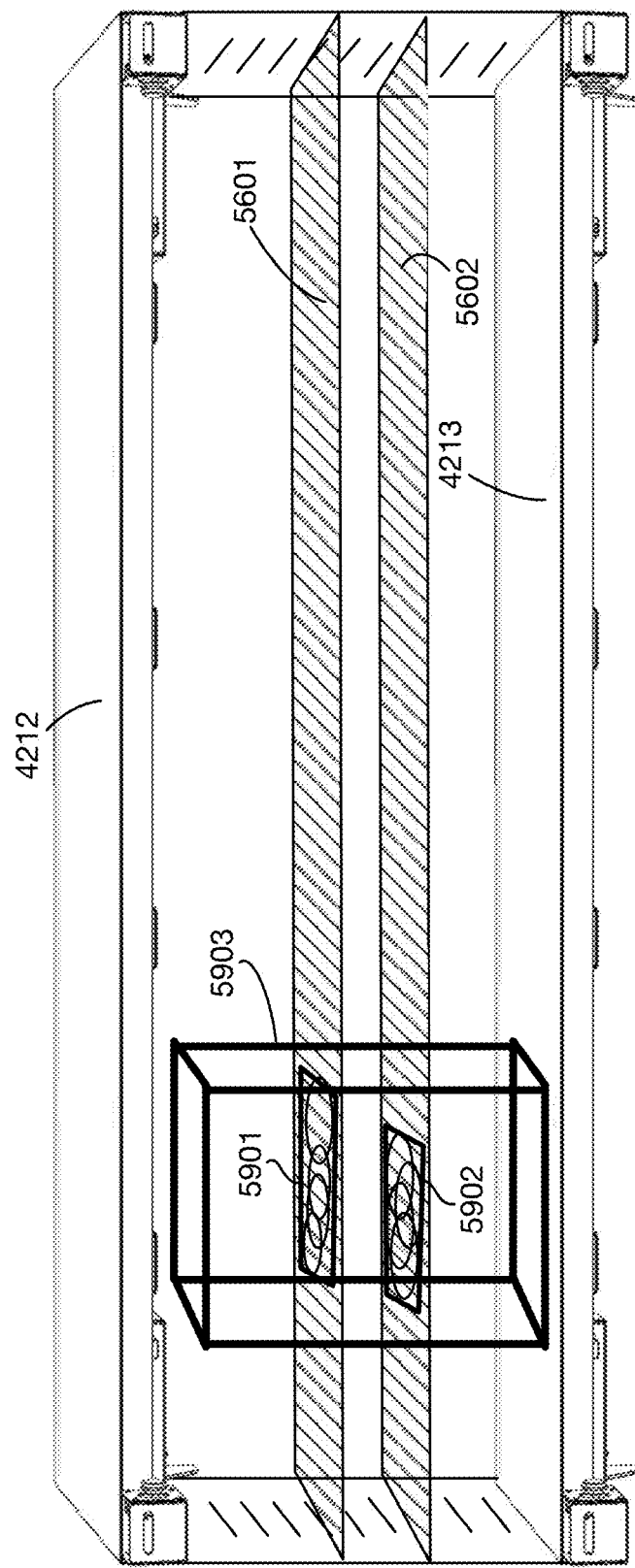
FIG. 59 illustrates combining image differences in multiple projected planes to determine a change volume within which items may have moved.

After calculating difference regions in various projected planes or other surfaces, one or more embodiments may combine these change regions to create a change volume. The change volume may be a three-dimensional volume within the item storage area within which one or more items appear to have been taken, put, or moved. Change regions in projected surfaces may be combined in any manner to form a change volume. In one or more embodiments, the change volume may be calculated as a bounding volume that contains all of the change regions. This approach is illustrated in FIG. 59, where change region 5901 in projected plane 5601, and change region 5902 in projected plane 5602, are combined to form change volume 5903. In this example the change volume 5903 is a three-dimensional box whose extent in the horizontal direction is the maximum extent of the change regions of the projected planes, and which spans the vertical extent of the item storage area. One or more embodiments may generate change volumes of any shape or size.

Figure 60:
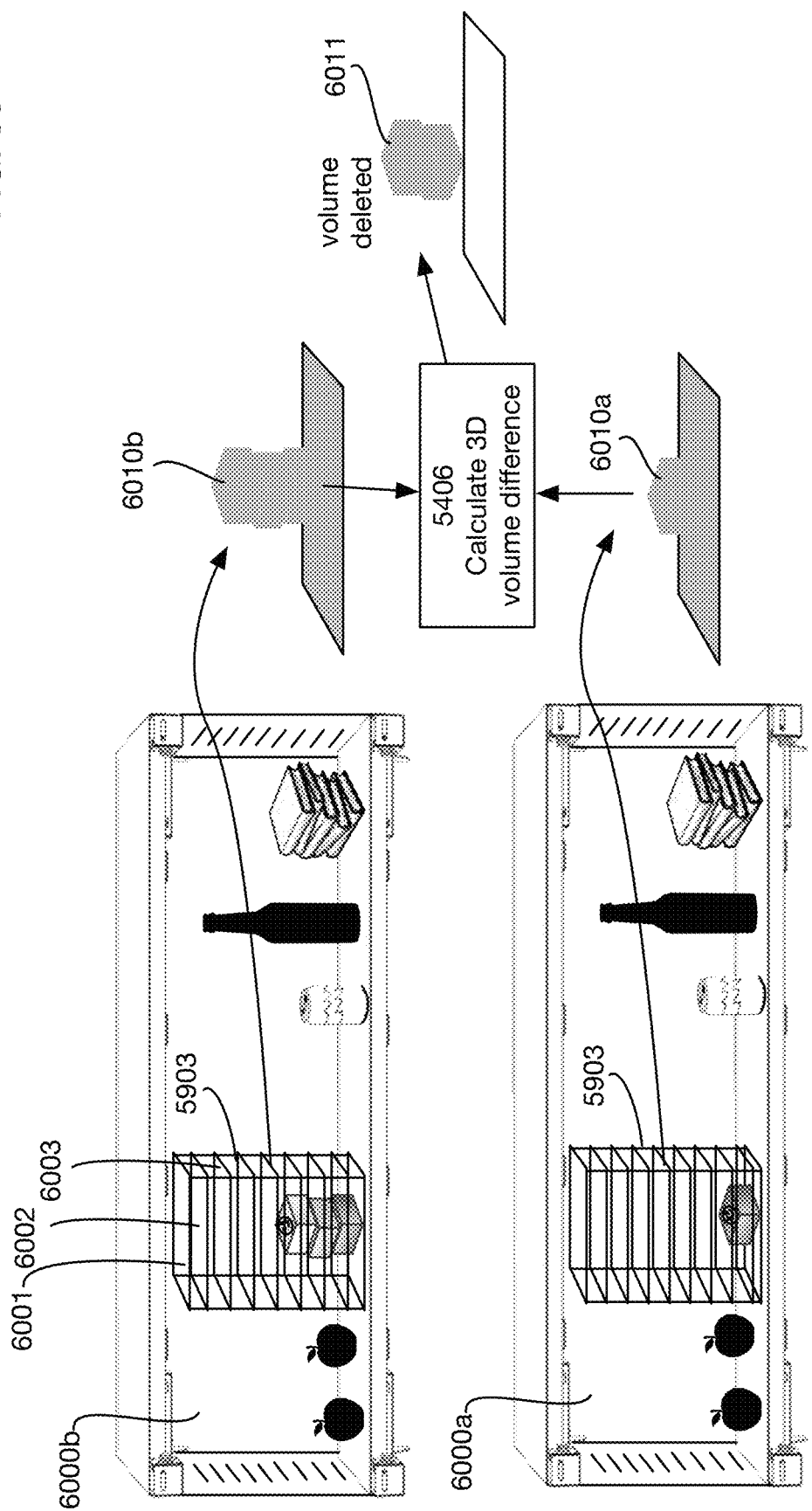
FIG. 60 shows illustrative sweeping of the change volume with projected image planes before and after shopper interaction, in order to construct a 3D volume difference between shelf contents before and after the interaction.

A detailed analysis of the differences in the change volume from the before state to the after state may then be performed to identify the specific item or items added, removed, or moved in this change volume. In one or more embodiments, this analysis may include construction of 3D surfaces within the change volume that represent the contents of the item storage area before and after the shopper interaction. These 3D before and after surfaces may be generated from the multiple camera images of the item storage area. Many techniques for construction of 3D shapes from multiple camera images of a scene are known in the art; embodiments may use any of these techniques. One technique that may be used is plane-sweep stereo, which projects camera images onto a sequence of multiple surfaces, and locates patches of images that are correlated across cameras on a particular surface. FIG. 60 illustrates this approach for the example from FIGS. 53A and 53B. The bounding 3D change volume 5903 is swept with multiple projected planes or other surfaces; in this example the surfaces are planes parallel to the shelf. For example, from the top, successive projected planes are 6001, 6002, and 6003. The projected planes or surfaces may be the same as or different from the projected planes or surfaces used in previous steps to locate change regions and the change volume. For example, sweeping of the change volume 5903 may use more planes or surfaces to obtain a finer resolution estimate of the before and after 3D surfaces. Sweeping of the before contents 6000*b* of the item storage within the change volume 5903 generates 3D before surface 6010*b*; sweeping of the after contents 6000*a* within the change volume 5903 generates 3D after surface 6010*a*. Step 5406 then calculates the 3D volume difference between these before and after 3D surfaces. This 3D volume difference may be for example the 3D space between the two surfaces. The sign or direction of the 3D volume difference may indicate whether items have been added or removed. In the example of FIG. 60, after 3D surface 6010*a* is below before 3D surface 6010*b*, which indicates that an item or items have been removed. Thus, the volume deleted 6011 between the surfaces 6010*b* and 6010*a* is the volume of items removed.

FIG. 61 shows an example of plane-sweep stereo applied to a sample shelf containing items of various heights. Images 6111, 6112, and 6113 each show two projected images from two different cameras superimposed on one another. The projections are taken at different heights: images 6111 are at projected to the lowest height 6101 at shelf level; images 6112 are projected to height 6102; and images 6113 are projected to height 6103. At each projected height, patches of the two superimposed images that are in focus (in that they match) represent objects whose surfaces are at that projected height. For example, patch 6121 of superimposed images 6111 is in focus at the height 6101, as expected since these images show the shelf itself. Patch 6122 is in focus in superimposed images 6112, so these objects are at height 6102; and patch 6123 is in focus in superimposed images 6113, so this object (which is a top lid of one of the containers) is at height 6103.

Figure 62:
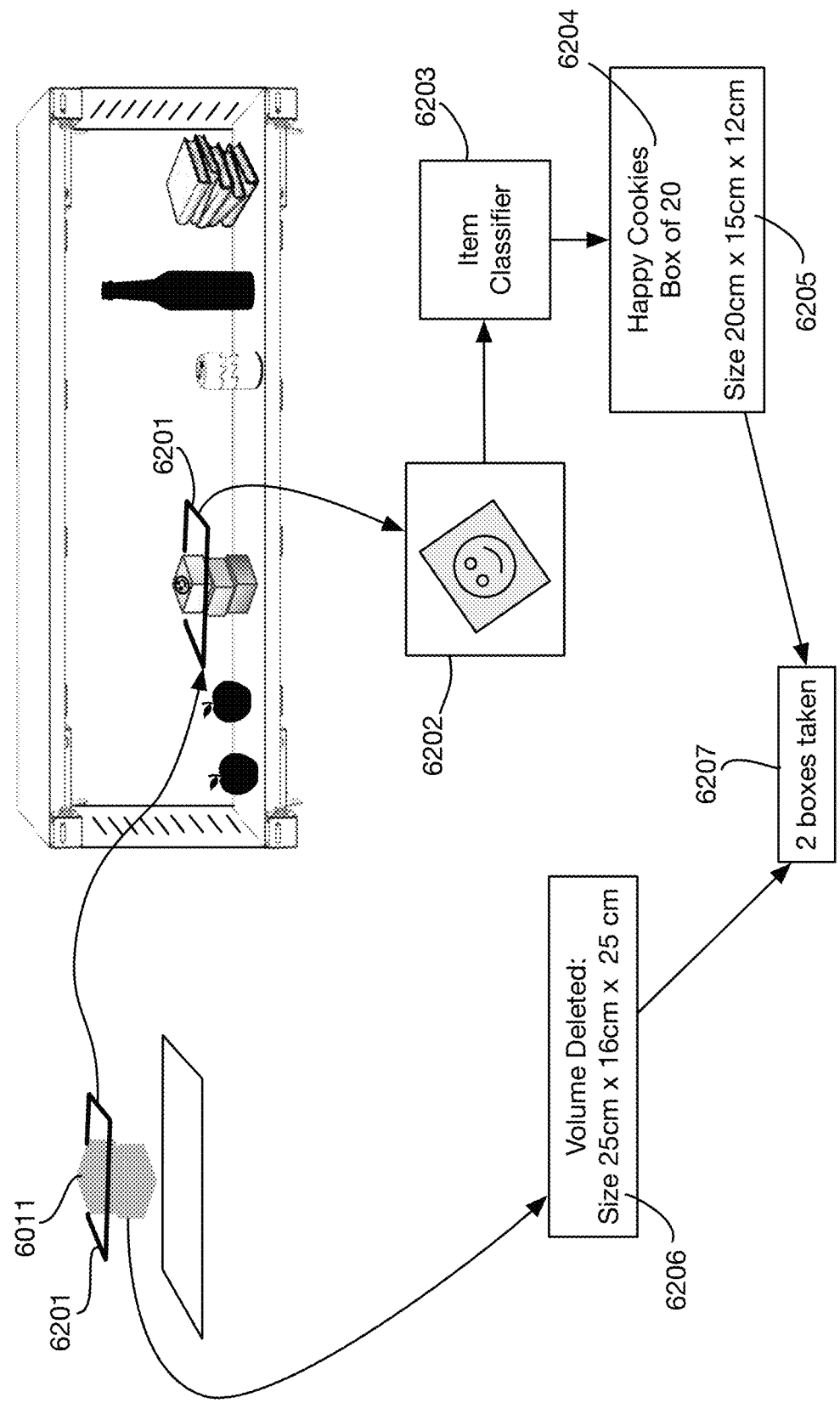
FIG. 62 illustrates identification of items using an image classifier and calculation of the quantity of items added to or removed from a shelf.

The 3D volume difference indicates the location of items that have been added, removed, or moved; however, it does not directly provide the identity of these items. In some situations, the position of items on a shelf or other item storage area may be fixed, in which case the location of the volume difference may be used to infer the item or items affected. In other situations, images of the area of the 3D volume difference may be used to determine the identity of the item or items involved. This process is illustrated in FIG. 62. Images from one or more cameras may be projected onto a surface patch 6201 that intersects 3D volume difference 6011. This surface patch 6201 may be selected to be only large enough to encompass the intersection of the projected surface with the volume difference. In one or more embodiments, multiple surface patches may be used. Projected image 6202 (or multiple such images) may be input into an item classifier 6203, which for example may have been trained or programmed to recognize images of items available in a store and to output the identity 6204 of the item.

The size and shape of the 3D volume difference 6011 may also be used to determine the quantity of items added to or removed from an item storage area. Once the identity 6204 of the item is determined, the size 6205 of a single item may be compared to the size 6206 of the 3D volume difference. The item size for example may be obtained from a database of this information for the items available in the store. This comparison may provide a value 6207 for the quantity of items added, removed, or moved. Calculations of item quantities may use any features of the 3D volume difference 6011 and of the item, such as the volume, dimensions, or shape.

Figure 63:
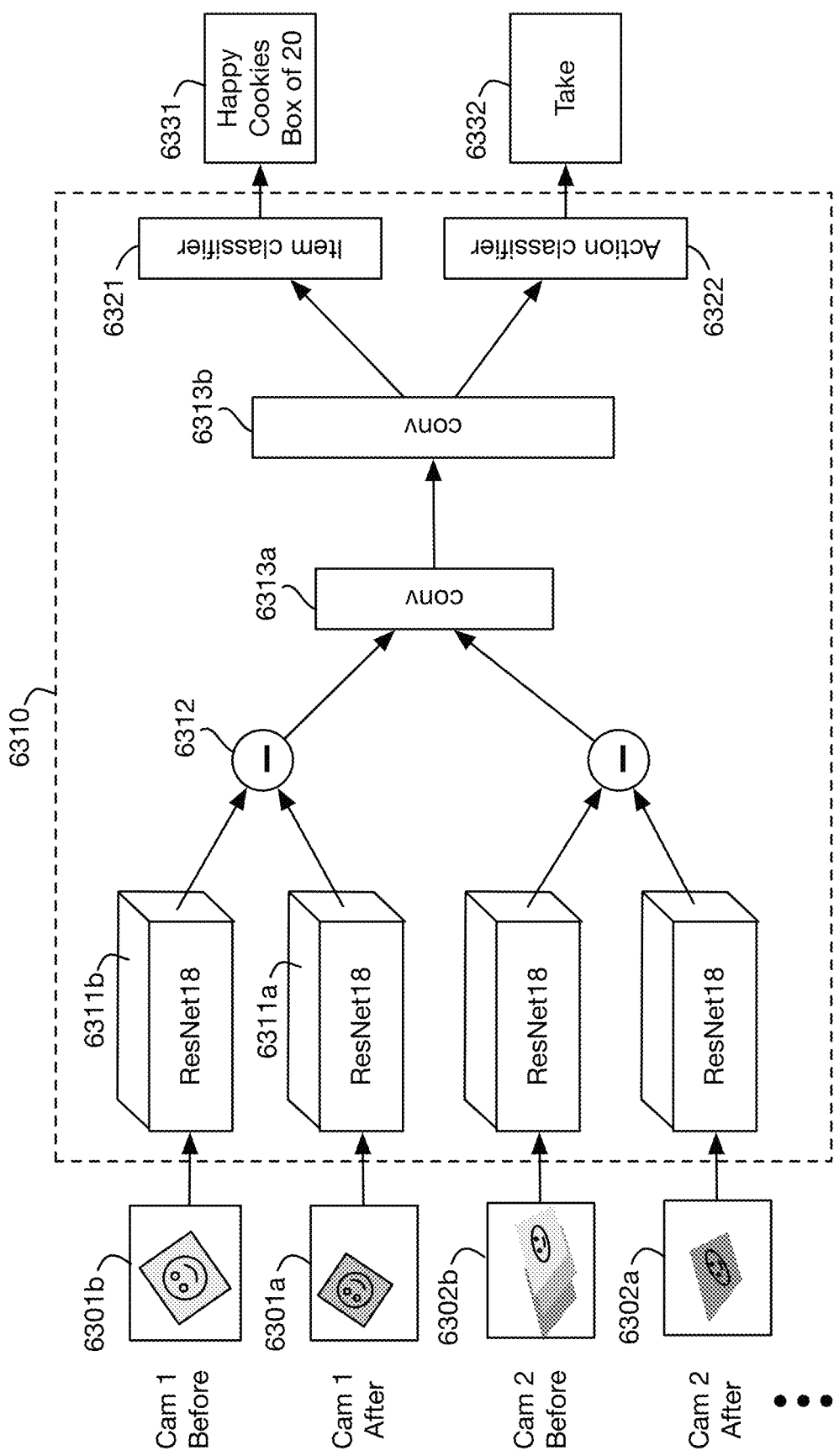
FIG. 63 shows a neural network that may be used in one or more embodiments to identify items moved by a shopper, and the action the shopper takes on those items, such as taking from a shelf or putting onto a shelf.

Instead of or in addition to using the sign of the 3D volume difference to determine whether a shopper has taken or placed items, one or more embodiments may process before and after images together to simultaneously identify the item or items moved and the shopper's action on that item or those items. Simultaneous classification of items and actions may be performed for example using a convolutional neural network, as illustrated in FIG. 63. Inputs to the convolutional neural network 6310 may be for example portions of projected images that intersect change regions, as described above. Portions of both before and after projected images from one or more cameras may be input to the network. For example, a stereo pair of cameras that is closest to the change region may be used. One or more embodiments may use before and after images from any number of cameras to classify items and actions. In the example shown in FIG. 63, before image 6301b and after image 6301a from one camera, and before image 6302b and after image 6302a from a second camera are input into the network 6310. The inputs may be for example crops of the projected camera images that cover the change region.

Outputs of network 6310 may include an identification 6331 of the item or items displaced, and an identification 6332 of the action performed on the item or items. The possible actions may include for example any or all of "take," "put", "move", "no action", or "unknown." In one or more embodiments, the neural network 6310 may perform some or all of the functions of steps 5405 through 5411 from the flowchart of FIG. 54, by operating directly on before and after images and outputting items and actions. More generally, any or all of the steps illustrated in FIG. 54 between obtaining of images and associating items, quantities, and actions with shoppers may be performed by one or more neural networks. An integrated neural network may be trained end-to-end for example using training datasets of sample interactions that include before and after camera images and the items, actions, and quantities involved in an interaction.

One or more embodiments may use a neural network or other machine learning systems or classifiers of any type and architecture. FIG. 63 shows an illustrative convolutional neural network architecture that may be used in one or more embodiments. Each of the image crops 6301b, 6301a, 6302b, and 6302a is input into a copy of a feature extraction layer. For example, an 18-layer ResNet network 6311b may be used as a feature extractor for before image 6301b, and an identical 18-layer ResNet network 6311a may be used as a feature extractor for after image 6301a, with similar layers for the inputs from other cameras. The before and after feature map pairs may then be subtracted, and the difference feature maps may be concatenated along the channel dimension, in operation 6312 (for the camera 1 before and after pairs, with similar subtraction and concatenation for other cameras). In an illustrative network, after concatenation the number of channels may be 1024. After merging the feature maps, there may be two or more convolutional layers, such as layers 6313a and 6313b, followed by two parallel fully connected layers 6321 for item identification and 6322 for action classification. The action classifier 6322 has outputs for the possible actions, such as "take," "place", or "no action". The item classifier has outputs for the possible products available in the store. The network may be trained end-to-end, starting for example with pre-trained ImageNet weights for the ResNet layers.

In some applications, it may be undesirable or impossible to replace existing shelving fixtures in a store entirely with smart shelves. It may therefore be beneficial to use a variation of the smart shelf invention that may be retrofit onto existing shelving. FIGS. 64A through 68 show an illustrative embodiment of a sensor bar that can be installed onto existing shelves. This illustrative sensor bar may contain components similar to those described for a smart shelf such as shelf 4212 of FIGS. 42 through 45. It may provide similar functionality by detecting shopper actions and by capturing images that may be used to identify items that a shopper removes from or adds to a shelf. The sensor bar shown in FIG. 64A through 68 is installed at or near the front of a shelf, and it monitors the shelf below. Another potential benefit of this configuration, in addition to the ability to be installed into existing shelving, is that the sensor bar electronics are not located below or above items on the shelves. As a result, the sensor bar electronics are less vulnerable to spills or contamination from leaking items or from shelf cleaning. In addition, when the sensor bar is on the front edge of a shelf, power consumed by the sensor bar does not directly heat the shelves, which may be important for certain types of products.

Figure 64A:
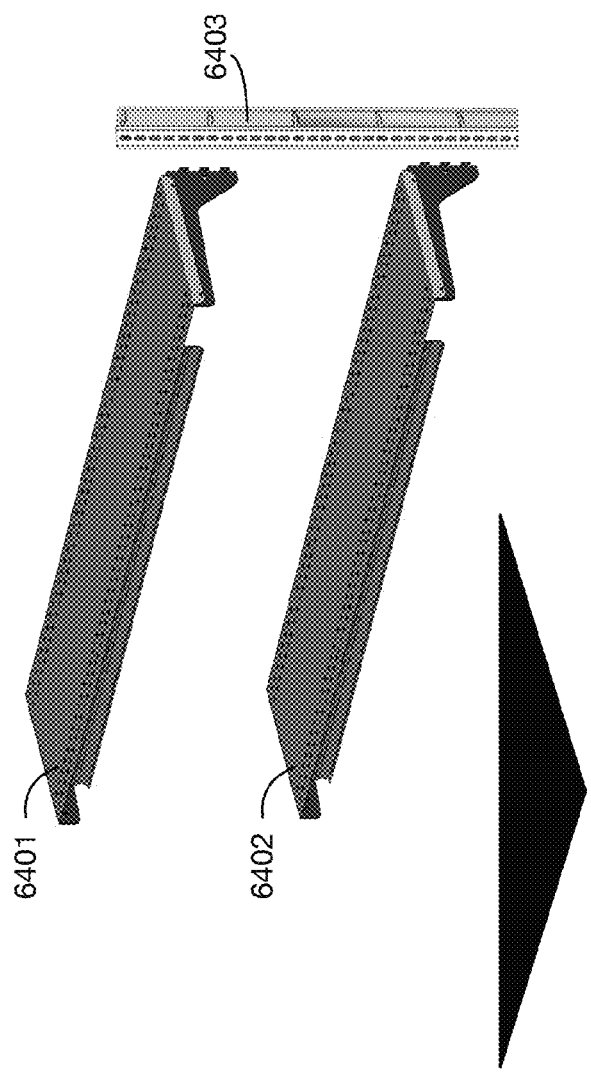
FIGS. 64A and 64B illustrate a sensor bar that can be installed into existing shelving to form a smart shelving system that monitors shopper actions.
Figure 64B:
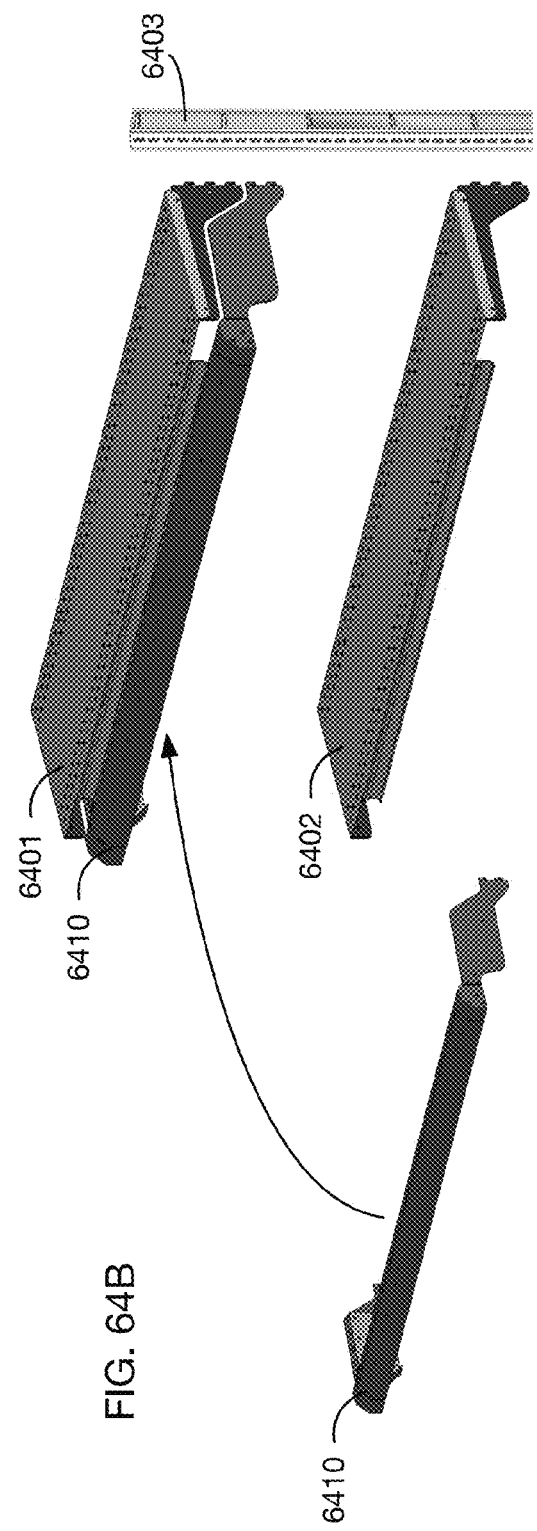

FIG. 64A shows a portion of an illustrative shelving system that may be installed in a store or similar environment. An upper shelf 6401 and a lower shelf 6402 may be mounted for example to a shelf support system that includes an upright 6403 with slots to receive shelf mounting brackets; a similar upright may receive brackets on the other sides of the shelves (not shown). In one or more embodiments, the shelving brackets and uprights may be part of a gondola shelving system, for example. In this illustrative scenario, rather than replacing shelves 6401 and 6402 with smart shelves, a separate sensor bar 6410 may be installed as shown in FIG. 64B along the front edge of shelf 6401. This sensor bar monitors items on the lower shelf 6402, as described below. Similar sensor bars may be installed on other shelves or fixtures to monitor other shelves. No modifications may be needed to the existing shelving to use the sensor bar, for example to convert an existing store to a fully or partially autonomous store. The illustrative sensor bar 6410 may be installed into the uprights, such as upright 6403, using brackets that are compatible with the existing shelving system. In one or more embodiments, sensor bar brackets or other mounting hardware may differ based on the type of shelving system in use in a store. Illustrative sensor bar 6410 is configured to be installed along or near the front edge of shelf 6410; one or more embodiments may configure sensor bars to be installed in other locations, such as for example along the sides of shelves, along the back edges of shelves, or in any other locations that allow the sensor bar to monitor the shelves.

Figure 65:
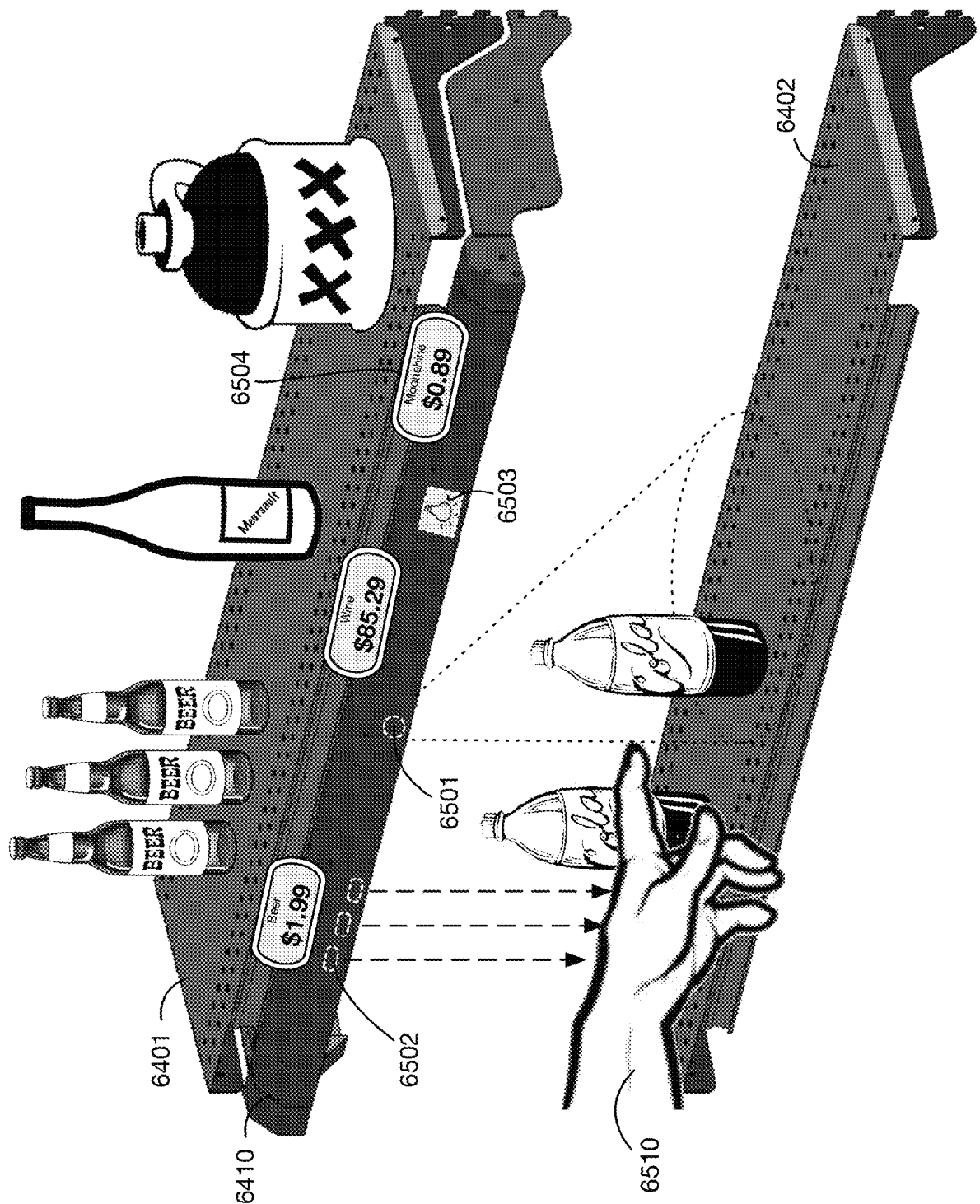
FIG. 65 shows illustrative operation of the sensor bar of FIG. 64B to detect entry of a shopper's hand into a shelf and to monitor item movement using cameras.

FIG. 65 shows illustrative operation of the sensor bar 6410 to monitor shopper actions and item changes. As described below, sensor bar 6410 may for example contain cameras such as camera 6501 that are oriented to view items on the shelf below the sensor bar. Sensor bars may contain any number of cameras. For sensor bars installed at the front edge of a shelf, the cameras may be oriented at an angle to provide a full view of the items on the shelf below. Sensor bar 6410 may also contain one or more sensors that detect shopper interactions with the shelf. For example, bar 6410 contains distance sensors such as sensor 6502 that may be used to detect when a shopper's hand 6510 reaches towards items on a shelf. The distance sensors may for example monitor a detection zone between the shelves 6401 and 6402, which may include all or portions of a vertical plane at or near the front of the shelves; when a shopper's hand enters or exits this detection zone, the changes in the distance signals from the distance sensors may be used to identify the hand entry or hand exit event. For example, when no hand is in the detection zone, distance sensors in the sensor bar that point downwards at the shelf below may measure the distance to the shelf below; when a hand 6510 enters between the sensor bar and the shelf below, the distance measurement of one or more of these distance sensors may be reduced. A hand entry may for example be detected when one or more of the distance signals change by more than a threshold amount. If the sensor bar contains multiple distance sensors, the location of the distance sensor or sensors with distance changes may be used to determine where along the shelf the hand is entering. When the hand exits the shelf, the distance signals may return to previous values (which for example may measure the distance from the sensor bar to the shelf below); this return of distance signals may be used to determine a hand exit event.

In one or more embodiments, sensor bar 6410 may also contain one or more lights 6503, which may for example illuminate items on the shelf 6402 below. It may also contain or be coupled to one or more electronic labels, such as label 6504. These labels may use technologies such as electronic ink or other display technologies. The labels may be used for example to label the items on the shelf 6401 against which the sensor bar is placed, or to display prices, barcodes, or other information.

Figure 66:
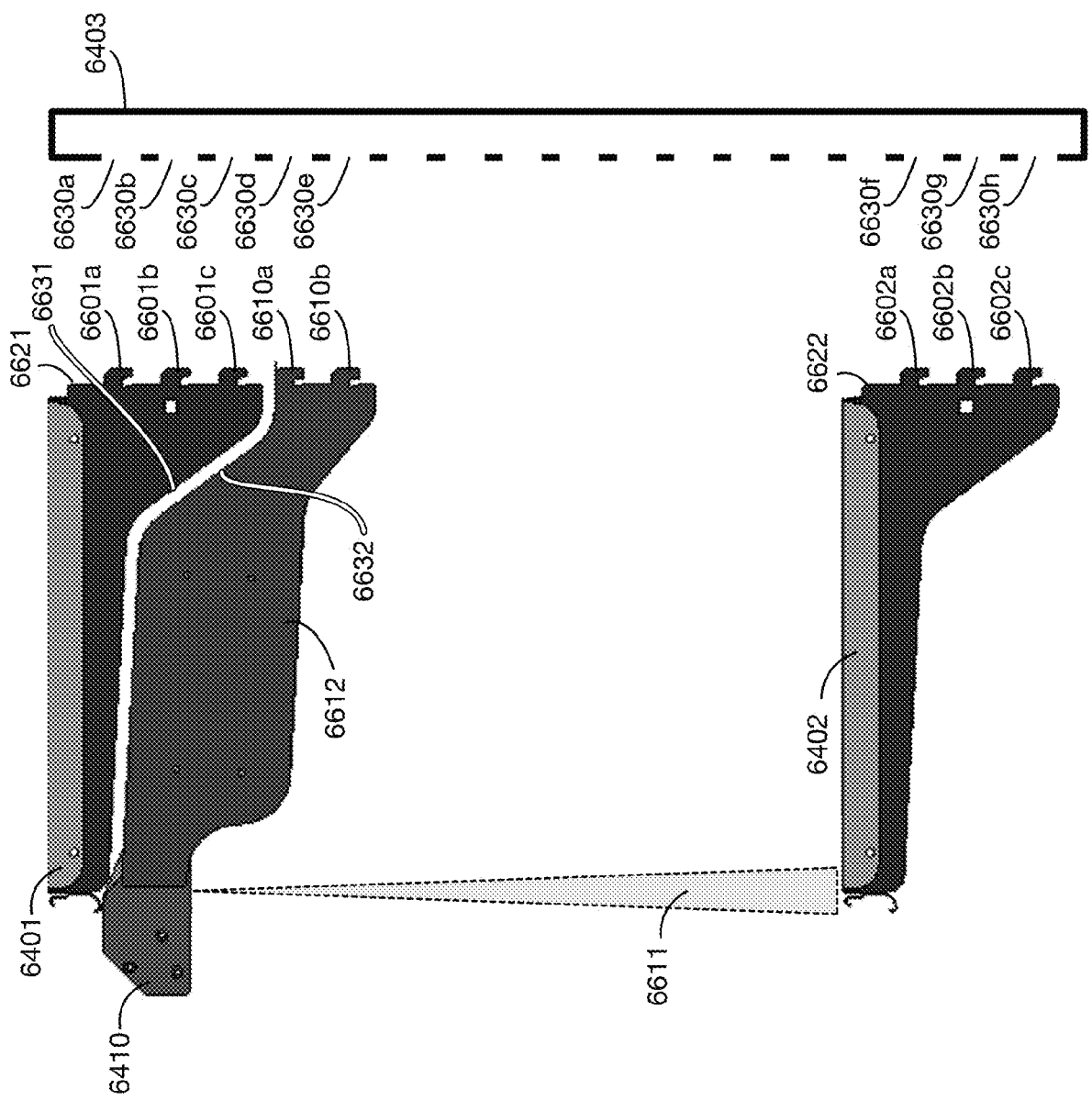
FIG. 66 shows a side view of the sensor bar of FIG. 64B installed into a shelf system.

FIG. 66 shows a side view of the shelves and sensor bar of FIG. 64B. Upper shelf 6401 has a side mounting bracket 6621 with tabs 6601a, 6601b, and 6601c that fit into corresponding slots 6630a, 6630b, and 6630c on upright 6403. Lower shelf 6402 has a side mounting bracket 6622 with tabs 6602a, 6602b, and 6602c that fit into corresponding slots 6630f, 6630g, and 6630h on upright 6403. Similar brackets exist on the opposite sides of the shelves (not shown). In this embodiment, sensor bar 6410 attaches to upright 6403 using a similar mounting bracket 6612 that fits into slots 6630d and 6630e of upright 6403. (The sensor bar may have another mounting bracket on the opposite side.) The sensor bar is therefore mounted into slots that are vertically between the slots used by the upper shelf and those used by the lower shelf. Sensor bar brackets or similar mounting hardware may be modified to be compatible with various types of shelving systems. In the embodiment shown, sensor bar bracket 6612 curves upward so that the sensor bar 6410 is located along or near the front edge of shelf 6401 even though the mounting tabs 6610a and 6610b are below those of the upper shelf bracket 6621. The upper edge 6632 of the sensor bar bracket lies below the lower edge 6631 of the upper shelf bracket 6621. This approach allows the sensor bar to use unused slots in the upright 6403 between those used by the upper shelf and those used by the lower shelf, while still positioning the sensor bar along the front edge of the upper shelf. This sensor bar mounting system therefore requires no changes to existing shelves or uprights.

FIG. 66 also illustrates the detection zone 6611 of the distance sensors of the sensor bar 6410. This detection zone may for example contain all or portions of a vertical plane at or near the front edges of the shelves. In one or more embodiments the detection zone may have gaps, for example in areas between distance sensors; however a hand entry may still be detected as long as the gaps are substantially smaller than the shopper's hand.

Figure 67:
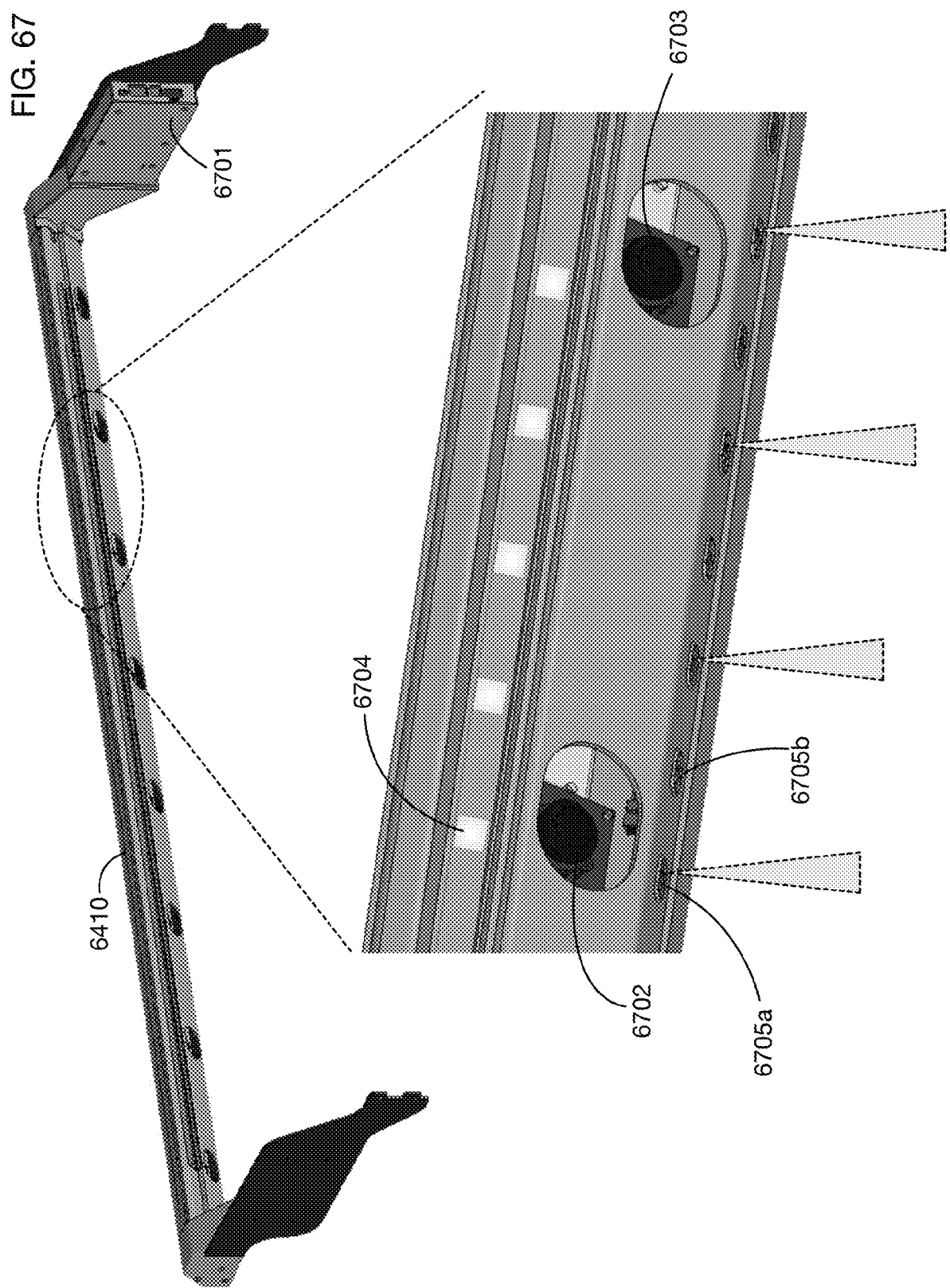
FIG. 67 shows a back view of the sensor bar of FIG. 64B, illustrating cameras, distance sensors, and lights integrated into the sensor bar and showing a sensor bar processor that controls these devices.

FIG. 67 shows a rear view of sensor bar 6410, and a closeup view of a portion of the back of the sensor bar. The illustrative sensor bar has 8 cameras, including cameras 6702 and 6703, which are oriented to view the items on the shelf below. For example, the cameras may be angled downward so that their field of view extends along the full width of the shelf below. Each camera may view the shelf through a corresponding window in the sensor bar. The sensor bar also has an array of distance sensors, such as sensors 6705a and 6705b. In one or more embodiments, distance sensors may be for example optical time-of-flight sensors, such as infrared or LIDAR, ultrasonic range sensors, or any other type of sensor that can detect entry or exit of a shopper's hand. These distance sensors may be spaced at any desired pitch. In one or more embodiments, distance sensors may be activated selectively based on the requirements of the installation. In FIG. 67, every other distance sensor is activated, so that for example distance sensor 6705a is activated and distance sensor 6705b is deactivated. Activating a subset of the distance sensors may reduce power consumption in some situations, while not compromising hand detection. Sensor bar 6410 may also have one or more lights such as LED 6704, which may for example be configured in a strip of LEDs. LEDs may be of any color or colors.

Sensor bar 6410 has an associated sensor bar processor 6710, which in the embodiment shown is installed along the side mounting bracket. This location for the processor may improve heat dissipation, and may also facilitate external connections to the processor. The processor may be coupled to the components of the sensor bar, such as cameras, distance sensors, lights, and electronic labels, via cables running along the sensor bar. In one or more embodiments some or all of these connections may be wireless. The sensor bar processor 6710 may process or collect data from the sensors on the bar, and it may transmit sensor data or processed data to other processors in a store for further analysis. For example, the sensor bar processor may monitor distance sensor signals to determine hand entry and hand exit events, and it may collect camera images from the sensor bar cameras to identify the state of the shelf below before the hand entry event and after the hand exit event. Camera images may be forwarded to other store processors for item classification. The sensor bar processor may also receive data from other processors, such as lighting data or electronic label data, and it may send control commands or signals to sensor bar devices such as lights or electronic labels based on this data.

Figure 68:
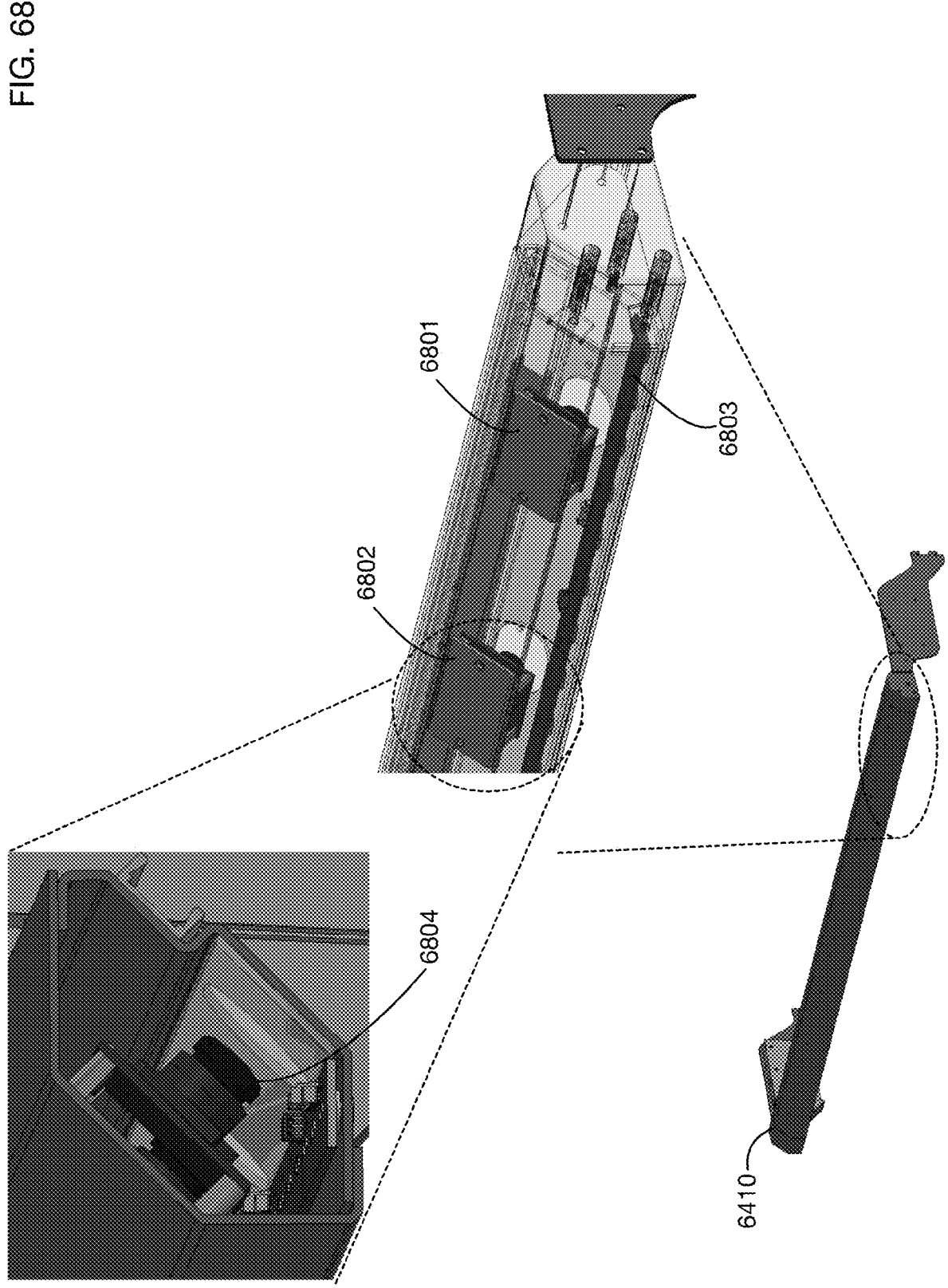
FIG. 68 shows a transparent front view of the sensor bar of FIG. 64B, illustrating cameras and distance sensors integrated into the sensor bar.

FIG. 68 shows another view of sensor bar 6410 from the front side, with a closeup view of the internal components shown using a transparent sensor bar housing. For example, the closeup view shows camera modules 6801 and 6802, and a portion of a distance sensor array 6803. A further closeup view of camera module 6802 shows camera 6804, which is angled downward to view the shelf below through a window in the sensor bar housing.

In one or more embodiments, a sensor bar may also perform disinfection or sterilization. When shoppers reach into a shelf, they may leave contaminants or pathogens on the shelf or on items that remain on the shelf. Because a sensor bar may be able to detect the entry of a shopper's hand into the shelving area, it can determine that a disinfection cycle may be appropriate. Moreover, disinfection can be performed after a shopper's hand has left the shelving area, so that the shopper is not directly affected. This as-needed disinfection feature may improve safety of the shopping experience, and it may also reduce energy consumption since disinfection may be performed when and only when required.

Figure 69:
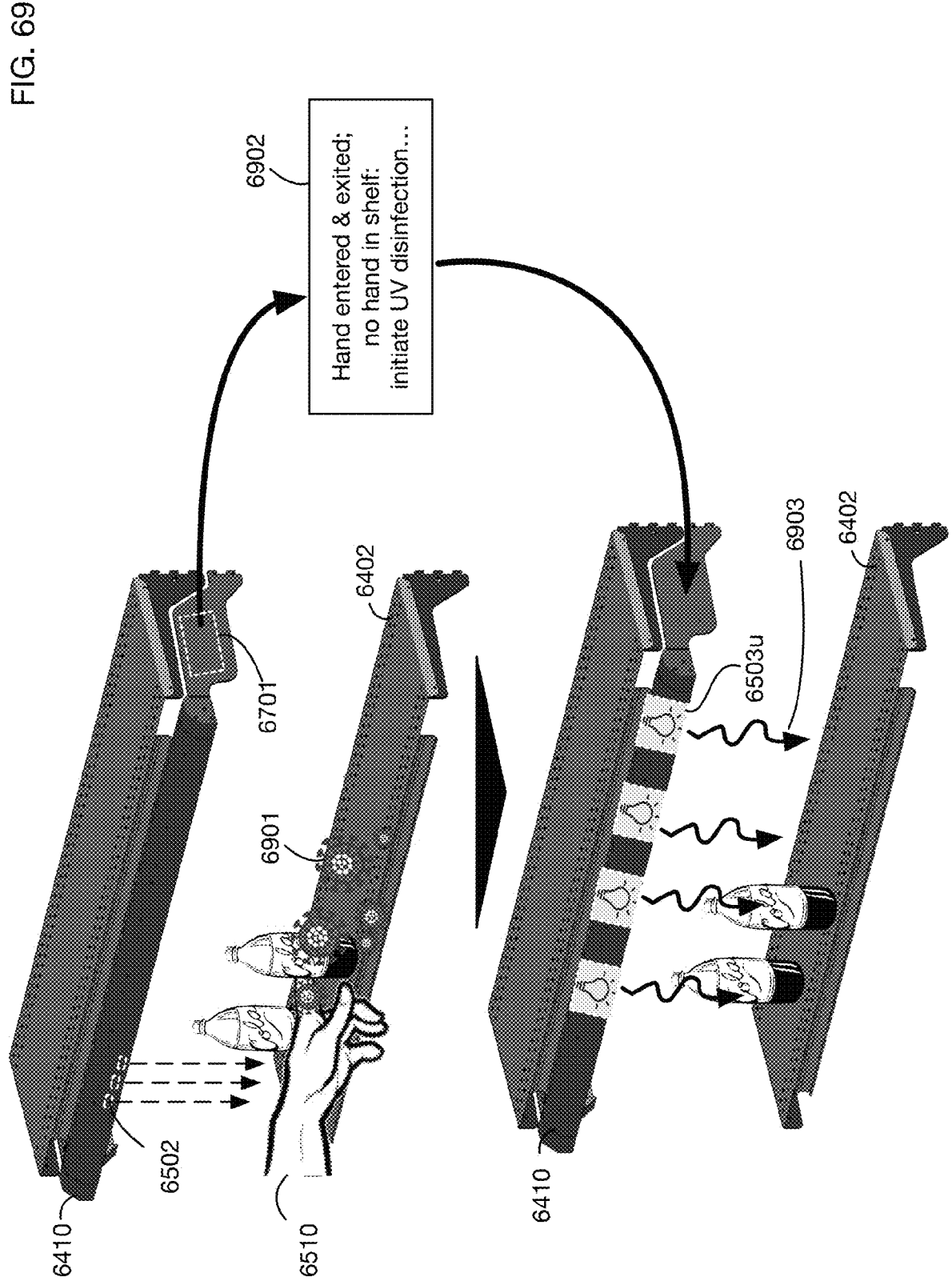
FIG. 69 shows an illustrative sensor bar that disinfects a shelf and its contents using UV light after a shopper has reached into the shelf and has retracted from the shelf.

FIG. 69 shows an illustrative sensor bar that includes an as-needed disinfection capability. As in FIG. 65, a shopper extends a hand 6510 towards items on shelf 6402. As the shopper touches items on the shelf or the shelf itself, or as the shopper breathes, coughs, or sneezes towards the shelf, the shopper may transfer contaminants or pathogens 6901 onto the items or shelf. As described above, sensors 6502 on sensor bar 6410 mounted above shelf 6402 may detect the entry of hand 6510 into the shelf area, and the subsequent exit of the hand from this area. Processor 6701 integrated into the sensor bar (or another store processor that receives data from the sensor bar) may therefore make determination 6902 that a disinfection cycle is appropriate after the hand has exited the shelf. In one or more embodiments this determination 6902 may be based on any factors or on any data collected by the sensor bar or by other sensors in the store. For example, in one or more embodiments a disinfection cycle may be performed only under certain conditions, such as when a shopper touches an item on the shelf but does not remove that item. In one or more embodiments disinfection cycles may occur after several shopper interactions, instead of after every shopper interaction. In one or more embodiments, tracking cameras in a store may be used to identify the location of shoppers in the store, and disinfection cycles may be performed based on shopper locations as well as or instead of based on shoppers' interactions with shelves. In one or more embodiments, disinfection cycles for a shelf may be performed periodically even if no shopper has approached a shelf. In one or more embodiments, shelves that are used frequently by customers, as determined for example by analyzing historical data collected from sensor bars, may be disinfected more often, for longer, or on shorter periodic cycles.

In the illustrative embodiment shown in FIG. 69, sensor bar 6410 contains one or more ultraviolet lights 6503u that may be used to perform disinfection. These lights 6503u may be typically turned off or turned down when shoppers are not interacting with the shelf. This type of disinfection is illustrative; sensor bars may contain any components that may be used to disinfect shelves or items with any modality or modalities, including but not limited to radiation, heat, chemical treatment, and air flow. In the embodiment shown, processor 6701 turns on ultraviolet lights 6503u in response to detected condition 6902. The radiation 6903 from these lights destroys or reduces the pathogens 6901. In one or more embodiments, processor 6701 may use information on the location of the hand 6501 when it interacted with the shelf to selectively activate a subset of the ultraviolet lights (or other components) on the shelf, further reducing energy usage.

If a shopper reaches into the shelving area while a disinfection cycle is ongoing, in one or more embodiments the processor may halt the disinfection cycle as a safety feature. In one or more embodiments, the sensor bar may contain indicators such as warning lights or electronic labels that indicate that disinfection is in progress.

While the invention herein disclosed has been described by means of specific embodiments and applications thereof, numerous modifications and variations could be made thereto by those skilled in the art without departing from the scope of the invention set forth in the claims.

What is claimed is:

1. A sensor bar shelf monitor, comprising:
   a bar configured to be installed proximal to a front edge of a first shelf;
   one or more cameras coupled to said bar and oriented to capture images of items on a second shelf located below said first shelf;
   one or more distance sensors coupled to said bar and oriented to detect a distance to an object in a detection zone between said first shelf and said second shelf;
   a sensor bar processor coupled to said bar and coupled electrically to said one or more cameras and to said one or more distance sensors, said sensor bar processor configured to
      analyze distance sensor data from said one or more distance sensors to detect
         a hand entry event when a shopper reaches towards said items on said second shelf; and
         a hand exit event when said shopper retracts from said second shelf;
      obtain before images of said items on said second shelf from said one or more cameras, wherein said before images are captured at a time proximal to said hand entry event;
      obtain after images of said items on said second shelf from said one or more cameras, wherein said after images are captured at a time proximal to said hand exit event;
      transmit said before images and said after images to a store processor configured to
         analyze said before images and said after images to identify an item of said items on said second shelf that is moved by said shopper.

2. The sensor bar shelf monitor of claim 1, further comprising
   one or more mounting brackets coupled to said bar, said one or more mounting brackets configured to couple with a shelf support to which said first shelf and said second shelf are coupled.

3. The sensor bar shelf monitor of claim 2, wherein
said shelf support comprises a pair of uprights, each upright of said pair of uprights comprising slots into which shelf brackets are inserted; and,
said one or more mounting brackets are further configured to be inserted into said slots.

4. The sensor bar shelf monitor of claim 3, wherein
said first shelf is coupled to a first pair of shelf brackets inserted into a first set of slots in said pair of uprights;
said second shelf is coupled to a second pair of shelf brackets inserted into a second set of slots in said pair of uprights;
said one or more mounting brackets are further configured to be inserted into a third set of slots lying vertically between said first set of slots and said second set of slots.

5. The sensor bar shelf monitor of claim 4, wherein an upper edge of said one or more mounting brackets lies below a lower edge of said first pair of shelf brackets when said one or more mounting brackets are inserted into said third set of slots.

6. The sensor bar shelf monitor of claim 1, wherein said one or more distance sensors comprise one or more optical time-of-flight sensors.

7. The sensor bar shelf monitor of claim 1, wherein said detection zone comprises a vertical planar region lying between said first shelf and said second shelf.

8. The sensor bar shelf monitor of claim 1, wherein said analyze said distance sensor data from said one or more distance sensors to detect said hand entry event comprises detect a change in said distance sensor data that exceeds a threshold.

9. The sensor bar shelf monitor of claim 1, further comprising
one or more lights coupled to said bar and configured to illuminate said items on said second shelf.

10. The sensor bar shelf monitor of claim 9, wherein
said sensor bar processor is further electrically coupled to said one or more lights; and,
said sensor bar processor is further configured to
receive lighting data; and,
transmit lighting control signals to said one or more lights based on said lighting data.

11. The sensor bar shelf monitor of claim 9, wherein
said one or more lights comprise one or more disinfecting lights that are configured to emit radiation that disinfects one or both of said second shelf and said items on said second shelf;
said sensor bar processor is further electrically coupled to said one or more disinfecting lights.

12. The sensor bar shelf monitor of claim 11, wherein said sensor bar processor is further configured to activate one or more of said one or more disinfecting lights after said hand exit event.

13. The sensor bar shelf monitor of claim 11, wherein said radiation comprises ultraviolet light.

14. The sensor bar shelf monitor of claim 1, further comprising
one or more electronic shelf labels coupled to said bar and electrically coupled to said sensor bar processor;
wherein said sensor bar processor is further configured to
receive label data; and,
transmit display commands to said one or more electronic shelf labels based on said label data.

15. The sensor bar shelf monitor of claim 1, wherein said analyze said before images and said after images to identify an item of said items on said second shelf that is moved by said shopper comprises
project said before images onto one or more surfaces contained in a volume between said first shelf and said second shelf to generate projected before images corresponding to each combination of a surface of said one or more surfaces and a camera of said one or more cameras;
project said after images onto said one or more surfaces to generate projected after images corresponding to said each combination of a surface of said one or more surfaces and a camera of said one or more cameras;
analyze
said projected before images, and
said projected after images, to
identify said item of said items on said second shelf that is moved by said shopper.

16. The sensor bar shelf monitor of claim 15, wherein said analyze said projected before images and said projected after images comprises
calculate a 3D volume difference between
contents of said second shelf at said time proximal to said hand entry event, and
contents of said second shelf at said time proximal to said hand exit event;
when said 3D volume difference indicates that said contents of second shelf at said time proximal to said hand exit event is smaller than said contents of said item storage area at said time proximal to said hand entry event,
input at least a portion of one or more of said projected before images that intersects said 3D volume difference into a classifier;
when said 3D volume difference indicates that said contents of said second shelf at said time proximal to said hand exit event is larger than said contents of said second shelf at said time proximal to said hand entry event,
input at least a portion of one or more of said projected after images that intersects said 3D volume difference into said classifier; and,
identify said item of said items on said second shelf that is moved by said shopper as an output of said classifier.

17. The sensor bar shelf monitor of claim 16, wherein said store processor is further configured to
calculate a quantity of said item of said items on said second shelf that is moved by said shopper based on said 3D volume difference; and,
associate said quantity with said shopper and with said item.

18. The sensor bar shelf monitor of claim 17, wherein said calculate said quantity of said item comprises obtain a size of said item; and,
compare said 3D volume difference with said size of said item to determine said quantity of said item.

19. A sensor bar shelf monitor, comprising:
a bar configured to be installed proximal to a front edge of a first shelf;
one or more cameras coupled to said bar and oriented to capture images of items on a second shelf located below said first shelf;
one or more distance sensors comprising one or more optical time-of-flight sensors coupled to said bar and oriented to detect a distance to an object in a detection zone between said first shelf and said second shelf, wherein said detection zone comprises a vertical planar region lying between said first shelf and said second shelf;

one or more lights coupled to said bar and configured to illuminate said items on said second shelf;

one or more electronic shelf labels coupled to said bar;

a sensor bar processor coupled to said bar and coupled electrically to said one or more cameras, to said one or more distance sensors, to said one or more lights, and to said one or more electronic shelf labels, said sensor bar processor configured to receive lighting data;

transmit lighting control signals to said one or more lights based on said lighting data;

receive label data;

transmit display commands to said one or more electronic shelf labels based on said label data;

analyze distance sensor data from said one or more distance sensors to detect a hand entry event when a shopper reaches towards said items on said second shelf; and a hand exit event when said shopper retracts from said second shelf;

obtain before images of said items on said second shelf from said one or more cameras, wherein said before images are captured at a time proximal to said hand entry event;

obtain after images of said items on said second shelf from said one or more cameras, wherein said after images are captured at a time proximal to said hand exit event;

transmit said before images and said after images to a store processor configured to analyze said before images and said after images to identify an item of said items on said second shelf that is moved by said shopper.

20. The sensor bar shelf monitor of claim 19, further comprising one or more mounting brackets coupled to said bar, said one or more mounting brackets configured to couple with a shelf support to which said first shelf and said second shelf are coupled.

21. The sensor bar shelf monitor of claim 20, wherein said shelf support comprises a pair of uprights, each upright of said pair of uprights comprising slots into which shelf brackets are inserted; and, said one or more mounting brackets are further configured to be inserted into said slots.

22. The sensor bar shelf monitor of claim 21, wherein said first shelf is coupled to a first pair of shelf brackets inserted into a first set of slots in said pair of uprights;

said second shelf is coupled to a second pair of shelf brackets inserted into a second set of slots in said pair of uprights;

said one or more mounting brackets are further configured to be inserted into a third set of slots lying vertically between said first set of slots and said second set of slots.

23. The sensor bar shelf monitor of claim 22, wherein an upper edge of said one or more mounting brackets lies below a lower edge of said first pair of shelf brackets when said one or more mounting brackets are inserted into said third set of slots.

* * * * *